May 10, 1966   R. G. FISHER   3,250,859
UNIVERSAL LINE CONCENTRATOR
Filed Dec. 31, 1962   69 Sheets-Sheet 7

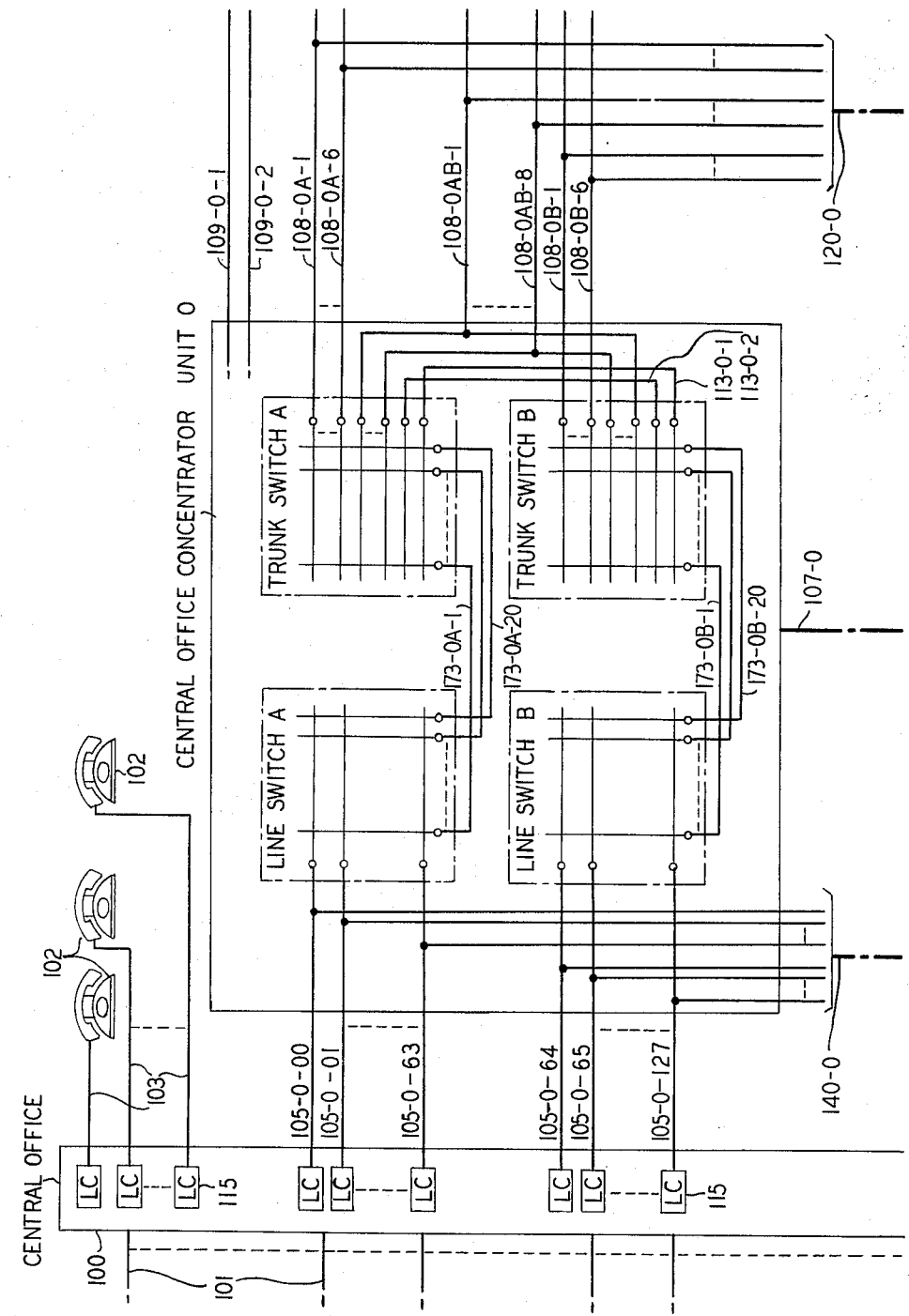
FIG. IA

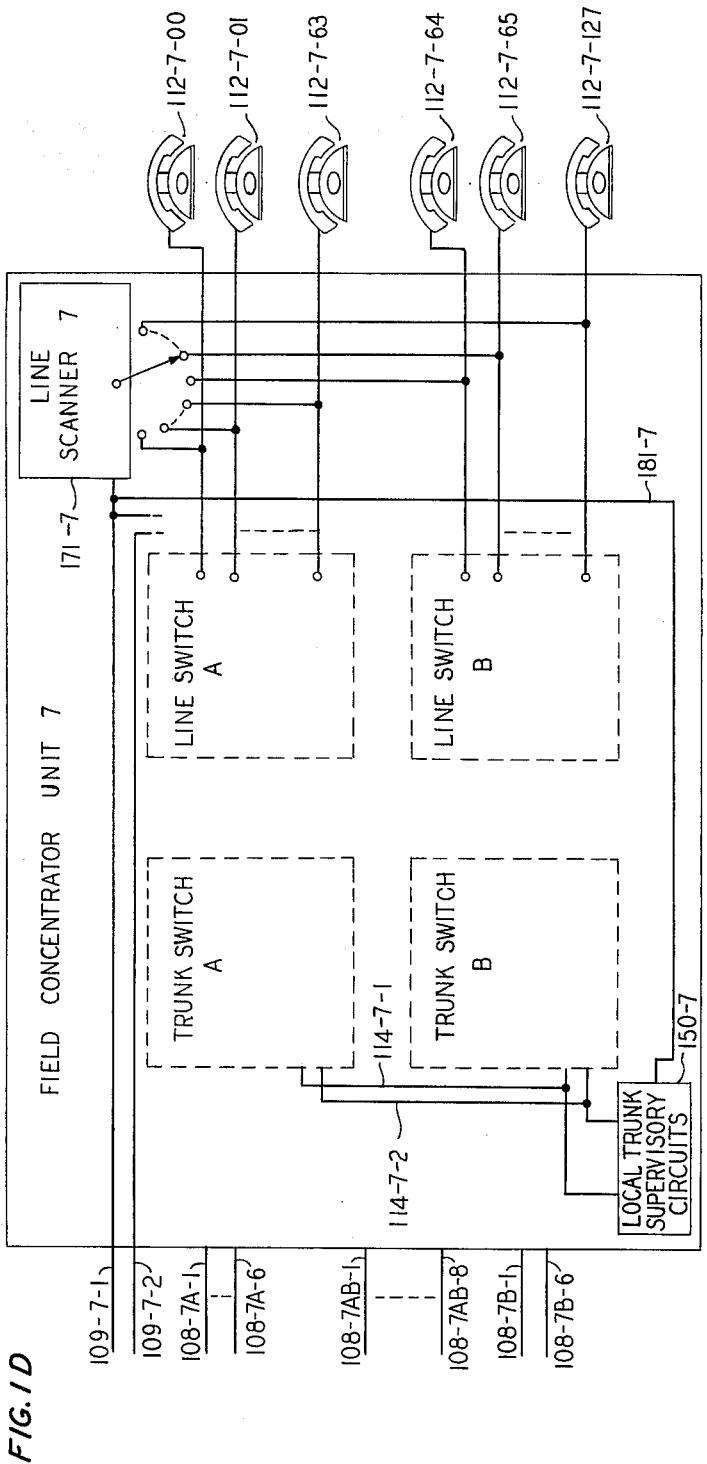

May 10, 1966 R. G. FISHER 3,250,859
UNIVERSAL LINE CONCENTRATOR
Filed Dec. 31, 1962 69 Sheets-Sheet 50

May 10, 1966  R. G. FISHER  3,250,859
UNIVERSAL LINE CONCENTRATOR
Filed Dec. 31, 1962

FIG.54

May 10, 1966  R. G. FISHER  3,250,859
UNIVERSAL LINE CONCENTRATOR
Filed Dec. 31, 1962  69 Sheets-Sheet 68

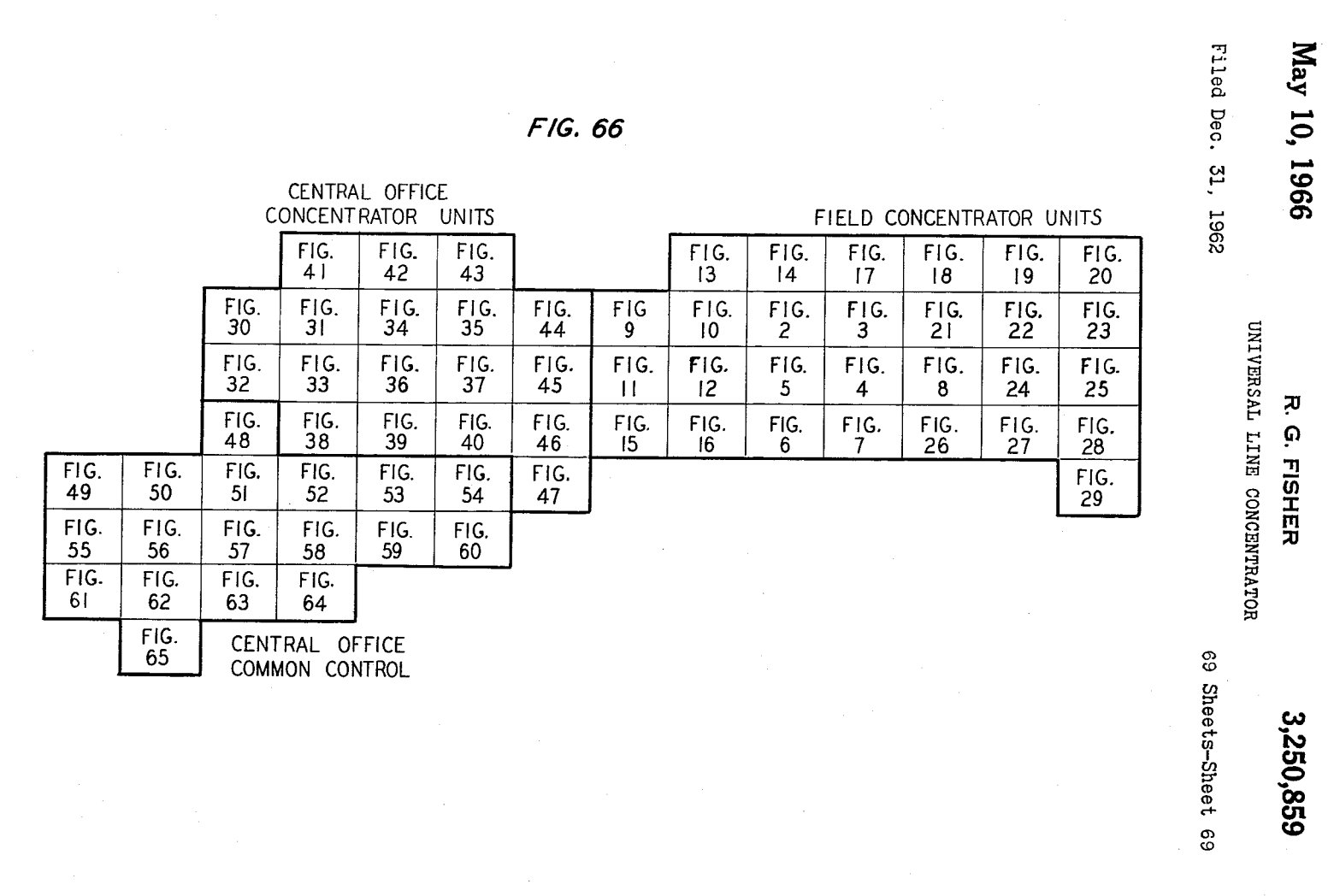

May 10, 1966  R. G. FISHER  3,250,859
UNIVERSAL LINE CONCENTRATOR
Filed Dec. 31, 1962  69 Sheets-Sheet 69

FIG. 66

United States Patent Office 3,250,859
Patented May 10, 1966

3,250,859
UNIVERSAL LINE CONCENTRATOR
Richard G. Fisher, Birmingham, Mich., assignor to American Telephone and Telegraph Company, New York, N.Y., a corporation of New York
Filed Dec. 31, 1962, Ser. No. 248,517
29 Claims. (Cl. 179—18)

This invention relates to telephone systems and more particularly to subscriber line concentrating systems.

Where subscribers are located a considerable distance from a telephone central office, the cost of wire facilities is appreciable, and the problem of providing them in sufficient quantity is a major one. For example, where a community has experienced unanticipated growth, the underground ducts which carry subscribers' cables are often fully utilized, and additional cable capacity can be provided only after major construction efforts have been undertaken.

It is well known that only a portion of a group of subscribers have a need for service at any one instant. Such requirements vary from subscriber group to subscriber group. However, traffic studies can readily develop representative service requirements of any group of subscribers.

Line concentrating systems are designed with the above-noted traffic considerations in mind, and in a line concentrator system a group of subscriber stations are connected to a telephone central office by a group of transmission paths which are fewer in number than the number of subscribers served. A line concentrating system includes apparatus for recognizing the transmission needs of a subscriber's line, and for establishing the required transmission and signaling paths between the subscriber and the telephone central office.

Subscriber line concentrators fall in two broad categories; namely, universal and nonuniversal. A universal line concentrator, although it may have optional internal wiring may generally be used with any of the well-known present-day telephone switching systems. A nonuniversal concentrator, however, is designed for use with only one particular type of telephone switching system.

In many line concentrating systems the supervision and control equipment is located at the central office and is included in the central office unit of the line concentrating system. The cost of this control equipment is generally a substantial part of the cost of the entire system. Many line concentrating systems may operate in conjunction with a particular central office with the various field units being located in different geographical positions. However, the central office unit of each line concentrating system is located in the central office. It thus becomes possible to provide a common control for operating with the central office unit of each line concentrating system. In this manner each individual line concentrating system shares a portion of the cost of the single common control, and the average cost of each system may be considerably reduced.

In certain prior art concentrating systems when one remote subscriber is connected to another served by the same unit, two trunks need be employed; each connecting one of the two subscribers to the central office where they are connected to each other through the central office switching equipment. As both subscribers are connected to the same remote unit it is possible to connect them directly to each other once the call is established, and thereby release the two priorly used trunks. In this manner the capacity of the system could be increased as these two trunks can now serve two other remote subscribers. Certain prior art circuits have been unable however to effect this type of connection. Control of all connections and disconnections is generally provided by the central office unit, supervisory and switching information being transmitted from the central office unit to the field unit to establish or disestablish connections. If two remote subscribers are connected directly to each other through the field unit and there is no connection of either one to the central office via one of the inter-unit trunks, it is apparent that the central office unit is unable to supervise the connection at the remote unit. The lack of means to effect and supervise a direct connection of two remote subscribers to each other in the field unit has prevented certain prior art concentrators from increasing their capacity in this manner.

To effect an increased capacity in the manner described, it is not enough to be able to establish direct connections at the remote unit. It is also necessary to first detect when two subscribers served by the same unit should be connected directly to each other at the remote unit. Extensive logic and memory circuits could be used to detect this condition, but their cost is appreciable if not prohibitive.

It is a general object of this invention to provide an improved universal communication switching system wherein subscriber stations are selectively and individually connected to a telephone central office by a smaller number of common trunks.

More particularly, an object of this invention is the optimum utilization of electronic and electromechanical techniques whereby subscriber needs are more economically and efficiently served.

It is another object of this invention to provide common control equipment to operate in conjunction with a plurality of line concentrating systems serving the same central office.

It is a principal object of this invention to provide a concentrating system having fewer trunks between central office and field units than prior art systems having the same call capacity.

More particularly, it is an object of this invention to selectively directly connect any two subscribers served by the same remote unit to each other by means of a local trunk at the remote unit, and to provide supervision of the call at the remote unit.

It is another principal object of this invention to detect when two subscribers may be directly connected to each other at their remote unit without requiring extensive logic and memory circuits, but rather a scanning circuit that is more efficient and far less costly.

It is another object of this invention to enable the common control to verify that the central office and field units are establishing or disestablishing connections in accordance with instructions from the common control for more reliable operation.

These and other objects of the invention are attained in one illustrative embodiment wherein requests for service are handled on an electronic basis, and wherein the communication paths are established by electromechanical means. Each line concentrator of the invention comprises a central office unit which is located at the telephone central office and is connected to subscriber line circuits therein, and a field unit which is located some distance from the central office and is connected to subscriber stations in the region of the field unit. The operation of each line concentrator is controlled by a common control unit located in the central office, the single common control serving eight line concentrating systems in the illustrative embodiment. Requests for service at both the central office and field units are detected by electronic scanning circuits. Once a request for service has been detected, the connection between the subscriber station and its associated central office line circuit is effected and maintained by electromechanical means contained in the particular line concentrator serving the subscriber.

The need to release a trunk in any of the eight line concentrators after the termination of a call is detected by an electronic trunk release scanner located in the central office common control which operates simultaneously with the line scanners rather than on an interleaved basis. Through the unique combined line and trunk scanning circuits employed in the system, subscriber service is efficiently and economically provided.

In certain prior art concentrating systems, to effect a call between two subscribers served by the same field unit two trunks must be used, each connecting a respective subscriber to the central office where the two trunks are connected to each other through the central office switching equipment. In the concentrating system of the invention, however, both subscribers served by and connected to the same remote unit are connected directly to each other. Both of the two trunks originally utilized for connecting the two subscribers to each other are released. A local trunk at the field unit is then substituted in place of the two originally used trunks connecting the central office and field units. Each subscriber is connected to one end of the local trunk, and thus two extra trunks become available to serve the remaining subscribers in the group. This permits a reduced number of trunks between the central office and remote units because various ones of the subscribers in the group served by the line concentrating system are provided with talking paths without requiring the use of inter-unit trunks. On the average, fewer subscribers must be connected via trunk cables to the central office units, and as a result fewer of these trunks need be included in the line concentrating equipment.

The central office common control scans every combination of two trunks in each of the eight units to detect the connection of any two trunks in the same group to each other. This scanning is interleaved with the trunk release scanning, and takes place simultaneously with line scanning. When the central office common control detects the connection to each other of any two trunks in the same one of the eight line concentrators, it operates on this particular concentrator to release the two trunks, and to connect the two subscribers at the field unit to each other by a local trunk. The common control also effects the connection of the subscribers' respective line circuits in the central office to each other by means of a local trunk in the central office unit of the particular concentrator, this connection being established for supervisory purposes, e.g., to provide busy tone for all incoming calls to either subscriber.

The common control detects the connection of two trunks serving the same central office and field units to each other through the central office switching equipment. Extensive logic and memory circuits are not required. The call is first established utilizing two inter-unit trunks. A scanning circuit then detects their connection to each other. A nonaudible tone is applied successively to each trunk. (The term "nonaudible tone" as used in the following description refers to a signal, preferably of a single frequency, to which the human ear is insensitive.) During the application of the tone to each trunk all other trunks in the same group are scanned for its appearance. If the tone is detected, the trunk on which it is applied, and the trunk on which it is detected are necessarily connected to each other. The two trunks are then released, and the local trunks employed. By first establishing two connections, both utilizing an inter-unit trunk, and then scanning pairs of trunks for possible interconnections, the use of extensive logic and memory circuits is avoided.

The field unit determines when the two subscribers on the local connection terminate their call. The field unit then initiates the release of the local connection, and notifies the common control to release the equivalent local connection in the respective central office unit. Because the field unit is capable of supervising local connections, not even one inter-unit speech trunk is required to connect the locally connected subscribers to the central office equipment; maximum economy is achieved.

It is a feature of this invention to scan subscriber lines and subscriber line circuits for service requests simultaneously; and to scan trunks for trunk release requirements, and pairs of trunks for possible interconnections.

It is another feature of this invention to scan pairs of trunks serving the same central office and field units for possible interconnections by successively applying a superaudible tone to each one of the trunks and scanning the remainder of the trunks in the same group for the appearance of the same tone.

It is another feature of this invention to scan trunks for release requests by applying the same superaudible tone to all links connected to line circuits requiring release, the tone appearing on those trunks requiring release.

It is another feature of this invention to provide means for connecting two subscriber lines served by the same field unit directly to each other in the field unit, and for releasing the two trunks originally serving them when it is determined by the common control that the two subscribers are connected to each other.

It is another feature of this invention to provide talking battery and supervisory circuits for the two subscriber lines connected directly to each other in the field unit.

It is another feature of this invention to provide means for directly connecting the two line circuits associated with the same two subscribers to each other through the same central office line concentrator unit when the common control determines that they are connected to each other through the central office switching equipment.

It is another feature of this invention to provide means for enabling the direct connection supervisory equipment at the field unit to notify the common control of a release request by the locally connected subscriber lines, the common control releasing the direct connections in the field and central office units in response thereto.

It is another feature of this invention to provide local trunks in both field and central office units for establishing the direct connections.

It is another feature of this invention, if all the local trunks are busy, to establish local connections of subscriber lines and line circuits requiring them immediately after the release of a local trunk in each unit.

It is another feature of this invention to scan trunks for release requests and pairs of trunks for possible interconnections on an interleaved basis, and to so scan the trunks in only one plurality at any time.

It is another feature of this invention to enable the line scanning and interleaved trunk scanning to occur simultaneously.

It is still another feature of this invention to provide interconnections between trunks, links, and subscriber lines or line circuits in both field and central office units in such a manner that all connections are established or released without requiring the transmission of more than trunk identity information between central office and field units.

The above and other objects and features of the invention will be more readily understood from the following description in conjunction with the drawing, in which:

FIGS. 1A–1D are a general block diagram schematic of the concentrating system of the invention, the figures being arranged as shown in FIG. 1E;

FIGS. 2–29 are a schematic representation of a line concentrator field unit in accordance with the illustrative embodiment of the invention;

FIGS. 30–47 are a schematic representation of a plurality of line concentrator central office units in accordance with the illustrative embodiment of the invention;

FIGS. 48–65 are a schematic representation of the central office common control in accordance with the illustrative embodiment of the invention; and FIG. 66 shows the arrangement of FIGS. 2 through 65.

Figure 1B:
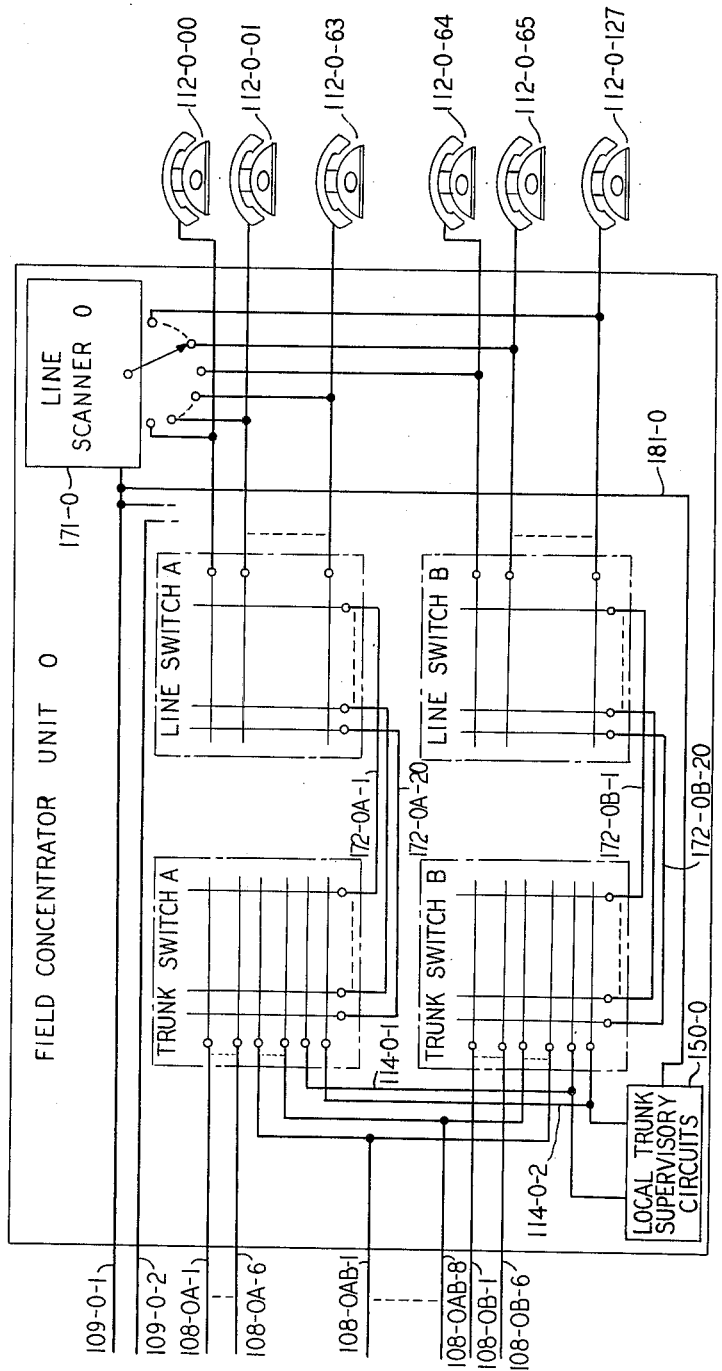
Figure 1C:
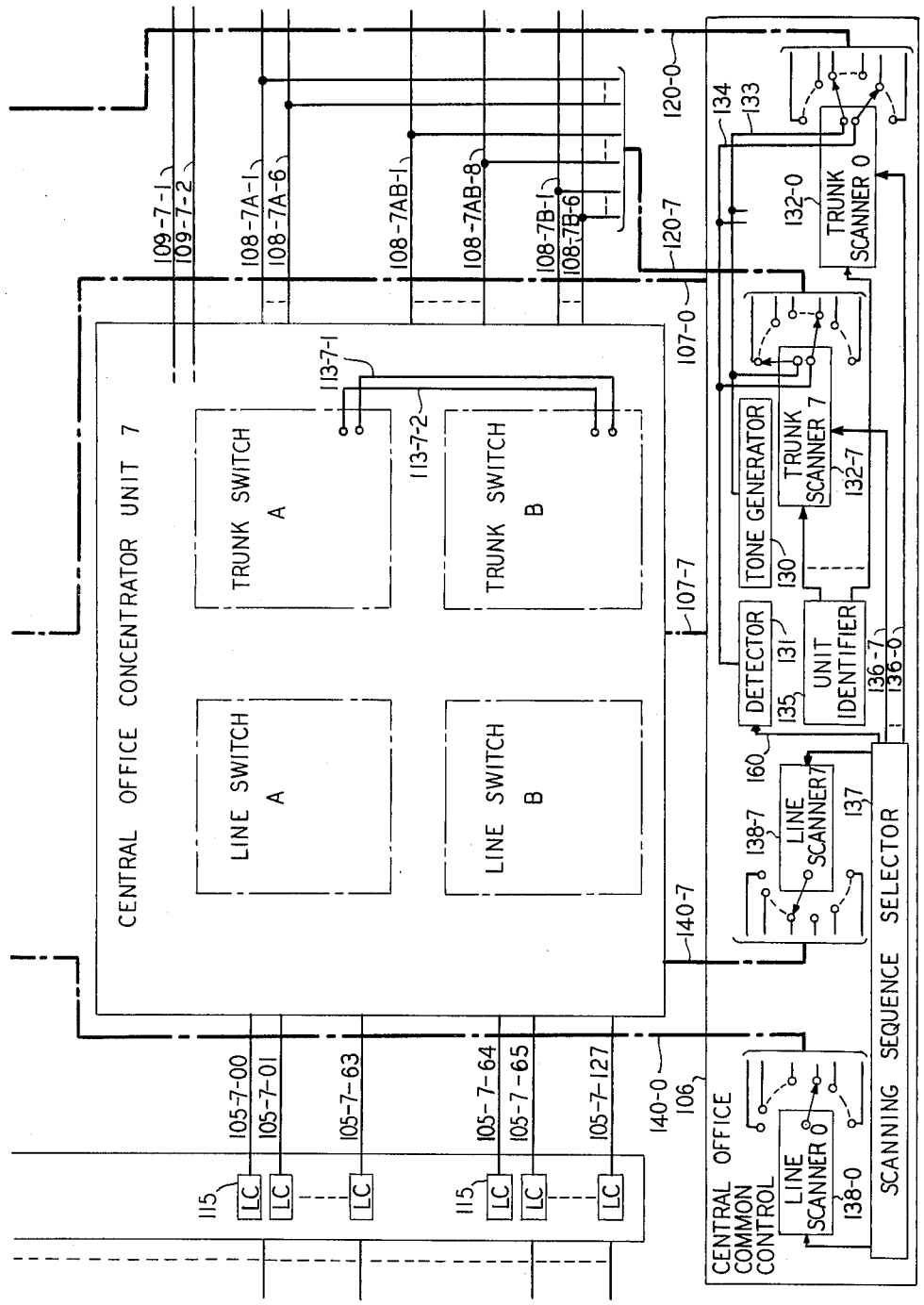
Figure 2:
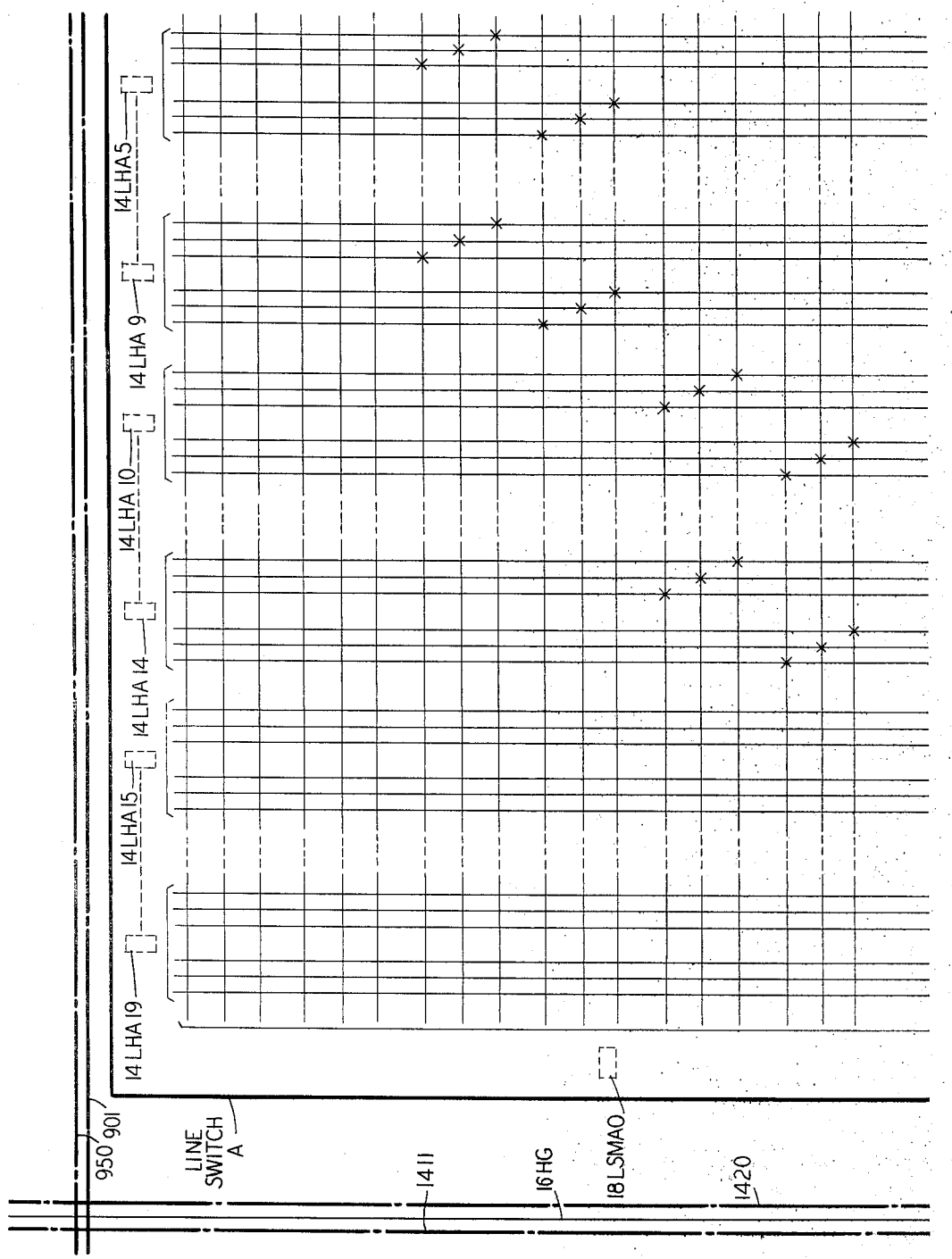

The description of the illustrative embodiment of the line concentrating system of the invention will be presented in accordance with the following index:

```
I. General Description of Entire System                          Column
   A. Component Description of FIGS. 1A-1D_____  6
   B. Examples of Scanning and Switching Sequences_____ 10
      (1) Regular Connection_____ 10
      (2) Local Connection_____ 10
      (3) Trunk Release_____ 11
      (4) Local Connection Release_____ 12
II. Field Unit
   A. General Description_____ 12
   B. Switching Scheme at Field Unit_____ 13
   C. Switching Information Transmitted to Field Unit_____ 18
      (1) Regular Connection Switching Information_____ 18
      (2) Trunk Release Switching Information_____ 19
      (3) Local Connection Switching Information_____ 20
      (4) Local Connection Release Switching Information_____ 22
   D. Regular Connection_____ 22
      (1) Detailed Description of Field Unit Operation_____ 22
      (2) Summary of Signal Information Transmitted Between
           Central Office and Field Units for Regular Connection_ 43
   E. Trunk Release_____ 43
      (1) Detailed Description of Field Unit Operation_____ 43
      (2) Summary of Signal Information Transmitted Between
           Central Office and Field Units for Trunk Release___ 46
   F. Local Connection_____ 46
      (1) Detailed Description of Field Unit Operation_____ 46
      (2) Summary of Signal Information Transmitted Between
           Central Office and Field Units for Local Connection_ 53
   G. Local Connection Release_____ 53
      (1) Detailed Description of Field Unit Operation_____ 53
      (2) Summary of Signal Information Transmitted Between
           Central Office and Field Units for Local Connection
           Release_____ 58
III. Central Office Units and Common Control
   A. General Description_____ 59
   B. Switching Scheme of Each Central Office Unit_____ 60
   C. Switching Information Required for Central Office Unit
       Operation_____ 60
      (1) Regular Connection Switching Information_____ 60
      (2) Trunk Release Switching Information_____ 61
      (3) Local Connection Switching Information_____ 61
      (4) Local Connection Release Switching Information_____ 61
   D. Regular Connection—Detailed Description of Central
       Office Unit and Common Control Operations_____ 61
   E. Trunk Release—Detailed Description of Central Office
       Unit and Common Control Operations_____ 83
   F. Local Connection—Detailed Description of Central Office
       Unit and Common Control Operations_____ 94
   G. Local Connection Release—Detailed Description of Central
       Office Unit and Common Control Operations_____ 111
IV. Epilogue_____ 115
```

Although most of the sequences performed originate in the eight central office units and the common control, a description of one of the eight field units will be presented first. The eight central office units and the common control are so inter-related that they must be described together; a result, a field unit, being considerably smaller and less complex, is a more convenient starting point. An analysis of the switching scheme of a field unit (IIB) and the switching information that must be transmitted to the field unit (IIC) will aid immeasurably in the understanding of the invention. Following this analysis the four detailed sequences of operations relating to the four respective functions of the field unit will be presented. Signal information is transmitted back and forth between the central office and field units for each type of connection to be established, or for each type of release to be effected. In the description of the field unit operation it will be assumed that the respective central office unit responds in the desired manner with the signal to be described below. A description of where and how these signals originate, however, will be deferred until Section III where the operations of the central office units and the common control will be described in detail. In order to more easily understand the manner in which the two ends of the system operate with each other, after the detailed description of each of the four sequences of operations in the field unit, a summary of the signal information transmitted back and forth between the central office and the field units will be presented. Thus, in describing the operation of the central office units and the common control the compatibility of the two ends of the system will become apparent by referring back to the summary of the transmitted signal information for each sequence.

I. GENERAL DESCRIPTION OF ENTIRE SYSTEM

A. Component description of FIGS. 1A–1D

Referring to FIGS. 1A–1D, a block diagram schematic of the line concentrating system of the invention is shown. Eight pairs of central office and field concentrator units are associated with central office 100. Central office and field units 0 are shown in more detail than central office and field units 7, the other 6 pairs of units not being shown in the drawing.

Each pair of concentrator units serves 128 subscribers 112–. The second number in each of the subscribers designations refers to the particular one of the eight field units serving the subscriber. The last number in each designation identifies the subscriber as one of 128 in the same group.

In central office 100 are shown line circuits 115, each associated with a respective subscriber served by the central office. Certain ones of these line circuits, of which only three are shown, are connected directly via respective lines 103 to respective subscribers 102. Others of these line circuits are associated with subscribers served by the line concentrating system of the invention. Each of these line circuits is connected to one of the central office units by a respective conductor group 105–. The second number in each of the conductor designations 105– identifies the particular central office unit serving the subscriber. The third numeral identifies the particular subscriber served by this unit.

The line concentrating system of the invention is universal in that it is compatible with many types of central offices. The requirement necessary for the compatibility of the illustrative embodiment of the invention with a central office is that the sleeve of each line circuit be maintained at a more negative potential in the normal condition, and at a more positive potential when the line circuit is connected to a calling party desiring to be connected to the associated subscriber, or when the line is in use.

The cables 101 represent inter-office trunks, intra-office trunks, etc. A connection of any subscriber served by the line concentrator system to any other telephone subscriber, whether or not the other subscriber is served by the same concentrator system or even by the same central office, is over various ones of cables 101.

Connected between each central office and field unit pair are two control cables 109–C. Signaling and switching information is transmitted back and forth between respective central office and field units over the tip and ring conductors in each of these cables. The second number in the designation of each control pair refers to the particular central office and field units served. The third number in each designation identifies each control pair as one of two.

Each line served by the concentration system is scanned at a rate of approximately four times per second. If a line wishes service in either direction, that is, the subscriber wishes to place a call or his line circuit is energized indicating an incoming call to him, the identity of the line is maintained registered in counter systems located in both the common control and the particular field unit serving the subscriber. If the subscriber desires service, his field unit notifies the respective central office unit, and through the central office unit the common control, of the service request. If an incoming call is being placed, the common control, through the respective central office unit, notifies the particular field unit over the control cables that a call is to be terminated to the particular subscriber. For a terminating call, the subscriber is connected by one of the 20 trunks serving his central office and field units to his associated line circuit. The central office supplies ringing current in the ordinary fashion. In the case of a service request by the subscriber, the line concentrating system connects him to his line circuit, and the central office then supplies dial tone.

If the subscriber is calling another subscriber served by the same central office and field units, the sequence of operations is as previously described. The calling subscriber is first connected via one of the 20 trunks serving his field unit to his line circuit and he is supplied with dial tone. He then dials, in the ordinary manner, the number of his neighbor. Central office 100 connects this subscriber to his neighbor's line circuit which results in a call being offered to the respective central office unit. The central office common control 106 then establishes a connection to the second subscriber over a second one of the 20 trunks in the same group. The called party's telephone will ring from the central office ringing current in the usual manner, and when he answers the message register, AMA, or similar equipment associated with the calling party's line will function in the ordinary manner.

At the central office, while the common control scans all of the line circuits associated with subscribers served by the line concentrating system, a simultaneous and independent scan is made of all combinations of trunks serving the same central office and field units for a possible connection through the central office of one trunk to another. The trunk scanning circuit includes an 18 kc. oscillator which places this frequency separately on the tip and ring of each trunk in turn. While this frequency is placed on each trunk the other 19 trunks in the same group are scanned for the tone. If a connection has been established between one subscriber and another served by the same central office and field units, the 18 kc. tone will be transmitted over one of the trunks, through the central office switching equipment, and over the second of the trunks, and therefore be detected by the common control. The common control then causes these two trunks to be released, and the two subscribers to be connected to each other directly over one of the two local trunks 114– serving the respective field unit. The second number in each of the local trunk designations refers to a particular field unit. The third number in the designation identifies the local trunk as one of two.

Two local trunks 113–, bearing similar designations, serve each central office unit. It is necessary to not only connect the two subscribers to each other through their mutual field unit but to connect the two associated line circuits to each other through the central office unit as well. This is necessary in order that the central office be aware that each of the two subscriber lines is "busy" in the event that incoming calls are placed to either of the two subscribers. This local connection in the central office unit is maintained until the two locally-connected subscribers hang up.

The central office common control 106 is connected to each of the central office units by respective control cables 107–. It is over the control paths in these cables that common control 106 controls the operation of each pair of central office and field units.

The scanning of trunks for release takes place simultaneously with line scanning for service requests, and is on an interleaved basis with the scanning of pairs of trunks to determine the connection of two trunks in the same group to each other. Regular release scanning involves the scanning of individual trunks to determine the on-hook condition of the subscriber previously connected to the trunk. When common control 106– detects this condition it causes the central office and field units to release the particular trunk.

When subscribers on a local connection hang up their receivers, the particular field unit local trunk circuit previously used controls the notification of the respective central office unit over a control pair that a pair of local trunks, one in each unit, are to be released. This release is effected by common control 106.

The switching system of each central office unit is similar to that shown in FIG. 1A for central office unit 0. Central office unit 0 contains two line switches and two trunk switches, A and B. Sixty-four of the line circuits are connected to line switch A, and 64 to line switch B. A plurality of links 173– connects each line switch to its respective trunk switch. The twenty trunks serving central office unit 0 are connected to the two trunk switches. Six of these trunks are connected only to trunk switch A and thus only the first 64 line circuits are connectable to these trunks. Similarly six of the 20 trunks are connected only to trunk switch B and are thus connectable only to the second group of 64 line circuits. The remaining eight trunks are connected to both trunk switches and are thus connectable to all 128 line circuits. The designation 108–0A–1 identifies this trunk as being connected to trunk switch A in central office unit 0. Similar remarks apply to the trunks whose middle designations are 0B. The eight trunks whose middle designations are 0AB are the eight connected to both trunk switches.

Trunks 113–0–1 and 113–0–2 are the two local trunks associated with central office unit 0. When the common control determines that two subscribers, both served by field unit 0, are connected to each other through the central office switching equipment, the two trunks serving these subscribers are released. At this time the two respective line circuits are connected to one of the two local trunks in the respective central office unit. The connections through the line switches are not changed. Each line circuit is still connected to the same link to which it was priorly connected. The two links however are no longer connected to two of the 20 inter-unit trunks. Instead they are both connected to one of the two local trunks. For example, if local trunk 113–0–1 is idle the two line circuits are connected through one or both trunk switches to this trunk. If the two line circuits are served by different line switches it is seen that both links connected to these line circuits are connected to each other over local trunk 113–0–1. If both line circuits are served by the same line switch, crosspoints associated with both links in the same trunk switch are operated, and both links are connected to local trunk 113–0–1. It makes no difference whether the two line circuits are in the same or different trunk switches. Similarly, local trunk 113–0–2 is connectable to any two links serving the same or different pairs of line and trunk switches.

The switching plan in each of the eight field units is similar to that of the central office units. Each of the line switches serves 64 subscribers. Thus each subscriber can be connected to only one of the two trunk switches. From the trunk switch each subscriber can be connected to the associated central office unit over one of the six trunks serving only this trunk switch or one of the eight common trunks. The two local trunks in the field unit operate in the same manner as those in the central office unit.

Central office common control 106 is connected to each of the eight pairs of units by three sets of conductors. Conductor groups 120–0 thorugh 120–7 connect the 20 trunks serving each pair of units to the common control. The common control scans these trunks to detect both requests for regular releases and the connection of any two trunks servng the same units to each other through the central office switching equipment. Conductor groups 140–0 through 140–7 connect the 128 line circuits in each central office unit to the common control for the purpose of line scanning. The common control scans all line circuits to determine service requests originating at the central office. Conductor groups 107–0 through 107–7 are the control conductors connecting each of the central office units to the common control, and it is over these conductors that all control signals are transmitted back and forth.

Each of line scanners 171–0 through 171–7 in the field concentrator units detects service requests originating at the remote units, and transmits this information over one of the two control conductors associated with the particular unit to the respective central office unit.

The blocks within common control 106 illustrate the general operation of the system. The common control provides three scanning sequences, the particular sequence performed at any time being determined by scanning sequence selector 137. The scanning sequence selector is connected to each of the line scanners 138–0 through 138–7, and these scanners under the control of selector 137 scan the line circuits for service requests. Scanning for service requests proceeds simultaneously in each of the eight pairs of units. At the same time that scanning circuits 138–0 through 138–7 scan the line circuits for service request, scanners 171–0 through 171–7 scan the subscriber lines for service requests. The scanning by the field unit scanners is controlled by signals transmitted over control conductors 109–0–1 through 109–7–1. If one or more of the field unit line scanners detects a service request the signals are transmitted to the associated central office units over the same control conductors.

Scanning sequence selector 137 also controls the scanning for the connection of any two trunks served by the same unit to each other through the central office switching equipment. Conductors 136–0 through 136–7 control trunk scanners 132–0 through 132–7. Trunk scanning is performed in only one pair of units at any one time and thus unit identifier 135 causes only one of these eight trunk scanners to operate. Each of the trunk scanners is provided with means for applying the tone of tone generator 130 to each of the 20 trunks serving the associated central office and field units. When the tone is applied to any one of the 20 trunks the trunk scanner scans the other 19 trunks for its detection. If the tone is applied to one trunk and detected on another by detector 131 the trunk on which the tone is applied is necessarily connected through the central office switching equipment to the trunk on which it is detected. The detection of the tone by detector 131 causes a local connection to be established.

The eight trunk scanners also control the scanning of trunks for trunk release requests. The signals on conductors 136–0 through 136–7 control the particular type of scanning that is performed by the trunk scanners, that is, either scanning for local connections or regular releases. Again, in the scanning for regular releases, unit identifier 135 determines which group of trunks is scanned. In the scanning sequence for regular releases it is not necessary to apply the tone to one trunk and scan the others for its appearance. As described in the detailed description it is only necessary to scan the 20 trunks for the tone appearance, the tone appearing on those trunks requiring release, and originating not on another trunk but rather in the central office unit itself. When detector 131 detects the tone the common control initiates a regular release sequence. Detector 131 detects a tone on one of the 20 trunks in the group being scanned during both regular release and local connecting scanning. In order for detector 131 to be made aware of the particular type of scanning in progress scanning sequence selector 137 notifies it over conductor 160. In this manner the tone detected by detector 131 results in either a regular release or local connection switching sequence.

A request to release a local connection may be detected in only a field unit. A changed D.C. condition due to the hang up by either or both subscribers on the local connection may be detected only in the respective field unit as there are no trunks connecting the two locally connected subscribers to a central office unit. Local trunk supervisory circuits 150–0 through 150–7 supervise all local connections. When a request for the release of a local connection is detected a signal is transmitted over one of conductors 181–0 through 181–7 and one of respective control conductors 109–0–1 through 109–7–1 to the respective central office unit, and over the respective one of cables 107–0 through 107–7 to the common control. The common control then causes the release of the local connection in both central office and field units.

B. *Examples of scanning and switching sequences*

(1) REGULAR CONNECTION

The system operation may be best understood by considering a specific example of each of the four scanning and switching sequences. The first of these is the regular connection. Line scanners 171–0 through 17–7 operate simultaneously, and are controlled by signals transmitted over the respective control conductors 109–. If subscribers 112–0–00 desires service, when his line is scanned by line scanner 171–0 signal is transmitted to central office unit 0 from geld unit 0. Central office unit 0 notifies the common control of the service request over cable 107–0. The common control then selects the particular links in central office and field units 0 and the particular trunk which will serve the call. If links 172–0A–1 and 173–0A–1 are chosen together with trunk 108–0A–1, the common control causes the appropriate signals to be transmitted to central office and field units 0 over cables 107–0, 109–0–1, and 109–0–2 for enabling the two units to operate their respective line and thunk switches A in the desired manner. Subscriber line 112–0–00 is connected in the field through line switch A to link 172–0A–1, and through trunk switch A to trunk 108–0A–1. The trunk is in turn connected in central office unit 0 through trunk switch A to link 173–0A–1, and through line switch A to conductor group 105–0–00. Thus, subscriber 112–0–00 is connected to his respective line circuit 115. When the respective line circuit is energized, central office 100 supplies dial tone to subscriber 112–0–00 who then completes his call in the ordinary manner.

If the service request originates in the central office rather than at the field the request on conductor group 105–0–00 is detected by line scanner 138–0 in the common control. Again, the common control selects the particular links and trunk to be employed, and the connection is established in the same manner. The central office then supplies the ringing current.

(2) LOCAL CONNECTION

A local connection is required when another subscriber served by field unit 0 is talking to subscriber 112–0–00. For example, subscriber 112–0–127 may be connected through line switch B in field unit 0 to link 172–0B–20, and through trunk switch B to trunk 108–0AB–1. This trunk may in turn be connected in central office unit 0 through trunk switch B, link 173–0B–20, and line switch B to conductor group 105–0–127. The two respective line circuits are connected to each other through two of the intra-office trunks 101.

When the common control scans the trunk serving central office and field units 0 for local connections, scanning sequence selector 137 enables trunk scanner 132–0 over conductor 136–0. At the same time the scanning sequence selector notifies detector 131 over conductor 160 that the scanning sequence in progress is for local connections. While the tone on conductor 133 is being applied over cable 120–0 to trunk 108–0A–1 the wiper connected to conductor 134 is successively connected over the same cable to the remaining 19 trunks serving central office and field units 0. When this wiper is connected to trunk 108–0AB–1 the tone is detected by detector 131, which is thus made aware that trunks 108–0A–1 and 108–0AB–1 are connected to each other through central office 100. The local connection switching sequence ensues. The common control first selects one of the two local trunks in each of central office and field units 0. For example, local trunks 114–0–2 and 113–0–2 may be chosen. The control signals are transmitted along cable 107–0 to central office unit 0, and over control conductors 109–0–1 and 109–0–2 to field unit 0. The field unit does not release the connections through line switches A and B. The connections through the two trunk switches however are released, and trunks 108–0A–1 and 108–0AB–1 are no longer connected to respective links 172–0A–1 and 172–0B–20. After the release of the two trunks, trunk switches A and B reoperate, and connect both links 172–0A–1 and 172–0B–20 to local trunk 114–0–2. Subscribers 112–0–00 and 112–0–127 are thus locally connected through field unit 0. Talking battery and supervision of the call is provided by one of the two local trunk supervisory circuits 150–0.

Central office unit 0 operates in a similar manner. The connections through line switches A and B are not disturbed. The connection through trunk switches A and B are released however, and trunks 108–0A–1 and 108–0AB–1 are released. The two trunk switches then reoperate, and connect local trunk 113–0–2 through the two trunk switches to links 173–0A–1 and 173–0B–20. The two respective line circuits are thus locally connected to each other through central office unit 0. This connection enables the central office to be aware that each of the two respective subscriber lines is "busy" in the event that incoming calls are placed to either of the two subscribers.

The wipers in the block diagram are merely symbolic. The detailed scanning equipment will become apparent from the detailed description.

(3) TRUNK RELEASE

The trunk release scanning and switching sequence involves a subscriber connected through the concentrator system to his respective line circuit in the central office, the subscriber talking to a party not served by the same field unit. In such an event, at the termination of the call, central office 100 causes a different D.C. condition to appear on the respective conductor group 105–. For example, subscriber 112–0–64 may be connected through line switch B in field unit 0, link 172–0B–1, trunk switch B, trunk 108–0B–6, trunk switch B in central office unit 0, link 173–0B–1, line switch B, and conductors 105–0–64, to his respective line circuit 115. At the termination of the call the central office causes a different D.C. condition to appear on conductors 105–0–64. During the regular release scanning sequence the tone is transmitted through cable 107–0 to central office unit 0. In a manner detailed below the tone appears on only those trunks connected through the switches in central office unit 0 to those of lines 105– having thereon the changed D.C. condition. In the example under consideration the tone appears on trunk 108–0B–6, the condition of conductors 105–0–64 to which this trunk is connected enabling the tone to pass to the trunk. When the trunks 108–0A–1 through 108–0B–6 are scanned for regular releases, scanning sequence selector 137 enables trunk scanner 132–0 over conductor 136–0. Only the wiper connected to conductor 134 operates during the regular release scanning sequence. This wiper rotates and when it is connected to trunk 108–0B–6 the tone appears on conductor 134. Detector 131 detects this tone, and because the control signal on conductor 160 at this time indicates that the scanning sequence in progress is for regular releases, the detector interprets the appearance of the tone as a release request by trunk 108–0B–6.

The common control then transmits the necessary switching signals over cable 107–0 to central office unit 0, and over control conductors 109–0–1 and 109–0–2 to field unit 0. In the field, the connections of subscriber line 112–0–64 through line switch B to link 172–0B–1 is released. Similarly in trunk switch B the connection of this same link to trunk 108–0B–6 is released. In central office unit 0 link and trunk switches B similarly break the connections between trunk 108–0B–6 and link 173–0B–1, and between link 173–0B–1 and conductor group 105–0–64.

(4) LOCAL CONNECTION RELEASE

The fourth scanning and switching sequence involves the release of a local connection. In the example for establishing a local connection above, subscriber 112–0–00 was connected through the field unit line switch A, link 172–0A–1, trunk switch A, local trunk 114–0–2, trunk switch B, link 172–0B–20, and line switch B to subscriber line 112–0–127. There is no connection to central office unit 0, and thus the local connection release must be detected by the field unit. Local trunk supervisory circuits 150–0 detect a request for a release of a local connection when one or both of the parties involved hangs up. A signal is transmitted over conductors 181–0 and 109–0–1 to central office unit 0, and over cable 107–0 to the common control. The common control in turn now transmits the necessary switching information over cable 107–0 to central office unit 0, and over control conductors 109–0–1 and 109–0–2 to field unit 0. In the field unit all four switches break their connections to effect the release of the local connection. In central office unit 0 all four switches similarly break the necessary connections to release local trunk 113–0–2, links 173–0A–1 and 173–0B–20, and conductors 105–0–00 and 105–0–127. Local trunks 114–0–2 and 113–0–2 are now available to establish another local connection if one is required.

II. FIELD UNIT

A. *General description*

An individual field unit is shown in FIGS. 2–29. The field unit serves 128 subscribers each of which is connected by respective tip and ring conductors to crossbar switches in the field unit. The field unit must perform four sequences of operations. The first is that sequence required to establish a regular connection of a subscriber to one of the 20 trunks extended to the respective central office unit. A regular connection is to be established if the subscriber desired service or an incoming call has energized his associated line circuit in the central office. In either event the field unit, responsive to signals transmitted over the two control cables connecting it to the respective central office unit, establishes a connection of the subscriber's line to an idle one of the 20 trunks serving the units.

The second function of the field unit relates to trunk release. When the central office common control detects a different D.C. condition on the trunk connected to the subscriber's line, an indication is made that the particular subscriber has hung up. The common control causes the crossbar switches in the central office unit to release. Signals are also sent over the control conductors to the field unit to likewise cause the crossbar switches in the field unit to release the connection.

The third sequence of operations to be performed by the field unit relates to the establishment of a local connection when the common control determines that two trunks serving the same central office and field units are connected to each other. Signals are transmitted to the field unit over the control conductors to release the two trunks, and to connect the two subscribers to each other over one of the two local trunks serving the field unit.

Finally, the fourth sequence of operations relates to the release of a local connection, that is, the hang-up by either subscriber on a local connection of his receiver. The field unit must release the local trunk circuit previously used for the connection, and notify and central office unit over a control path.

Information must be transmitted back and forth between central office and field units, this information varying for each sequence of operations to be performed. A complete understanding of the necessary signaling information to be transmitted for each type of connection or release may be best understood by first analyzing the switching scheme at the field unit.

B. *Switching scheme at field unit*

An understanding of the switching plan is a prerequisite to the comprehension of the detailed operation of the circuit. For this reason a description of the crossbar switches in the field unit will be presented at this point.

Figure 3:
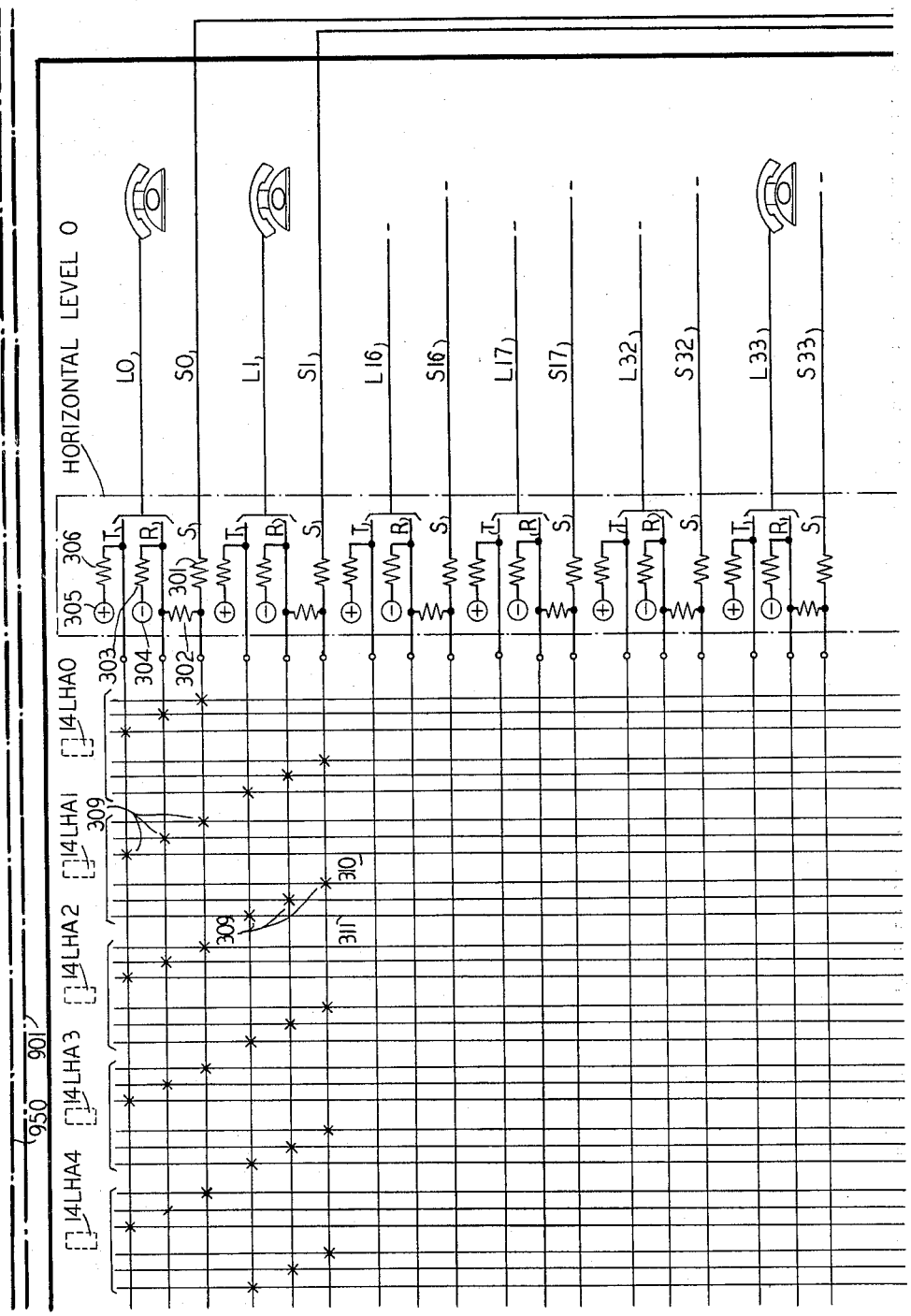
Figure 4:
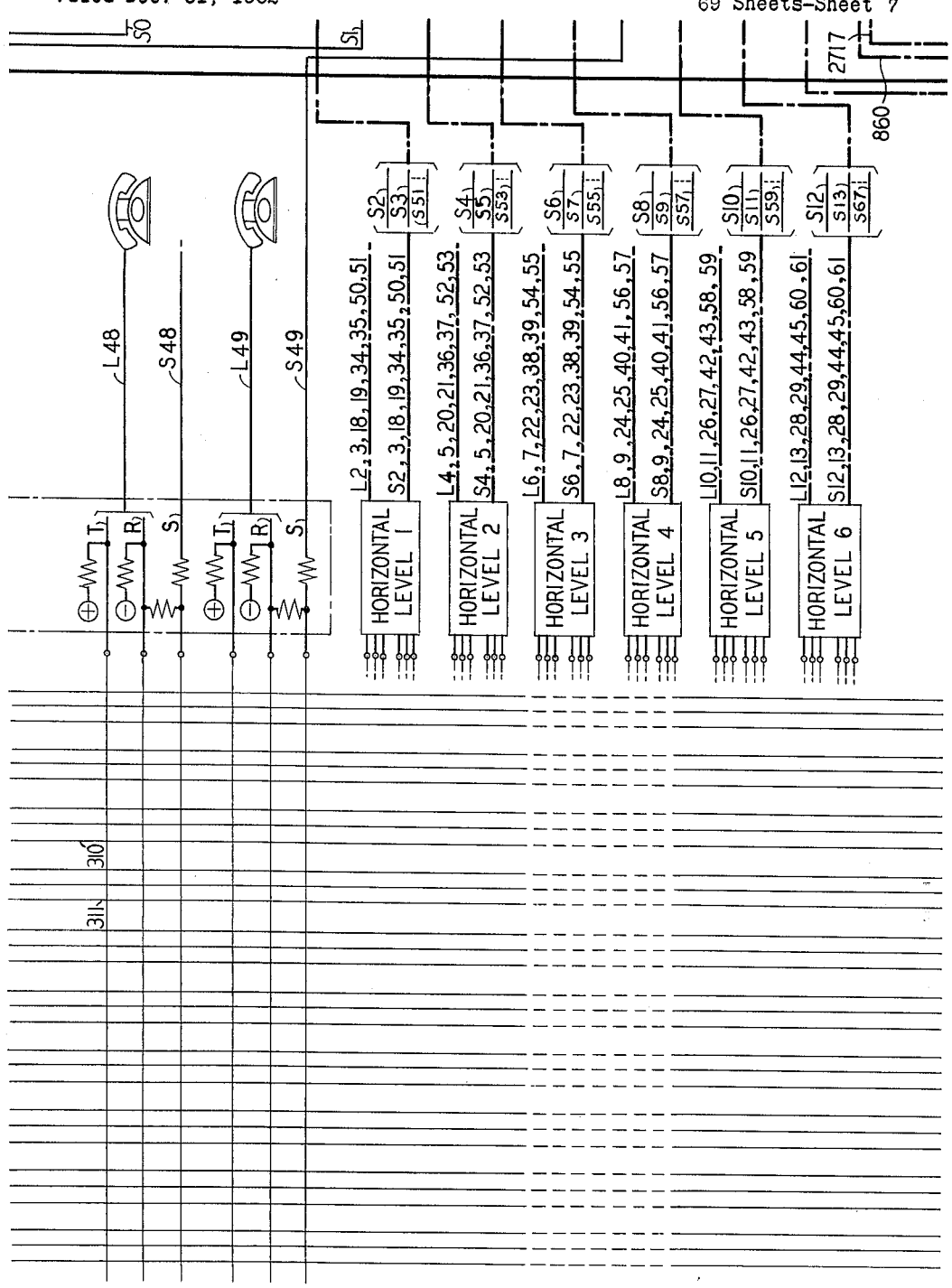
Figure 5:
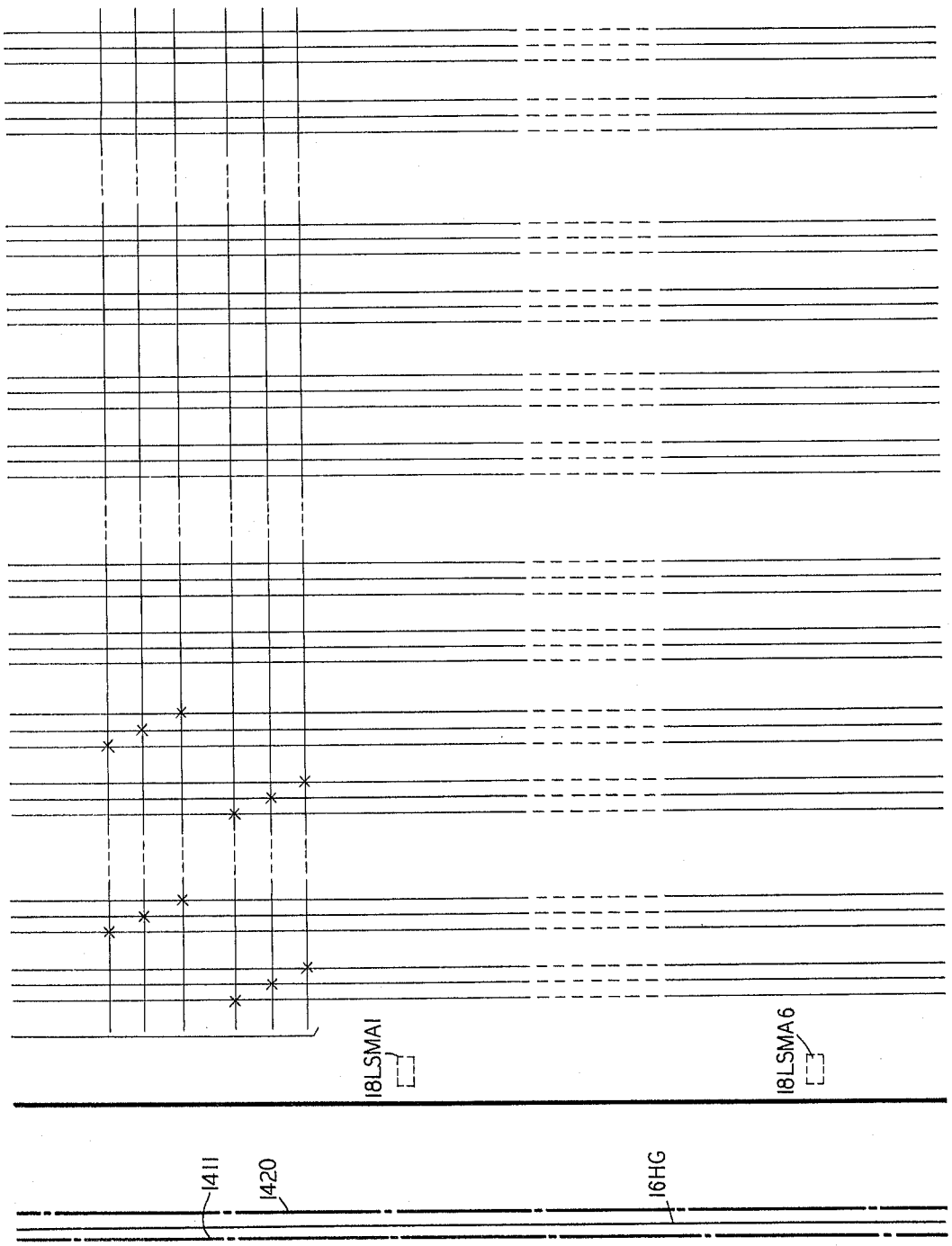

Each individual line concentrator of the invention serves 128 subscribers. These subscribers are divided into two groups, group A comprising subscribers 0 through 63, and group B comprising subscribers 64 through 127. Each remote unit includes A and B line switches, and A and B trunk switches. Referring to FIGS. 2–7, line switch A, serving subscribers 0 through 63, is shown. This switch contains 10 select magnets 18LSMA0–18LSMA9, and 20 hold magnets 14LHA0–14LHA19. These magnets are shown in dotted symbolic form only in FIGS. 2–7, the actual magnets and related circuitry being shown in detail in respective FIGS. 18 and 14. Each of the first eight horizontal levels, 0 through 7, serves eight particular subscribers. Horizontal level 0 serves subscribers 0, 1, 16, 17, 32, 33, 48 and 49 as shown in FIGS. 3 and 4; horizontal level 1 serves lines 2, 3, 18, 19, 34, 35, 50 and 51; etc. Only horizontal level 0 is shown in detail. Levels 1 through 6 are shown symbolically only. The respective lines served by horizontal levels 1 through 6 are designated in FIG. 4. Horizontal level 7 is shown in slightly more detail than levels 1 through 6. All of levels 1 through 7 are similar to level 0 but serve the particular lines designated on the drawing.

A sleeve lead is not extended to each individual subscriber. However, individual sleeve leads are associated with each of the 64 subscribers served by line switch A, these leads being necessary for supervisory purposes.

Figure 6:
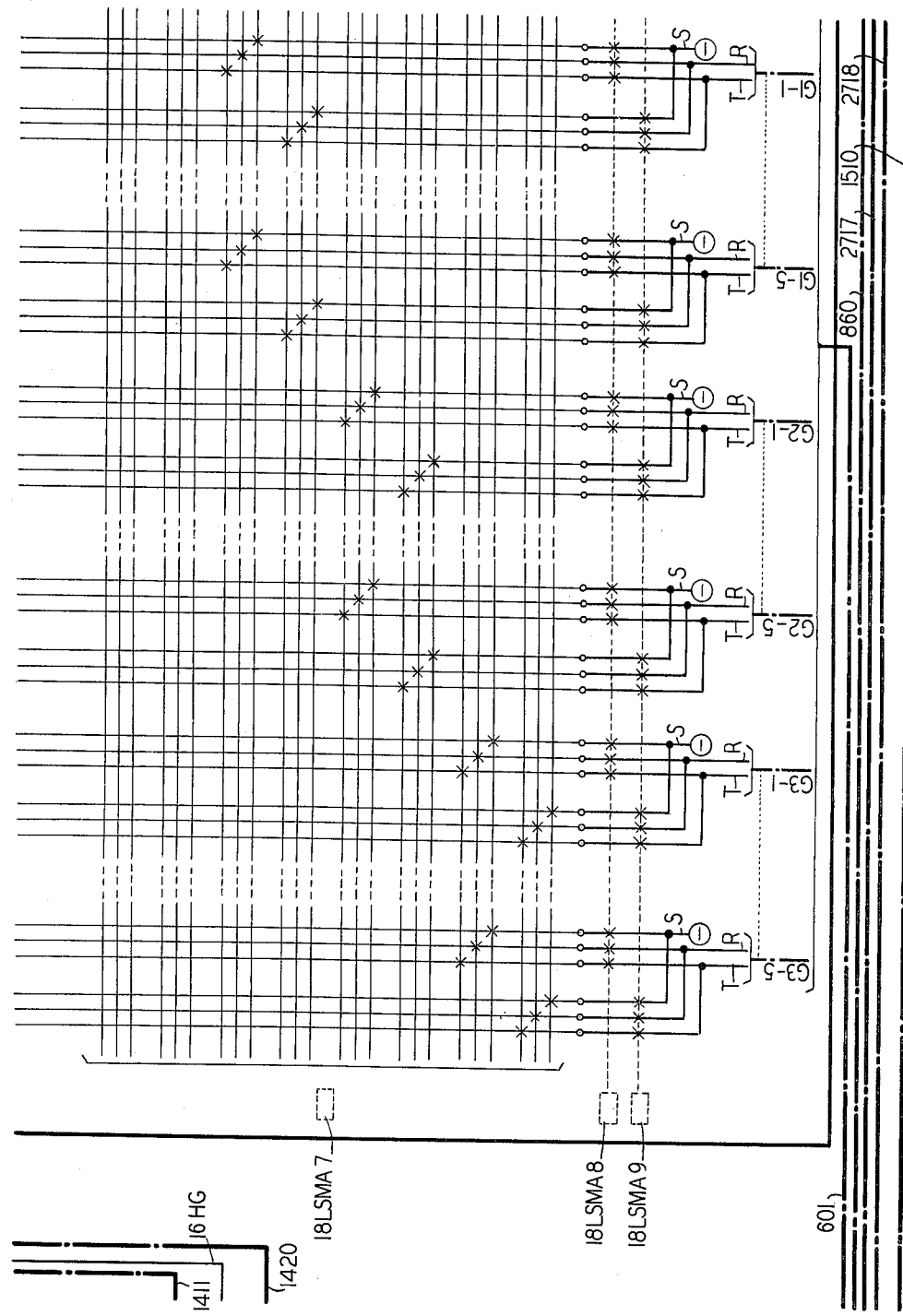
Figure 7:
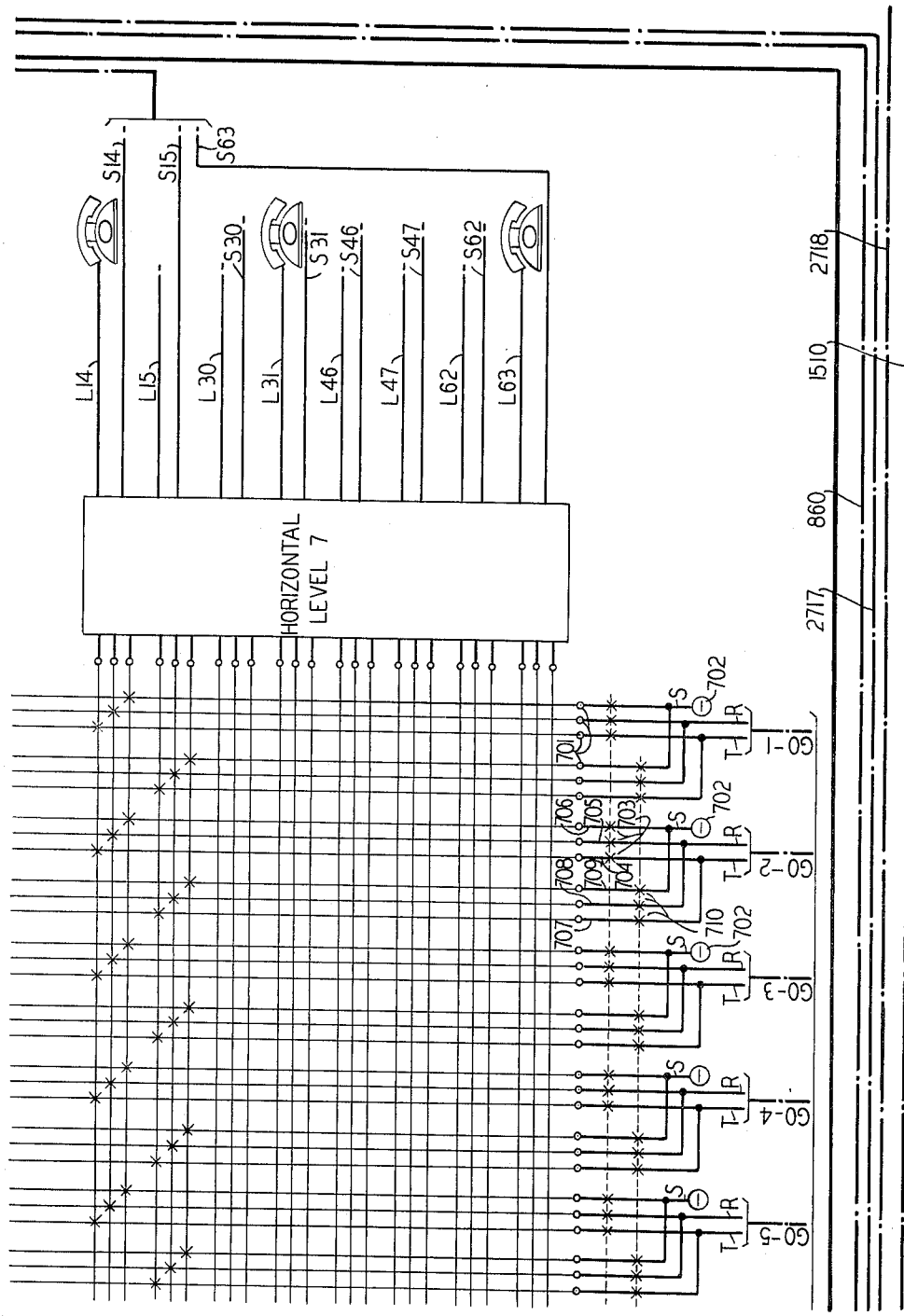

Twenty links, each comprising a tip and ring conductor, are shown entering the A line switch at the bottom of FIGS. 6 and 7. These links are divided into four groups; G0, G1, G2 and G3. Each of the four groups contains five individual links. All five links in group G0 are shown in FIG. 7, these links being G0–1 through G0–5. Only the first and last links in each of groups G1 through G3 are shown in FIG. 6.

The 20 links connect line switch A to trunk switch A, shown in FIGS. 9–12, trunks being extended from trunk switch A to the central office unit. The 20 trunks connecting the central office and remote units similarly do not contain sleeve leads. However, sleeve leads are associated with each of these trunks at the remote unit and enter trunk switches A and B in a manner similar to the tip and ring conductors of each trunk. These sleeves are also necessary for supervisory and control functions. The 20 links connecting line switch A to trunk switch A similarly contain no sleeve leads. However, sleeve conductors are associated with the links as with the lines and trunks for similar reasons. Although the sleeve lead associated with a subscriber is never connected to the sleeve lead associated with a particular trunk as the 20 links contain no sleeve conductors, the sleeve leads control the supervision and switching of the entire circuit, and for this reason an understanding of the connections through the line and trunk switches is imperative.

Referring to FIGS. 6 and 7, it is seen that each link tip and ring conductor entering line switch A branches out into two vertical conductors. There are thus 40 groups of vertical conductors in line switch A, each containing a tip and ring conductor. Each of these 40 groups is provided with a sleeve lead, each of the sleeve leads being connected to a negative potential source. Line switch select magnets 8 and 9, 18LSMA8 and 18LSMA9, are steering levels, and determine which one of each two groups of three vertical conductors each is connected to the link tip and ring conductors and to a negative source 702. The simultaneous operation of select magnet 8 or 9, and one of the 20 hold magnets 14LHA0–14LHA19 establishes a connection. For example, the simultaneous operation of select magnet 8 and hold magnet 14LHA1 causes all contacts in contact group 703 to close. Thus the tip conductor of link G0–2 is connected to conductor 704, the ring conductor of this group is connected to conductor 705, and the sleeve conductor 706 is connected to a negative potential source 702. Only one of select magnets 8 or 9 is operated at any time and thus when connections are made to conductors 704–706, each of the conductors 707–709 remains unconnected to a link tip or ring conductor, or to one of negative potential sources 702. The simultaneous operation of a line switch steering level select magnet and a line switch hold magnet closes a particular group of three contacts in horizontal levels 8 or 9. The line switch steering level select magnet is then released but the contacts remain closed as long as the controlling line switch hold magnet remains operated.

The vertical lines in FIGS. 6 and 7, below terminals 701, each represents an individual conductor. Above terminals 701, each vertical line represents the vertical of a crossbar switch rather than a conductor. As in conventional crossbar switches a vertical conductor is associated with each vertical of the switch. This vertical conductor is connected to any one of the horizontal conductors associated with respective horizontals of the switch upon the operation of the particular crosspoint at their intersection. For example, when line switch select magnet 18LSMA0 operates simultaneously with line switch hold magnet 14LHA1 crosspoints 309 are operated. The tip conductor associated with line L0 is thus connected to the vertical conductor associated with vertical 310, and the tip of line L1 is connected to the conductor associated with vertical 311. One of these conductors is in turn connected through either conductor 704 or 707, and one of the contacts in group 703 or 710 to the tip conductor G0–2, depending upon which one of select magnets 8 or 9 is operated. A similar connection is established between the ring conductor associated with line L0 or L1 and the ring conductor of link G0–2. The sleeve conductor associated with the same line is connected to a negative source 702. Any connection of a line to a link is thus seen to require the operation of one of steering level select magnets 8 or 9, one of horizontal select magnets 0–7, and one of hold magnets 14LHA0 through 14LHA19. The connection is maintained after the release of both select magnets until the hold magnet is de-energized.

Although the link conductors do not contain sleeve leads, the connection of a line to a link establishes the connection of one of negative sources 702 through the sleeve associated with the particular link being used to the sleeve lead associated with the particular line to which the link is connected. This results in the placing of a negative potential on the sleeve lead associated with any of the 64 lines when it is connected to a link.

None of the lines served by line switch A can be connected to all of the 20 links serving the same switch. It is seen in FIGS. 3 and 4 that of the eight lines associated with horizontal level 0, only lines L0 and L1 can be connected to the five links in group G0. Referring to horizontal level 7 it is seen that only lines L14 and L15 of the eight lines served by this horizontal can be connected to group G0. Similarly in horizontal level 1 only lines L2 and L3 can be connected to the links in group G0. Similar remarks apply to the lines served by horizontal levels 2 through 7. Lines L0–L15 are the only lines that can be connected to the five links comprising group G0. Any of these sixteen lines can be connected to any of the five links G0–1 through G0–5 upon the simultaneous operation of a particular one of the line switch select magnets 18LSMA0–18LSMA7, one of steering level select magnets 18LSMA8 or 18LSMA9, and one of line switch hold magnets 14LHA0–14LHA4.

Referring to link group G1, in horizontal level 0 only lines L16 and L17 can be connected to the five links served by this group. Similarly in holizontal level 7 only lines L30 and L31 can be connected to links G1–1 through G1–5. Similar remarks apply to horizontal levels 1 through 6. It is seen from FIGS. 2–7 that each of lines L0–L15 can be connected to any one of the links G0–1 through G0–5. Lines L16–L31 can be connected only to links G1–1 through G1–5. Similar remarks apply to lines L32–L47 and links G2–1 through G2–5, and lines L48–L63 and links G3–1 through G3–5. Thus, if connections are established between the five links in any group and five of the 16 lines served by this group, the remaining 11 subscribers served by the same links cannot obtain service. Furthermore, it is apparent that any line may be identified by a combination of a particular horizontal level, groups of links, and steering level. There are four groups of links, two steering levels and eight horizontal levels, providing a total of 64 combinations. For example, the operation of line switch select magnet 0, steering level select magnet 9, and any one of line hold magnets 14LHA0–14LHA4 (group G0) establishes a connection between line L1 and the one link in group G0 controlled by the particular hold magnet associated with this group that is operated. The hold magnet selected in the invention is always the first available in the group, that is, if hold magnet 14LHA0 is unoperated whenever line L1 is to be connected to a link this hold magnet is operated. If hold magnet 14LHA0 is already operated, line L1 is connected to link G0–2 by the operation of hold magnet 14LHA1, etc. If all five hold magnets 14LHA0–14LHA4 are operated when subscriber L1 desires service, no path exists for line L1 to be connected to one of the five links serving this line due to the fact that these links are already serving five of subscribers L0 and L2–L15. Subscriber L1 is not provided service until one of the five subscribers using links G0–1 through G0–5 releases his link.

Figure 8:
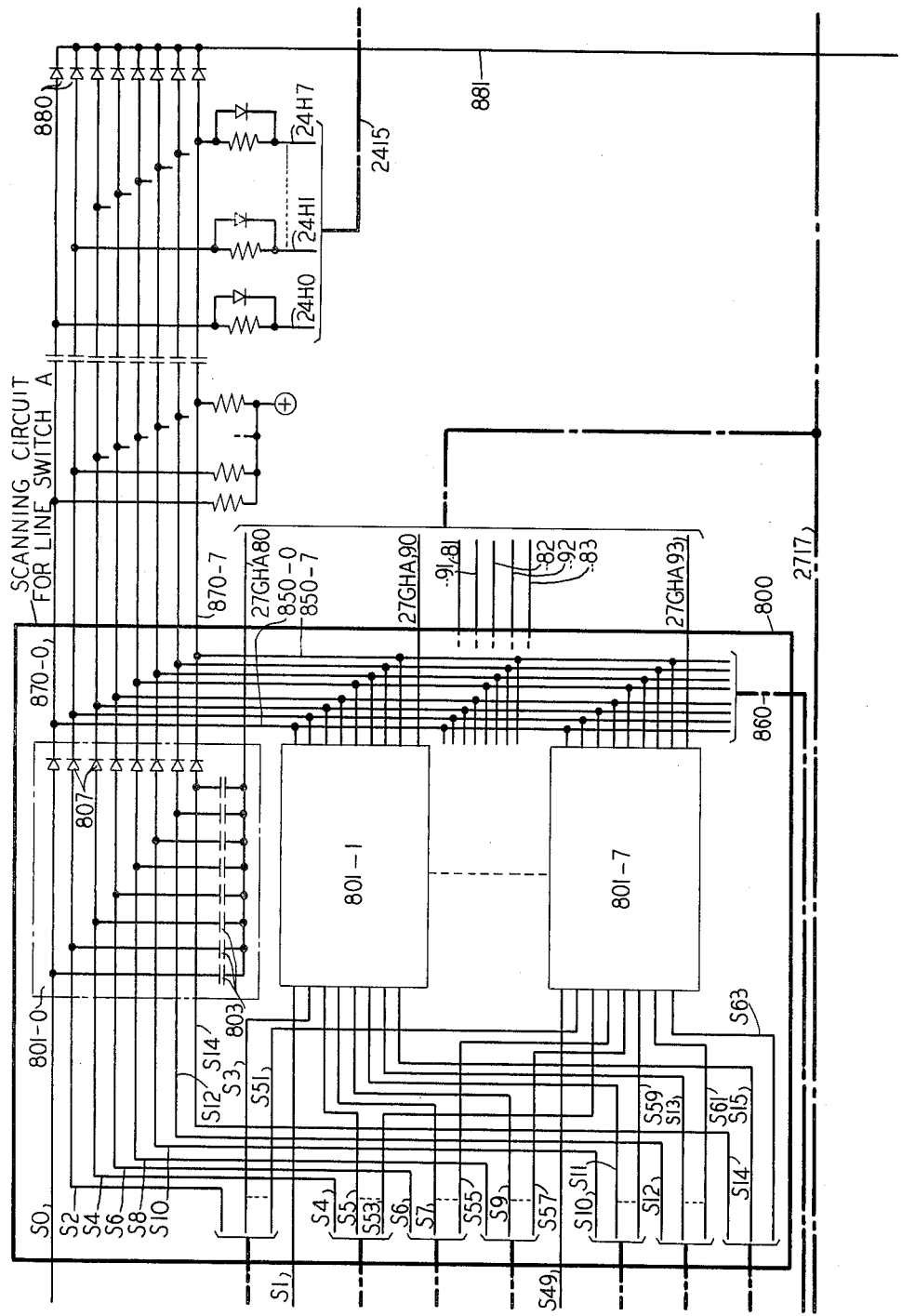

Sleeve leads S0, S1, S16, S17, S32, S33, S48 and S49, associated with horizontal level 0, are extended to the scanning circuit for line switch A shown in FIG. 8. Similarly, the sleeve leads associated with the eight lines served by each of the remaining seven horizontal levels are extended to this scanning circuit.

Figure 16:
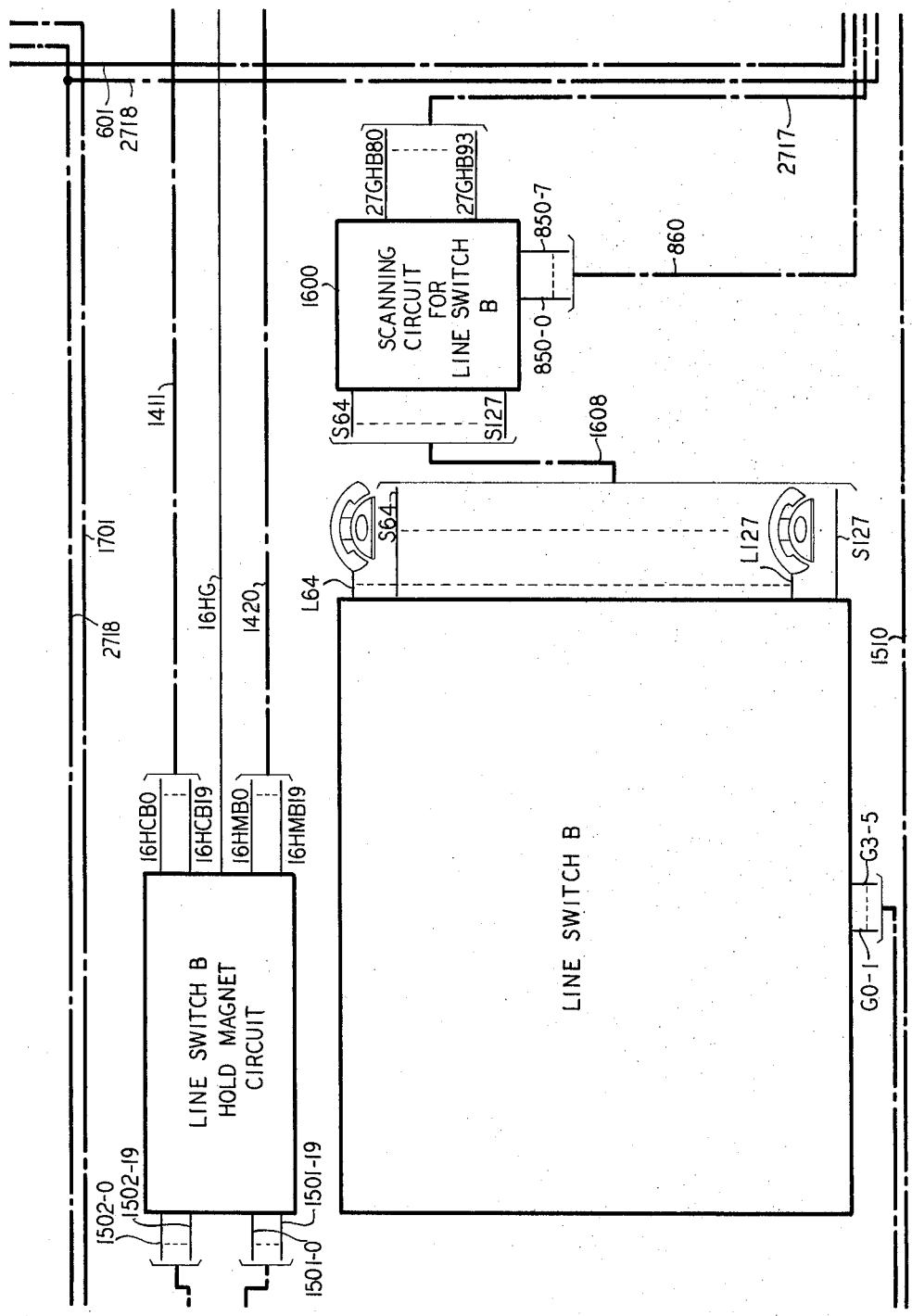

Line switch B, shown in FIG. 16, serves lines L64 through L127. The switching plan for line switch B is similar to that of line switch A. Subscribers L64 through L79 can be connected only to the five links in group G0 serving line switch B and to no others. Similar remarks apply to the remaining lines. As in line switch A each group of five links serves only 16 lines. Sleeve leads S64 through S127 in line switch B, associated with respective lines, are connected via cable 1608 to the scanning circuit 1600 for line switch B. This scanning circuit is similar to the scanning circuit 800 for line switch A.

The 20 links associated with line switch A, each comprising a tip and ring conductor, are connected via cable 601 to trunk switch A shown in FIGS. 9–12. Trunk switch A is similar to line switch A in that it contains 10 select magnets and 20 hold magnets. As in line switch A, the vertical and horizontal lines above terminals 1001 represent crossbar verticals and horizontals. Below these terminals the vertical and horizontal lines represent conductors. Each of trunk switch select magnets 21TSMA0–21TSMA6 operates upon two groups of conductors, each containing tip, ring and sleeve leads. Trunk switch select magnets 21TSMA8 and 21TSMA9 are steering levels and are analogous to line switch steering level select magnets 18LSMA8 and 18LSMA9. Any one of the 20 links entering trunk switch B may be connected to any one of the 14 trunk groups shown in FIG. 9. A connection is established upon the simultaneous operation of one of select magnets 8 or 9, one of select magnets 0–6, and one of trunk hold magnets 13THA0–13THA19. For example, the tip and ring conductors in link G0–2 may be connected to the respective horizontal tip and ring conductors of trunk 9ATK0–9 upon the operation of trunk switch select magnet 21TSMA0, trunk switch select magnet 21TSMA9, and trunk switch hold magnet 13THA1. These tip and ring conductors are extended to the central office via trunk 9A0. The numeral 8 or 9 after one of the designations 9ATK0– through 9ATK6– indicates which of the steering level select magnets has caused the connection of a link to the particular trunk.

Figure 9:
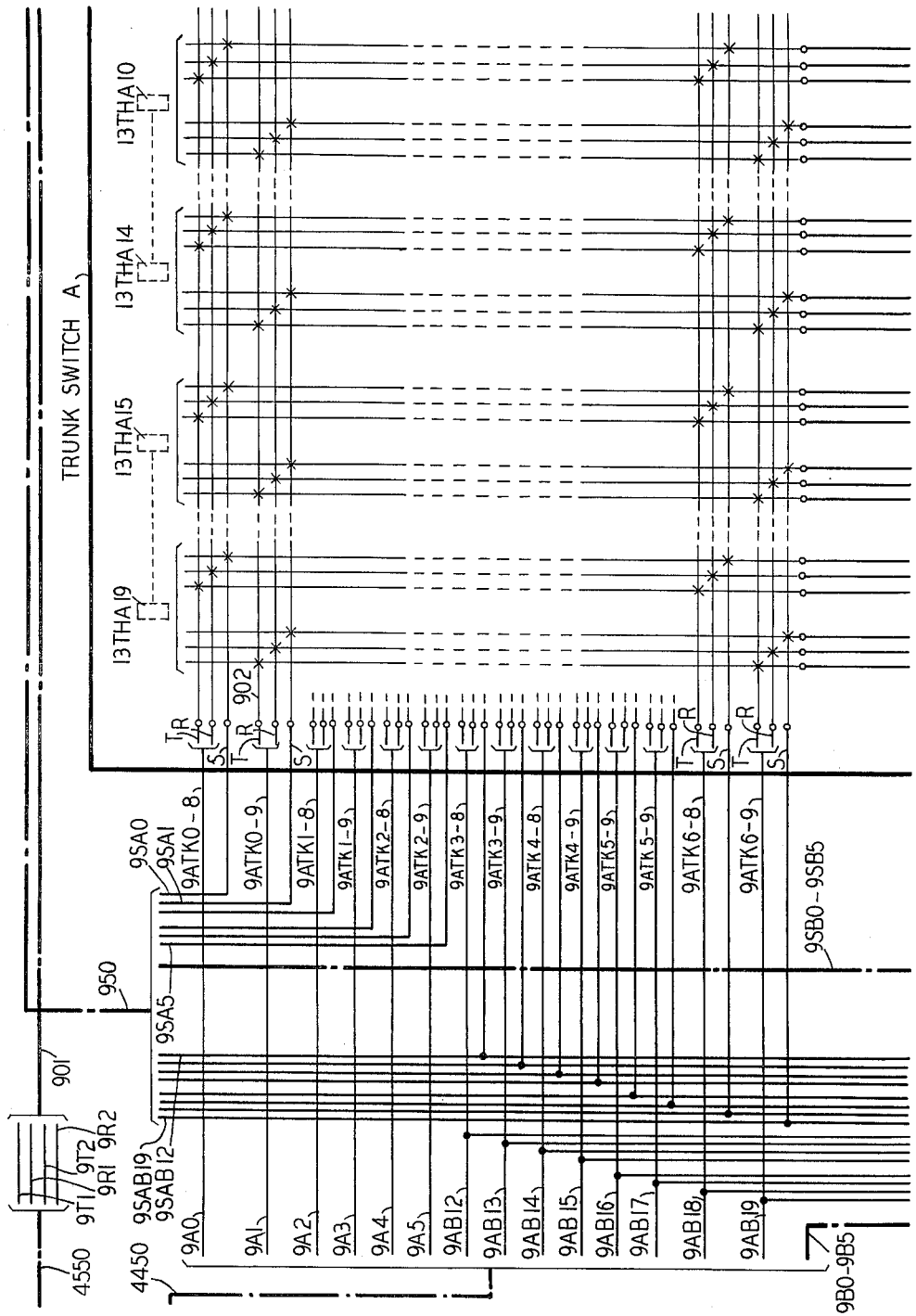
Figure 10:
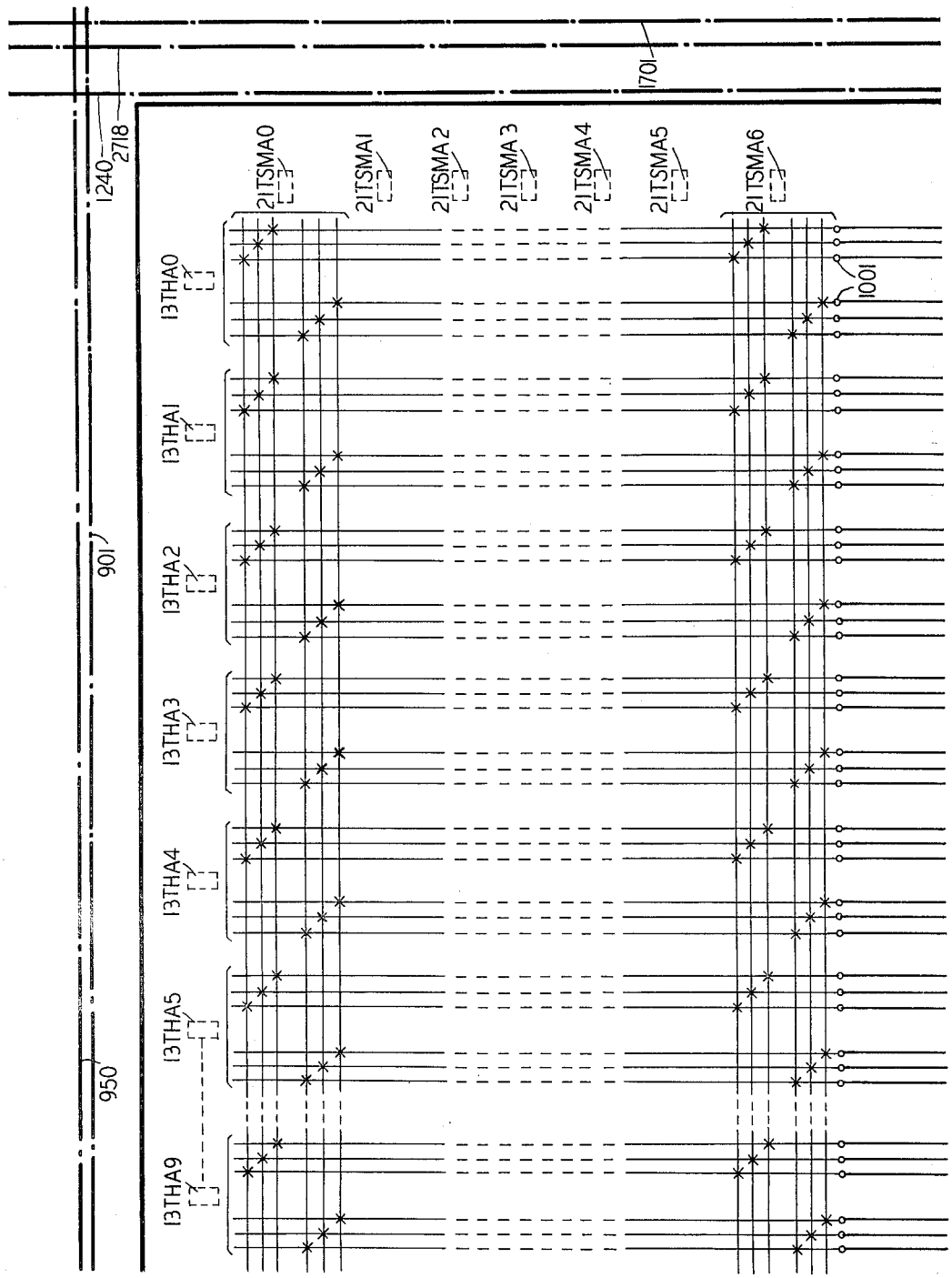
Figure 11:
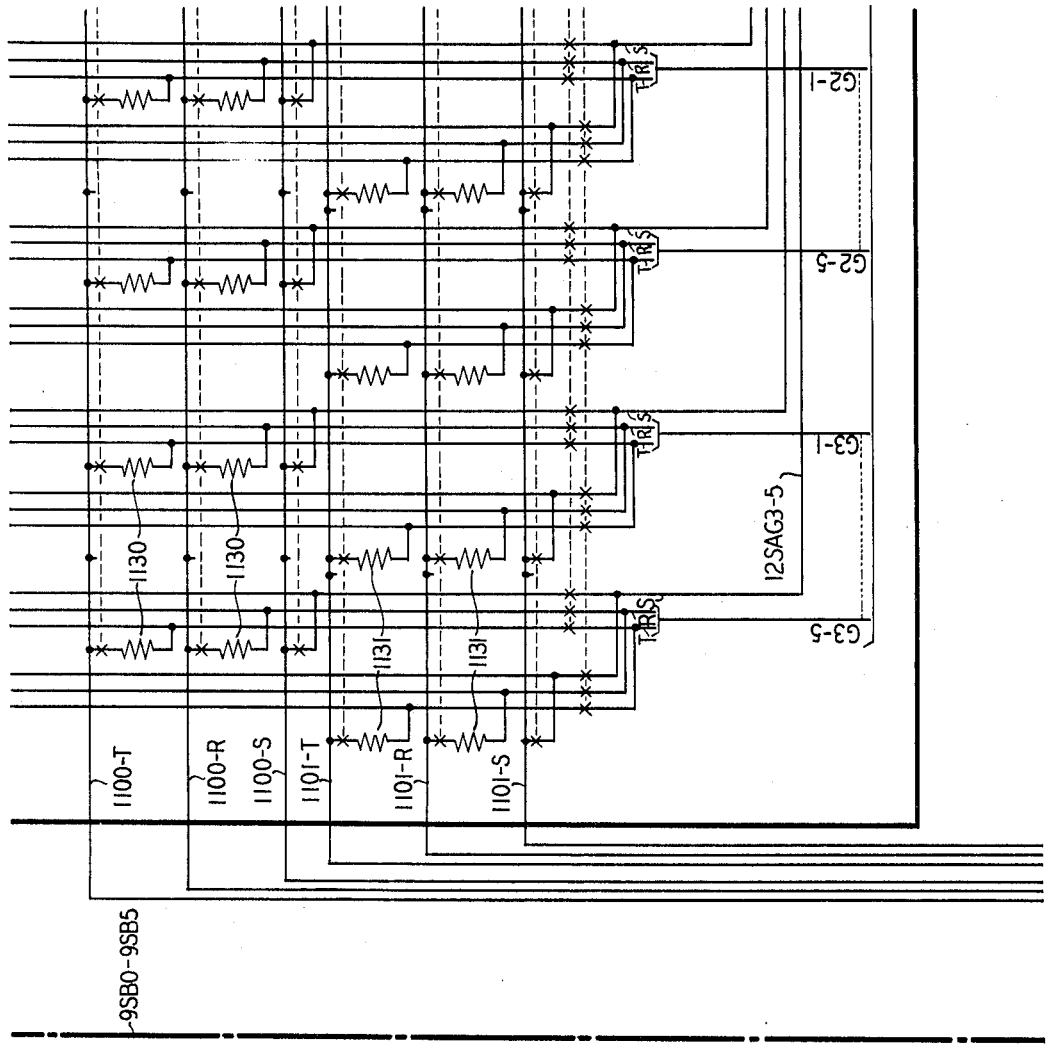
Figure 12:
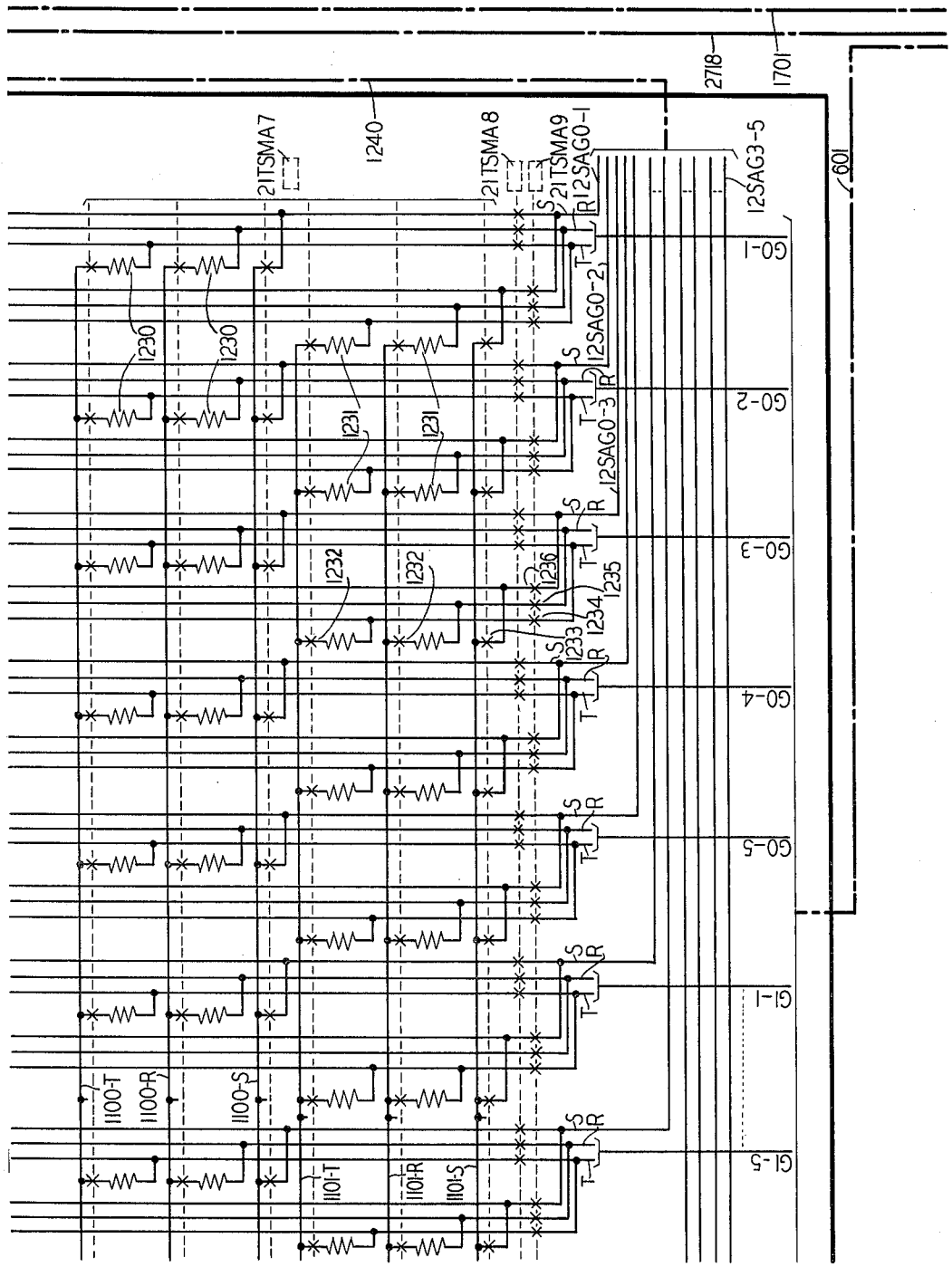

The 20 links, and the 14 trunks on FIG. 9, entering trunk switch A do not contain sleeve leads. However, a sleeve lead is associated with each link and each trunk. It is seen that any one of the 20 sleeve conductors 12SAG0–1 through 12SAG3–5 associated with the 20 links may be connected through trunk switch A to sleeve leads associated with respective horizontals. These connections are made for supervisory and switching purposes.

In trunk switch A select magnet 21TSMA7 does not control the connection of a link to one of the trunks extended to the central office. Instead trunk switch select magnet 7 controls the connection of one or more links to the two local trunks 1100– and 1101–. It is these local trunks that connect subscribers served by the same remote unit to each other thereby releasing trunks normally required to connect them to the central office. Trunk switch select magnet 21TSMA7 controls the crosspoints in tip-ring-sleeve group 1100– and tip-ring-sleeve group 1101–.

The tip and ring conductors of any link, as well as the respective one of sleeve leads 12SAG0–1 through 12SAG3–5, may be connected to the respective tip, ring, and sleeve conductors of either groups 1100– or 1101– depending upon which of steering level trunk switch select magnets 8 or 9 operates. The tip and ring conductors of each link are connected to respective tip and ring conductors in either group 1100– or 1101– through respective ones of resistors 1230 or 1130. The sleeve leads are connected directly to each other. For example, consider that it is necessary to connect link G0–3 to local trunk 1101–. Upon the simultaneous operation of trunk switch select magnets 21TSMA9 and 21TSMA7, and hold magnet 13THA2 all of contacts 1231–1236 close. It is seen that the tip conductor of link G0–3 is connected directly through contacts controlled by trunk switch select magnets 9 and 7 and one of resistors 1230 to tip conductor 1101–T. Similarly, the ring conductor of link G0–3 is connected through contacts controlled by select magnets 9 and 7 and one of resistors 1230 to ring conductor 1101–R. The sleeve conductor associated with link G0–3, conductor 12SAG0–3, is connected directly to the sleeve conductor 1101–S through contacts controlled by trunk switch select magnets 9 and 7.

It should be noted that any one of the 20 links of trunk switch A may be connected to either one of the two local trunks 1100– or 1101– depending upon which hold magnet operates, and which one of select magnets 8 or 9 operates. The connection of a link to a local trunk can only be established when trunk switch select magnet 21TSMA7 operates. Thus the operation of any one of select magnets 0–6 with the simultaneous operation of a particular hold magnet and one of select magnets 8 or 9 establishes a connection of any of the 20 links to any of the 14 trunks of trunk switch A extended to the central office. The operation select magnet 7 instead of one of select magnets 0–6 establishes a connection of any of the 20 links to either of the two local trunks.

Figure 15:
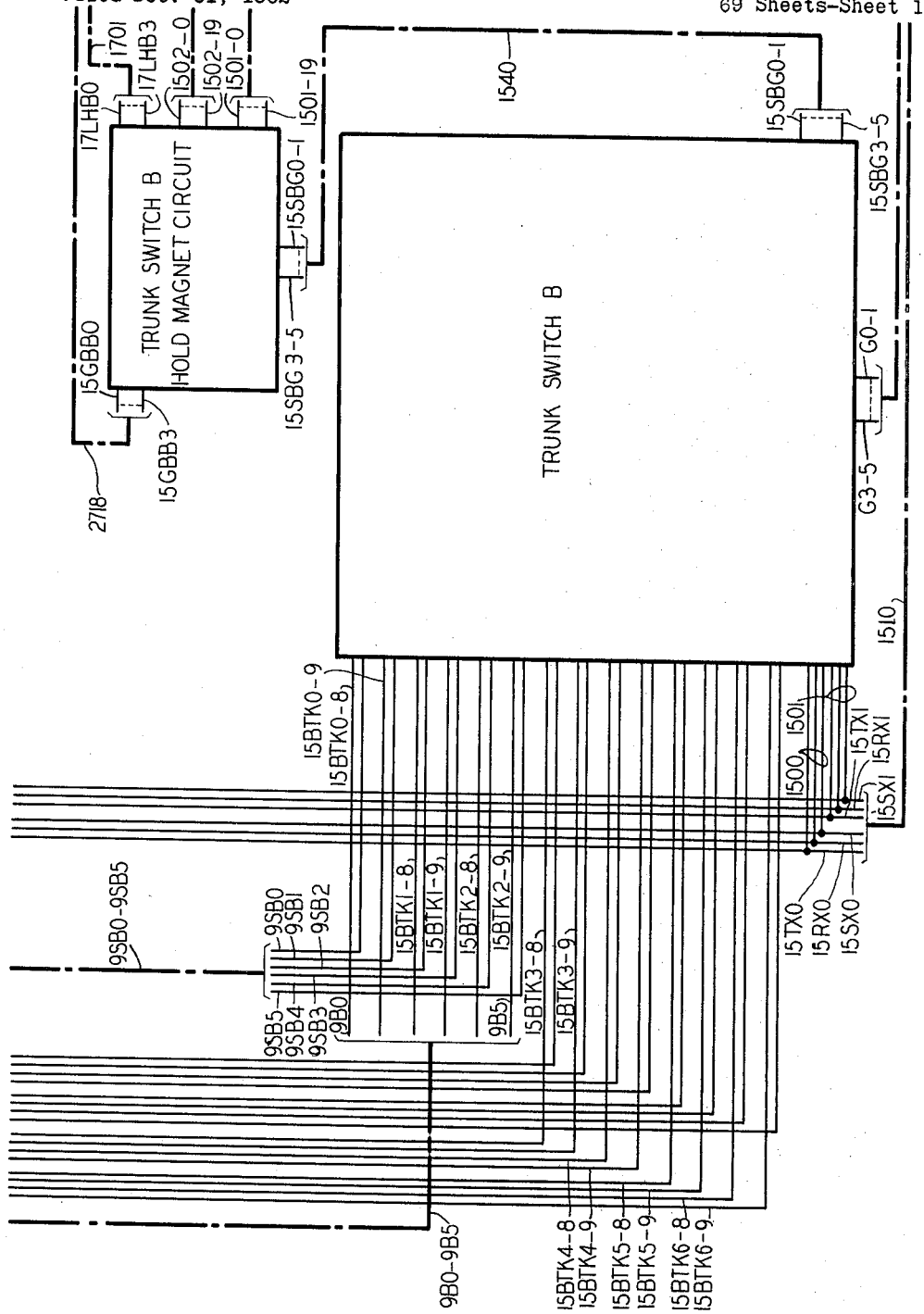

Trunk switch B shown symbolically in FIG. 15 is similar to trunk switch A. Any one of subscribers 64 through 127 can be connected through line switch B to particular ones of the 20 links connecting line switch B and trunk switch B. Through trunk switch B the 20 links may be connected to any one of the 14 trunks 15BTK0–8 through 15BTK6–9, or to either of the two local trunks 1500 or 1501.

The tip, ring and sleeve conductors of local trunk 1500 are connected to the respective tip, ring and sleeve conductors of local trunk 1100– by conductors 15TX0, 15RX0, and 15SX0. The tip, ring and sleeve conductors of local trunk 1501 are similarly connected to the respective tip, ring and sleeve conductors of local trunk 1101– by conductors 15TX1, 15RX1, and 15SX1. Two local connections may be established. The two local connections may both involve subscribers served by trunk switch A or trunk switch B, or subscribers served by different trunk switches. For example, if two subscribers served by line and trunk switches A are to be connected to each other the two links to which these subscribers are connected and which enter trunk switch A must be connected to each other. By operating the two respective trunk switch hold magnets, trunk switch select magnet 21TSMA7, and trunk switch select magnet 21TSMA8, the two subscribers are connected to local trunk 1100–. If trunk switch select magnet 21TSMA9 is operated rather than trunk switch select magnet 21TSMA8 they are both connected to local trunk 1101–. The two tip conductors of both subscribers are connected through different resistors to the tip of the particular local trunk used. Similar remarks apply to the two ring conductors. The two sleeve conductors are both connected directly to the sleeve of the local trunk. In a similar manner two subscribers served by line and trunk switches B may both be connected to either of the two local trunks.

If the first local connection established connects two subscribers served by line and trunk switches A to local trunk 1101– due to the operation of trunk switch select magnet 21TSMA9 in trunk switch A, to connect two subscribers served by line and trunk switches B to each other, trunk switch select magnet 21TSMAB8 in trunk switch B is operated rather than trunk switch select magnet 21TSMB9. This causes these two subscribers to be connected to local trunk 1501. In a similar manner if trunk switch select magnet 21TSMA8 is operated in trunk switch A, trunk switch select magnet 21TSMB9 is operated in trunk switch B. This insures that both local connections are not connected to each other by conductors 15TX0–15SX1.

It is also possible, as stated above, to establish a local connection between subscribers served by different trunk switches. To establish such a connection the same one of trunk switch select magnets 8 or 9 is operated in both trunk switches. For example, if trunk switch select magnets 8 are operated in both trunk switches the two subscribers are both connected to conductors 15TX0, 15RX0, and 15SX0. To establish another connection between two subscribers served by different trunk switches, trunk switch select magnets 9 would then be operated to connect them to conductors 15TX1, 15RX1, and 15SX1. It is also possible to establish at the same time a local connection of two subscribers served by the same trunk switch, and another local connection of two subscribers served by different trunk switches. For example, two subscribers served by trunk switch A might both be connected to local trunk 1100– due to the operation of trunk switch select magnet 21TSMA8 in trunk switch A. To then establish a connection of two subscribers served by different trunk switches it is merely necessary to operate trunk switch select magnets 9 in both trunk switches to connect both subscribers to conductors 15TX1, 15RX1, and 15SX1.

It is thus seen that two local connections may be established at any time, these connections involving any two combinations of any two of the 128 subscribers whether or not the subscribers are served by the same line and trunk switches.

In trunk switch A any of the 20 links can be connected to any of the 14 trunks 9ATK0–8 through 9ATK6–9. Similarly any of the 20 links serving trunk switch B can be connected to any of the 14 trunks 15BTK0–8 through 15BTK6–9. As seen in FIG. 9, respective ones of trunks 9ATK3–8 through 9ATK6–9 are connected to respective ones of trunks 15BTK3–8 through 15BTK6–9. Eight of the twenty trunks extended to the central office unit, trunks 9AB12–9AB19, are connected to horizontals in both trunk switches. The remaining six horizontal tip and ring pairs in trunk switch A are extended directly to the central office unit, and are designated 9A0–9A5. The remaining six horizontal tip and ring pairs in trunk switch B are also connected directly to the central office unit, and are designated 9B0–9B5. Of the total 20 tip and ring pairs connecting the central office and remote units, six are individual to trunk switch A, six are individual to trunk switch B, and eight are common to both. Subscribers 0 through 63 may be connected through line and trunk switches A to any one of the 14 trunks 9A0–9A5 and 9AB12–9AB19. The 64 subscribers served by line and trunk switches B may be connected to any one of the 14 trunks 9B0–9B5 and 9AB12–9AB19.

Figure 13:
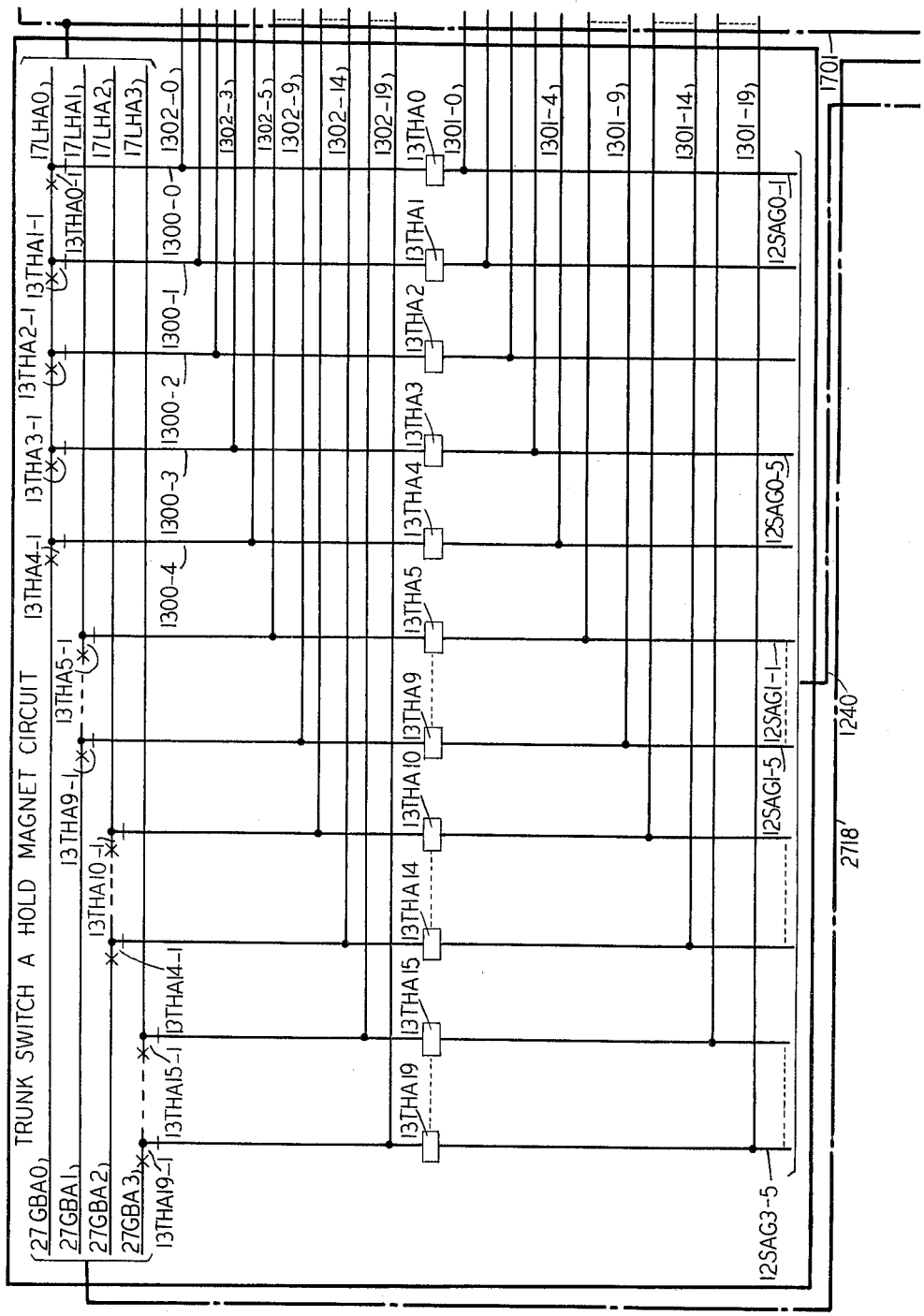
Figure 14:
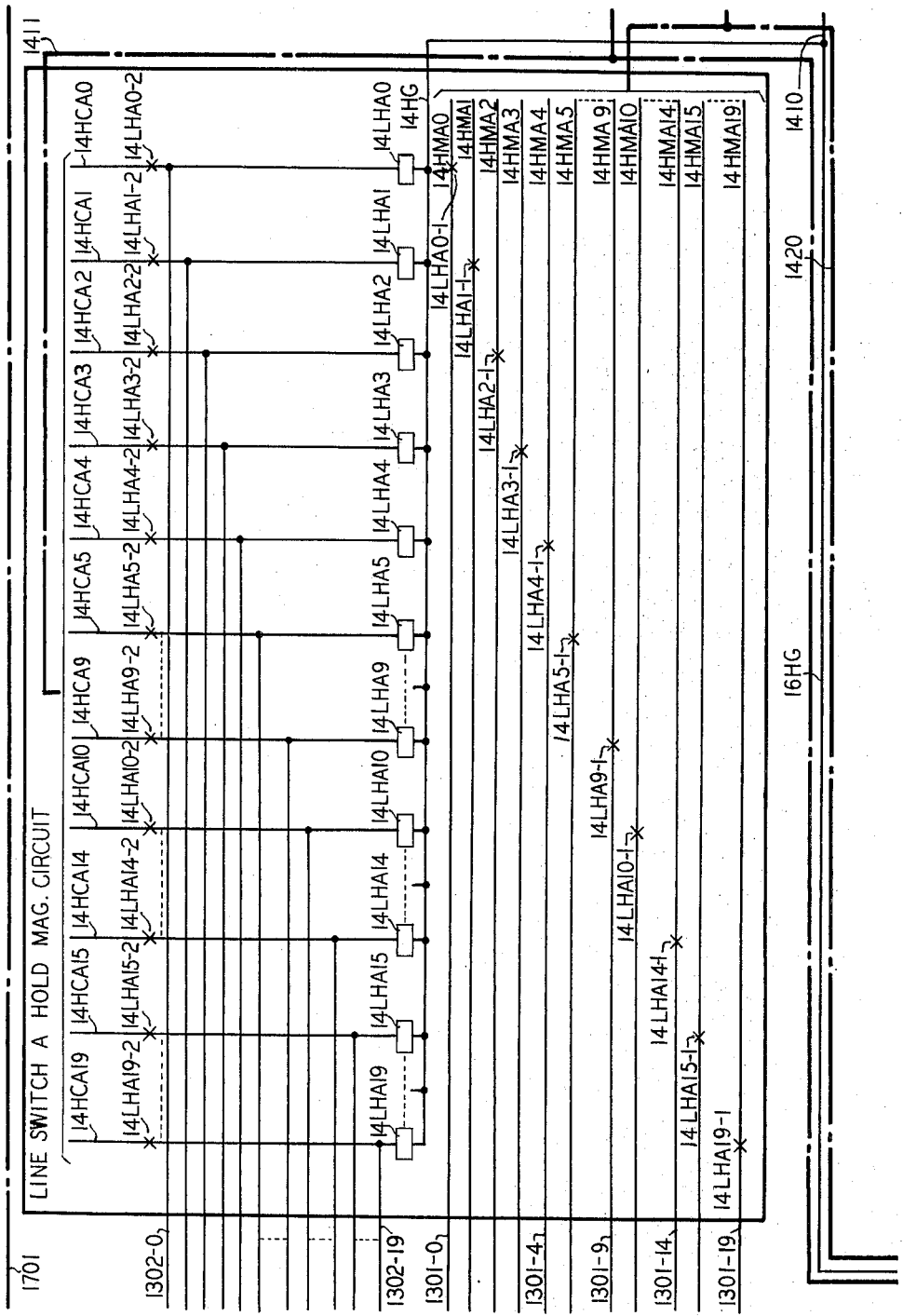

The eight sleeve conductors associated with the eight mutual trunks are similarly connected to each other. These sleeves are connected to each other, and to respective ones of sleeve leads 9SAB12–9SAB19. The six sleeve leads 9SA0–9SA5 are individual to trunk switch A. The six sleeve leads 9SB0–9SB5 are individual to trunk switch B. Thus a total of 20 sleeve leads 9SA0–9SAB19 can be connected through the two trunk switches to respective sleeve leads associated wtih the verticals of the two trunk switches. The 20 link sleeve leads associated with each trunk switch are extended via respective cables 1240 and 1540 to respective trunk switch hold magnet circuits. The trunk switch hold magnet circuit for trunk switch A is shown in FIG. 13. The trunk switch hold magnet circuit for trunk switch B is shown symbolically in FIG. 15. In a similar manner only the line switch hold magnet circuit for line switch A is shown in detail in FIG. 14. The hold magnet circuit for line switch B is shown symbolically only in FIG. 16 as its operation is similar to that shown in FIG. 14. It should be remembered that the hold magnets for line and trunk switches A are shown in detail in FIGS. 14 and 13, respectively. These hold magnets as well as the select magnets are shown in dotted outline only in the respective line and trunk switches. This symbolic notation is included to more clearly identify the particular crosspoints controlled by respective hold magnets. The separation has been effected in order to reduce the complexity of the drawing. Similar remarks apply to the select and hold magnets of the B switches.

C. *Switching information transmitted to field unit*

At the field unit four types of switching operations take place. The first of these is the ordinary connection of any subscriber through line and trunk crossbar switches to one of the 20 trunks extended to the central office. This is referred to as a regular connection. The second type of switching sequence relates to the release of this regular connection when a subscriber hangs up. The third switching sequence relates to the establishment of a local connection through one of the two local trunks when it is determined that two of the 128 subscribers served by the same field unit are connected to each other. The establishment of this connection also involves the release of the two trunks priorly used for connecting these two subscribers to the central office. The fourth switching sequence involves the release of a local connection when one or both of the two parties served by the field unit and connected to each other have terminated the call. The necessary information that must be supplied to the field unit for the control of these four sequences will be presented briefly at this point as this information is intimately related to the switching plan employed at the field unit and described immediately above.

(1) REGULAR CONNECTION SWITCHING INFORMATION

A regular connection is a connection of a remote subscriber, through field line and trunk crossbar switches to one of the 20 trunks, which in turn is connected through central office trunk and line crossbar switches to the respective line circuit of the subscriber. The service request may originate from either the remote subscriber or from a calling party energizing the remote subscriber's line circuit at the central office. Two control pairs, each comprising tip and ring conductors, connect the central office unit to the remote unit. The common control at the central office supplies successive series of pulses to the remote unit. Each series comprises 64 pulses, all of the same polarity. The first series of pulses is positive in polarity, the next series of 64 is negative in polarity, etc. A 64 state counter in the remote unit controls the scanning of the 128 local subscribers. The 64 positive pulses cause lines 0 through 63 to be scanned. The 64 negative pulses control the scanning of lines 64 through 127 by the same 64 state counter.

In the central office unit a similar scanning of the 128 line equipments takes place. When either the central office or field unit detects a service request, a signal is sent to the other unit notifying it that the subscriber's line and his respective line circuit must be connected to each other. Both central office and field units have the identity of the particular subscriber stored in their respective counters, the counters being stopped from advancing responsive to a service request in either direction. Both units thus immediately know the identity of the subscriber and the line switch serving him. As each subscriber is served by only one link group both units similarly know the identity of which one of the eight groups of links must be involved in the connection. Each unit must select one of the five links in this group. The lowest numbered idle link is always chosen and as the same numbered links in each unit are always used together, both units, on their own, select the link to be used. Each link at the field, however, may be connected to any one of 14 trunks through the respective field trunk switch. A particular trunk must be identified. The central office common control identifies the particular trunk to be employed and transmits this information to the field unit. The identity of the trunk to be employed is the only switching information that must be transmitted to the field unit.

Four control conductors extend from the central office to the field unit, these conductors being designated 9T1, 9R1, 9T2, and 9R2. Both positive and negative potentials may be applied by the common control at the central office to each of the four control conductors serving each pair of central office and field units. A particular trunk is identified by signals applied to two of the four control conductors. As eight signals may be transmitted in all (positive and negative potentials on each of the four control conductors) it is seen that a particular trunk is identified by a 2-out-of-8 code.

When the central office common control determines which trunk is to be employed for the connection to be established, the 2-out-of-8 code is transmitted to the field unit. The central office and field units each connect the same numbered link to the same one of the 14 possible trunks. The particular trunk selection procedure will be described below with reference to the common control.

It is thus seen that for a regular connection the only information that need be transmitted from the central office unit to the field unit is the identity of a trunk.

(2) TRUNK RELEASE SWITCHING INFORMATION

A trunk release is to take place whenever a subscriber is to be disconnected from his line equipment, i.e., whenever a regular connection is to be broken. Although scanning for service requests necessarily occurs at both central office and field units, trunk release scanning takes place only at the central office. When either the local subscriber or the party connected to his line circuit in the central office hangs up, the D.C. condition on the tip and ring conductors of the trunk used changes. This is detected by trunk release scanning equipment in the central office. The common control causes the release of the crosspoints in the central office unit line and trunk crossbar switches connecting the subscriber's line circuit to one of the 20 trunks. For the field unit crosspoints to release the only information that must be transmitted to the field unit is the identity of the trunk whose release is to be effected. Again, the 2-out-of-8 code is employed and the identity of the trunk is stored in the field unit. Referring to trunk switch A, the crosspoints connect any of the 14 sleeve leads 9SA0–9SA5 and 9SAB12 through 9SAB19 to any of the 20 sleeve leads 12SAG0–1 through 12SAG3–5 associated with respective ones of the 20 links. The 20 leads 12SAG0–1 through 12SAG3–5 are connected directly via cable 1240 to respective ones of the 20 windings of the trunk switch hold magnets in trunk switch A, shown in FIG. 13. The other end of the coil of each trunk switch hold magnet is connected by one of conductors 1302–0 through 1302–19 directly to one end of the winding of the similarly numbered line switch hold magnet. The other end of the winding of each line switch hold magnet is connected to conductor 14HG. Any connection of a line to a trunk through the line and trunk crossbar switches always results in the same numbered line and trunk switch hold magnets being energized together. The field unit is provided with means for energizing the particular one of sleeve leads 9SA0–9SA5 or 9SAB12–9SAB19 associated with the trunk whose identity has been transmitted to the field unit. The energizing potential on the particular one of these 14 sleeve leads is transmitted through trunk switch A and along cable pair 1240 to the particular trunk switch hold magnet winding holding the connection of the identified trunk to a link. The trunk switch hold magnet releases thereby releasing the particular trunk whose sleeve lead was energized responsive to the identifying 2-out-of-8 code, and the link priorly used. The line switch hold magnet similarly de-energizes and releases the same link from the particular subscriber connected to this link. Similar remarks apply to the release of one of the 14 trunks connected to a subscriber line through line and trunk switches B.

It is important to note that for a trunk release it is only necessary to transmit the identity of the trunk to be released. The field unit need not know the identity of the particular subscriber connected to this trunk nor the identity of the link employed. The sleeve of the trunk is energized and through a trunk switch causes the deenergization of the particular line and trunk switch hold magnets connecting the subscriber to the identified trunk. When the hold magnets release, the connection is broken. Although the subscriber lines, the links, and the trunks do not have sleeve leads the necessity of establishing sleeve connections through the trunk switches is apparent. It is the connection of one of sleeve conductors 12SAG0–1 through 12SAG3–5 to any one of sleeve conductors 9SA0–9SA5 or 9SAB12–9SAB19, or the connection of any one of sleeve conductors 15SBG0–1 through 15SBG3–5 to any one of sleeve conductors 9SB0–9SB5 or 9SAB12–9SAB19 through respective trunk switches A and B that enables the particular line and trunk switch hold magnets (links) serving any trunk to be identified. The identification of the trunk to be released results in the release of the two hold magnets establishing the trunk connection although the identity of these hold magnets is not transmitted from the central office unit to the remote unit. For a trunk release only the identity of the particular trunk need be supplied to the field unit.

(3) LOCAL CONNECTION SWITCHING INFORMATION

A local connection, utilizing conductors 15TX0, 15RX0, and 15SX0, or conductors 15TX1, 15RX1, and 15SX1 is to be made whenever two remote subscribers served by the same field unit are connected to each other. When the calling party first requests service he is connected by a particular one of the 20 trunks to his line circuit in the central office. He then dials the number of the other local subscriber and the central office establishes a connection from the line circuit of the first subscriber to the line circuit of the second subscriber in the central office. The line scanning circuit in the central office unit detects the service request at the second subscriber's line circuit and connects the line circuit of the second subscriber to the second subscriber over a second one of the 20 trunks. Ringing current is then supplied to the second subscriber who answers the call.

The central office common control continuously scans the 20 trunks serving each concentrator to determine a connection of any two of these trunks to each other through the central office switching equipment. When the common control determines that two trunks, both in the same one of the eight line concentrators, are connected to each other, further scanning is inhibited, and the common control operates on the particular concentrator to connect the two subscribers directly to each other via one of the two local trunks.

The common control transmits to the field unit the identity of the two trunks connected to each other. This is the only information required for the establishment of a local connection. In a manner similar to the release of a trunk described in the preceding section, the two 2-out-of-8 codes transmitted cause current to flow through two of sleeve leads 9SA0–9SAB19, and through various crosspoints in one or both of the trunk switches to the windings of the two trunk switch hold magnets establishing the connections to the two trunks connected to each other. The line switch hold magnets are prevented from releasing in this case, and only the trunk switch hold magnets release. Trunk switch select magnets 7 in both switches are operated. Trunk switch select magnets 8 in both trunk switches or trunk switch select magnets 9 in both switches are also operated. If no local connections are already established or a connection on the second local trunk is already established trunk switch select magnets 8 operate. If one local connection has already been established by select magnets 8, trunk switch select magnets 9 in both switches are operated. The two particular trunk switch hold magnets priorly released are then reoperated. They are operated over new paths rather than those through the two trunk switches as the sleeve crosspoints in these switches have opened when the hold magnets controlling them were originally released. However, as the two trunk switch hold magnets involved in the connection have already been identified during the release operation, the field unit needs no further information to reoperate these two hold magnets. When the two trunk switch hold magnets were released, both of the trunks extended to the central office, released. When the two hold magnets reoperate it is seen that both subscribers are connected via the same links to which they are already connected to one of the two local trunks 15TX0–15SX0 or 15TX1–15SX1 through the trunk crossbar switches.

It is important to note that it makes no difference whether the two subscribers are served by the same line and trunk switches or different line and trunk switches. If no local connection already exists, trunk switch select magnets 8 in both trunk switches A and B operate. The two subscribers are connected through either the same trunk switch or different trunk switches to local trunk 15TX0–15SX0. On the other hand, if a local connection already exists, the previously unoperated trunk switch select magnet 8 or 9 in each switch operates and the two subscribers are connected through one or both trunk switches to the other local trunk when the two originally released trunk switch hold magnets are reoperated.

Thus it is unnecessary to transmit any information from the central office unit to the field unit other than the identity of the two trunks to which the two subscribers are respectively connected. The identity of the two subscribers need not be determined. Because the two trunk switch hold magnets originally serving these subscribers are identified by sleeve connections through the trunk switches, the hold magnets are automatically released and reoperated without requiring the transmission of further information. And because of the unique connections of all links to the two local trunks via the contacts controlled by trunk switch select magnets 8 and 9 in both trunk switches, the two subscribers are automatically connected to the same local trunk as a result of the operation of similarly designated trunk switch select magnets 8 or 9 in both trunk switches.

In both a regular connection and a trunk release the only information transmitted from the central office to the remote unit is the identity of a particular one of the 20 trunks. For a local connection the only information transmitted is the identity of two trunks, the identity of the second trunk being transmitted after the identity of the first as described in detail below.

(4) LOCAL CONNECTION RELEASE SWITCHING INFORMATION

The fourth type of switching operation is that of releasing a local trunk when one of the two subscribers on a local connection hangs up. This can only be detected by the remote unit as neither subscriber is connected to central office equipment. When either subscriber (or both) hangs up, the tip and ring of the local trunk to which he is connected assume a different D.C. condition which controls further release sequences. The sleeve of the local trunk is energized, and as it is extended through one or both of the trunk switches to the four hold magnets maintaining the local connection, as in an ordinary trunk release, the line and trunk switch hold magnets serving each subscriber release, and the local connection is broken. No information need be transmitted from the central office to the remote unit. Instead it is the remote unit which transmits a signal to the central office unit identifying which of the two local trunks is to be released in order that the central office unit become aware of this fact for supervision purposes at the central office.

D. *Regular connection*

(1) DETAILED DESCRIPTION OF FIELD UNIT OPERATION

Line scanning for service requests proceeds simultaneously at the central office and field units. A counter is situated in the common control and is operated synchronously with counters in each of the field units. Thus each field unit scans the 128 lines it serves, all field units scanning simultaneously. The common control at the central office controls the simultaneous scanning of the 128 line circuits associated with each of the central office units. The first field unit or central office unit desiring service causes the common control to operate solely on that pair. The common control operation will be discussed below. At the present time the operation of an individual field unit, disclosed in FIGS. 2–29, will be described.

Two control cables, each comprising tip and ring conductors, are extended between the field unit and the associated central office unit. Pulses are transmitted by the central office unit along the tip and ring of the first pair to the field unit to control line scanning at the field. The scan pulses are transmitted along conductors 9T1 and 9R1, and along cable 901 to FIG. 28. The pulses are transmitted through normally closed contacts 28LR–1 and 28LR–2, along respective conductors 24ID–1 and 24ID–3, cable 2802, through normally closed contacts 25AUX–1 and 25AUX–2, and conductors 22TIC and 22RIC to transformer 2601. Thus under normal scanning conditions the pulses transmitted along control conductors 9T1 and 9R1 operate through transformer 2601 on transistors 26PDA and 26PDB.

As previously described, subscribers 0 through 63 are connected to line switch A with the remaining subscribers 64 through 127 being connected to line switch B. Six-stage counter 2400 is a 64-count counter. The scanning pulses transmitted along conductors 9T1 and 9R1 step this counter and thus control the scanning of 64 successive lines. The central office transmits 64 successive pulses of positive polarity followed by 64 pulses of negative polarity, etc. Every series of pulses steps counter 2400. The particular polarity of each group of 64 pulses determines which of the two groups of 64 subscriber lines is scanned.

Transistors 26PDA and 26PDB are both normally conducting. The bases of both of these transistors are connected to ground through respective resistors 2680 and 2681. Both emitters are connected to positive potential source 2602 and as the emitter-base junctions are forward biased, both transistors conduct in the absence of scanning pulses on conductors 22TIC and 22RIC.

Transistors 26PMA and 26PMB are both normally off. Each of these two transistors is held off by the conduction of the respective one of transistors 26PDA and 26PDB.

Transistors 26PMA and 26PMB in combination with transistor 26M, which is normally conducting, form mutually exclusive monostable circuits, that is, at certain times in the cycle of system operation, when transistor 26PMA is turned on, this transistor in combination with transistor 26M comprises a monostable circuit, while at other times in the operating cycle transistor 26PMB in combination with transistor 26M similarly forms a monostable circuit. As long as transistors 26PDA and 26PDB are in the off state, transistor 26M is fully conducting. It is held in the on state by the forward biasing of the emitter-base junction over a path which includes negative source 2606, resistors 2607 and 2609, diode 2610, and the base-emitter junction of the transistor returned to ground. When transistor 26PMA is turned on, a positive pulse is transmitted through diode 2605 and capacitor 2611 to reverse bias diode 2610. When this diode is reverse biased, the base of transistor 26M is connected to positive source 2613 through resistor 2612 and the transistor is turned off. The voltage at the collector of transistor 26M approaches that of negative source 2615. In that pulses transmitted from the central office to the remote unit may be mutilated in transmission and, therefore, may be of irregular shape and duration when they arrive at the field unit, the timing of the monostable circuit which comprises transistors 26PMA and 26M during the scanning of lines in the A group or transistors 26PMB and 26M during the scanning of lines in the B group must be independent of the waveshape of the incoming pulses from the central office. Positive pulses from the central office across conductors 22TIC and 22RIC cause transistor 26PDA to be turned off. This turns transistor 26PMA on for the duration of the monostable operation. Similarly, negative pulses turn off transistor 26PDB which similarly triggers the monostable circuit comprising transistors 26PMB and 26M. In this manner the pulses generated by the monostable circuits are made independent of the waveshape of the incoming pulses and, therefore, independent of the operations of transistors 26PDA and 26PDB.

Isolation of the above-mentioned mutually exclusive monostable circuits from the operation of the pulse detection transistors 26PDA and 26PDB is accomplished by making the timing of these circuits dependent upon the time required for recovery of capacitor 2611. When transistor 26M is turned off its collector no longer draws current from source 2608 through respective resistor-diode pairs 2624 and 2620, 2623 and 2622. Under this condition current flows from source 2608 through resistor 2624 and diode 2619 to the collector of transistor 26PMA if a positive pulse turned off transistor 26PDA, or through resistor 2623 and diode 2621 to the collector of transistor 26PMB if the scan pulse was negative in polarity and originally turned off transistor 26PDB. In addition, when transistor 26PMA is turned on and transistor 26M is turned off, negative current from source 2608 through resistor 2623 and diode 2621 joins the negative current from the same source through resistor 2617. This combined negative current flows to the base of transistor 26PMA and is great enough to keep it turned on even when transistor 26PDA turns back on. When transistor 26PMB is turned on and transistor 26M turns off, it is the current from source 2608 through resistor 2624 and diode 2619, and through resistor 2618, to the base of transistor 26PMB which sustains transistor 26PMB when transistor 26PDB turns back on. When the initial scan pulse has terminated, that one of transistors 26PDA or 26PDB, which was initially turned off, now turns on. But the monostable operation continues independent of this condition.

Capacitor 2611 begins to charge when transistor 26M turns off with current flowing from source 2606, through resistors 2607 and 2609, capacitor 2611, and emitter diode 2605 to the collector of transistor 26PMA, or diode 2604 to the collector of transistor 26PMB. During the charging period, diode 2610 is reverse biased and positive source 2613 holds transistor 26M off. However, after one millisecond has elapsed, capacitor 2611 has charged sufficiently from source 2606 to forward bias diode 2610. At this time a negative potential is once again applied to the base of transistor 26M which turns on. This transistor again draws current through diodes 2620 and 2622 and respective resistors 2624 and 2623, and the voltage at its collector becomes less negative. A positive pulse is thus generated on conductor 26P which is connected by cable 2679 to the first stage of counter 2400. The count of this counter is advanced by one digit. With transistor 26M turned on once again, current no longer flows through diodes 2619 and 2621. The previously conducting one of transistors 26PMA or 26PMB turns off and the monostable operation is completed.

Thus counter 2400 is not advanced until one millisecond has elapsed after the initial application of the scan pulse. Counter 2400 contains a count reprsentative of the line being scanned at both the central office and field units. In a manner to be described below, the scan pulse causes the line represented by the count in the counter to be scanned. The count of the counter must not be advanced until after the scan. For this reason, the advance pulse on conductor 26P is delayed for one millisecond.

In the event that the line being scanned desires service, transistor 26M is held off by other means for a period exceeding the one millisecond of monostable operation. It is held off until after the subscriber desiring service is connected to his line circuit through the line concentrator system. In this manner the advance pulse is not applied to conductor 26P until after service is provided to the subscriber requesting it. This operation will be described below but for the moment it will be assumed that the line being scanned desires no service and counter 2400 is advanced after the one millisecond of monostable operation during which the field unit determines the absence of a service request. This scanning procedure continues in the manner previously described. For a first 64 pulses of positive polarity the monostable circuit operation comprises transistors 6PMA and 26M. The next 64 monostable operations are a result of the conduction of transistor 26PMB and the turning off of transistor 26M. In either case, counter 2400 is advanced after each monostable operation, as the advance pulses on conductor 26P are supplied independent of the polarity of the scan pulse.

Prior to the transmission of the first scan pulse in any group of 64, counter 2400 is automatically reset. It counts from 0 through 63, and the 64th pulse of the preceding group causes the scanning of subscriber line 63 and after one millisecond advances counter 2400 which places it in the 0 or reset state. When a line at either the central office or field units desires service, counters at both the central office and field units are inhibited from operating, counter 2400 being inhibited by holding transistor 26M off in a manner to be described below. After a regular connection has been established, scanning could proceed from where it previously left off. However, it is desirable to reset the counters in both the central office and field units and to scan the other group beginning with the first line in it. The resetting of both counters, one in each unit, insures that both end units are in synchronism with each oher. In addition, even when no service requests are detected, it is desirable to reset the counters after the 64th line in each group has been scanned. Counter 2400, if operating properly, will indeed be reset at this time because after the 64th line in the group is scanned by the 6th pulse, the pulse on conductor 26P advances counter 2400 to the initial or reset state. To further insure that the counters at both ends are in synchronism, means are provided to reset counter 2400 after the scan of either group of lines.

The reset transistor 26R is the means for resetting counter 2400. Pulses from the central office are transmitted at the rate of approximately 500 per second. As stated heretofore, the transmitted pulse is distorted and a reshaped one millisecond pulse is provided by one of the two monostable circuits. During this one millisecond, a pulse must be transmitted to the central office by the field unit indicating a service request, or a pulse must arrive from the central office to the field unit similarly indicating a service request. In the event that neither unit has detected a service request, a new scan pulse arrives 2 milliseconds after the previous pulse.

After the transmission of a group of 64 scan pulses, the central office ceases to transmit pulses for 5 milliseconds. Conductors 9T1 and 9R1 are maintained at ground potential as they are connected through conductors 22TIC and 22RIC, the primary of transformer 2601, conductor 2651, and the primary of transformer 2652 to ground. The reset transistor 25R' is normally off. In a manner now to be described, it is turned on and pulses the reset conductor 26R only when no scan pulses are received for 2.5 milliseconds. During the transmission of a group of 64 pulses, pulses occur every two milliseconds. Thus, transistor 26R does not turn on during the transmission of a group of scan pulses. However, after the 64th pulse, no more pulses are received for 5 milliseconds, transistor 26R turns on, and applies a pulse to reset conductor 26R' to reset counter 2400 in the event the counter is not already reset after it has been stepped by the 64th pulse on conductor 26P. In a similar manner, after the establishment of a regular connection, the central office does not resume with the transmission of a new group of 64 scan pulses for 125 milliseconds. During the establishment of the connection, transistor 26R is held off as is transistor 26M. After the establishment of the connection, however, as has been explained above, transistor 26M turns on once again and advances the count. In a similar manner, transistor 26R is enabled to turn on after 2.5 milliseconds because no scan pulses are transmitted along control cable 1, and counter 2400 is reset.

When either of transistors 26PMA or 26PMB is turned on, current flows through respective diodes 2625 or 2626 to the junction of capacitor 2633, resistor 2636 and the diodes. The positive potential charges capacitor 2633 through resistor 2637. After transistor 26M turns off, the positive pulse from that one of transistors 26PMA or 26PMB which was turned on no longer appears at the junction. Transistor 26R is normally held in a nonconducting state by potential source 2627 which is greater in magnitude than source 2630 and as a result causes diode 2629 to conduct and maintain an approximately .5 volt bias across the emitter-base junction of transistor 26R. After the initial charging pulse through one of diodes 2625 or 2626, capacitor 2633 begins to discharge. Current flows from negative source 2635 through resistor 2636, the capacitor, and diode 2638 to negative source 2634, the magnitude of source 2635 being greater than that of source 2634. The junction becomes less positive. Diode 2632 is a reverse threshold diode which conducts when the reverse voltage thereacross exceeds a predetermined magnitude. If no new positive current pulses are supplied by transistors 26PMA and 26PMB through respective diodes 2625 and 2626, the junction attains a negative voltage sufficient to break down diode 2632. This negative potential of the junction is applied through resistor 2631 and diode 2632 to the base of transistor 26R which consequently turns on. The time required for capacitor 2633 to discharge sufficiently to break down diode 2632 is 2.5 milliseconds. The capacitor begins to discharge when the turned on one of transistors 26PMA or 26PMB turns off. Since either of these transistors remains on for one millisecond after a scan pulse is received, if scan pulses are not received for 3.5 milliseconds, capacitor 2633 discharges sufficiently to turn on transistor 26R. The collector of transistor 26R supplies a positive pulse to reset conductor 26R' which is connected to the reset terminal of each stage of counter 2400. As a result, all stages of the counter reset. Tranisor 26R remains on due to the potential of source 2635 which is applied to its base through resistors 2636 and 2631, and diode 2632. It turns off when one of transistors 26PMA or 26PMB turns on, at which time diode 2632 ceases to conduct.

In summary, transistors 26PDA and 26PDB respond to pulses of opposite polarities which are transmitted from the central office unit to the field unit over the first control pair, conductors 9T1 and 9R1, and in response thereto, trigger the monostable circuit comprising transistors 26PMA and 26M, or the monostable circuit comprising transistors 26PMB and 26M. Transistor 26M is normally conducting and turns off whenever one of transistors 26PMA or 26PMB is turned on. After the time-out of either monostable circuit, a positive pulse is developed on conductor 26P which advances the count of counter 2400. Transistor 26R is normally on but remains off as long as either of transistors 26PMA or 26PMB turns on within prescribed limits of time, approximately once every 3.5 milliseconds. If the time between pulses exceeds this period, which it does after the establishment of a regular connection, or after any of the other three switching sequences, or after the transmission of the 64th scan pulse in any group, transistor 26R is turned on and causes all stages of counter 2400 to reset.

Either end unit may detect a service request on the line being scanned. In response thereto the other unit must be notified and transistors 26M and 26R must be held off until the regular connection is completed. After this time, transistor 26M must turn on, and capacitor 2633 must discharge to turn transistor 26R on. The resulting potential on conductor 26R', occurring 2.5 milliseconds after the pulse on conductor 26P, must reset counter 2400.

The scanning of a particular line at the field unit occurs during the one millisecond of operation of either monostable circuit. The turning on of either transistors 26PMA or 26PMB supplies a positive pulse to respective conductors 26PA and 26PB. This pulse is extended through respective capacitors along cable 2603 and through respective resistors 2701 and 2702 to the base of either transistor 27A or 27B. Negative source 2706 is smaller in magnitude than negative source 2705, and transistors 27A and 27B are normally maintained nonconducting. The one millisecond positive pulse on either of conductors 26PA or 26PB causes the respective transistor to be turned on.

Referring to line switch A shown in FIGS. 2-7, it is seen that any line may be identified by specifying the line switch A or B in which it is contained, the particular one of the four groups of links to which it may be connected, the horizontal in which it is contained, and its steering level 8 or 9. These four identifying characteristics of any line are determined in the following manner:

(1) The line switch, A or B, is identified as a result of the conduction of transistor 27A, or the conduction of transistor 27B.

(2) The group is identified by stages 2 and 3 of counter 2400. These two stages together indicate one of groups 0 through 3.

(3) The steering level is identified by the state of stage 1 of the counter. A 0 represents level 8 and a 1 represents level 9.

(4) Stages 4, 5 and 6 of counter 2400 identify the particular one of eight horizontals containing the line to be scanned.

The eight AND gates 2404 are of the type which produce a negative output pulse only if both inputs are negative in polarity. The output is positive if either input is positive. Each counter stage applies a positive potential to its 0 output and a negative potential to its 1 output when it is in the 0 state. Similarly, when in the 1 state, a positive potential is applied to the 1 output, and a negative potential to the 0 output. When stages 2 and 3 are both 0, it is seen that only conductor 24G0 of conductors 24G0–24G3 has applied to it a negative potential as its respective AND gate is the only one whose both inputs are connected to negative outputs of stages 2 and 3. Similarly, when stages 2 and 3 are in respective 0 and 1 states (a binary 2), only conductor 24G2 has a negative potential applied to it.

Figure 27:
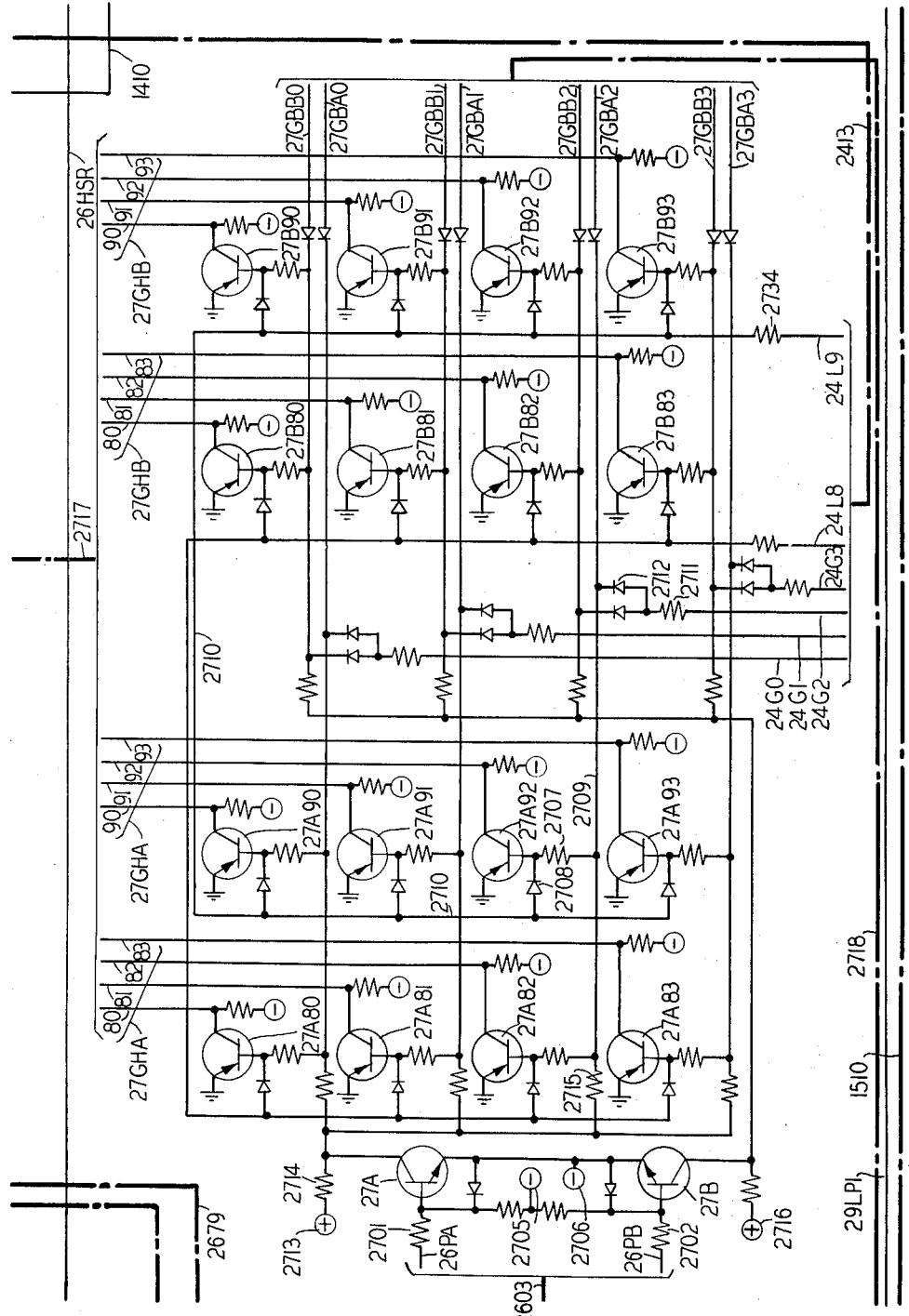

The four conductors 24G0 through 24G3 are extended via cable 2413 to FIG. 27. On this figure are shown in addition to transistors 27A and 27B, transistors 27A80 through 27B93. The last digit in each of these designations refers to one of four groups of links. The next to last digit in each designation refers to the steering level 8 or 9. The third digit from the end refers to line switch A or B. Each of these transistors is normally non-conducting. Referring to a particular one of these transistors, 27A92, it is seen that for the transistor to conduct the base must be made negative in potential. The base of transistor 27A92 is connected to resistor 2707 and diode 2708. If a positive potential is applied to conductor 2709, this potential is transmitted through resistor 2707 and transistor 27A92 is held off. Similarly, a positive potential on conductor 2710 is transmitted through diode 2708 to the base of the transistor and it is held off. A positive potential on conductor 24G2 is normally applied through resistor 2711 and diode 2712 to conductor 2709 and in itself is sufficient to keep transistor 27A92 off. Similarly, the positive potential of source 2713 applied through resistors 2714 and 2715 to conductor 2709 is similarly in itself sufficient to keep transistor 27A92 non-conducting. And the positive potential normally on conductor 24L9 and applied through resistor 2734 to conductor 2710 is similarly sufficient to reverse bias transistor 27A92. However, if conductor 24L9 is negative in potential, conductor 24G2 is similarly negative in potential, and transistor 27A conducts and applies a negative potential to conductor 2709 through resistor 2715, the three inhibiting potentials applied to transistor 27A92 are removed and the transistor conducts. Transistor 27A becomes active when an A scan pulse is received from the central office. Conductor 24G2 is negative in potential when stages 2 and 3 of counter 2400 are in the 0 and 1 states respectively. And conductor 24L9, connected directly to the 0 output of stage 1 of counter 2400, is made negative in potential when this stage is in the 1 state. Thus transistor 27A92 is made active only when the line to be scanned is in the A switch, in link group 2, and connected to a link by steering level 9. When the transistor conducts, a positive pulse is applied to conductor 27GHA92.

Source 2713 inhibits the eight transistors 27A80 through 27A93, and source 2716 inhibits the eight transistors 27B80 through 27B93. Conductor 24G0 inhibits transistors 27A80, 27A90, 27B80 and 27B90. Similarly conductors 24G1 through 24G3 each inhibits four respective transistors. And each of conductors 24L8 and 24L9 inhibits eight of the transistors. At any one time only one of transistors 27A and 27B conducts, only one of the conductors 24G0 through 24G3 is negative in potential, and only one of conductors 24L8 and 24L9 is likewise negative in potential. As a result, only one of the 16 transistors 27A80–27B93 supplies a positive pulse to respective output conductors 27GHA80–27GHB93. These 16 conductors are extended along cable 2717 to the scanning circuit 800 for line switch A, and to the scanning circuit 1600 for line switch B. The eight conductors having the letter A in their designations are extended to scanning circuit 800 and the eight conductors having the letter B in their designations are extended to scanning circuit 1600. Only one of the 16 conductors is positive in potential at any given instant.

Each of these 16 conductors identifies a particular combination of one of the two line switches, one of the two steering levels in that switch, and one of the four groups of links in the same switch. To identify a particular line it is only necessary to further designate one of the eight horizontals in the same switch. A particular horizontal is identified by the combination of one of the transistors in FIG. 24 whose output conductors are designated 24H0–24H7. Normally negative sources 2402 maintain conductors 24H0–24H7 at negative potentials. Only one of the eight transistors conducts at any one time, the particular transistor being determined by stages 4, 5 and 6 of counter 2400. For one of these transistors to conduct its base must be made negative in potential. Normally, negative source 2408 applies a negative potential through resistor 2409 and one of resistors 2406 to the base of each of the four uppermost transistors. Similarly, this same potential is applied through resistor 2410 and resistor 2407 to the bases of the lowermost four transistors. This negative potential, however, is insufficient in itself to cause the transistors to conduct if a positive potential is applied through resistors 2405 from the outputs of the AND gates 2404 connected to stages 4 and 5. If a negative potential is applied to the base of a particular one of the transistors by both source 2408 and the output of one of the AND gates 2404, the transistor conducts.

It is readily seen that each of the possible eight states of stages 4, 5 and 6 causes a respective one of the transistors to conduct. For example, consider the binary number 010(2) to be contained within these stages. As output 1 of stage 6 is negative in potential, diode 2411 is reverse biased and potential 2408 is as usual applied through resistors 2406 to the bases of the four uppermost transistors. However, output 0 of this stage is positive in potential and diode 2412 is forward biased. The potential applied to the base of each of the four lowermost transistors is no longer derived from negative source 2408 but rather from the positive output of stage 6. As a result, the four lowermost transistors are inhibited from operating even if the respective AND gates apply negative potentials to the output conductors connected to their bases. The particular one of the four uppermost transistors that is operated is determined by the four AND gates 2404 connected to stages 4 and 5 of the counter. With the digit 0 stored in stage 4, output 1 is negative in potential. The digit 1 stored in stage 5 causes output 0 to be negative in potential. The only one of AND gates 2404 connected to stages 4 and 5 which is energized is the second from the bottom. A negative potential is thus applied from the output of this AND gate of the base of transistor connected to conductor 24H2 and the base of the transistor connected to conductor 24H6. Only the first-mentioned transistor conducts, however, as stage 6 is in the 0 state. As a result, only conductor 24H2 has applied to it a positive potential.

It is seen that as stages 4, 5 and 6 are advanced, a positive potential is successively applied to one of conductors 24H0–24H7. These eight conductors are extended via cable 2415 to FIG. 8. The particular one of these conductors which is energized identifies a horizontal, and together with that of the 16 conductors 27GHA80–27GHB93 which is energized completely identifies a particular one of the 128 lines.

Scanning circuit 800, individual to line switch A, contains eight networks 801–0 through 801–7. Each of the eight conductors 27GHA80–27GHA93 is associated with a respective one of these networks, 27GHA80 being associated with network 801–0, as shown, 27GHA90 being associated with network 801–1, etc. Each of the networks 801– is associated with eight of the 64 lines served by line switch A. The sleeves of lines 0, 2, 4, 6, 8, 10, 12 and 14 are associated with network 801–0. Each of these sleeves is contained in a different horizontal level and it is seen that each network 801– is associated with one sleeve in each of the eight horizontals of line switch A.

Referring to FIG. 3 and in particular to sleeve S0 it is seen that it is connected through resistors 301, 302 and 303 to negative source 304. If the associated subscriber is on-hook, the potential of negative source 304 is applied directly to sleeve S0. If on the other hand he is off-hook, current flows from source 305 through resistor 306, the tip and ring conductors and resistor 303 to negative source 304. As a result, the junction of resistors 302 and 303 is positive in potential and a positive potential is applied to sleeve S0. In network 801–0 a diode 807 is in series with each of the eight sleeve conductors. Only if the associated subscriber desires service is the respective diode forward biased as the sleeve is positive in potential. A positive pulse applied on conductor 27GHA80 is transmitted through only those of capacitors 803 and diode 807 associated with subscribers requesting service.

Each of the eight networks 801–0 through 801–7 in scanning circuit 800 is associated with eight lines, each in a different horizontal. Only one of the eight conductors 27GHA80–27GHA93, has applied to it a positive pulse at any one time. As a result, the pulse is transmitted through the diodes associated with subscribers requesting service in only one of the eight networks.

Similar remarks apply to scanning circuit 160. Only one of conductors 27GHB80–27GHB93 applies a positive pulse to the scanning circuit at any one time and as a result this pulse is transmitted through the diodes associated with lines desiring service in only one of the eight networks in scanning circuit 160 analogous to networks 801–0 through 801–7. And as only one of the 16 conductors 27GHA80–27GHB93 is energized at any one time, only one of the 16 diode networks transmits pulses to its output leads.

Each of the 16 diode networks has in it an output conductor associated with a line in horizontal 0 of one of the two switches. Similarly, each of the diode networks has in it an output conductor associated with a line in each of the horizontals in one of the two switches. All of the output conductors associated with lines in horizontals 0 of either switch are coupled together by conductor 850–0. Similar remarks apply to the other seven output conductors of each of the diode networks. Cable 860 extends these coupling conductors from scanning circuit 800 to scanning circuit 160. Since only one of the 16 diode networks may be energized at any one time, although 16 output conductors in all are coupled to conductor 870–0, it is seen that a pulse on this conductor can only result from a service request of a subscriber associated with the particular one of the 16 diode networks enworks.

It is possible that when a positive pulse is applied to one of the 16 conductors 27GHA80–27GHB93 all eight of conductors 870–0 through 870–7 will contain thereon positive pulses. This is possible if all eight lines associated with the particular one of the 16 diode networks energized, desires service. Only one line is scanned at any one time and the final step in selecting the particular line to be scanned arises from the particular one of the eight conductors 24H0 through 24H7 which is positive in potential. Each of diodes 880 is connected through conductor 881 and resistor 2663 to a positive potential, this potential being a result of the voltage dividing network comprising source 2661 and resistors 2662 and 2664. As each of conductors 24H0 through 24H7 is normally negative in potential, each of the diodes 880 is normally reverse biased. The only diode which is forward biased is that one connected to the particular one of conductors 24H0–24H7 which is positive in potential. This diode is forward biased, and if a positive pulse appears on the associated one of conductors 870– it is transmitted through the diodes to conductor 881. The positive pulse on this conductor represents a service request originating at the field unit.

A specific example will aid in the understanding of the line scanning circuit. Suppose that line S0 is being scanned and the associated subscriber desires service, diode 807 in series with conductor 870–0 and in circuit 801–0 being forward biased when he goes off-hook. When a positive pulse is applied to conductor 27GHA80 the pulse is transmitted through this diode. It is also transmitted through all others of diodes 807 associated with subscribers 2, 4, 6, 8, 10, 12 and 14 who may desire service at this time. However, the only one of diodes 880 which is forward biased at this time is that diode in series with conductor 870–0 which is forward biased by the positive potential on conductor 24H0. As a result, the pulse originating on conductor 27GHA80 is transmitted along conductor 870–0 to conductor 881.

The entire scanning process originates with the application of a positive pulse to one of the 16 conductors 27GHA80–27GHB93. The positive pulse originates from the conduction of the associated one of transistors 27A80–27B93. There is one situation however where line scanning is to be inhibited. As discussed above, every line in either line switch can be connected to the five links in only one of the four groups. If the five links in a particular group are all busy it is impossible to provide service to a sixth of the subscribers served by this group of links. As a result, scanning must be inhibited for all lines in this group as long as the five links remain busy. Were this not done, the common control might attempt to establish a connection that is impossible at this time.

Referring to FIG. 27, eight leads 27GBA0–27GBB3 are shown connected through respective diodes to the bases of transistors 27A80–27B93. The last digit in each of these eight designations refers to one of the four groups of links, and the A or B designation refers to one of the two pairs of line and trunk switches. It is seen that if a positive potential is applied, for example, to conductor 27GBA2, transistors 27AB82 and 27AB92 are inhibited from operating. These two transistors, although normally operated when lines in the A switch and served by link group G2 are being scanned, are inhibited from operating when the five links in group G2 in line and trunk switches A are already all in use. In this manner, lines for which service cannot be supplied are not scanned to begin with.

The eight conductors 27GBA0–27GBB3 are extended along cable 2718 to FIGS. 13 and 15. Conductors 27GBA0–27GBA3 are extended to FIG. 13 containing therein the hold magnets of trunk switch A. Conductors 27GBB0–27GBB3 are similarly extended to the trunk switch hold magnet circuit for trunk switch B. If the five hold magnets in any one of the eight groups of links are all busy, the respective one of conductors 27GBA0–27GBB3 is energized, and the resulting positive potential inhibts the respective two of transistors 27A80–27B93 from operating. This is accomplished by means of a contact chain controlled by the various trunk switch hold magnets. Positive potential source 1700 is connected through respective resistors 1705 to each of the eight leads 17LHA0–17LHB3. Conductors 17LHA0–17LHA3 are extended via cable 1701 to FIG. 13, with the other four conductors associated with respective ones of the four links in line and trunk switches B being extended to FIG. 15. Referring to FIG. 15, it is seen that if the five hold magnets 13THA0–13THA4, all associated with the five links in group G0 of trunk switch A, are operated, all of contacts 13THA0–1 through 13THA4–1 are closed. The positive potential on conductor 17LHA0 is extended directly to conductor 27GBA0, and transistors 27A80 and 27A90 are inhibited from operating. Similarly, if all of trunk hold magnets 13THA5–13THA9 are operated, the five sets of contacts 13THA5–1 through 13THA9–1 are closed, the positive potential on conductor 17LHA1 is extended to conductor 27GBA1, and transistors 27B81 and 27B91 are inhibited from operating. Similar remarks apply to the remaining two contact chains in FIG. 13 controlled by respective trunk hold magnets 13THA10–13THA14, and 13THA15–13THA19. In a similar manner, four analogous contact chains are in the hold magnet circuit for trunk switch B, and if all five magnets in one of the four groups of links in trunk and line switches B are operated the positive potentials on conductors 17LHB0–17LHB3 are extended to respective conductors 27GBB0–27GBB3, and prevent the respective two of transistors 27B80–27B93 from operating.

The positive pulse on conductor 881 indicates that the particular line identified by the count in 64-count counter 2400 and the particular one of the operated transistors 26PMA or 26PMB desires service. This pulse must "freeze" counter 2400 and the operated one of the two transistors by maintaining both of transistors 26M and 26R in the nonconducting state. This pulse must also cause a signal to be transmitted to the central office unit notifying it of a service request at the field unit. The counter in the central office common control has in it the same count as that in counter 2400, and is thus made aware of the particular line requesting service.

While scanning is in progress, transistor 26AF1 is conducting and transistor 26AF is not. The emitter of transistor 26AF1 is connected directly to positive potential source 2661. The base of this transistor is connected through resistors 2671 and 2682 to negative source 2683. The emitter-base junction is forward biased and the transistor conducts. Collector current causes a positive potential to be developed at the junction of resistors 2657 and 2658, this positive potential reverse biasing the emitter-base junction of transistor 26AF.

The positive pulse on conductor 881 is effective to turn off transistor 26AF1 and thereby turn on transistor 26AF. The positive pulse is transmitted through capacitors 2666 and 2665 to the base of transistor 26AF1 and reverse biases the emitter-base junction of this transistor. With transistor 26AF1 off, the junction of resistors 2657 and 2658 is negative in potential due to source 2683. Transistor 26AF turns on and a positive pulse appears at its collector. This potential is extended through diode 2668, resistor 2670, and capacitor 2665 to the base of transistor 26AF1 maintaining this transistor nonconducting. After capacitor 2665 changes, the potential at the junction of resistors 2670, 2682, and 2671 is sufficient when extended through resistor 2671 to turn transistor 26AF1 back on. The charging period is 150 milliseconds. Capacitor 2660 is provided to filter out noise appearing on condutcor 881.

The positive pulse on the collector of transistor 26AF is transmitted through resistor 2684 to the secondary of transformer 2652. A positive pulse is induced across the primary of this transformer connected by conductor 2651 to the primary of transformer 2601. A positive pulse thus appears on each of conductors 26RIC and 26TIC. This simplex pulse is transmitted from the field unit to the central office unit over control conductors 9T1 and 9R1 and indicates a request for service from the field unit.

When it is the central office unit that determines a request to terminate a call to one of the subscribers served by the line concentrating system, a positive simplex pulse is transmitted from the central office unit to the field unit over the simplex of the first control pair. This signal appears as a positive pulse across the secondary of transformer 2652. It is transmitted through resistor 2684, diode 2668, resistor 2670 and capacitor 2665 to the base of transistor 26AF1. This transistor is turned off in the same manner as when a service request pulse originating at the field unit appears on conductor 881. Transistor 26AF1 remains off, and transistor 26AF turns on and remains on until capacitor 2665 charges.

Diodes 2655 and 2656 are included for protective purposes. The collector of transistor 26AF is normally maintained at the potential of source 2653 whose magnitude is the same as that of source 2654. Excessive positive pulses cause diode 2656 to conduct. Any negative pulses cause diode 2655 to conduct. In this manner, excessive pulses from external sources, e.g., lightning, are prevented from damaging transistors 26AF and 26AF1.

Thus a service request at either end unit causes transistor 26AF to remain on until capacitor 2665 charges. The discharge time of this capacitor is 150 milliseconds. Transistor 26M is normally off for only one millisecond after the scan pulse is transmitted over the tip and ring conductors of the first control pair from the central office unit. This transistor must remain off, however, responsive to the detection of a service request. An advance pulse on conductor 26P must not be produced because the count in counter 2400 must be frozen to identify the line requiring service. The count must be maintained until after the connection is completed. Transistor 26M is held off for the 150 milliseconds during which transistor 26AF conducts. The positive collector voltage is transmitted directly through diodes 2668 and 2676, and resistor 2609 to the junction of diode 2610 and capacitor 2611. The capacitor cannot discharge over its normal discharge path comprising source 2606, resistors 2607 and 2609, capacitor 2611, and resistor 2641. This discharge cannot take place until after transistor 26AF turns off once again.

The central office does not transmit further scan pulses responsive to a service request at either end unit. Normally, transistor 26R would time-out after 2.5 milliseconds and a reset pulse would appear on conductor 26R'. This must be prevented to preserve the count in counter 2400. As transistor 26R times out 2.5 milliseconds after that one of the operated transistors 26PMA or 26PMB turns off, it is apparent that because the monostable operation is stretched for a period of 150 milliseconds by maintaining transistor 26M off, transistor 26R cannot begin to time-out and no reset pulse is generated.

The field unit operates under the philosophy that all action within the field unit should be primarily under the command of the central office unit. Thus upon the occurrence of a request for service by one of the subscribers served by the concentrator, the field unit takes steps to temporarily halt the scanning of lines therein. However, the field unit in the absence of additional orders from the central office unit will withdraw from control and will become once again subservient to further orders from the central office. Under this philosophy the field unit must not disable itself for prolonged periods of time. For this reason the circuitry comprising transistors 26AF1 and 26AF is arranged to restore after 150 milliseconds, the charging time of capacitor 2665. After this time period, counter 2400 is advanced, and if no further scan pulses are received it is reset. The field unit is thus prepared to accept scanning pulses or other orders from the central office. In the normal course of events, once a service request has been transmitted from the field unit to the central office unit, the central office unit transmits additional control signals to effect a regular connection. As the establishment of this connection may require more than 150 milliseconds, additional means must be provided to freeze counter 2400 in response to the transmission of additional control signals by the central office unit which thus recognizes the service request. This means will be described below.

The field unit knows the identity of the line requiring service by the count stored in counter 2400. Before it can establish the required connections through its line and trunk switches, it must obtain the identity of the trunk which is to be employed from the central office unit. Communication, for purposes of control, between the central office unit and the field unit is accomplished over the first and second control pairs comprising conductors 9T1, 9R1, and 9T2, and 9R2. During the scanning cycle, conductors 9T1 and 9R1 are connected through respective break contacts 28LR–1 and 28LR–2, conductors 24ID–1 and 24ID–3, contacts 25AUX–1 and 25AUX–2, and conductors 22TIC and 22RIC to the primary of coil 2601. Scan pulses are transmitted over this path to the transformer to operate respective transistors 26PDA and 26PDB. The identity of the trunk to be used is transmitted from the central office unit to the field unit and is stored in two of the eight identification relays 22ID–1 through 22ID–8. Th tip and ring conductors of control pair 1 must be transferred from the primary of transformer 2601 to the coils of various ones of these identification relays in order that identification signals on these conductors operate appropriate identification relays.

The tip and ring conductors of control pair 2 during scanning are connected via conductors 9T2 and 9R2, respective break contacts 25C1–1 and 25C1–2, diodes 2501 and 2502, break contacts 25AUX–3 and 25AUX–4, and the coils of respective relays 25A and 25B to ground. During scanning no potentials are applied at the central office unit to each of conductors 9T2 and 9R2. The central office unit, responsive to a service request from either unit and after the transmission of the simplex pulse in either direction, applies a large negative potential to either conductor 9T2 or conductor 9R2, and a smaller negative potential to the other. The large potential is applied to conductor 9T2 if the line requiring service is in group A, and is applied to conductor 9R2 if the line is in group B. The associated one of relays 25A or 25B operates when this potential is applied. The other of these relays, having a smaller potential applied to its winding, does not operate. Either of these relays operating causes the auxiliary relay 25AUX to be operated. Contacts 25A–1 or 25B–1, in closing, connect sources 2533 and 2534 to each other through the coil of relay 25AUX. This relay thus operates.

The 25A or 25B relay operating indicates that the central office unit has recognized the service request and is proceeding to cause the establishment of the regular connection. Thus transistors 26M and 26R must be held off for more than the 150 milliseconds of conduction of transistor 26AF. Relay 25A or 25B in operating closes contacts 25A–2 or 25B–2 on FIG. 26. The closing of either of these sets of contacts connects positive source 2677 through resistors 2678 and 2609 to the junction of diode 2610 and capacitor 2611. This positive potential prevents the discharge of capacitor 2611 independent of transistor 26AF. This positive potential from source 2677 is maintained until after the operated 25A or 25B relay releases, which does not occur until after the regular connection is completed. Thus transistors 26M and 26R are held off for the duration of the switching sequence. When relay 25C1 operates later, contacts 25C1–1 further insure that transistors 26M and 26R remain off. After the connection has been established and the operated one of relays 25A or 25B and relay 25C1 have released, transistor 26M on after one millisecond and advances counter 2400. No further scanning pulses are transmitted from the central office unit to the field unit for 125 milliseconds and thus after the first 25 of these milliseconds, transistor 26R turns on and causes counter 2400 to reset. Scanning of lines then proceeds from the first line in the other of the two groups.

The diodes across the coils of relays 25A and 25B as well as those in parallel with the coils of other relays are to insure that excessive reverse voltages are not obtained when the relays release. The diodes short circuit the coils when the relays release in the well-known manner.

Figure 21:
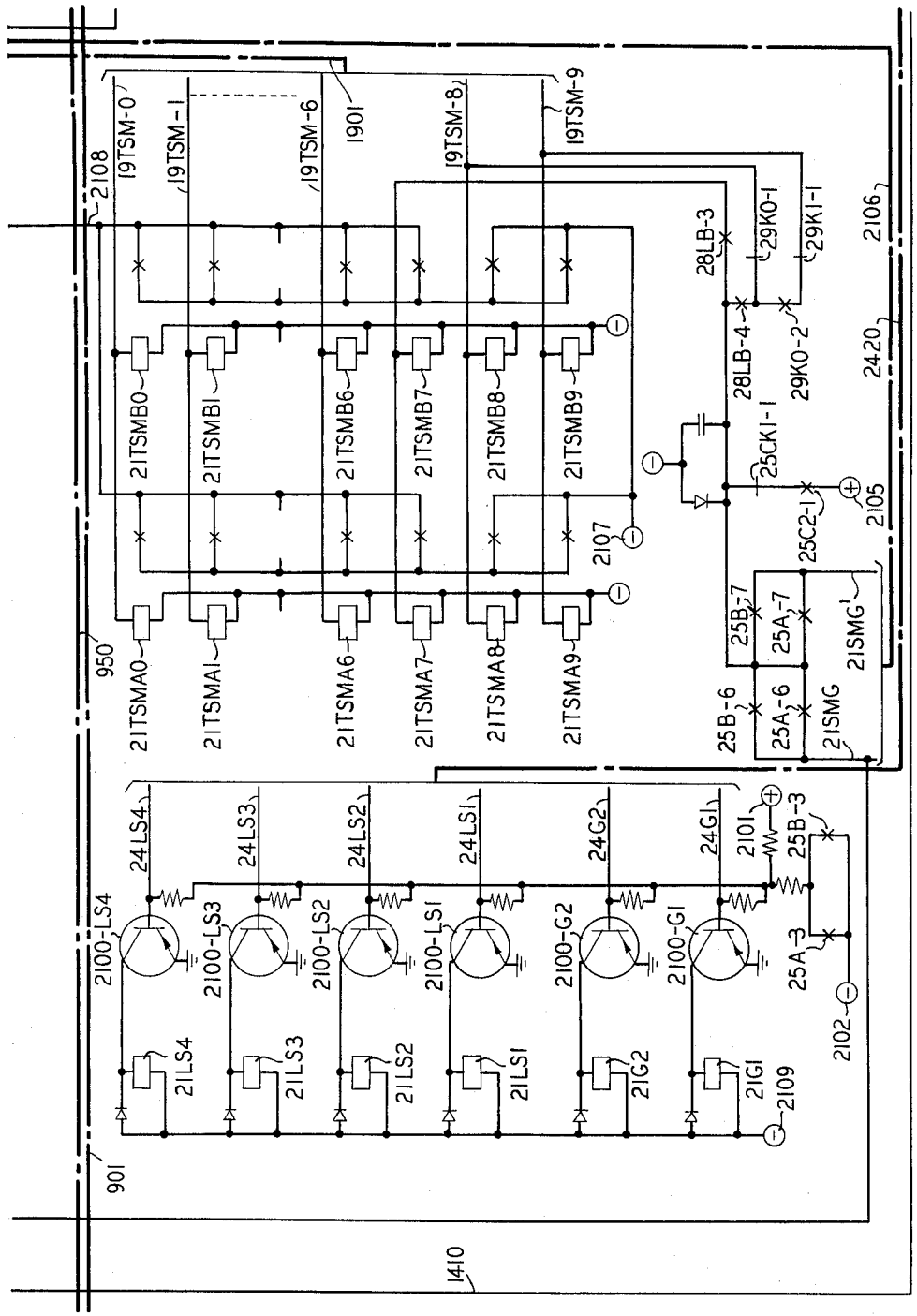

The 25A or 25B relay in operating closes respective contacts 25A–3 or 25B–3 on FIG. 21. Normally, each of the six transistors 2100–G1 through 2100–LS4 is held non-conducting by the application of a positive potential from source 2101 to the respective base terminals. However, when either contacts 25A–3 or 25B–3 close, source 2102 is connected to these bases and partially overcomes the inhibiting effect of source 2101. These transistors, however, do not operate unless a negative potential is also applied to respective conductors 24G1 through 24LS4. These conductors are connected via cable 2420 to respective stages of counter 2400. Each of these conductors has a negative potential applied to it from the respective counter stage only if the stage is in the 1 state and the 0 output is negative in potential. Those of transistors 2100–G1 through 2100–LS4 that are operated thus represent those stages of the counter 2400 in the 1 state.

The operation of each of these transistor controls the operation of its respective relay 21G1–21LS4. Current from the collector of each of these transistors flows through the coil of its respective relay to source 2109 and the relay is operated. The particular ones of relays 21G1–21LS4 which are operated indicate a particular line as does the count maintained in counter 2400. For example, if all stages of the counter are in their 1 states, all of the relays are operated. Relays 21G1 and 21G2, both operated, indicated that the line is in group 3. Relays 21LS1 through 21LS3 operated indicate that the line is in the eighth horizontal, and relay 21LS4 operated is an indication that the particular line can be connected to a link by the operation of steering level 9 rather than steering level 8. Two lines are thus identified, line 63 in line switch A and line 127 in line switch B. This is similar to the identification of two lines by the count of counter 2400. The final step in the identification of the particular line will be seen later to result from which of relays 25A or 25B has been operated.

The auxiliary relay 25AUX, having been operated from the initial operation of either relay 25A or 25B, transfers the tip and ring conductors 9T1 and 9R1 of control pair 1 from the primary of transformer 2601 to the windings of the first four identification relays 22ID–1 through 22ID–4. Contacts 25AUX–1 and 25AUX–2 open, thus disconnecting conductors 22TIC and 22RIC from respective conductors 24ID–1 and 24ID–3. Contacts 25AUX–5 and 25AUX–6 are now closed, and it is seen that the tip and ring conductors of control pair 1 are each connected through various diodes to the coils of two respective ones of the first four identification relays.

Each trunk is identified by a 2-out-of 8 code. A trunk is identified by the operation of:

(1) One of relays 22ID–1 or 22ID–2, and one of relays 22ID–3 or 22ID–4; or (2) One of relays 22ID–1 through 22ID–4 and one of relays 22ID–5 through 22ID–8.

Thus, when auxiliary relay 25AUX connects the tip and ring conductors of control pair 1 to the first four identification relays, one or two of these relays operate. A positive potential applied by the central office unit to the tip of control pair 1 causes relay 22ID–2 to operate. A negative potential on this conductor causes identification relay 22ID–1 to operate instead. Similarly, positive and negative potentials on the ring of control pair 2 cause respective relays 22ID–4 and 22ID–3 to operate.

The following table indicates the potentials on conductors 9T1, 9R1, 9T2, and 9R2, and the corresponding operated identification relays required to identify the twenty trunks.

| Trunk | Polarity of— | | | | Identification relays operated: | | | | | | | |
|---|---|---|---|---|---|---|---|---|---|---|---|---|
| | 9T1 | 9R1 | 9T2 | 9R2 | 1 | 2 | 3 | 4 | 5 | 6 | 7 | 8 |
| 9A0 | − | − | | | ✓ | | ✓ | | | | | |
| 9A1 | − | + | | | ✓ | | | ✓ | | | | |
| 9A2 | − | | − | | ✓ | | | | ✓ | | | |
| 9A3 | − | | + | | ✓ | | | | | ✓ | | |
| 9A4 | − | | | − | ✓ | | | | | | ✓ | |
| 9A5 | − | | | + | ✓ | | | | | | | ✓ |
| 9B0 | + | − | | | | ✓ | ✓ | | | | | |
| 9B1 | + | + | | | | ✓ | | ✓ | | | | |
| 9B2 | + | | − | | | ✓ | | | ✓ | | | |
| 9B3 | + | | + | | | ✓ | | | | ✓ | | |
| 9B4 | + | | | − | | ✓ | | | | | ✓ | |
| 9B5 | + | | | + | | ✓ | | | | | | ✓ |
| 9AB12 | | − | − | | | | ✓ | | ✓ | | | |
| 9AB13 | | − | + | | | | ✓ | | | ✓ | | |
| 9AB14 | | − | | − | | | ✓ | | | | ✓ | |
| 9AB15 | | − | | + | | | ✓ | | | | | ✓ |
| 9AB16 | | + | − | | | | | ✓ | ✓ | | | |
| 9AB17 | | + | + | | | | | ✓ | | ✓ | | |
| 9AB18 | | + | | − | | | | ✓ | | | ✓ | |
| 9AB19 | | + | | + | | | | ✓ | | | | ✓ |

The central office unit, after transmitting or receiving the simplex pulse and after having applied a greater negative potential to conductor 9T2 or 9R2, energizes conductors 9T1–9R2 in accordance with the trunk it has determined should be used. The operation of one or two of the first four identification relays in the field unit is an indication that the signal information on control pair 1 has operated the appropriate identification relay or relays. One or two of contacts 22ID–1–3 through 22ID–4–3 close and negative source 2201 is connected to conductor 22C1. This potential is extended along cable 2202 to the coil of relay 25C1 which thus operates. Relay 25C1 in operating transfers the tip and ring conductors of the second control pair to respective windings of the last four identification relays. Contacts 25C1–1 and 25C1–2 open, and conductors 9T2 and 9R2 are no longer connected to respective relays 25A and 25B. Instead, when contacts 25C1–3 and 25C1–4 close it is seen that these conductors are connected to respective conductors 22ID–5 and 22ID–7. Conductor 22ID–5 is connected in turn to the coils of identification relays 22ID–5 and 22ID–6, and conductor 22ID–7 is connected to the coils of relays 22ID–7 and 22ID–8.

The greater negative potential originally applied by the central office unit to either conductor 9T2 or 9R2 operates one of respective relays 25A or 25B. The central office must verify that relay 25A or 25B has operated. The negative current in that one of conductors 9T2 and 9R2 having applied to it the lesser potential normally inhibits relay 54TR in the central office unit from operating. When either relay 25A or 25B operates, relay 25AUX operates and opens contacts 25AUX–3 and 25AUX–4. If relay 25A was originally operated, it remains operated because contacts 25A–4 close. However, when contacts 25AUX–4 open, current ceases to flow in conductor 9R2. Relay 54TR in the central office unit operates to indicate that relay 25A has operated. The central office then applies identifying potentials to the control conductors.

Similarly, if the original greater potential was on conductor 9R2, current continues to flow in this conductor when relay 25AUX operates, as contacts 25B–4 are closed. However, contacts 25AUX–3, now open, are not shunted by closed contacts 25A–4 as relay 25A has not operated. Current ceases to flow in conductor 9T1, and the central office now places the identification potentials on the control conductors.

The originally operated one of relays 25A or 25B is no longer held by the greater negative potential on conductor 9T2 or 9R2 as the central office has removed this potential. However, capacitor 2507 is normally charged from source 2590 and now discharges through contacts 25C1–5, diode 2508, and either of contacts 25A–5 or 25B–5 to maintain the operated relay operated. The discharge maintains the one relay operated until it is maintained by the energization of conductor 22C1' connected to diode 2508. This conductor is connected to negative source 2201 after one or two of the first four identification relays has operated, and one or two sets of contacts 22ID–1–1 through 22ID–4–1 have closed, as described above. Relay 25A or 25B thus remains operated for the duration of the switching sequence until the operated one or ones of the first four identification relays release.

Positive or negative potentials may be applied to either the tip or ring of the second control pair by the central office unit and one of relays 22ID–5 through 22ID–8 may operate. Relay 25C1 controls the connection of the second control pair to the last four identification relays only after one or two of the first four identification relays have operated. This allows sufficient time for the original negative potentials on conductors 9T2 and 9R2 to subside and for the new identifying potential applied to take effect. When both identification relays have operated conductor 22C2 is connected to negative source 2201. If the trunk selected is identified by two relays in the first four it is seen that conductor 22C2 was already connected to source 2201 through one of contacts 22ID–1–4 or 22ID–2–4, and one of contacts 22ID–3–4 or 22ID–4–4 after the identification potentials on the first control pair were transmitted. Conductor 22C2 is connected through cable 2203 to the coil of relay 25C2 which operates. If the trunk selected is identified by one identification relay in the first four and another in the second four, relay 25C2 does not operate until after the second identification relay has energized. At this time, source 2201 is connected to conductor 22C2 through one set of contacts 22ID-1-3 through 22ID-4-3, and one set of contacts 22ID-5-3 through 22ID-8-3.

Two of identification relays 22ID-5 through 22ID-8 should not be operated together if no malfunctions have occurred. Conductor 22BLK is negative in potential only if both conductors 9T2 and 9R2 had identifying potentials applied to them and one set of contacts 22ID-5-4 or 22ID-6-4, and one set of contacts 22ID-7-4 or 22ID-8-4 have operated. In such a case the negative potential on conductor 22BLK is applied to the other end of the coil of relay 25C2 which thus does not opertate. It is the operation of this relay that directly initiates the operation of the crossbar switches, and this operation is prevented if erroneous identifying signals have been transmitted. Similarly, if both of relays 25A and 25B have operated relay 25C2 should be prevented from operating as one of relays 25A or 25B has erroneously energized. In such a case, contacts 25A-12 and 25B-12 are both closed and connect negative source 2503 to the coil of relay 25C2 which is thus prevented from operating. If relay 25L has erroneously operated with relay 25A negative source 2527 is connected through contacts 25L-3 and 25A-13 to the coil of relay 25C2 to prevent it from operating. If relay 25R or 25R1 has erroneously operated with relay 25B, contacts 25B-12 and 25R-4 or 25R1-4 connect negative source 2503 to the coil of relay 25C2 which is again prevented from operating. (Relay 25L cannot operate together with relay 25B, for as explained below, these relays operate in response to opposite polarity potentials appearing on conductor 9R2. Similar remarks apply to relays 25R and 25A, and conductor 9T2.)

During the switching sequence to follow it is desirable to prevent the erroneous turning off of transistor 26AF1 which would cause transistor 26AF to generate further simplex pulses. This erroneous operation could arise from extenral sources or the various pulses and potentials appearing throughout the field unit. Relay 25C2, in operating, closes contacts 25C2-7, which connect negative source 2669 through resistors 2667 and 2671 to the base of transistor 26AF1 which is thus held on.

When relay 25C2 operates, the two appropriate identification relays have been energized, and as this is the only information that need be transmitted from the central office unit to the field unit the crossbar switches can now be operated. Contacts 25C2-1 on FIG. 21 close and positive source 2105 is connected through these contacts, normally closed contacts 25CK1-1 and either contacts 25A-6 or 25B-6 to conductor 21SMG, and through either contacts 25A-7 or 25B-7 to conductor 21SMG'. This positive potential on conductor 21SMG' is extended through cable 2106 to FIG. 19 and through various contacts of the identification relays to either conductor 19TSM-9 or 19TSM-8. Referring to trunk switch A it is seen that one of any pair of two trunks may be connected to a link depending upon which of the trunk switch steering level select magnets operates. For example, trunk 9ATK0-8 can be connected to any one of the 20 links if trunk switch select magnet 21TSMA8 operates while trunk 9ATK0-9 can be connected to these links only if trunk switch select magnet 21TSMA9 is operated. The contact chain connected to conductor 21SMG' results in the positive potential on this conductor being connected to either one of conductors 19TSM-9 or 19TSM-8 in accordance with which two of the eight identification relays have operated.

In a similar manner, the positive potential on conductor 21SMG is transmitted through various ones of the contacts controlled by the identification relays to one of conductors 19TSM-0 through 19TSM-6. The particular one of these conductors which is energized is dependent upon the trunk identified. It should be noted that there is no conductor 19TSM-7 as select magnets 7 in both trunk switches are to be operated only to establish a local connection.

The positive potential on one of conductors 19TSM-9 or 19TSM-8, and the positive potential on one of conductors 19TSM-0 through 19TSM-6 are transmitted via cable 1901 to FIG. 21 which contains the trunk switch select magnets of both the A and B trunk switches. The potential on one of conductors 19TSM-8 or 19TSM-9 directly operates both of select magnets 21TSMA8 and 21TSMB8, or 21TSMA9 and 21TSMB9. The potential on one of conductors 19TSM-0 through 19TSM-6 directly operates the respective select magnets in both trunk switches. Although two select magnets are thus operated in both trunk switches A and B, a hold magnet will be operated in only one of them and thus connections are established through only one of the two crossbar switches.

Figure 19:
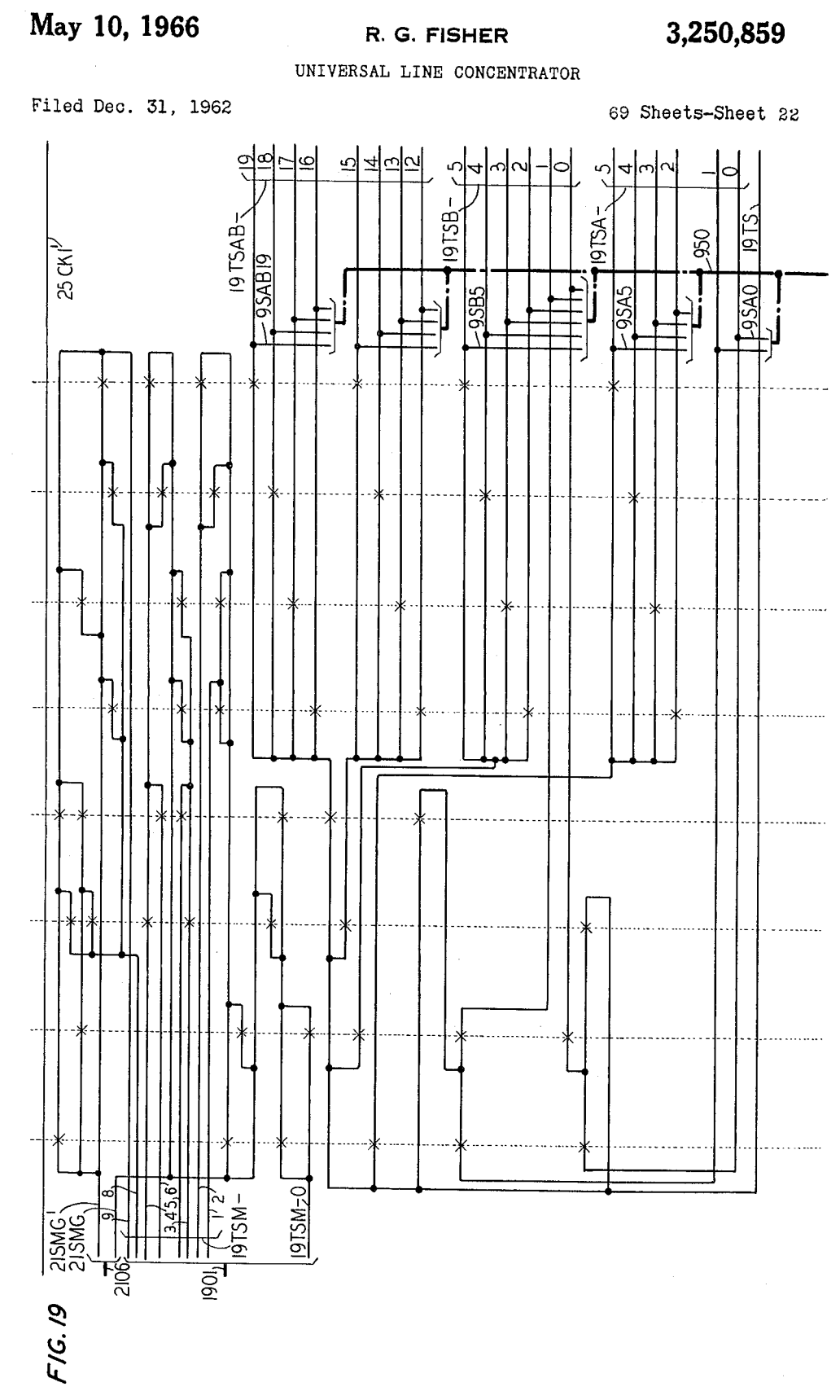

In addition to the two trunk switch select magnets that must be operated, two line switch select magnets must be operated as well. The positive potential on conductor 21SMG in addition to being extended to the associated contact chain on FIG. 19 is extended to FIG. 18 as well. Relays 21LS1 through 21LS3 represent the horizontal in which the line desiring service is contained. The positive potential on conductor 21SMG is extended through the tree translator of FIG. 18 to operate one of select magnets 18LSMA0-18LSMA7 and one of select magnets 18LSMB0-18LSMB7. Again although line switch select magnets are operated in both line switches A and B, a hold magnet in only one of these switches will be operated, and connections will be established through only one of the line switches.

Relay 21LS4 identifies the line switch steering select magnet which connects any line to one of its respective links. The potential on conductor 21SMG is extended through either contacts 21LS4-1 or 21LS4-2 to operate steering level select magnets 18LSMA8 and 18LSMB8, or steering level select magnets 18LSMA9 and 18LSMB9.

After the appropriate four line select magnets (only two, in a particular one of the two line switches, will be utilized) have operated, and after the appropriate four trunk switch select magnets (only two, in a particular one of the two trunk switches, will be utilized) have operated, the first available link must be selected and its line and trunk switch hold magnets operated to establish connections through the line and trunk switches. Each of the trunk switch select magnets on FIG. 21 has adjacent to it a set of contacts controlled by it. It is seen that after either one of the trunk switch steering level select magnets on either switch has operated, and after any one of the eight horizontal select magnets on the same switch has operated, the potential of negative source 2107 appears on conductor 2108. This potential is extended directly to conductor 18HM. Relays 17HMA and 17HMB do not operate however due to the various open contacts in the paths of their relay coils. The negative potential on conductor 2108 is extended through contacts associated with the line switch select magnets of FIG. 18 in a similar manner to conductor 1800. Thus, conductor 1800 has applied to it a negative potential only when horizontal and steering level select magnets have operated in both the line and trunk switches. This negative potential on conductor 1800 is an indication that the appropriate hold magnet pair may now be selected and operated.

The operation of the same numbered hold magnet in each of line and trunk switches A or B is dependent upon the fact that these switches are of the magnetic latching type. A hold magnet in any one of the four crossbar switches at the field unit operates when current is passed through its respective winding in one direction. The hold magnet remains operated even after this current ceases. It releases only when current is passed through its winding in the opposite direction. The appropriate hold magnet of either the A or B line switch is operated first. Following this, the same numbered hold magnet in the respective trunk switch is operated. The two hold magnets are not operated simultaneously. This is due to the fact that in a local connection, to be described below, the line switch hold magnet does not operate while the trunk switch hold magnet releases and then reoperates. The establishment of a local connection necessitates that the same numbered hold magnets in respective line and trunk switches not be operated simultaneously and for this reason even in the establishment of a regular connection, where this requirement does not exist, they are operated at different times in order that the same equipment be capable of handling both regular and local connections.

It will be recalled that during the scanning sequence, source 1700 applied a positive potential to each of conductors 17LHA0–17LHB3, which potentials were extended through respective trunk hold magnet contact chains to respective conductors 27GBA0–27GBB3 to inhibit the scanning circuit in the event that all links serving the particular line being scanned were in use. The positive potential of source 1700 is applied to conductors 17LHA0–17LHB3 through respective resistors 1705. The negative potential on conductor 1800 is applied through break contacts 17LHK–B1 and the tree translating network of FIG. 17 directly to one of these eight conductors. This negative potential over-rides the positive potential from source 1700 applied through a resistor, and one of conductors 17LHA0–17LHB3 has applied to it the negative potential of source 2107.

The particular one of conductors 17LHA0–17LHB3 which is energized at this time depends upon which of the two line switches serves the line desiring service, and furthermore, which of the four groups of links in this switch serves the same line. Either contacts 25A–8 or 25B–8 are closed depending upon which relay 25A or 25B has operated. Relays 21G1 and 21G2 determine the group serving the line being scanned and connect the respective one of conductors 17LHA0–17LHB3 through the respective contacts 25A–8 or 25B–8 to conductor 1800. For example, if the first line in line switch A is being served, as has been stated above, all six stages of counter 2400 are in their 0 states. Relays 21G1 and 21G2 are both unoperated. As relay 25A is operated for a line in line switch A, it is seen that the negative potential on conductor 1800 is applied through the break contacts of relay 17LHK, conductor 1702, and contacts 25A–8, 21G2–4, 21G1–8 to conductor 17LHA0.

This conductor is extended to the hold magnet circuit of trunk switch A shown in FIG. 13. As this conductor represents the first group in the A switches, the contact chain in its path is controlled by trunk switch hold magnets 13THA0–13THA4. If hold magnet 13THA0 is not operated, the negative potential is extended through normally closed contacts 13THA0–1 to conductor 1300–0. If this hold magnet is already in use, the negative potential is extended through normally open contacts 13THA0–1 which are closed; and contacts 13THA1–1 to conductor 1300–1 if hold magnet 13THA1 is not in use. The potential is extended to the respective one of conductors 1300–0 through 1300–4 which is associated with the first idle link. At least one of these hold magnets must be idle or as explained above a service request would never have been generated in the first place as the original positive potential of source 1700 would have been extended through conductor 27GBA0 to inhibit the line scanning circuit.

There are 40 conductors analogous to conductors 1300–0 through 1300–4, each connected to a particular one of the 20 hold magnets in one of the trunk switches. Although the remainder of this detailed description will describe the connection of a line served by the A switches and served by the first group of links, similar remarks apply to any other combinations.

One of conductors 1300–0 through 1300–4 now has a negative potential applied to it. This potential has no effect on the respective one of trunk switch hold magnets 13THA0–13THA4. Although the conductor is connected to one end of the winding of a respective trunk switch hold magnet, the other end is connected to one of conductors 12SAG0–1 through 12SAG0–5. This conductor is the sleeve of the respective link which has no connection through the A trunk switch at this time. The other end of the winding of the respective hold magnet is also connected to a respective one of conductors 1301–0 through 1301–4. However, each of these conductors has in series with it respective open contacts 14LHA0–1 through 14LHA4–1, operated by the respective line switch hold magnet. Thus the trunk switch hold magnet selected does not operate.

However, the negative potential on one of conductors 1300–0 through 1300–4 is extended through a respective one of conductors 1302–0 through 1302–4 to one end of the winding of a respective line switch hold magnet. The other end of the winding of each line switch hold magnet is connected to conductor 14HG which at this time is connected to conductor 1410, through normally closed contacts 28LR–3 and 25R1–1, and either of now closed contacts 25A–10 or 25B–10 to positive source 2800. Current thus flows through the coil of the first available line switch hold magnet of the particular group serving the line desiring service and the magnet operates.

When the selected line switch hold magnet operates, respective contacts 14LAH0–2 through 14LHA4–2 close, and the negative potential on the energized one of conductors 1302–0 through 1302–4 is applied to the respective one of conductors 14HCA0–14HCA4. The forty 14HCA0–16HCB19 conductors are connected through forty individual sets of contacts 17HCA–0 through 17HCB–19 to conductor 1710. Relays 17HCA and 17HCB operated when either of contacts 25A–9 or 25B–9 initially closed, current flowing from source 1711, through the coils of both relays, and through either contacts 25A–9 or 25B–9 to source 1712. The negative potential on conductor 1710 is now extended through contacts 28C3–2, and contacts 17LHK–B2 to one end of the coil of relay 17LHK, the other end being connected to positive source 1713. Relay 17LHK operates. This relay, in operating, controls the make-before-break contacts adjacent to it. When the break contacts 17LHK–B1 open, the negative potential on conductor 1800 is no longer applied to the selected one of conductors 17LHA0–17LHB3 and current ceases to flow through the selected line switch hold magnet. However, the line switch hold magnet being of the magnetic latching type remains operated once pulsed. Thus the connection through the line switch of the line desiring service to the first idle link in the group serving the line is established and maintained. The negative potential on conductor 1800 is now extended through make contacts 17LHK–M1, and through the coil of relay 17LHK to source 1713, and relay 17LHK remains operated.

Relay 17LHK, in operating, causes relays 17HMA and 17HMB to operate. Contacts 17LHK–2 close and positive potential source 1714 is extended through these contacts, resistor 1715, and through the coils of both relays 17HMA and 17HMB to conductor 18HM. This conductor is connected directly to conductor 2108 to which is applied the negative potential of source 2107. Thus both of relays 17HMA and 17HMB now operate. However, it is desired to operate these relays only after the negative potential on the respective one of conductors 14HCA0–14HCA19 or 16HCB0–16HCB19 has been removed in response to the opening of the break contacts 17LHK–B1. Until these contacts open the negative potential on one of these 40 HC conductors is extended directly through diode 1716 to the coils of relays 17HMA and 17HMB and these relays do not operate. It is only after the selected line hold magnet operates, and causes relay 17LHK to operate and remove the negative potential on the selected one of the HC conductors that positive source 1714 energizes relays 17HMA and 17HMB. The relays lock over contacts 17HMA–22 independent of the negative potential on conductor 18HM.

When these relays operate, positive source 1714 is directly connected through contacts 17LHK–3, 17HMB–22, and respective contacts 17HCA–0 through 17HCA–19 and 17HCB–0 through 17HCB–19 to all of conductors 14HCA0–14HCA19 and 16HCB0–16HCB19. Thus a positive potential is now applied to all of conductors 1300–0 through 1300–19, and the analogous 20 conductors associated with the B switches which are associated with operated ones of the line switch hold magnets. Thus instead of a negative potential being applied via one of conductors 1300– to the particular trunk switch hold magnet to be operated, a positive potential is applied to all of the trunk switch hold magnets associated with operated line switch hold magnets, including the trunk switch hold magnet to be operated to establish a connection to the line requesting service. The other end of each winding of these trunk switch hold magnets are connected through respective closed contacts 14LHA0–1 through 14LHA19–1 to respective conductors 14HMA0–14HMA19 in the A trunk switch and through analogous contacts to conductors 16HMB0–16HMB19 in the B trunk switch. The 40 conductors 14HMA0–14HMA19 and 16HMB0–16HMB19 are connected through respective contacts 17HMA–0 through 17HMA–19 and 17HMB–0 through 17HMB–19, and now closed contacts 17LHK–4 to negative source 1720. Thus current flows through the windings of all of the previously operated trunk switch hold magnets which are associated with respective operated line switch hold magnets as well as the one trunk switch hold magnet associated with its newly operated line switch hold magnet. Pulsing the windings of operated trunk switch hold magnets has no effect as these magnets remain operated. When the newly selected trunk switch hold magnet is pulsed, however, it operates and establishes the connection through the trunk switch. This completes the regular connection at the field unit.

The sleeve associated with the line just given service is now connected through its line switch to one of negative sources 702. The negative potential on the sleeve prevents the line from generating a service request even though the subscriber is off-hook. The associated one of diodes 807 is reverse biased as it is when the subscriber is on-hook.

It is necessary to notify the central office unit that the connection has been established. Furthermore, the central office unit should be notified that the connection has been established only if the trunk whose identification was originally transmitted by the central office unit is indeed the trunk connected to the line requesting service.

Conductors 12SAG0–1 through 12SAG3–5 in trunk switch A have applied to them the negative potential of source 1720 via conductors 1301–0 through 1301–19. These conductors are extended through trunk switch A to the sleeves of the respective trunks connected to links operated by the hold magnets to which these conductors are connected. Thus those of the 20 sleeve leads 9SA0–9SA5, 9SB0–9SB5, and 9SAB12–9SAB19, associated with trunks connected through the trunk switches to various links, have applied to them a negative potential. These leads are all extended via cable 950 to respective ones of conductors 19TSA–0 through 19TSB–19. To verify that the identified trunk has indeed been connected through the trunk switch, the contact chains on the bottom half of FIG. 19 are provided. Although many of conductors 19TSA–0 through 19TSB–19 have applied to them a negative potential, only that one of these 20 conductors associated with the identified trunk will be connected to conductor 19TS through the contact chains, the contacts in these chains being controlled by the eight identification relays 22ID–1 through 22ID–8. Thus only if the correct trunk is now connected through the trunk switch is conductor 19TS energized with a negative potential. The contact chain translation is necessary at this stage to verify that the identified trunk has been connected through a trunk switch as all of the sleeves associated with trunks in use have applied to them a negative potential. The contact chains on the lower portion of FIG. 19 permit only a negative potential on the sleeve associated with the identified trunk to be transmitted to conductor 19TS if this potential has been applied as desired to the sleeve of the identified trunk.

The negative potential on conductor 19TS is extended through closed contacts 25C2–2, normally closed contacts 28C3–3, conductor 23CKA, the top coil of relay 25CK, and either contacts 25A–11 or 25B–11 to positive source 2516. Relay 25CK thus operates. Contacts 25CK–1 on FIG. 17 now close. Current flows from positive source 2511, through the coil of relay 25CK1, conductor 25CK1', closed contacts 28C3–1 and 25CK–1, conductor 1721, and through one or two of contacts 22ID–1–5, through 22ID–4–5 to negative source 2201. Relay 25CK1 thus operates. Contacts 25CK1–1 on FIG. 21 thus open, and the original positive potential of source 2105 which operated all of the line and trunk switch select magnets is removed from conductors 21SMG and 21SMG'. All of the line and trunk switch select magnets operated (eight in all) release. When the select magnets release the negative potential of source 2107 is removed from conductors 1800 and 18HM. As a result, relays 17LHK, 17HMA, and 17HMB release.

Figure 22:
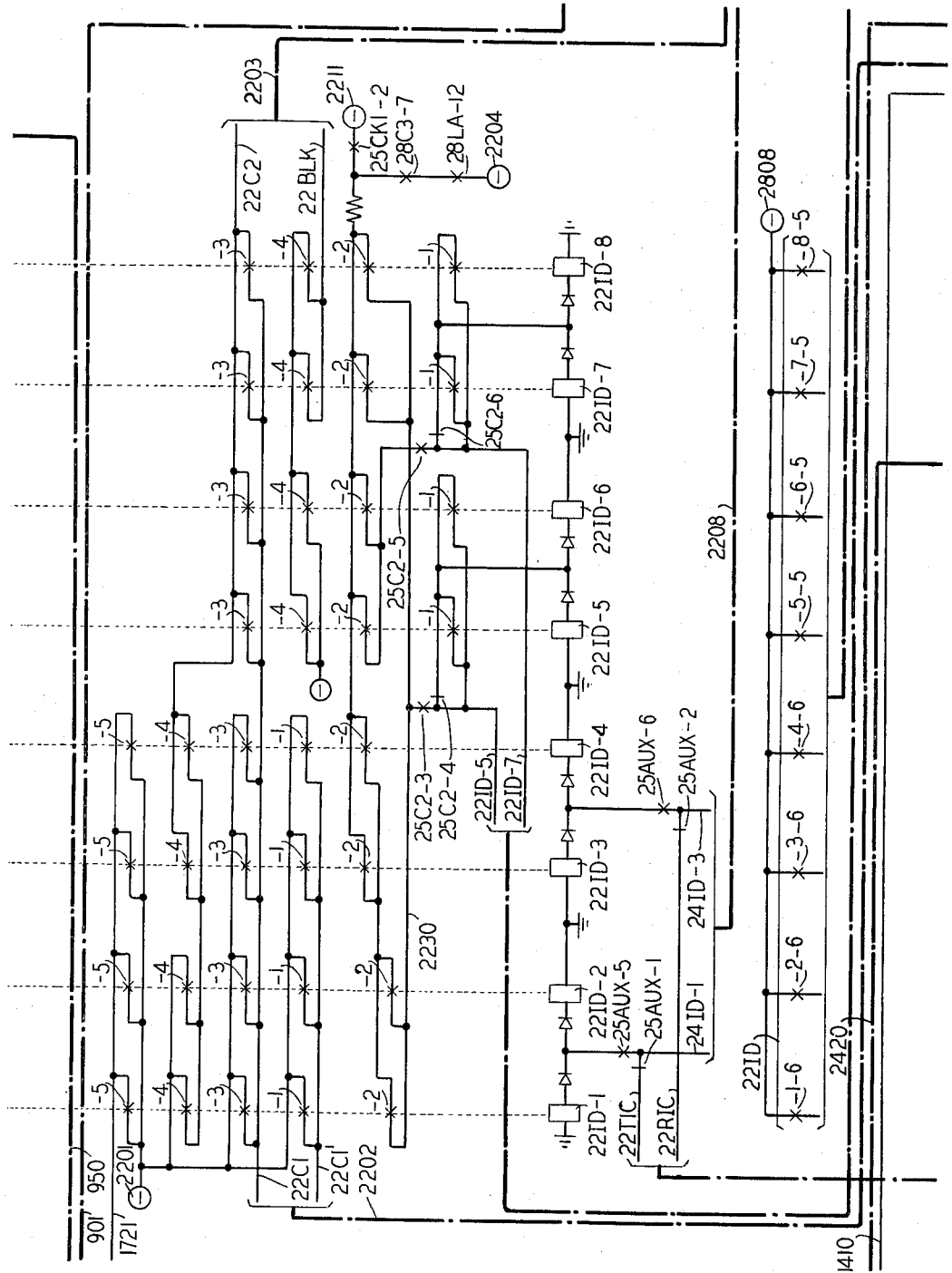
Figure 24:
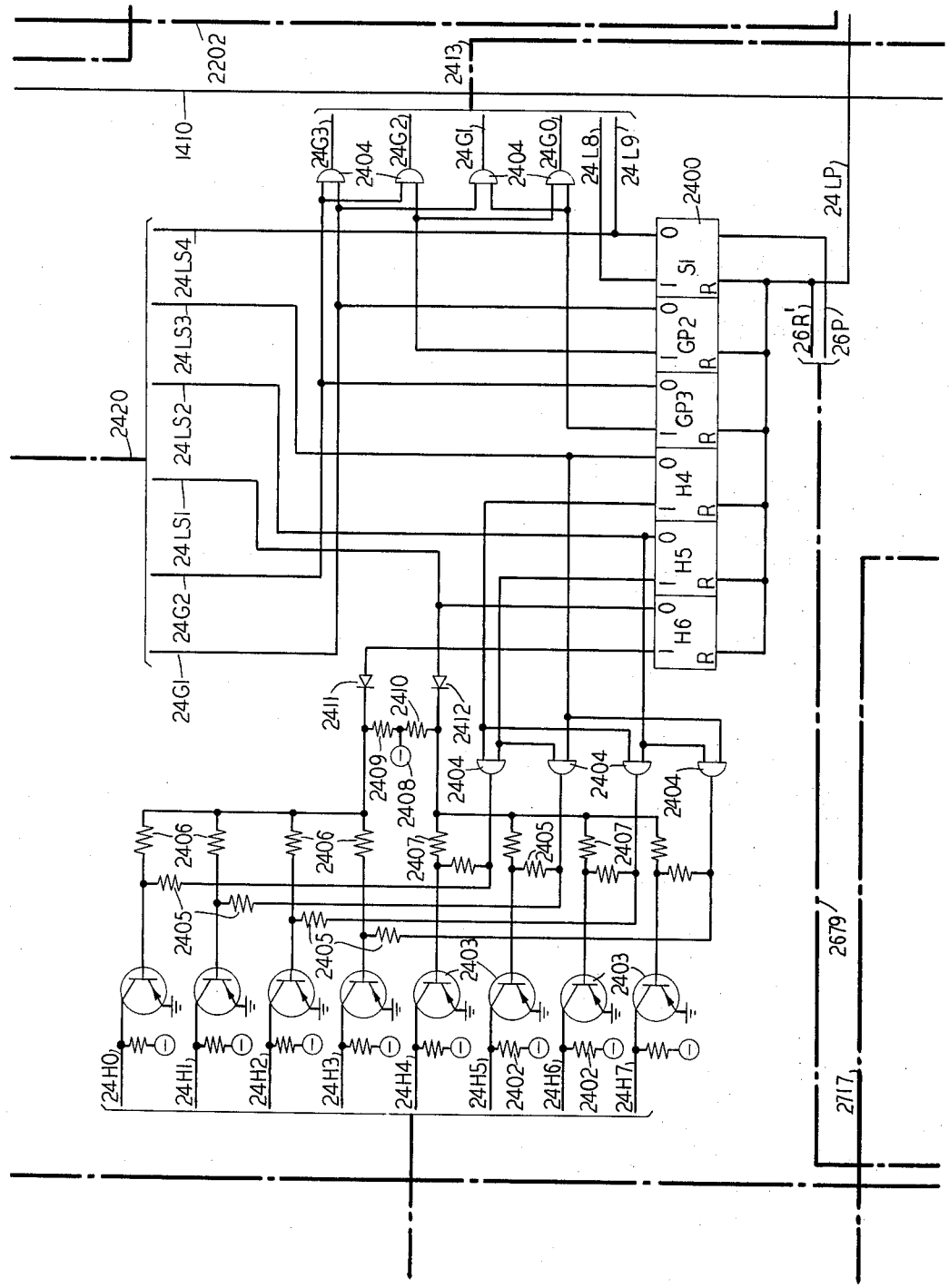

Relay 25CK1 operated, causes contacts 25CK1–2 on FIG. 22 to close. These contacts control the transmission of the check signal to the central office unit. A negative signal is transmitted over either the tip or ring of the second control pair. If the original identification of the trunk required the use of either the tip or ring of the second control pair, the potential originally applied still being present on the conductor, the other of these two conductors is used for transmitting the check signal. In the event that the identification of the trunk required the use of both conductors in the first control pair and neither of the conductors in control pair 2, the check signal is transmitted over the tip of the second control pair. For example, if the identification relays operated were one of relays 22ID–1 or 22ID–2, and one of 22ID–3 or 22ID–4, it is seen that the negative potential of source 2211 is extended through one of contacts 22ID–3–2 or 22ID–4–2, and one of contacts 22ID–2–2 or 22ID–1–2 to conductor 2230 which is connected through closed contacts 25C2–3 to conductor 25ID–5 which, as explained above, is at this time connected to conductor 9T2. Similarly, if one identification relay in each group of four is operated, the negative check signal is extended through either of contacts 25C2–3 or 25C2–5 to the unused conductor of control pair 2.

When relay 25C2 operated, contacts 25C2–4 and 25C2–6 opened. Thus the check signal has no effect on the identification relays. It should be noted that when contacts 25C2–4 and 25C2–6 opened, the operated one, if any, of the last four identification relays was held by its respective contacts 22ID–5–1 through 22ID–8–1. These contacts connect their respective relay coils to conductors 22ID–5 or 22ID–7 on one of which is an identifying potential.

When the central office receives the check signal it removes the two identification signals from the two of the four control conductors used. The two operated identification relays 22ID-1 through 22ID-8 release, their contacts open, and the negative potential originally applied to conductor 22C1' which held one of relays 25A or 25B operated is removed. The operated one of relays 25A or 25B thus releases, and all of the relays held operated by contacts on the operated one of these two relays are released. The field unit resets.

Figure 26:
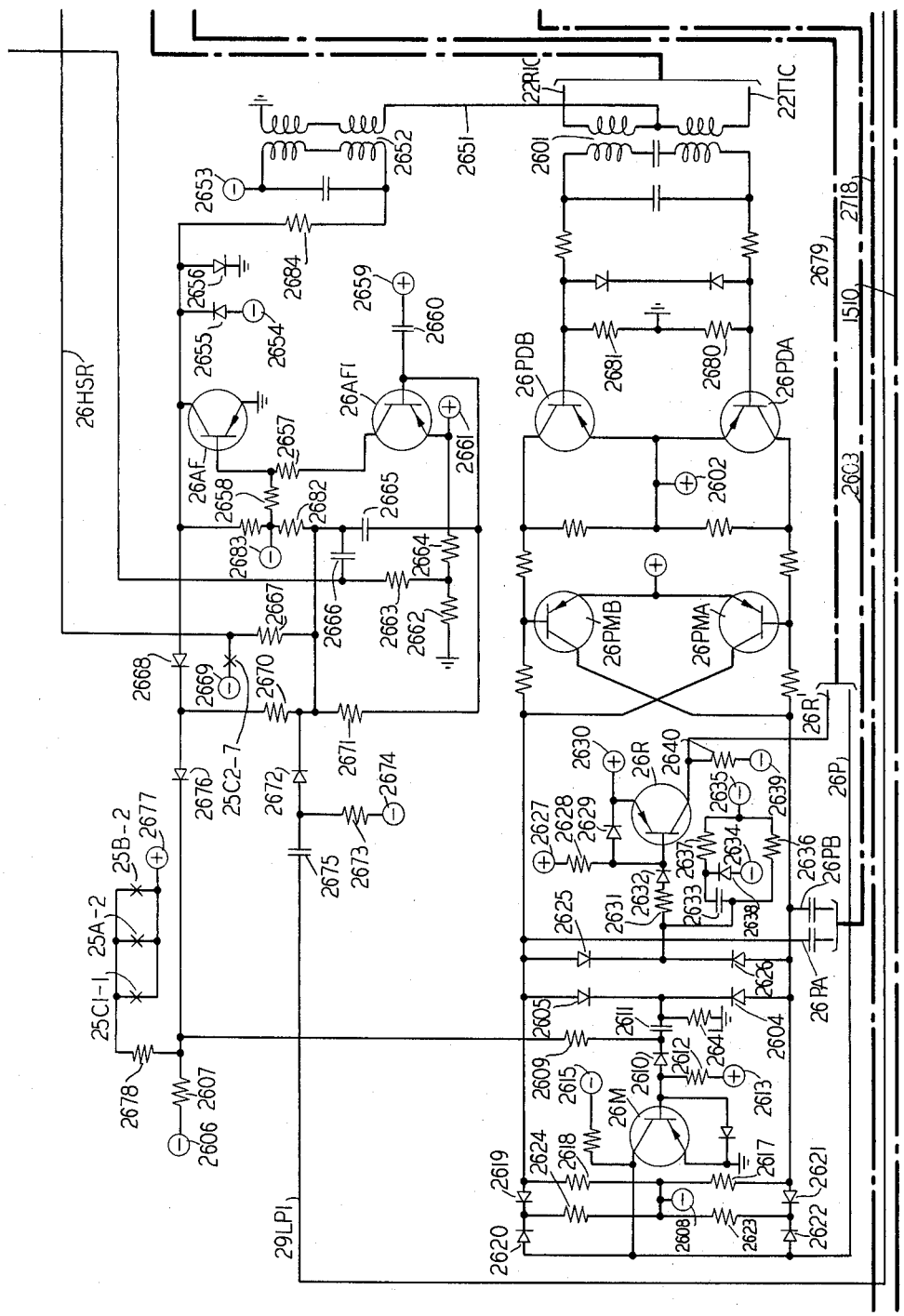

When either of relays 25A or 25B originally operated, contacts 25A-2 or 25B-2 on FIG. 26 closed. These contacts remain closed until their controlling relays release. It will be recalled that either set of these contacts connected positive source 2677 to the junction of diode 2610 and capacitor 2611 which maintained both of transistors 26M and 26R off. When these contacts open transistor 26M goes on after one millisecond. The central office does not resume transmitting scan pulses over the first control pair for 125 milliseconds after the receipt of the check signal from the field unit. After 2.5 milliseconds, transistor 26R turns on and resets counter 2400. The field unit it thus in a condition to resume line scanning with the first line in whichever group the central office now scans. The polarity of the scan pulses transmitted to the field unit determines which group of 64 lines is next scanned.

(2) SUMMARY OF SIGNAL INFORMATION TRANSMITTED BETWEEN CENTRAL OFFICE AND FIELD UNITS FOR REGULAR CONNECTION

Scanning pulses of either polarity are transmitted along conductors 9T1 and 9R1. The pulses are transmitted at a rate of 500 pulses per second. Groups of 64 pulses of the same polarity are transmitted followed by no signals for 5 milliseconds. A service request by either end unit results in the application of a positive simplex pulse to the tip and ring of control pair 1.

During scanning, no potentials are applied to conductors 9T2 and 9R2. Following the application of the simplex pulse to control pair 1 by either end unit, the central office applies a greater negative potential to either conductor 9T2 or 9R2, depending on which switch contains the line desiring service, and a lesser negative potential to the other conductor. The field unit opens one of conductors 9T2 or 9R2 when relay 25A or 25B energizes, and the central office unit then applies the identification signals to the control conductors. Following the the establishment of the connection, the field unit applies a negative signal to the unused one of conductors 9T2 or 9R2, or to conductor 9T2 in the event that both conductors 9T2 and 9R2 are unused, to notify the central office that the field unit has completed its operation. The central office unit then removes the two identification signals from the control conductors, and after waiting for a period of 125 milliseconds resumes transmitting scan pulses over conductors 9T1 and 9R1.

E. *Trunk release*

(1) DETAILED DESCRIPTION OF FIELD UNIT OPERATION

Trunk scanning for release of a regular connection proceeds at the central office location. The common control scans all trunks in all eight concentrators to detect a now idle but previously used trunk condition. The scanning sequence will be described below when the common control and central office units are considered. This section relates only to the manner in which a field unit releases the crosspoints previously connecting a line to the now unused trunk.

When the common control detects this condition it must notify the particular field unit that the trunk is to be released. Unlike line scanning, it is not necessary to hold counter 2400 as the identity of the line connected to the trunk is not needed for releasing the trunk. As explained above, the field unit only requires the identity of the trunk itself. The sleeve connection through the trunk crossbar switch to the hold magnet automatically identifies the particular link connected to the trunk. During the release of the trunk, line scanning is inhibited by the common control and scan pulses are not transmitted along control pair 1.

The common control causes the particular central office unit to apply a large positive potential over the tip of control pair 2. To establish a connection it will be recalled that a large negative potential is applied to either conductor 9T2 or 9R2 depending upon which switch A or B contains the line requesting service. To release a trunk a larger positive potential is always applied to conductor 9T2, and a lesser positive potential to conductor 9R2. The large positive potential is transmitted through normally closed contacts 25C1-1, diode 2510, and contacts 25AUX-7 to the coil of relay 25R. Relay 25R operates and contacts 25R-1 close. Current flows from source 2511 through contacts 25R-1, the coil of relay 25R1, conductor 25LR1, resistor 2801, and contacts 28LR-4 to source 2802. Relay 25R1 thus operates. The operation of this relay in turn causes relay 25AUX to operate. Contacts 25R1-2 close, and current flows from source 2533, through the coil of relay 25AUX, and contacts 25R1-2 to source 2534.

The operation of relay 25AUX causes contacts 25AUX-8 to open. The smaller current flowing through conductor 9R2 thus ceases and the central office equipment is notified that the field unit has recognized the central office command. Relay 25AUX also connects conductors 9T1 and 9R1 to the first four identification relays 22ID-1 through 22ID-4. The central office applies the two identifying potentials to two of conductors 9T1, 9R1, 9T2 and 9R2. As in a regular connection sequence, one or two of the first four identification relays in the field unit operate. The positive potential originally applied to conductors 9T2 and 9R2 are no longer applied by the central office unit, identification signals having taken their places. Although relay 25R releases, relay 25R1 remains operated. Contacts 25R1-3 are now closed and capacitor 2507 discharges through the path including contacts 25C1-5 and 25R1-3, the coil of relay 25R1, conductor 25LR1, resistor 2801, and contacts 28LR-4. This capacitor discharge maintains relay 25R1 operated in the same manner that it maintain either of relays 25A or 25B operated after their initial operation.

Contacts 25R-2 shunt contacts 25AUX-7 and thus enable relay 25R to remain operated from the positive potential on conductor 9T2 even after contacts 25AUX-7 open. Thus relay 25R remains operated until the central office removes the original positive potential from conductor 9T2. Relay 25R then releases and only relays 25R1 and 25AUX remain operated, due to the discharge of capacitor 2507.

When one or two of the first four identification relays have operated, relay 25C1 operates as in the regular connection sequence. The operation of this relay, again, connects conductors 9T2 and 9R2 to identification relays 22ID-5 through 22ID-8, and one of the last four identification relays operates if the trunk code includes one of these relays.

As in a regular connection, relay 25C2 operates after two of the identification relays have operated. Again, this relay is prevented from operating by the negative potential on conductor 22BLK in the event that two of the last four identification relays have operated and two of contacts 22ID-5-4 through 22ID-8-4 have closed. Similarly, if relay 25B has operated, relay 25C2 is prevented from operating, negative source 2503 being applied through contacts 25B-12, and 25R1-4 or 25R-4 to the coil of relay 25C2, the relay thus remaining unoperated. (Relay 25A cannot operate if relay 25R has operated as both relays operate from different polarity potentials being applied to conductor 9T2.)

When relay 25C1 operates, contacts 25C1–5 open and relay 25R1 is no longer held operated by the discharge of capacitor 2507. However, conductor 22C1' is connected to negative source 2201 before relay 25C1 operates as in the regular connection sequence, and as this conductor is connected to the coil of relay 25R1 through contacts 25R1–3, relay 25R1 remains operated.

Figure 25:
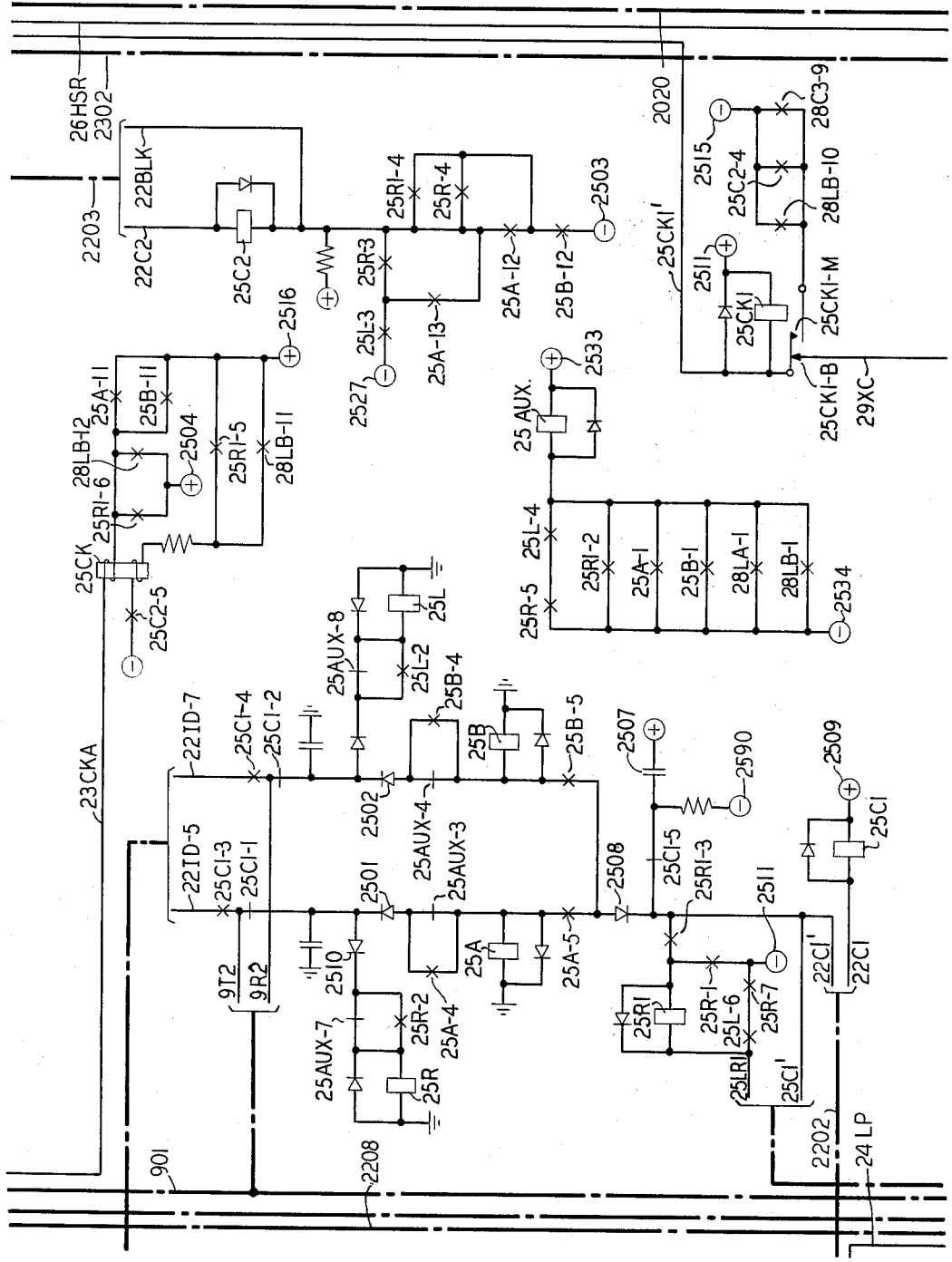

With relays 25R1 and 25C2 operated, contacts 25R1–5, 25R1–6, and 25C2–5 on FIG. 25 are closed. Current flows through both coils of relay 25CK and this relay does not now immediately operate, current flowing through the lower coil as well as the oppositely wound upper coil. The positive potential of source 2504 is now extended through contacts 25R1–6, the uppermost coil of relay 25CK, conductor 23CKA, contacts 28C3–3 and 25C2–2 to conductor 19TS. The positive potential is extended through the lower translating network of FIG. 19 to one of the 20 conductors 9SA0–9SAB19. This potential, extended along cable 950, is transmitted through one of the two trunk switches to one of conductors 12SAG0–1 through 12SAG3–5 or 15SBG0–1 through 15SBG3–5. A positive potential is thus applied to one end of the winding of the hold magnet controlling the trunk crossbar connection to be released. When relay 25R1 operated, contacts 25R1–8 closed and the potential of negative source 2865 is now extended through contacts 25R1–8 and 28LR–3 and conductor 1410 to one end of the winding of each of the 40 line switch hold magnets. Current thus flows from this source through conductor 1410, the winding of the particular line switch hold magnet connected by its respective conductor 1302–0 through 1302–19 or 1502–0 through 1502–19 to the coil of the particular trunk switch hold magnet the other end of whose winding has applied to it the negative potential originating on conductor 19TS, and the winding of the trunk switch hold magnet. The current in both particular line and trunk switch hold magnets thus energized is in a direction opposite to the current directions in these windings when the hold magnets were originally operated. Both hold magnets release.

When the trunk switch crosspoints open, current no longer flows through conductor 23CKA as the trunk switch sleeve crosspoint is now open. Current now flows only through the lowermost winding of relay 25CK and this relay operates. As in the regular connection sequence contacts 25CK–1 close. Current now flows from source 2511 through the coil of relay 25CK1, conductor 25CK1', contacts 28C3–1 and 25CK–1, conductor 1721, and one or two of contacts 22ID–1–5 through 22ID–4–5 to source 2201. Relay 25CK1 operates and contacts 25CK1–2 on FIG. 22 close. As in the regular connection sequence, a negative potential is now extended through the identification relay contacts to the unused wire of control pair 2, or the tip of this control pair if both wires are unused, to the central office unit which is thus notified that the trunk has been released.

Relay 25R1 which controls the operation of the circuit for a trunk release is held operated by the negative potential on conductor 22C1'. When the central office removes the identifying potentials from the two of the control wires used, the two operated ones of the eight identification relays in the field unit release and conductor 22C1' is no longer connected to source 2201. Relay 25R1 thus releases and the field unit is restored to its original condition. The central office sends no scan pulses for 125 milliseconds. Contacts 25C1–1 on FIG. 26, when closed, prevent transistors 26M and 26R from turning on as do contacts 25A–2 and 25B–2 in a regular connection. When relay 25C1 releases transistor 26R times out and counter 2400 is reset. Line scanning thus resumes with the first line in either group, the particular group being determined by the polarity of the scan pulses transmitted along conductors 9T1 and 9R1 from the central office.

(2) SUMMARY OF SIGNAL INFORMATION TRANSMITTED BETWEEN CENTRAL OFFICE AND FIELD UNITS FOR TRUNK RELEASE

The sequence is initiated by the application of a greater positive potential to conductor 9T2, and a lesser positive potential to conductor 9R2 by the central office unit. The field unit, with the operation of relay 25AUX, then causes the lesser current flowing in conductor 9R2 to cease. The central office then responds with the potentials identifying the trunk to be released on two of the four control wires. After the connection has been broken through the crossbar switches at the field unit, the field unit causes a negative potential to be applied to the unused one of conductors 9T2 and 9R2, or conductor 9T2 if both are unused, which notifies the central office that the field unit has completed its operation. The central office unit then removes the identifying potentials and the field unit restores. Scan pulses are transmitted 125 milliseconds thereafter.

F. *Local connection*

(1) DETAILED DESCRIPTION OF FIELD UNIT OPERATION

As described above, the common control initiates a local connection sequence. The determination by the common control of the possibility of establishing a local connection is achieved in a manner to be described below. When this determination is made however, further scanning is inhibited and the field unit is notified. As with a trunk release, the count in counter 2400 is unnecessary for the switching sequence. The only information that the field unit requires to establish the local connection is the identity of the two trunks connected to the two subscribers served by the field unit.

The field unit is notified of a service request by the application of a greater negative potential to either of conductors 9T2 or 9R2 and a lesser negative potential to the other. A greater positive potential on conductor 9T2 and a lesser one on conductor 9R2 notifies the field unit that a trunk release sequence is to ensue. The third possible signal, the application by the central office unit of a greater positive potential to conductor 9R2 and a lesser one to conductor 9T2, is used to notify the field unit that a local connection is to be established.

The greater positive potential on conductor 9R2 causes relay 25L to operate, the coil of this relay being connected to conductor 9R2 through contacts 25AUX–8 and 25C1–2. Relay 25L in operating causes relay 28LA to operate. Contacts 25L–1 close and current flows from source 2802 through contacts 28LR–4, resistor 2801, the coil of relay 28LA, contacts 28C3–5, and contacts 25L–1 to source 2806. Contacts 28LA–1 close and relay 25AUX operates. Contacts 25AUX–7 in opening cause the lesser current normally flowing in conductor 9T2 to cease, and the central office is notified that the field unit has recognized the command. Although contacts 25AUX–8 open, relay 25L is still held by the positive potential applied by the central office unit to conductor 9R2, contacts 25L–2 now being closed. When the central office unit removes this potential from conductor 9R2 relay 25L releases. However, relay 28LA is held operated by the discharge of capacitor 2507, current flowing from the capacitor through contacts 25C1–5, conductor 25C1', now closed contacts 28LA–2, the coil of relay 28LA, resistor 2801, and contacts 28LR–4 to source 2802. This discharge maintains relay 28LA operated until conductor 22C1' is energized as in the regular connection and trunk release sequences. This conductor, connected directly to conductor 25C1', maintains relay 28LA energized even after contacts 25C1–5 open.

Relay 25AUX in operating connects conductors 9T1 and 9R1 to the first four identification relays, and once again one or two of these relays operate in response to the central office unit identifying potentials. When these relays have operated, conductors 22C1 and 22C1' are connected to negative source 2201. Current flowing through conductor 22C1' maintains relay 28LA operated. Current flowing through conductor 22C1 causes relay 25C1 to operate. Relay 25C1 in operating connects conductors 9T2 and 9R2 to the last four identification relays, one of which may operate at this time if an identifying potential is applied to conductor 9T2 or 9R2 by the central office unit. As with the sequences described heretofore, conductor 22C2 is energized after two of the identification relays have operated, and if conductor 22BLK is not energized at this time relay 22C2 operates. Relay 22C2 does not operate if relay 25R has erroneously operated and relay 25L has not released as negative source 2527 is connected through contacts 25L–3 and contacts 25R–3 to the coil of relay 25C2. Similarly, if relay 25A has erroneously operated, this same source is connected to the coil of relay 25C2 through contacts 25L3 and 25A–13. (Relay 25B cannot operate simultaneously with relay 25L as these relays operate upon the application of opposite polarity potentials to conductor 9R2.)

The operation thus far is similar to those of the sequences described above with two of the eight identification relays now being operated and relay 25C2 being energized. However, to establish a local connection, the field unit must be notified of the identity of the two trunks involved, and for this reason two sets of identifying potentials must be transmitted to the field unit. The first set is stored in identification relays 23ID–1' through 23ID–8'. Although initially stored in identification relays 22ID–1 through 22ID–8 this storage is only temporary. Two of contacts 22ID–1–6 through 22ID–4–6 and 22ID–5–5 through 22ID–8–5 are closed. Similarly, all of contacts 28LA–3 through 28LA–10 are closed, and source 2208 is connected directly to the coils of two of the identification relays 23ID–1' through 23ID–8'. Thus, for example, if identification relays 22ID–3 and 22ID–7 operate so do relays 23ID–3' and 23ID–7'. Two of the eight identification relays on FIG. 23 thus remain operated as long as the same two analogous identification relays on FIG. 22 remain operated. The two operated ones of identification relays 23ID–1' through 23ID–8' lock to source 2301 through contacts 28LR–5, and 28C3–6 and respective contacts 23ID–1'–1 through 23ID–8'–1 only after relay 28C3 has operated.

Figure 23:
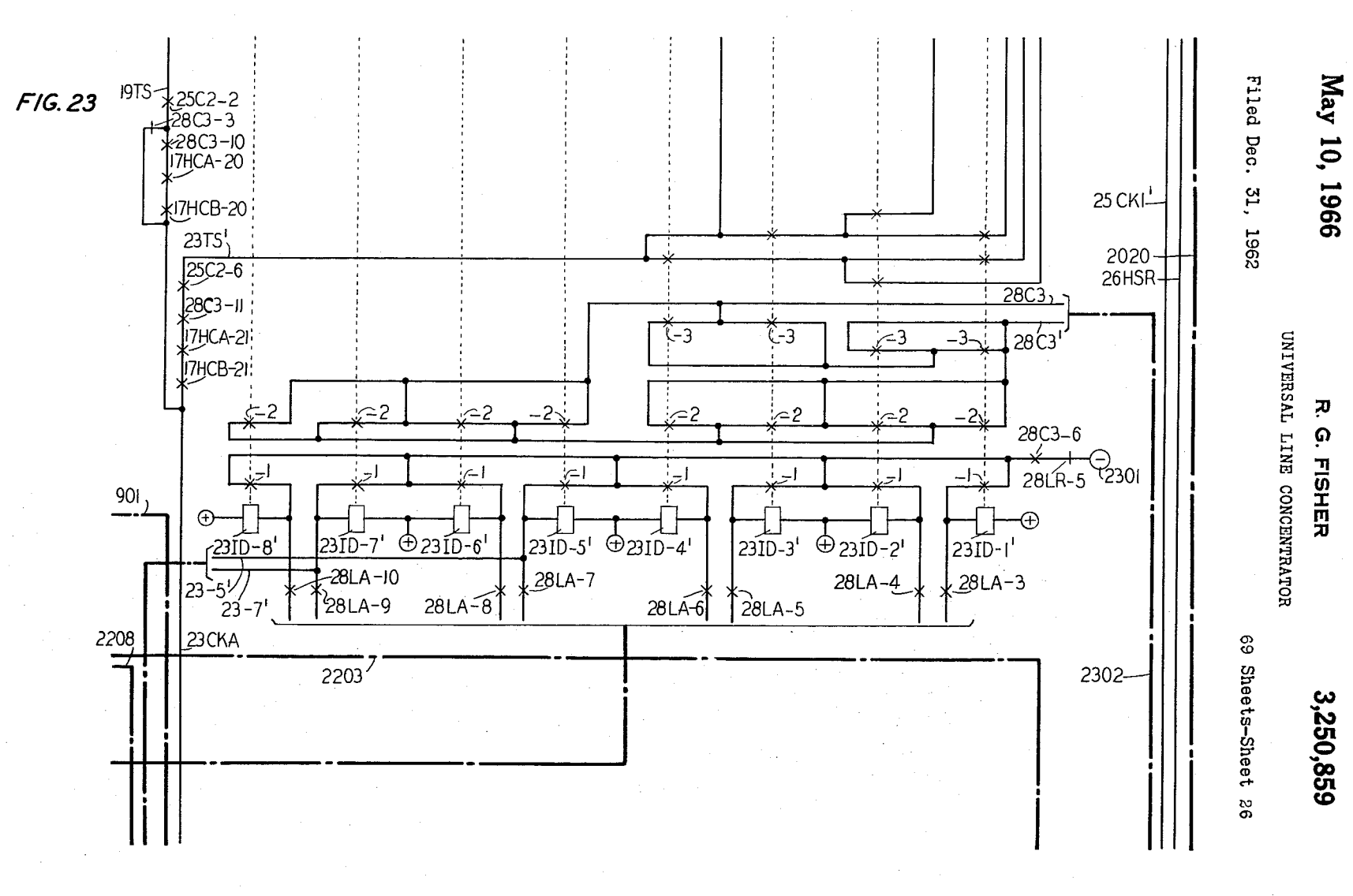

When two of the eight identification relays on FIG. 23 initially operate conductor 28C3' is connected to conductor 28C3. Contacts 23ID–1'–2 through 23ID–8'–2 and contacts 23ID–1'–3 through 23ID–4'–3 control this connection, conductor 28C3 being connected to conductor 28C3' through two sets of contacts in the first four identification relays or one set of contacts in each group of four identification relays. Conductors 28C3 and 28C3' are connected by cable 2302 to FIG. 28 where conductors 28C3 is connected through the coil of relay 28C3 and resistor 2803 to positive source 2804, and conductor 28C3' is connected through now closed contacts 28LA–11 to negative source 2897. Relay 28C3 thus operates and when contacts 28C3–6 close the two operated identification relays on FIG. 23 lock to source 2301.

Transistor 26AF1, as in a regular connection and a trunk release, is held on by the closing of contacts 25C2–7, to prevent false operation of the transistor. Although relay 25C2 soon releases, transistor 26AF1 is still held on by a negative potential on conductor 26HSR. Contacts on relays 23ID–1' through 23ID–8' connect negative source 2030 directly to conductor 26HSR as do contacts 17HMB–23 connect source 2040 to this conductor when relay 17HMB later operates.

Relay 25L should have released by the time relay 28C3 is to operate. If it has not, contacts 25L–8 are closed and connect negative source 2885 to one end of the coil of relay 28C3. This prevents the relay from operating when conductor 28C3 is energized as there is no voltage drop across the coil of relay 28C3. Similarly, relay 28LB should not be operated at this time and if it has erroneously operated contacts 28LB–14 are closed and prevent relay 28C3 from operating. When relay 28LB does operate later, contacts 28C3–18 are already open and thus source 2885 is not then connected to the coil of relay 28C3 and it remains operated.

Contacts 28C3–7 on FIG. 22 close and as contacts 28LA–12 are closed at this time it is seen that the potential of negative source 2204 is extended over the unused one of conductors 9T2 or 9R2, or conductor 9T2 if both are unused, to the central office unit to notify it that the first trunk identity has been stored in two of identification relays 23ID–1' through 23ID–8'.

The central office unit then removes the two identifying potentials from the control conductors. Conductor 22C1' is no longer connected to source 2201 when the two operated ones of identification relays 22ID–1 through 22ID–8 release. Relay 28LA is thus no longer held operated. Contacts 28LA–1 open and relay 25AUX releases as well. Also, as conductor 22C1 is no longer connected to source 2201, relay 25C1 releases. And as conductor 22C2 is similarly no longer connected to source 2201, relay 25C2 releases. Relay 28C3, however, does not release. Although contacts 28LA–11 are now open and current no longer flows from source 2805 through the coil of relay 28C3, a capacitor discharge maintains the relay operated. Capacitor 2809 has charged from source 2805 and current now flows during the discharge of this capacitor through contacts 25CK1–3 to conductor 28C3' in the same manner that current previously flowed from source 2805 through contacts 28LA–11 to this conductor. As a result, relay 28C3 remains operated. As contacts 28C–6 thus remain closed, the two of the eight identification relays on FIG. 23 remain operated and locked to source 2301.

With relay 25AUX released, the four control conductors are connected in their normal manners, conductors 9T1 and 9R1 being connected to the primary of transformer 2601, and conductors 9T2 and 9R2 being connected through various contacts and diodes to relays 25A, 25B, 25R and 25L. The central office again applies a greater positive potential to conductor 9R2 and a lesser one to conductor 9T2 which causes only relay 25L in the field unit to operate. The first operation of relay 25L caused relay 28LA to operate as contacts 28C3–5 were then closed. However, as relay 28C3 is now operated, contacts 28C3–5 are now open and relay 28LA does not operate. However, contacts 28C3–8 are now closed and relay 28LB thus operates, current flowing from source 2802 through contacts 28LR–4, resistor 2801, the coil of relay 28LB, and contacts 28C3–8 and 25L–1 to source 2806. Contacts 28LB–1 close and relay 25AUX operates. Contacts 25AUX–7 open and the central office unit is notified that relay 25L has operated for the second time. Although relay 25L releases when the positive potential is removed from its coil, relay 28LB remains operated as contacts 28LB–2 have closed. The discharge of capacitor 2507 through conductor 25C1' maintains this relay operated until conductor 22C1' is connected to source 2201 after the operation of one or two of identification relays 22ID–1 through 22ID–4 and maintains relay 28LB operated as it did relay 28LA.

When relay 28LB operates, contacts 28LB–14 close and negative source 2885 is connected through these contacts and now closed contacts 25C3–19 to the coil of relay 28C3. Relay 28C3 thus remains operated independent of the discharge of capacitor 2809. To insure that relay 28C3 not release before contacts 28LB–14 close, contacts 25L–8, which close before contacts 28LB–14, are connected in parallel with the latter. The time during which relay 28C3 is held by the discharge of capacitor 2809 is thus reduced.

The central office unit after being notified that relay 25L has operated for the second time applies the identifying potentials to the control wires. One or two of identification relays 22ID–1 through 22ID–4 operate and cause conductors 22C1 and 22C1' to be connected to source 2201. The latter connection maintains relay 28LB operated. The former connection causes relay 25C1 to operate. Relay 25C1, in operating, connects conductors 9T2 and 9R2 to identification relays 22ID–5 through 22ID–8 and one of these identification relays operates if only one of the first four previously operated. With two of the eight identification relays operated, conductor 22C2 is connected to source 2201 and again if conductor 22BLK is unenergized, that is, no control relays have erroneously operated, relay 25C2 is operated. This second operation of relay 25C2 is an indication that both trunk identities are stored, one in the identification relays on FIG. 23 and the other in the identification relays of FIG. 22. At this time the local connection may be established.

It will be recalled that to establish a local connection the two line switch hold magnets are not released. The two subscribers remain connected to the same two respective links to which they were originally connected. The two trunk switch hold magnets however must be released and then reoperated. They must be released in order that the two trunks connecting the two subscribers to the central office be disconnected from the two respective links in the trunk crossbar switch or switches. After the release of the two trunk switch hold magnets they must be reoperated to connect the same two links connected to the two subscribers to the same local trunk. The two trunk switch hold magnets are reoperated only after stearing level select magnets 8 or 9 have operated in both switches and select magnets 7 have operated as well in both switches. As described above, if horizontal select magnet 7 is operated in both trunk switches and the same steering level select magnet is operated in both trunk switches, the two links will be connected to the same local trunk whether or not these links are in the same trunk switch or different trunk switches.

When relay 25C2 operates, contacts 25C2–1 on FIG. 21 close. At this time, normally open contacts 28LB–3 and 28LB–4 are similarly closed. Relay 29K0 is operated whenever the first local trunk comprising conductors 15TX0, 15RX0 and 15SX0 is in use, and relay 29K1 is operated whenever the second local trunk comprising conductors 15TX1, 15RX1, and 15SX1 is in use, the operations of these relays to be described below. If the first local trunk is not in use the potential of source 2105 is extended through contacts 25C2–1, 25CK–1, 28LB–4 and 29K0–1 directly to the coils of trunk switch steering level select magnets 21TSMA8 and 21TSMB8. On the other hand, if the first local trunk is already in use, the second local trunk must now be connected to the two particular subscribers involved in the local connection. If the first local trunk is already connected to two other subscribers, relay 29K0 is operated and contacts 29K0–1 are open. However, contacts 29K0–2 are closed and if the second trunk is not also in use, with relay 29K1 unoperated, the potential of source 2105 is extended through contacts 29K0–2 and 29K1–1 to the coils of trunk switch steering level select magnets 21TSMA9 and 21TSMB9. In this manner the same numbered trunk switch steering level select magnet in each trunk switch is operated, with the first preference being for the first local trunk. Only if this trunk is already in use is the second local trunk selected instead.

For any local connection to be made, trunk switch horizontal select magnets 21TSMA7 and 21TSMB7 must be operated. As contacts 28LB–3 are closed, it is seen that potential source 2105 is directly connected to the windings of these two magnets which therefore operate.

With two trunk switch select magnets operated in each switch, the negative potential of source 2107 is extended to conductors 2108 and 18HM. However, relay 17HMA and 17HMB are not yet operated as contacts 17LHK–2 are now open. Relays 17HCA and 17HCB are, however, operated, these relays having operated when contacts 28LB–5 closed and connected sources 1711 and 1730 to each other through the coils of the two relays.

When relay 25C2 operates it also causes contacts 25C2–5 to close. As contacts 28LB–11 are also closed, current flows through the lower winding of relay 25CK. At the same time, however, current flows through the upper winding of relay 25CK and the relay thus remains unoperated. Current flows from source 2504 through contacts 28LB–12, the upper winding of relay 25CK, conductor 23CKA, contacts 17HCB–20, 17HCA–20, 28C3–10, and 25C2–2, conductor 19TS, the translating network on FIG. 19 controlled by the identification relays on FIG. 22, that one of conductors 9SA0 through 9SAB19 whose trunk identity is represented by the operated identification relays of FIG. 22, cable 950, one of the trunk switches, that of one of conductors 12SAG0–1 through 12SAG3–5 or 15SBG0–1 through 15SBG3–5 connected to the energized trunk sleeve, the winding of the identified trunk switch hold magnet, the respective one of conductors 1302–0 through 1302–19 or 1502–0 through 1502–19, the particular line switch hold magnet contacts 14LHA0–2 through 14LHA19–2 or the analogous contacts in the hold magnet circuit for line switch B, one of 40 conductors 14HCA0 through 16HCB19, one set of contacts 17HCA–0 through 17HCB–19, conductor 1710, and contacts 28C3–20, 28LB–7 and 17LHK–5 to negative source 1740. At the same time, current in conductor 23CKA also flows through contacts 17HCB–21, 17HCA–21, 28C3–11, and 25C2–6 to conductor 23TS'. This current flows through the translating network of FIG. 20 which is controlled by identification relays 23ID–1' through 23ID–8' to that one of conductors 9SA0 through 9SAB19 whose trunk identity is stored in these identification relays. Thus in a similar manner current flows through the trunk switch hold magnet winding connecting the other subscriber to the other identified trunk. Both trunk switch hold magnets release, and the trunk switch crossbar connections controlled by these magnets are opened.

The two associated line switch hold magnets do not release during the local connection sequence. One end of the winding of each of the line switch hold magnets is connected to conductor 14HG or 16HG which at this time are connected to conductor 1410, through contacts 28LR–3, 25R1–1 and 28LB–6 to positive source 2800. The potential difference across the operated line switch hold magnets is in the direction necessary to operate these magnets. Thus all operated line switch hold magnets remain operated, including the two line switch hold magnets associated with the two trunk switch hold magnets being released.

When both trunk switch hold magnets release, current ceases to flow through the sleeve conductors of the crossbar switches connected to crosspoints controlled by these hold magnets. At this time, current through the top winding of relay 25CK ceases and the relay operates as only the lower winding is energized. This relay checks that both trunk switch hold magnets have released. If either one remains operated, current continues to flow through the upper winding, and through either one of the translating networks of FIGS. 19 and 20 and the trunk crossbar switches. Only after both trunk switch hold magnets release does relay 25CK operate.

Figure 17:
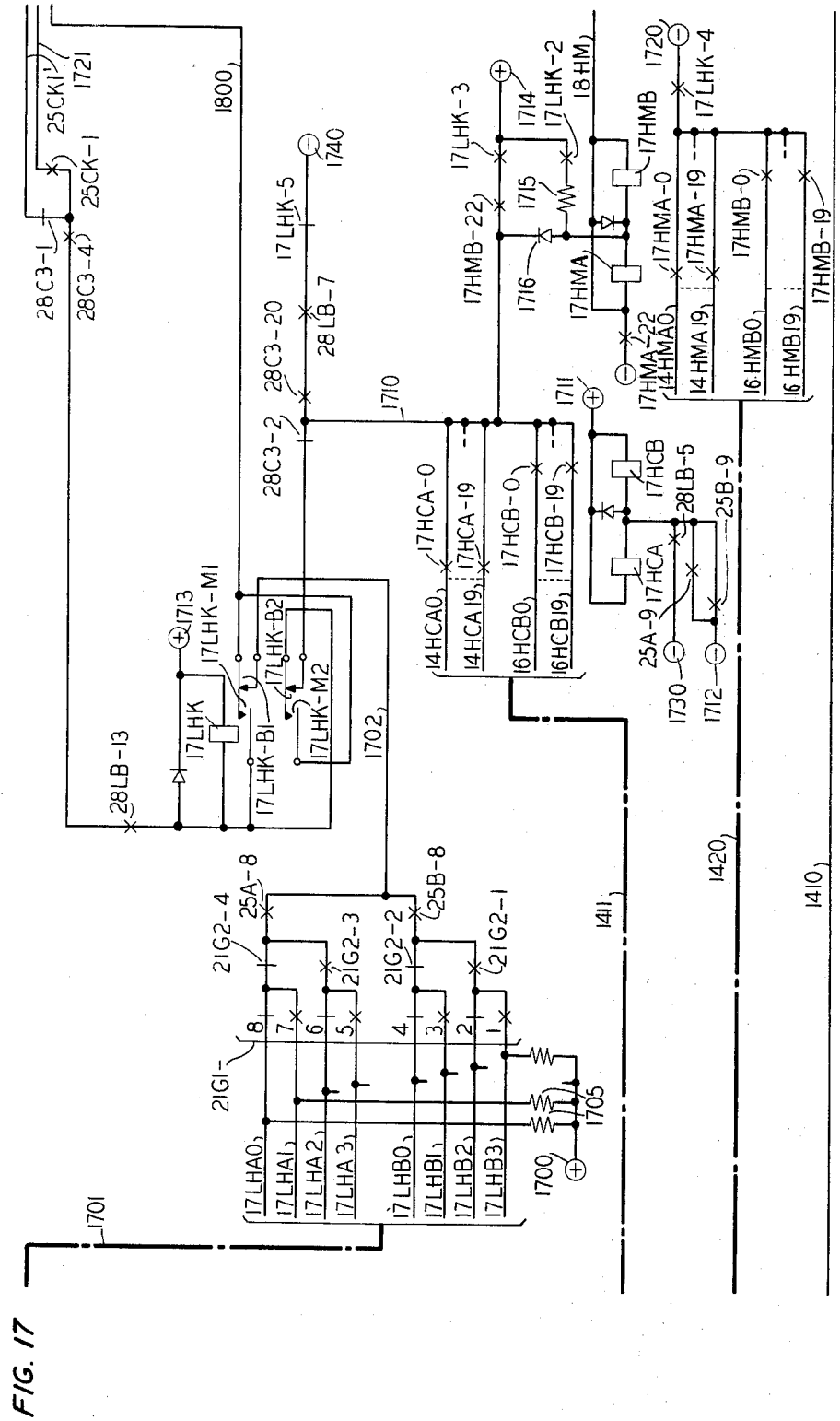
Figure 18:
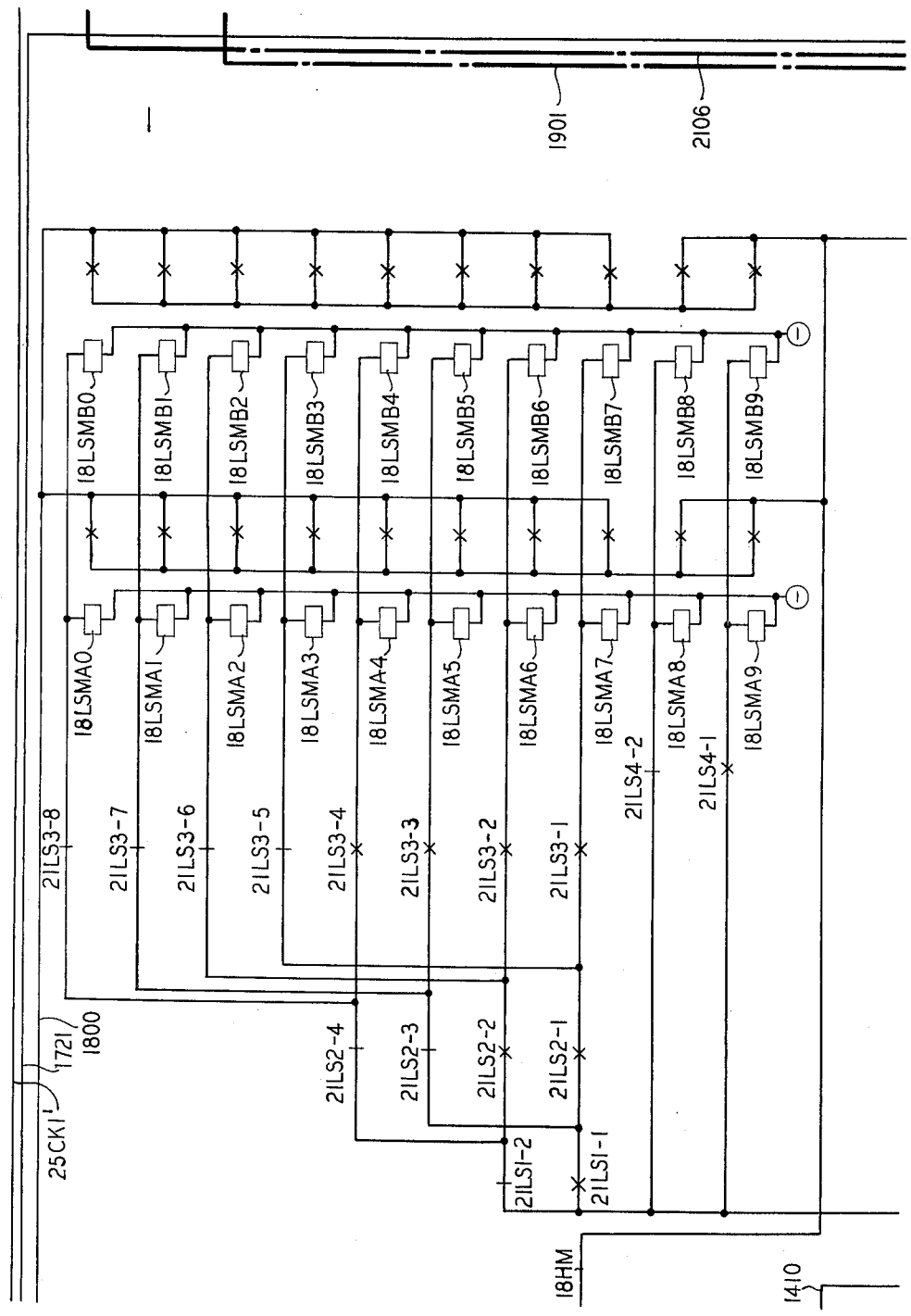

When relay 25CK operates, contacts 25CK–1 on FIG. 17 close. Current now flows from source 1713 through the coil of relay 17LHK, contacts 28LB–13, 28C3–4 and 25CK–1, conductor 1721 and one or two sets of contacts 22ID–1–5 through 22ID–4–5 to source 2201. Relay 17LHK operates and causes contacts 17LHK–2 to close. At this time, the negative potential on conductor 18HM is extended through the coils of relays 17HMA and 17HMB to positive source 1714 and the relays operate. Contacts 17HMA-22 close and lock relays 17HMA and 17HMB until contacts 17LHK-2 open. Relays 17HMA and 17HMB operate only after contacts 17LHK-5 open and remove source 1740 from the cathode of diode 1716, the operation being similar to that described above in the regular connection sequence.

With the operation of relays 17HMA and 17HMB, contacts 17HMA-0 through 17HMB-19 close. As contacts 17LHK-4 are now closed, negative source 1720 is connected to all of conductors 14HMA0 through 16HMB19. This negative potential is extended through contacts 14LHA0-1 through 14LHA19-1 and the analogous contacts in the hold magnet circuit for line switch B of all operated switch hold magnets to one end of the windings of all trunk switch hold magnets having their associated line switch hold magnets operated. Thus the negative potential of source 1720 is connected not only to the coils of trunk switch hold magnets already operated but to the coils of the two trunk switch hold magents previously released as the two line switch hold magnets associated with these trunk switch hold magnets did not release. The negative potential of source 1720 is now applied where the negative potential of source 2504 was previously applied, it being necessary to now operate the two priorly released trunk switch hold magnets rather than to release them. Source 2504 is no longer applied as the crosspoint connections have opened.

The other ends of the windings of these trunk switch hold magnets were priorly connected through conductors 14HCA0 through 14HCA19, and 16HCB0 through 16HCB19, and contacts 17LHK-5 to negative source 1740. A positive potential must now be substituted for this negative potential. The operation of relay 17LHK causes contact 17LHK-5 to open and the negative potential is removed. Conductor 1710, connected to the 40 HC leads, is now connected through contacts 17HMB-22 and 17LHK-3 to positive source 1714. Current thus flows through the windings of all the previously operated trunk switch hold magents including the two trunk switch hold magnets priorly released in such a direction as to operate them. The currents have no effect on the operated trunk switch hold magnets. The two priorly released magnets, however, reoperate and connect the two subscribers to either of the two local trunks depending upon which trunk switch steering level select magnet in each switch was operated together with trunk switch select magnets 21TSMA7 and 21TSMB7.

When the crosspoints close, the two conductors of conductors 12SAG0-1 through 12SAG3-5 and 15SBG0-1 through 15SBG3-5 which are connected to the two priorly released and now reoperated trunk switch hold magnets are connected through one or both trunk crossbar switches to each other and to the sleeve of the selected local trunk. The negative potential on these conductors thus appears on either conductor 15SX0 or 15SX1. Relay 29K0 must operate and remain operated whenever the first local trunk is in use, and relay 29K1 must do likewise whenever the second local trunk is in use. It will be recalled that contacts 29K0-1, 29K0-2 and 29K1-1 of FIG. 21, controlled by these two relays, determine which trunk switch steering level select magnets are operated. For the control circuit of FIG. 29 to determine which local trunk should be used for the next local connection, it is necessary to now operate that one of relays 29K0 and 29K1 corresponding to the local trunk now put in service. The negative potential on either of conductors 15SX0 or 15SX1 is extended through cable 1510 to FIG. 29. If this potential is on conductor 15SX0, relay 29K0 has not yet operated as the first local trunk was just now put in use. The negative potential is extended through contacts 29K0-4, diode 2905, conductor 29XC, break contacts 25CK1-B, and the coil of relay 25CK1 to positive source 2511. Relay 25CK1 operates. If the first local trunk was previously in use, the second local trunk was just selected and the negative potential appears on conductor 15SX1. As relay 29K0 is already operated, contacts 29K0-5 are closed. In this case, the negative potential on contactor 15SX1 is extended through contacts 29K1-3 and 29K0-5, diode 2905, conductor 29XC, contacts 25CK1-B, and the coil of relay 25CK1 to positive source 2511. In either case, relay 25CK1 operates and contacts 25CK1-M close before contacts 25CK1-B open. Relay 25CK1 thus locks over contacts 25CK1-M and contacts 28LB-10, 25C2-4 or 28C3-9. It remains operated until after the local connection has been established and all of relays 28LB, 25C2, and 28C3 have released. When relay 25CK1 operates, contacts 25CK1-4 and 25CK1-5 on FIG. 29 close. The negative potential on either conductor 15SX1 or 15SX0 is now extended through either break contacts 29K1-B, the primary coil of relay 29K1, and contacts 25CK1-5 to positive source 2901, or through break contacts 29K0-B, the primary coil of relay 29K0, and contacts 25CK1-4 to positive source 2902. The respective one of relays 29K0 or 29K1 thus operates depending upon which local trunk is selected. If relay 29K0 operates, contacts 29K0-B open but only after contacts 29K0-M close. At this time, negative source 2903 is connected through contacts 29K0-M, the primary coil of relay 29K0, and contacts 29K0-3 as well as contacts 25CK1-4 to positive source 2902. Relay 29K0 thus remains operated even after relay 25CK1 releases. This relay remains operated for the duration of the local connection involving the first local trunk. Similarly, if relay 29K1 operates, contacts 29K1-2 close and connect positive source 2901 to negative source 2904 independent of contacts 25CK1-5.

Relays 29K0 and 29K1 indicate which local trunks are in use. It is necessary, however, to include other means to provide the two subscribers with talking battery, and in addition to provide supervisory means to determine when they hang up. If the first local trunk has been connected to the two subscribers, the tip conductors of both subscribers are connected through respective resistors such as resistors 1130 or 1230 to conductor 15TX0 and the ring conductors of both subscribers are connected through respective resistors such as 1131 and 1231 to conductor 15RX0. Current now flows from positive source 2906 through one coil of relay 29S0, conductor 15TX0, the tip conductors of both subscribers, through their respective telephones, the ring conductors of both subscribers, conductor 15RX0, the second winding of relay 29S0, and contacts 28LB-8 to negative source 2907. Relay 29S0 thus operates. Contacts 29S0-1 close and negative source 2910 is connected through these contacts and contacts 29S0'-1 to the second winding of relay 29S0. The relay thus remains locked even after contacts 28LB-8 open. This relay remains operated for the duration of the local call until current ceases to flow through the relay windings. The cessation of this current flow will be described below in the section dealing with the release of a local connection.

Similarly, if the second local trunk is now put in service, positive source 2908 is connected to negative source 2911 through conductors 15TX1 and 15RX1, both windings of relay 29S1, and contacts 28LB-9. Relay 29S1 operates and contacts 29S-1 close. Negative source 2912 is now connected through contacts 29S1-1 and 29S1'-1 to the lower winding of relay 29S1 and this relay remains operated even after relay 28LB releases. Talking battery is thus supplied to the two subscribers on the local connection until the call is terminated.

Capacitors 2942 and 2943 are across the tip and ring conductors of respective local trunks. They bypass the relay windings, and lower the transmission level to that of the original connection via the trunks to the central office.

When relay 25CK1 operates, contacts 25CK1-2 on FIG. 22 close and again potential source 2211 applies a negative potential to the unused wire of the second control pair, or to conductor 9T2 if neither is used. The central office is thus notified that the local connection has been established. The second set of identifying potentials is removed from the control conductors and the two operated ones of relays 22ID-1 through 22ID-8 release. Conductors 22C1 and 22C2 thus de-energize and relays 25C1 and 25C2 release. The release of these two relays cause all other control relays in the field unit to release. The only relays that remain operated are relays 29K0 and 29S0 if the first local trunk is in use, and relays 29K1 and 29S1 if the second local trunk is in use. It should be noted that only two local connections may be made. If both local trunks are in use, both of relays 29K0 and 29K1 are operated and contacts 29K0-1 and 29K1-1 on FIG. 21 are open. Thus neither of steering level select magnets 8 or 9 may be operated in response to a command to establish a local connection. In fact, the central office unit does not transmit a command to establish a local connection if both local trunks are in use.

After a local connection is established, the central office unit transmits scan pulses over the first control pair after a delay of 125 milliseconds. By this time, transistor 26R has timed out and counter 2400 is reset. Line scanning resumes with the first line in the next group to be scanned, the group being determined by the polarity of the scan pulses transmitted.

(2) SUMMARY OF SIGNAL INFORMATION TRANSMITTED BETWEEN CENTRAL OFFICE AND FIELD UNITS FOR LOCAL CONNECTION

When the common control determines that a local connection is to be established, the particular central office unit involved places a greater positive potential on conductor 9R2 and a lesser positive potential on conductor 9T2. The field unit notifies the central office unit of its recognition of the signal by opening conductor 9T2. The central office then applies identifying potentials representing the trunk connected to the first local subscriber to the control conductors. After the field unit has stored this information in identification relays 23ID-1' through 23ID-8', the check signal is transmitted to the central office unit over the unused wire of the second control pair, or conductor 9T2 if neither conductor has thereon an identifying potential. The central office then applies a second pair of positive potentials to conductors 9R2 and 9T2 to reoperate relay 25L in the field unit. The field unit again opens conductor 9T2 when relay 25AUX operates. The central office then applies the second set of identifying potentials representing the second trunk, connected to the second local subscriber, to the control conductors. After the field unit establishes the local connection, a second check signal is transmitted to the central office unit which then removes the second set of identifying potentials from the control conductors. After 125 milliseconds, scan pulses are transmitted from the central office unit to the field unit to control the line scanning at the field unit.

G. *Local connection release*

(1) DETAILED DESCRIPTION OF FIELD UNIT OPERATION

Although thus far only a local connection at the field unit has been described, it must be borne in mind that a similar connection is made in the central office unit. Connections are extended between respective conductors of the line circuits of the two locally connected subscribers. This insures that other telephone users calling the subscribers are provided busy tone for the duration of the call. Thus when the subscribers terminate their call, not only must the particular one of the two local trunks in the field unit that was used for the call be released but, in addition, the field unit must notify the central office unit which of the two local trunks in the central office unit must now be released.

Only the field unit may recognize the release of the local connection as no trunks are extended to the central office unit whose D.C. condition is dependent upon the on-hook or off-hook conditions of the two subscribers involved in the local connection. Although the field unit must notify the central office unit which of the two local trunks is to be released, the normal trunk identification information is not required, that is, the normal 2-out-of-8 codes identifying one or two of the 20 trunks connecting the central office and field units are not needed to release a local connection. Rather, information is transmitted from the field unit to the central office unit and the identification is 1-out-of-2 rather than 1-out-of-20.

When the subscribers on a local connection both hang up their receivers, current ceases to flow through conductors 15TX0 and 15RX0, or 15TX1 and 15RX1. Although the crosspoint connections are still maintained, both subsets present open circuit conditions. Thus, relay 29S0 or 29S1 releases. The release of either of these relays indicates that the crosspoints establishing the local connections in the field and central office units must be released. It is first necessary for the field unit to notify the central office unit that the connection, or connections if both calls are terminated simultaneously, are to be released.

When the scanning of lines for a service request is interrupted for synchronization purposes after a group of 64 scan pulses have been transmitted, transistor 26R becomes active. This transistor creates a positive pulse on conductor 26R' which resets counter 2400. This same pulse is also extended along conductor 24LP to FIG. 29. Whichever local trunk was previously in use but is now to be released now has its K0 or K1 relay operated and its S0 or S1 relay released. If the first local trunk is to be released, the pulse on conductor 24LP is extended through closed contacts 29K0-6 and now closed contacts 29S0-2 to conductor 29LP1. If the second local trunk is to be released, the pulse on conductor 24LP is extended through closed contacts 29K1-4 and now closed contacts 29S1-2 to the same conductor 29LP1. It is only after a local trunk is in use with its respective 29K0 or 29K1 relay operated and after it is determined that it is to be released with its respective relay 29S0 or 29S1 released, that the pulse on conductor 24LP is extended to conductor 29LP1. The pulse on this latter conductor is transmitted through capacitor 2675, diode 2672, and capacitor 2665 to the base of transistor 26AF1. Transistor 26AF1 goes off and transistor 26AF thus goes on. As with a service request, a simplex pulse is transmitted over the first control pair to the central office unit. The central office unit recognizes that the simplex pulse occurs during the 5 milliseconds between group scans and thus recognizes that the simplex pulse represents an indication that one or both local connections are to be released rather than representing a service request.

Once the central office unit recognizes that one or both local connections are to be released, further control is placed under the central office unit. Further scanning is inhibited not only for the remaining part of the 5 milliseconds between scans but until the local connections have been released in both units. The central office unit transmits a signal over control pair 2 to notify the field unit that the central office unit has received the simplex pulse. Different magnitude negative potentials are transmitted along conductors 9T2 and 9R2 to operate relays 25A or 25B to establish a regular connection. Different magnitude positive potentials are applied to conductors 9T2 and 9R2 when it is necessary to release a trunk and relay 25R operates. Different magnitude positive potentials are transmitted over conductors 9R2 and 9T2 to operate relay 25L when it is necessary to establish a local connection. For the release of a local connection the central office unit applies equally large positive potentials to both of conductors 9T2 and 9R2, and as a consequence both of relays 25R and 25L operate. These positive potentials indicate that the common control will release the local connection or connections in the particular concentrator unit. If two or more of the eight units require local connection releases, the common control operates on only one of them at this time, the other releases being effected in succeeding periods between group scans. Only that concentrator unit to be operated upon at this time has the positive potentials applied to its conductors 9T2 and 9R2.

Since both of relays 25R and 25L operate, it is necessary to inhibit further action at the field unit that would normally ensue in response to the operation of either of these relays individually. That is, the field unit must not treat the operations of both relays 25R and 25L as indications of a trunk release and the establishment of a local connection. The operation of the trunk release circuitry depends upon the operation of relay 25R1 immediately after the operation of relay 25R. Relay 25R1 normally operates when contacts 25R-1 close. However, as contacts 25L-6 and 25R-7 are now closed, it is seen that both ends of the coil of relay 25R1 are connected to the same negative potential 2511 and relay 25R1 thus remains unoperated. Similarly, the operation of the local connection circuitry depends upon the operation of relay 28LA. Relay 28LA is also prevented from operating when contacts 25L-6 and 25R-7 close. Only relay 28LR is operated by the simultaneous energizations of relays 25R and 25L. Relay 28LR is the relay which controls the operation of the circuitry for effecting the release of a local connection. When contacts 25L-7 and 25R-8 close, it is seen that current flows through the coil of relay 28LR which thus energizes. Contacts 28LR-4 open and further insure that relays 25R1 and 28LA do not operate. With contacts 25L-4 and 25R-5 closed, current flows from source 2533 through the coil of relay 25AUX to source 2534. Relay 25AUX thus operates.

Relay 28C3 is prevented from operating at this time because contacts 25R-6 and 25L-5 are closed. As contacts 28C3-15 are normally closed, negative source 2812 is connected directly to one end of the coil of relay 28C3 and thus relay 28C3 cannot operate even though conductor 28C3 now has applied to it a negative potential through contacts 28LR-7, 25L-9, and 25R-9.

The field unit must notify the central office unit that relays 25R and 25L have operated. As both conductors 9T2 and 9R2 are now in use, the central office having applied positive potentials to both of them to operate relays 25R and 25L, the field unit applies a negative potential to conductor 9T1 if the first local trunk is to be released and/or conductor 9R1 if the second local connection is to be released. If the first local trunk is to be released, negative source 2811 is connected through contacts 28C3-13, now open contacts 29S0-3, still closed contacts 29K0-7, and now closed contacts 28LR-9 to control conductor 9T1. If the second local trunk is to be released, source 2811 is connected through contacts 28C3-12, now closed contacts 29S1-3, still closed contacts 29K1-5, and now closed contacts 28LR-10 to conductor 9R1. Contacts 28LR-1 and 28LR-2 are now open and the negative potential on conductors 9T1 and/or 9R1 cannot erroneously operate identification relays 22ID-1 or 22ID-3 over conductors 24ID-1 and 24ID-3.

The central office is thus notified that relays 25R and 25L have operated. The central office then removes the positive potentials from conductors 9T2 and 9R2 and relays 25L and 25R release. Relay 28C3 now operates. Relay 28LR is held operated by a capacitor discharge even though contacts 25L-7 and 25R-8 are now open, capaictor 2809 discharging through contacts 28LR-6 and either contacts 29K0-8 and 29S0-4, or 29K1-6 and 29S1-4, through the coil of relay 28LR. As contacts 28LR-7 remain closed and contacts 25R-6 and 25L-5 are now open, current flows from source 2804 through resistor 2803, the coil of relay 28C3, contacts 28LR-7, conductor 28HC3 and either contacts 29K0-9 and 29S0-6 to source 2910, or contacts 29K1-7 and 29S1-6 to source 2912, or both, if both local connections are to be released. Relay 28C3, in operating, opens contacts 28C3-12 and 28C3-13 and thus removes the negative potential from either or both of conductors 9T1 and 9R1. As contacts 28C3-16 and 28C3-17 are now closed, conductors 9T1 and 9R1 are connected respectively to conductors 23-5' and 23-7', these conductors being directly connected to the coils of respective relays 23ID-5' and 23ID-7'.

The negative potential having been removed from one or both of conductors 9T1 and 9R1 notifies the central office unit that these conductors are now connected to respective relays 23ID-5' and 23ID-7'. The central office unit then reapplies the positive potentials to conductors 9T2 and 9R2 and relays 25R and 25L reoperate. Relay 28C3 remains operated although contacts 25R-6 and 25L-5 close because now contacts 28C3-15 are open. And contacts 25L-9 and 25R-9, which are now closed and connect negative source 2886 to the coil of relay 28C3 maintain this relay operated even after contacts 29K0-9 or 29K1-7 later open. The central office unit then applies negative potentials to both of conductors 9T1 and 9R1 causing relay 23ID-5' and/or relay 23ID-7' to operate. Relay 23ID-5' operates if the first local trunk is to be released, that is, if contacts 29S0-3 are now closed. Relay 23ID-7' operates if the second local trunk is to be released and contacts 29S1-3 are now closed. Current flows through conductor 9T1 only if the first local trunk is to be released, and current flows through conductor 9R1 only if the second local trunk is to be released. It is the currents flowing through conductors 9T1 and 9R1 at this time that notify the central office unit which of the two local trunks is to be released.

Figure 20:
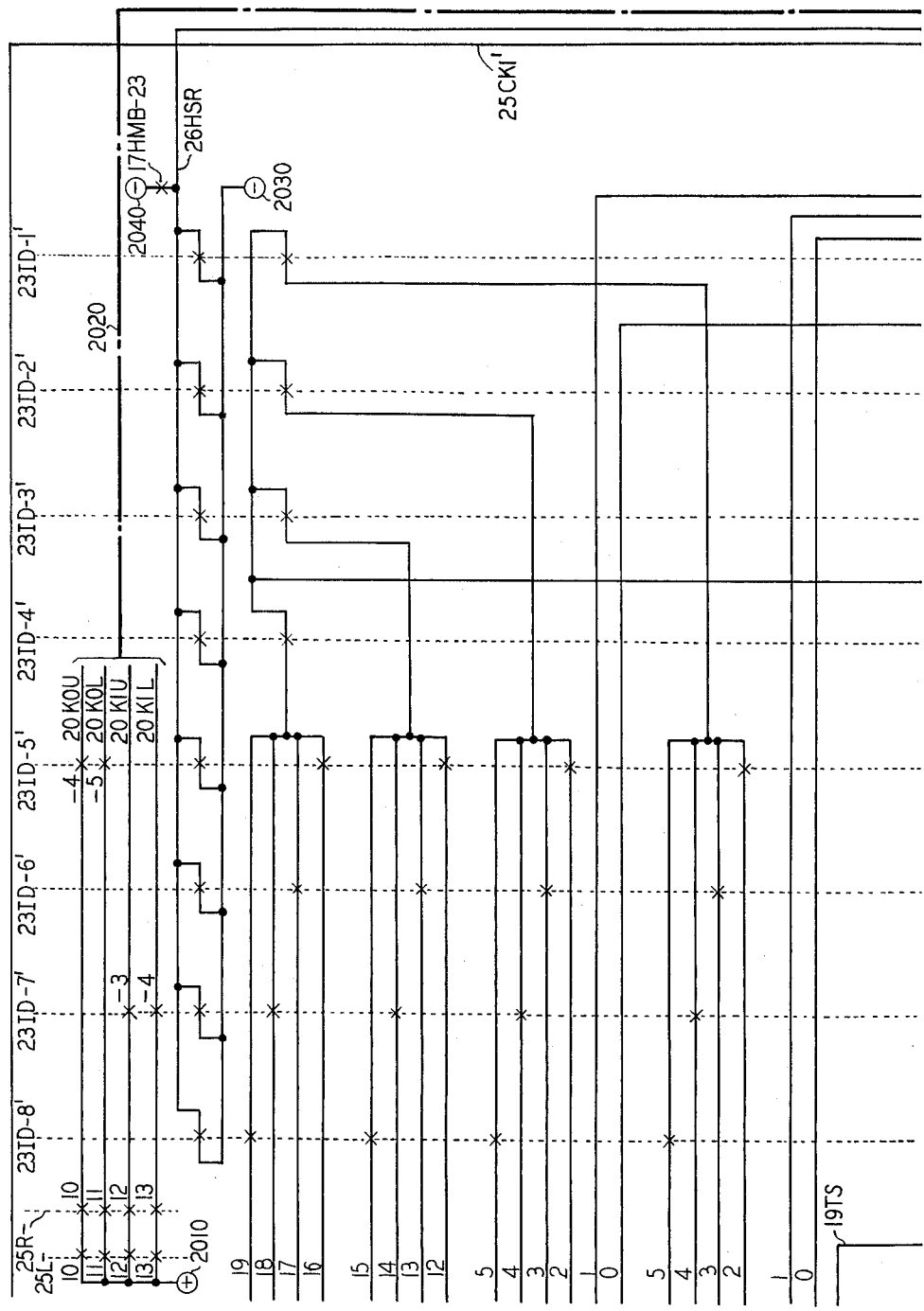

Contacts 25L-10 through 25L-13 and 25R-10 through 25R-13 on FIG. 20 are now closed and positive source 2010 is connected to both of conductors 20KOU and 20KOL and/or 20KIU and 20KIL depending upon which of contacts 23ID-5'-4 and 23ID-5'-5 and/or 23ID-7'-3 and 23ID-7'-4 are operated. These potentials are extended through cable 2020 to FIG. 29. A positive potential on conductor 20KOU causes current through the upper winding of relay 29K0 to cease as both ends of this winding are connected to equal positive potentials. However, relay 29K0 does not yet release. The positive potential on conductor 20KOL is extended through the lower winding to conductor 15S0 and through the trunk sleeve crosspoints to one end of each coil of the two particular trunk hold magnets holding these crosspoints operated. At this time, the other end of the coil of every trunk switch hold magnet is connected through the coil of its associated line switch hold magnet to conductors 14HG or 16HG which are now connected through contacts 28LR-8, 28C3-14, 25L-5 and 25R-6 to negative source 2812. Current flows through the particular line and trunk switch hold magnets establishing connections to the first local trunk, both hold magnets release, and the crosspoints open. At this time, current ceases to flow through conductor 15SX0 and since the lower winding of relay 29K0 is no longer energized relay 29K0 releases.

On the other hand, if the second local trunk is to be released, the positive potential on conductor 20K1U causes current through the upper winding of relay 29K1 to cease. This relay remains operated, however, because of the current flow through conductor 20K1L, the lower winding of relay 29K1 and conductor 15SX1. The line and trunk switch hold magnets maintaining the second local connection release in a similar manner and when current ceases to flow through conductor 15SX1 relay 29K1 releases.

Figure 28:
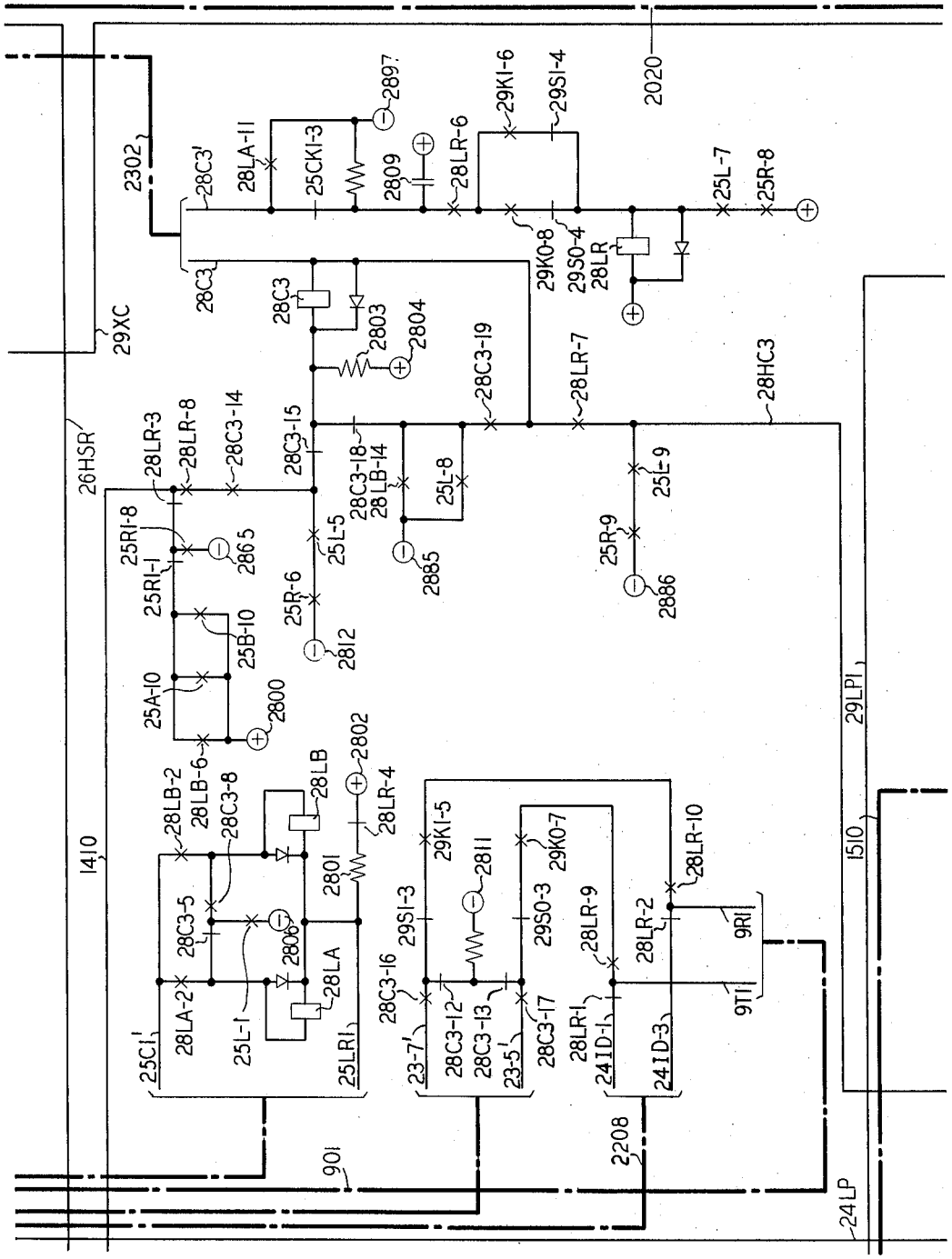
Figure 29:
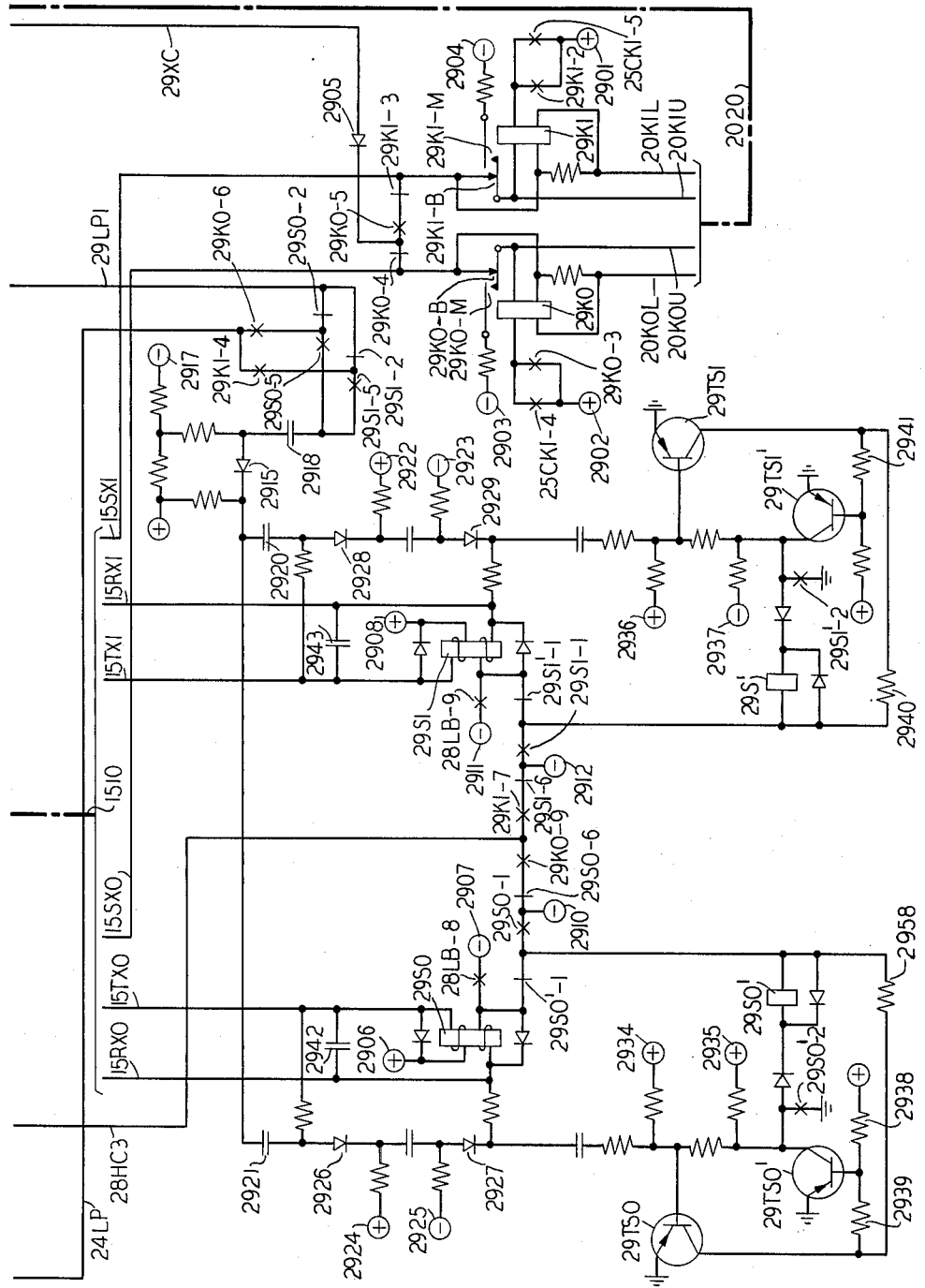
Figure 30:
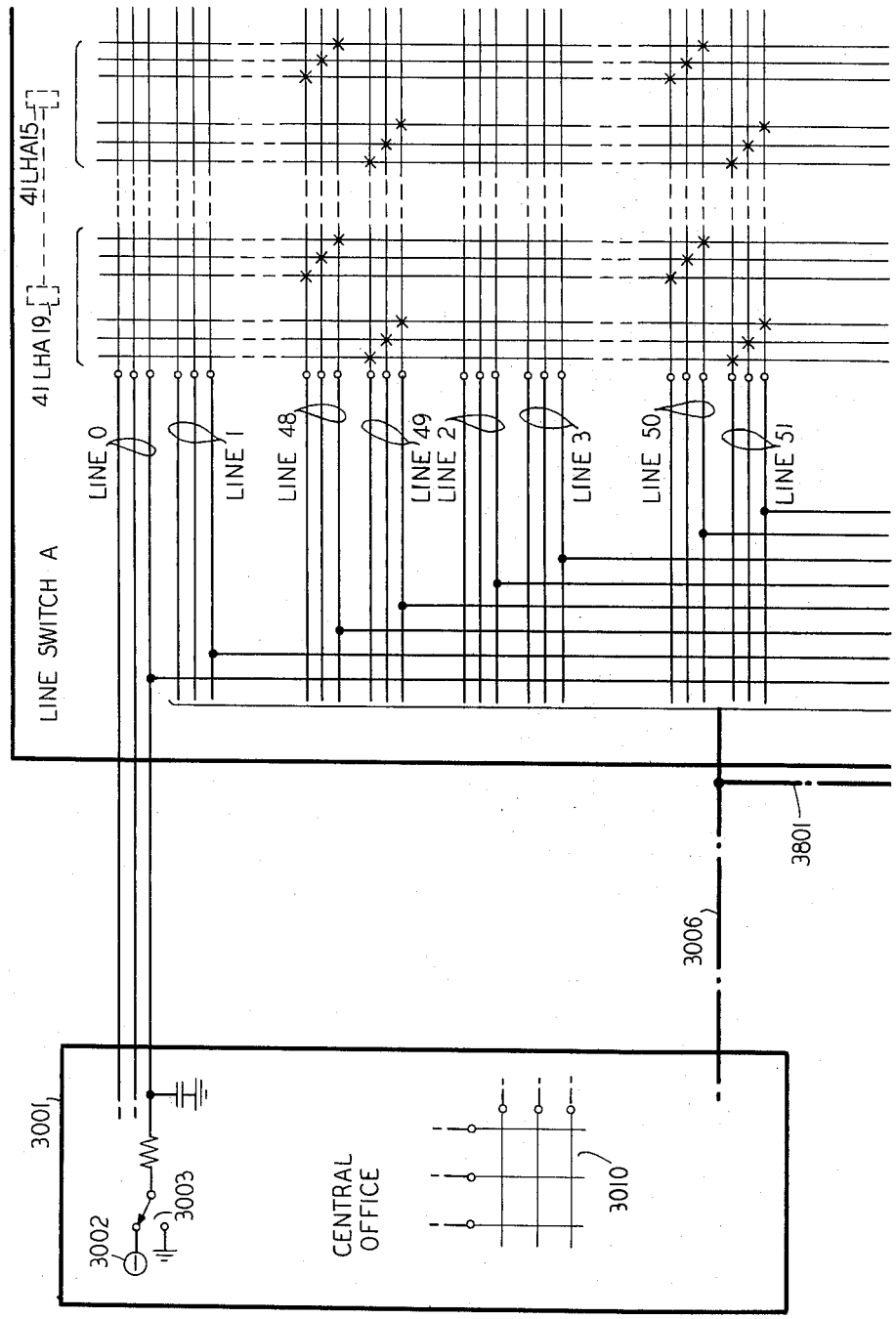
Figure 31:
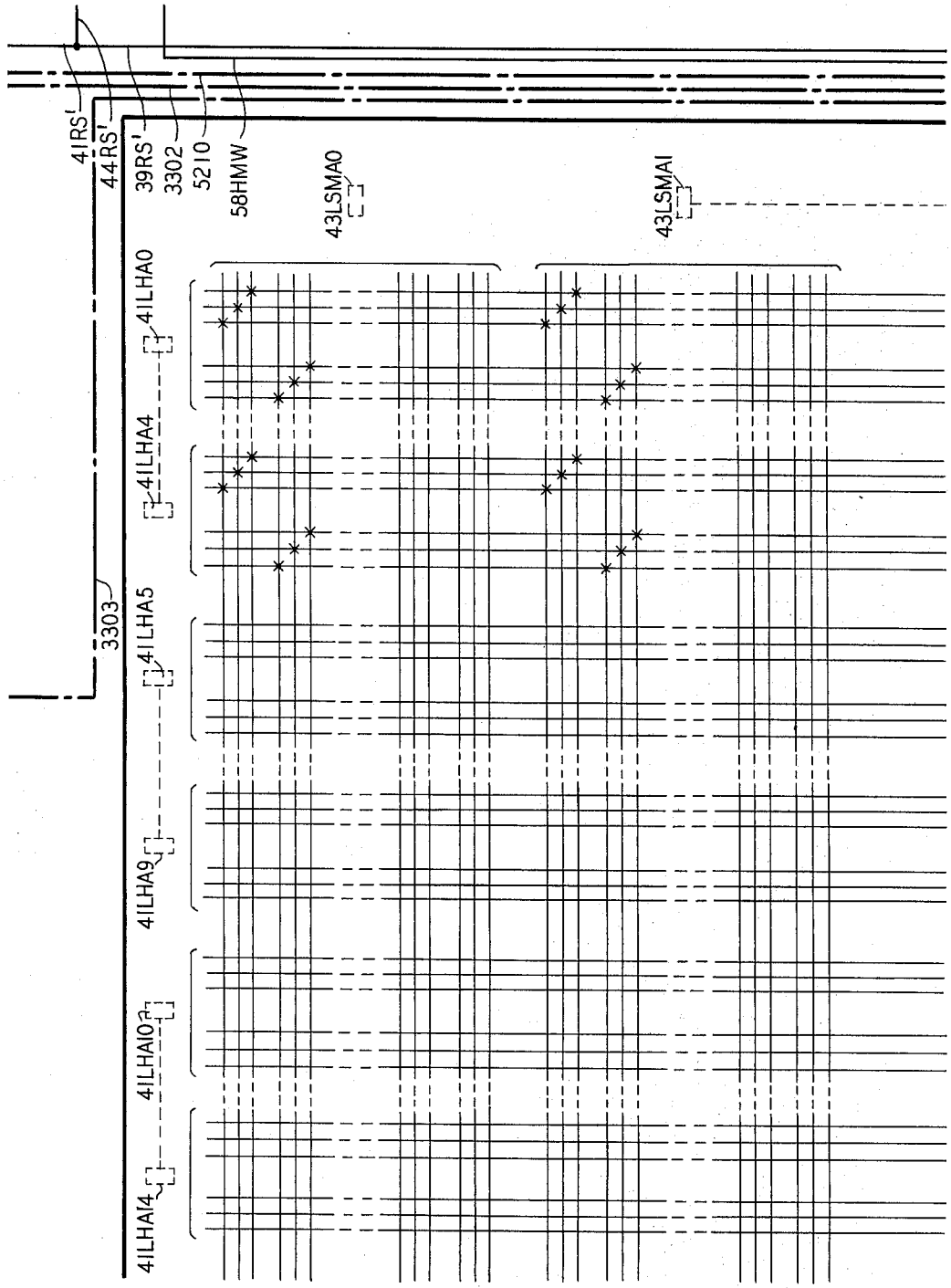
Figure 32:
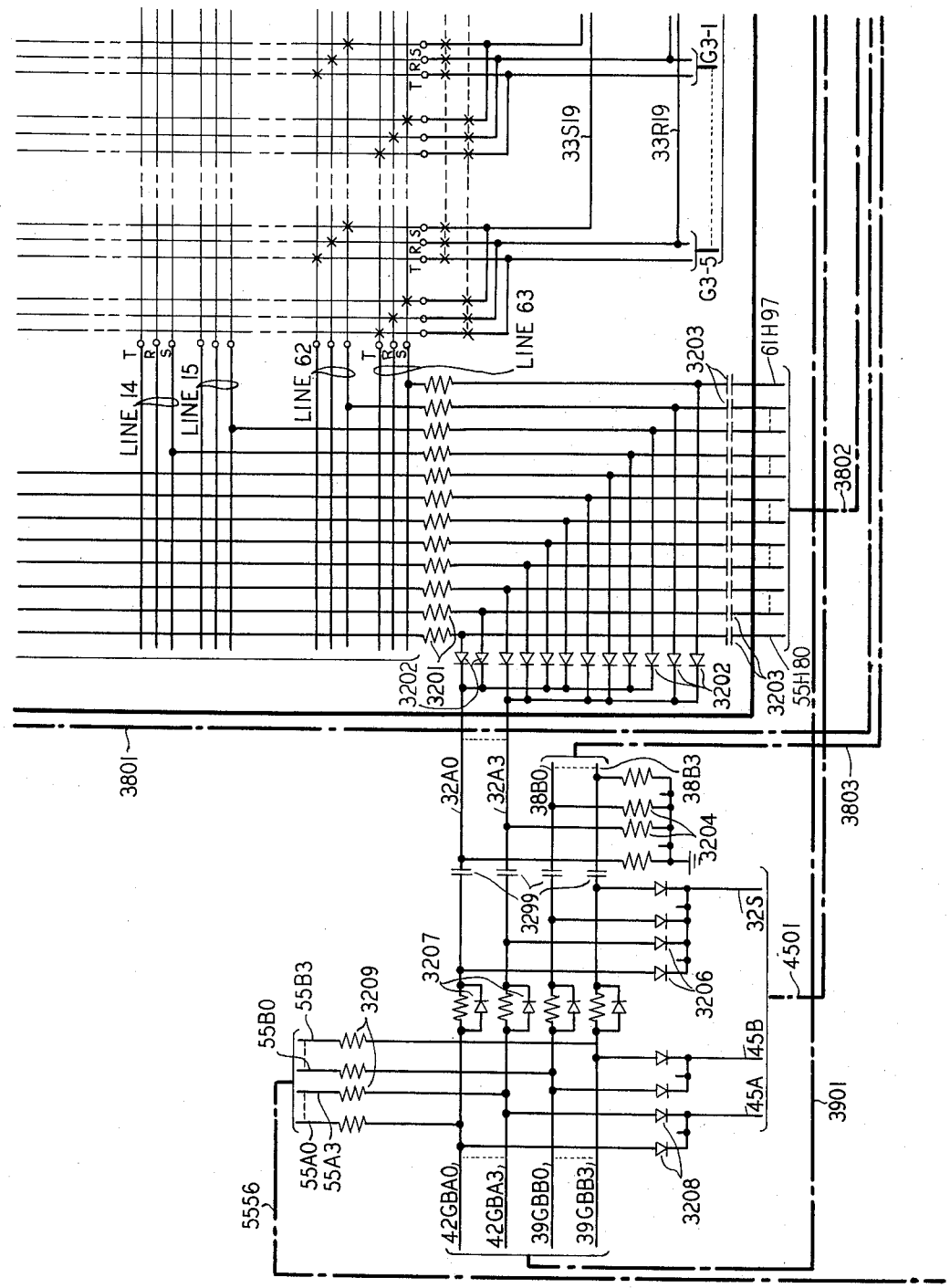
Figure 33:
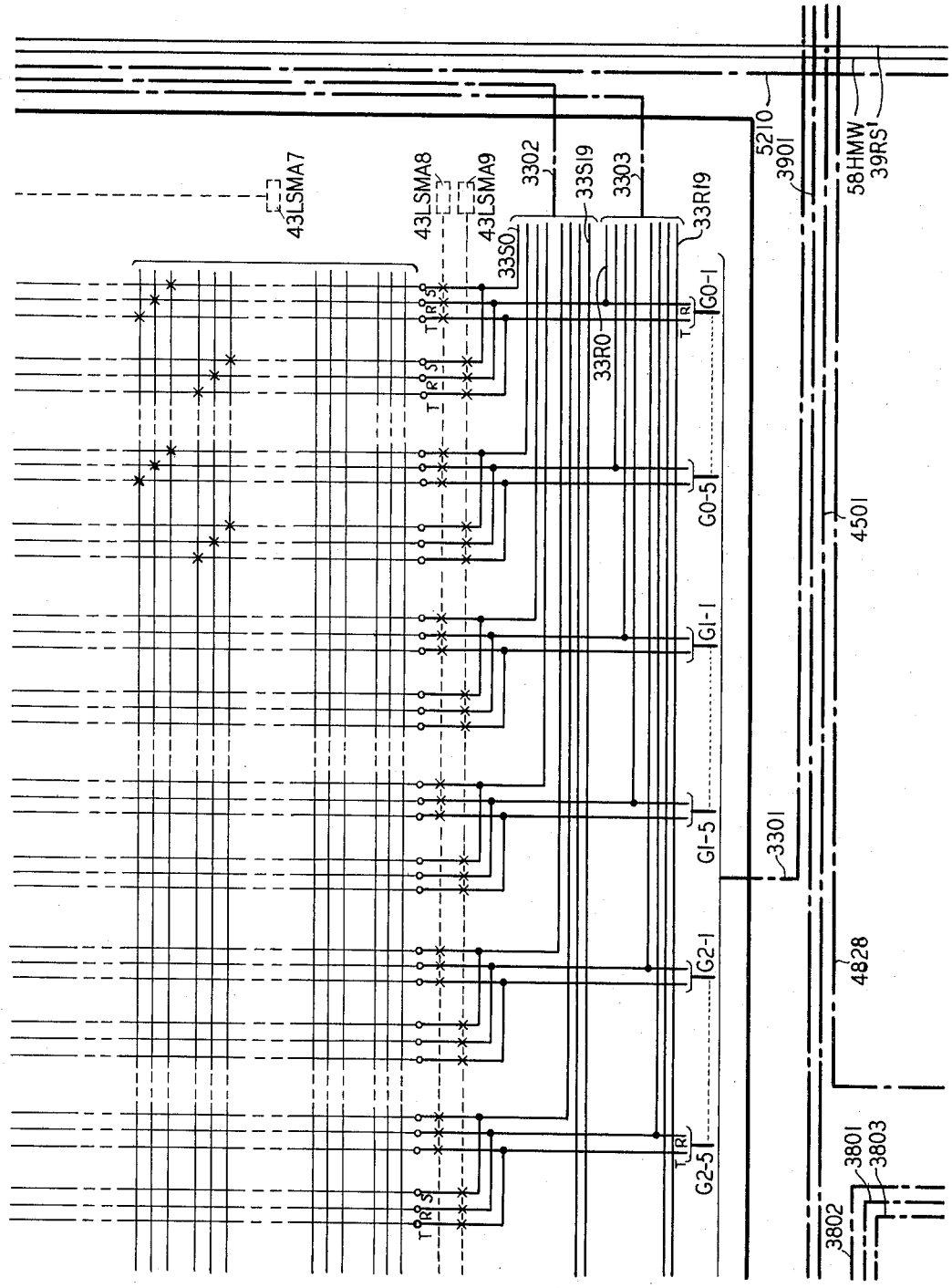
Figure 34:
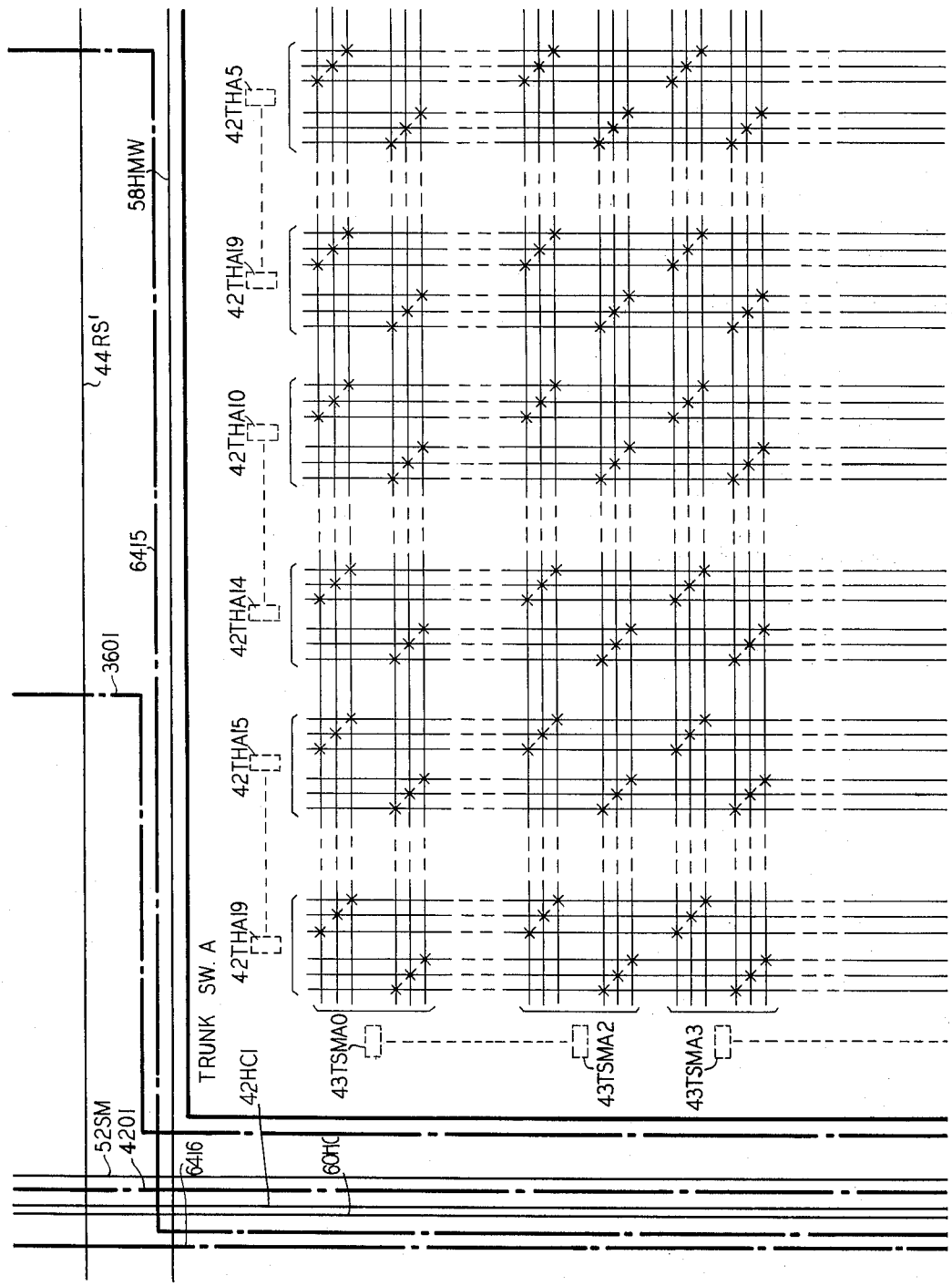

When the operated ones of relays 29K0 and/or 29K1 release, the negative current originally flowing through conductors 9T1 and/or 9R1 cease as contacts 29K0-7 and/or 29K1-5 on FIG. 28 are now open. This notifies the central office unit that the local connection or connections have been released at the field unit. When the central office unit similarly completes the release of one or both of the local connections in the central office unit, the positive potentials on conductors 9T2 and 9R2 are removed. The field unit relays restore and the two control pairs are connected for line scanning when relay 25AUX releases. After 125 milliseconds, line scanning resumes.

Again, during the entire switching sequence transistor 26AF1 is held on as a safety precaution. Contacts 25C2–7 on FIG. 26, and the contacts of relays 23ID–5' and 23ID–7' connecting source 2030 to conductor 26HSR maintain the transistor conducting. It remains on in the local connection release sequence until the last of relays 25C2, 23ID–5' or 23ID–7' releases.

The release of a local connection is initiated only when relays 29S0 or 29S1 release. It has been assumed above that both subscribers hang up their receivers and that current ceases to flow through conductors 15TX0 and 15RX0, or conductors 15TX1 and 15RX1, thus causing the respective relays to release. However, it is possible that only one subscriber on a local connection will hang up. In the event that the other subscriber remains off-hook, e.g., due to a failure on his part to properly place his receiver on-hook, current still flows through the local trunk connected to this subscriber. This is due to the fact that the tip and ring conductors of both subscribers are connected in parallel to respective tip and ring conductors of a local trunk. Were the local connection not released, the local trunk connected to the still off-hook subscriber would be tied up indefinitely until he were to hang up his receiver. For this reason, means are provided to cause relays 29S0 or 29S1 to release even if only one subscriber hangs up and current still flows through the windings.

When one of the two subscribers on the first local trunk hangs up, although an infinite impedance does not appear between the tip and ring conductors of the local trunk, a greater impedance than was priorly between these conductors does appear. Both subsets were previously connected to the tip and ring conductors of the local trunk. Two impedance circuits in parallel were thus both connected between the tip and ring conductors of the local trunk, and when one of these impedances is removed or made infinite the total impedance between the local trunk tip and ring conductors is increased. As a result, the positive potential on conductor 15TX0 increases slightly in magnitude and the negative potential on conductor 15RX0 similarly increases in magnitude. Diode 2926 is normally reverse biased, the positive potential on its cathode from source 2924 being slightly greater than the positive potential on its anode connected to conductor 15TX0. When one subscriber hangs up and the positive potential on conductor 15TX0 increases in magnitude, diode 2926 is forward biased. Diode 2927 is normally reverse biased, the negative potential on its anode from source 2925 being greater in magnitude than the negative potential on its cathode connected to conductor 15RX0. When one subscriber on the local connection hangs up, the slightly increased magnitude negative potential on conductor 15RX0 forward biases diode 2927.

The positive pulse on conductor 24LP is not transmitted to conductor 29LP1 as contacts 29S0–2 are still open. However, contacts 29S0–5 are closed and thus the positive pulse on conductor 24LP is transmitted through capacitor 2918 and diode 2915. If only one subscriber on the first local trunk has hung up, this pulse is transmitted through capacitor 2921, diodes 2926 and 2927 to the base of transistor 29TS0. Similarly, as contacts 29S1–5 are closed, the diode network comprising diodes 2928 and 2929 and potential sources 2922 and 2923, connected to the second local trunk, permits this pulse to pass to the base of transistor 29TS1 in the event that one subscriber on the second local trunk is still off-hook.

Transistors 29TS0 and 29TS1 are normally active, the voltage dividing network between sources 2935 and 2934 normally maintaining the base of transistor 29TS0 negative, and the voltage dividing network between sources 2936 and 2937 normally maintaining the base of transistor 29TS1 negative. Transistors 29TS0' and 29TS1' are normally passive, collector currents from respective transistors 29TS0 and 29TS1 maintaining positive potentials on the bases of transistors 29TS0' and 29TS1'. The positive pulse from conductor 24LP through either diode gate network momentarily turns off respective transistors 29TS0 or 29TS1. Thus transistors 29TS0' or 29TS1' momentarily conduct. If the first local trunk is to be released, current flows from the collector of transistor 29TS0' through the coil of relay 29S0' and contacts 29S0–1 to source 2910. Relay 29S0' operates. Contacts 29S0'–2 close and relay 29S0' thus remains operated even after transistor 29TS0' turns off. With relay 29S0' operated, contacts 29S0'–1 open. Current no longer flows through conductors 15TX0 and 15RX0 and relay 29S0 releases. Contacts 29S0–1 open and relay 29S0' releases as well. With relay 29S0 released, the local connection will be released when the next positive pulse is applied to conductor 24LP and is transmitted through now closed contacts 29S0–2 to conductor 29LP1 in the normal manner.

Similarly, if only one subscriber on the second local trunk has hung up, the positive pulse transmitted through capacitor 2918 and diode 2915 is now transmitted through the diode gate comprising diodes 2928 and 2929 to the base of transistor 29TS1, transistor 29TS1' momentarily conducts, and relay 29S1' operates. This relay locks over its contacts 29S1'–2. Contacts 29S1'–1 open and relay 29S1 releases. When contacts 29S1–1 open, relay 29S1' releases as well. The local connection involving the second local trunk is released with the next application of a positive pulse to conductor 24LP which is transmitted through now closed contacts 29S1–2 to conductor 29LP1.

The subscriber whose receiver is still off-hook would now cause a new service request in the normal manner. The call would be set up as usual over one of the 20 trunks extended to the central office unit. It is necessary that this regular connection be established in order that equipment in the central office time out and connect the off-hook subscriber to a permanent signal trunk.

(2) SUMMARY OF SIGNAL INFORMATION TRANSMITTED BETWEEN CENTRAL OFFICE AND FIELD UNITS FOR LOCAL CONNECTION RELEASE

The sequence for the release of a local connection initiates with the application by the field unit of a simplex pulse to the first control pair. This pulse is only applied between group scans and thus the central office unit is notified that it represents a request to release a local connection rather than a service request. The central office unit then applies positive potentials to both of conductors 9T2 and 9R2 to operate relays 25R and 25L in the field unit. The field unit notifies the central office unit of its recognition of these potentials by applying negative potentials to either or both of conductors 9T1 and 9R1. The central office unit then removes the positive potentials from conductors 9T2 and 9R2. Relay 28C3 then operates in the field unit and removes the negative potentials from conductors 9T1 and/or 9R1. This notifies the central office unit to reapply the positive potentials to conductors 9T2 and 9R2 which cause relays 25R and 25L in the field unit to reoperate. Then the central office unit applies negative potentials to both of conductors 9T1 and 9R1. Conductor 9T1 is connected to relay 23ID–5' only if the first local trunk is to be released. Conductor 9R1 is connected to relay 23ID–7' only if the second local trunk is to be released. Relays 23ID–5' and/or 23ID–7' then operate and cause the local connections at the field unit to release. The negative potential applied by the central office unit to conductor 9T1 causes current flow through this conductor to operate relay 23ID–5' only if the first local trunk is to be released and contacts 29S0–3 are closed. Current flowing through this conductor is an indication to the central office unit that the first local trunk is to be released. The negative potential applied by the central office unit to conductor 9R1 causes current to flow through this conductor and to operate relay 23ID–7' only if the second local trunk is to be released and contacts 29S1–3 are closed. Current flowing through this conductor notifies the central office unit that the second local trunk is to be released. Both central office and field units release their local connections. When the field unit has completed the release of the first local trunk, relay 29K0 releases and current ceases to flow in conductor 9T1. If the second local trunk is to be released by the field unit, current ceases to flow in conductor 9R1 after the release of this trunk with the corresponding release of relay 29K1. When no currents flow through conductors 9T1 and 9R1 the central office unit is thus notified that the one or two releases of local connections at the field unit have been effected. When the central office unit completes the release of its local connection or connections it removes the positive potentials from conductors 9T2 and 9R2 and both central office and field units restore to normal. Line scanning then resumes after 125 milliseconds with the scanning of the first line in the next group.

III. CENTRAL OFFICE UNITS AND COMMON CONTROL

A. *General description*

The common control located at the telephone central office serves eight pairs of central office and field concentrator units in the illustrative embodiment of the invention. An individual central office unit, the counterpart of the field unit described in detail above, is shown in FIGS. 30–46. The common control is shown in FIGS. 48–65. Although only one central office unit is shown in detail the common control serves another seven as well. These seven central office units are shown symbolically in FIG. 47. Although connections are shown between the common control and central office unit 0, the drawing indicates multiple connections where they exist; that is, all conductors and cables connecting the common control to central office unit 0 are shown to be extended to central office units 1–7 as well.

Figure 46:
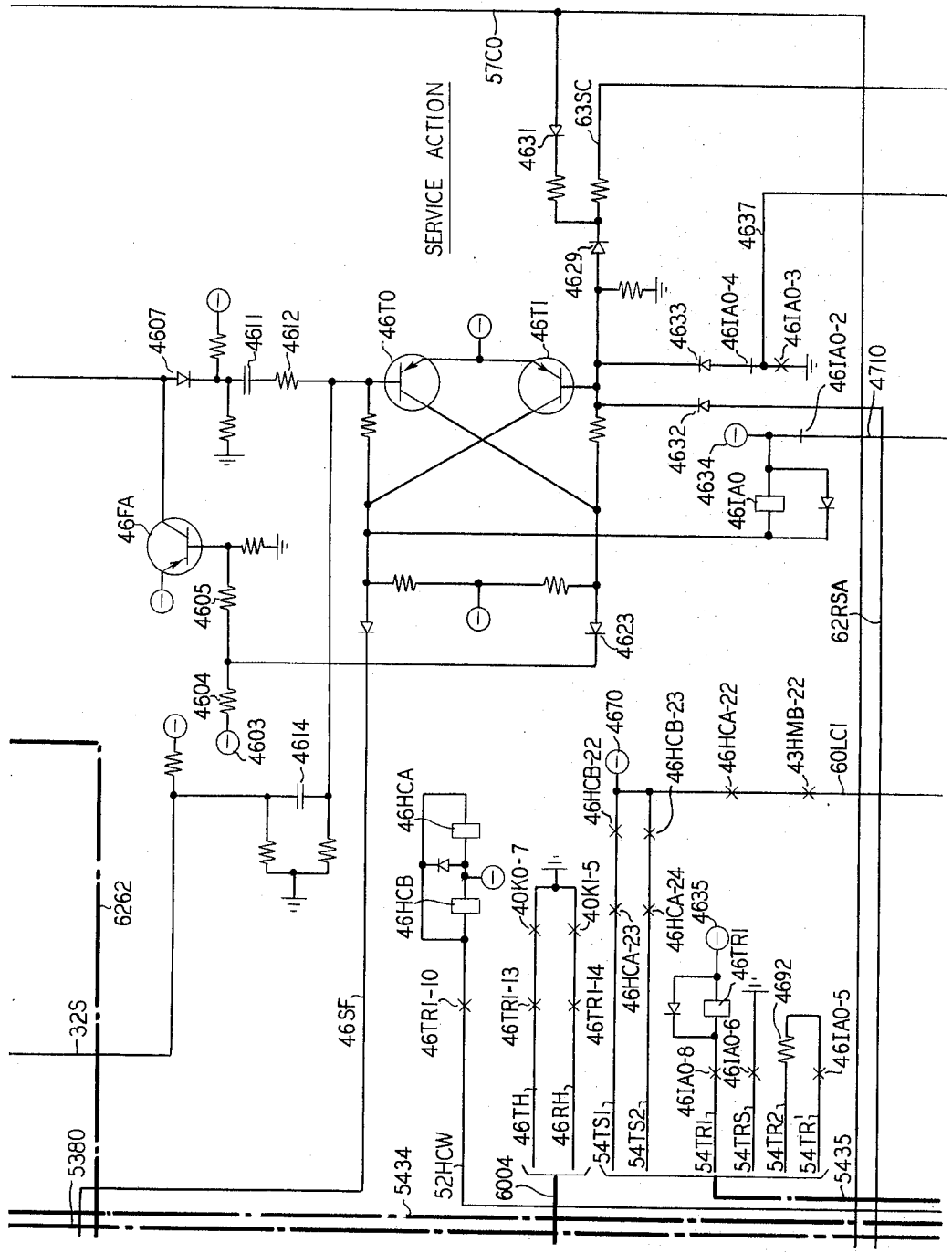
Figure 47:
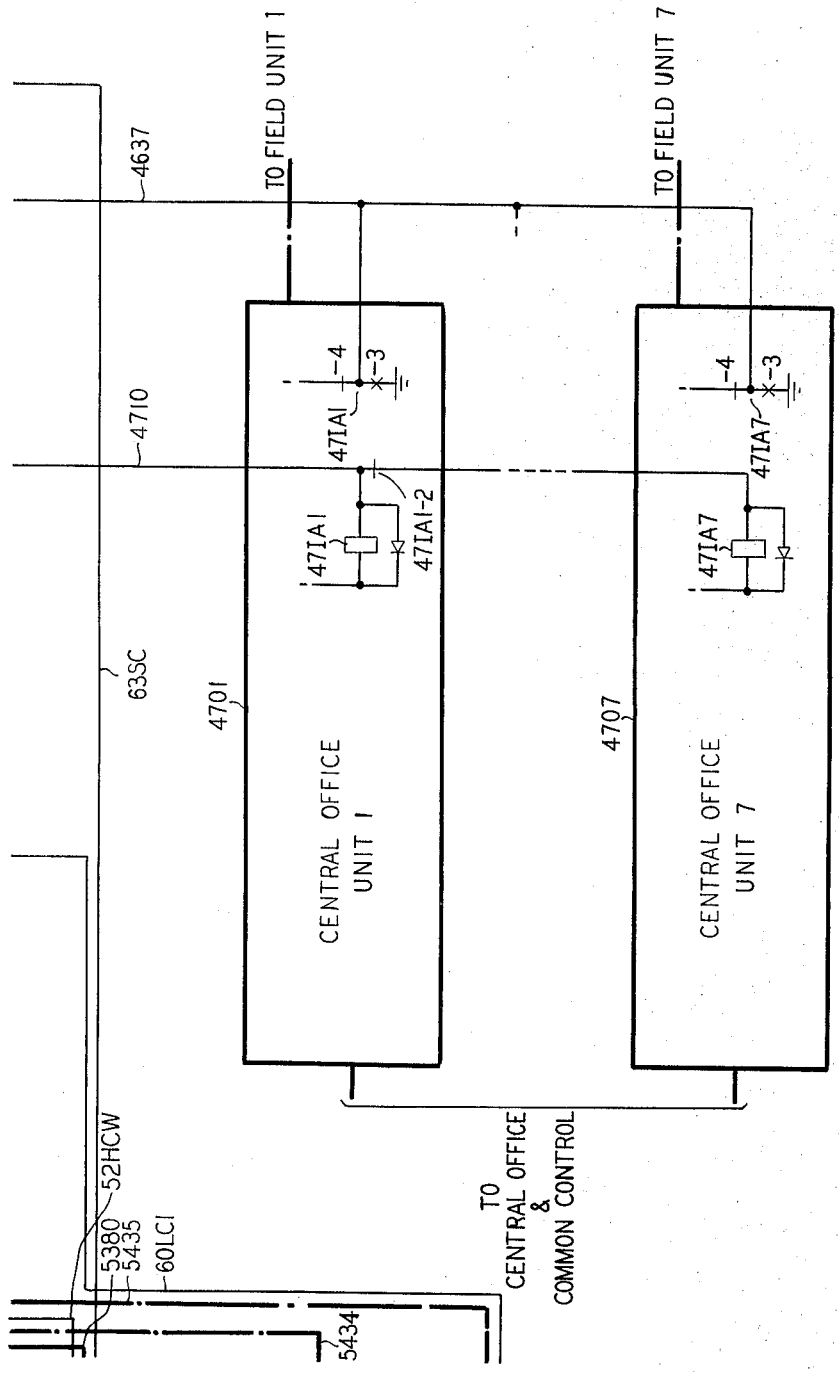

Referring to FIG. 47, each of the seven central office units shown symbolically is connected to its respective field unit, these connections being identical to the manner in which the central office unit and field unit disclosed in detail are connected to each other. Similarly each of these seven central office units is indicated as being connected to both the central office and the common control. The connections are similar to the connections of FIGS. 30–46 to the central office and common control. The eight individual central office units are connected to each other by only two conductors 4637 and 4710, the purpose of these connections to be described below.

Each central office unit is a switching device compressing 128 subscriber line circuits on to 20 trunks. Each of these 20 trunks comprises tip and ring conductors only. Although line and trunk switches A and B provide sleeve connections, trunk sleeves are not extended to the field unit. The switching plan of the central office unit is identical to that of the field, with six trunks individual to trunk switch A, six to trunk switch B, and eight common to both. Each line switch serves 64 subscriber line circuits.

Each central office unit must perform four sequences of operations as does each field unit. These include regular connections, trunk releases, local connections, and local connection releases. The connections established by any individual central office unit under the command of the common control may be summarized as being the same as those in the field unit where subscriber line circuits in the central office are analogous to subscribed lines in the field unit.

B. *Switching scheme of each central office unit*

Line switch A is shown in detail in FIGS. 30–33. Trunk switch A is shown in detail in FIGS. 34–37. Line and trunk switches B are shown symbolically in FIGS. 38 and 40, respectively. The line and trunk switches in both central office and field units are similar. The major difference is that the field switches are of the magnetic latching type. Once a hold magnet is operated in a field switch it remains operated until it is energized by current flowing in its winding in the opposite direction. For a hold magnet in the central office unit switches to remain operated, however, current must be continuously supplied to the hold magnet winding.

Each line switch serves 64 subscriber line circuits, each comprising a tip, ring, and sleeve. Each of the first eight horizontals of either line switch serves eight subscribers. Again, the twenty links are divided into four groups of five links each, and each pair of two lines in each horizontal can be connected only to the five links in a respective group. Thus each group of five links serves 16 lines as in the field unit. Horizontals 8 and 9 are steering levels as in the field unit.

The 128 line circuits in central office 3001 may be connected to each other by intra-office trunks. Crossbar switch 3010 is shown to illustrate symbolically the manner of establishing these connections.

Each of the trunk switches contains four groups of five links each, each link being connectable to any one of the 14 trunks in the same switch depending upon which one of the two steering level trunk switch select magnets and which one of the first seven trunk switch select magnets are operated. Again the two trunks controlled by trunk switch select magnet 7 in each trunk switch are connected to each other as in the field unit. The connection is different however, for it is not necessary to supply talking battery at the central office unit as it is at the field. In the central office it is only necessary to connect the two subscriber line circuits to each other in order to provide busy tone for incoming calls to either one of them. Supervision must be provided however, as in the field, to determine which of the two local trunks should be selected for each new local connection established. It will be seen that the resistors in the trunk switches at the field unit connected to the two local trunks are not included in the trunk switches of the central office unit. This is due to the fact that talking battery need not be supplied.

C. *Switching information required for central office unit operation*

Because the switching plan is the same for both central office and field units the information required by the central office unit for each of the four operations is essentially the same as that required by the field. This information is derived from the common control and individual central office unit, and for a local connection release from the field unit.

(1) REGULAR CONNECTION SWITCHING INFORMATION

The central office unit transmits scanning pulses of a positive or negative polarity depending upon which group of subscriber lines 0–63 or 64–127 is being scanned. The pulses advance a counter in each of the eight field units. When a service request originates at either the central office or field unit the common control thus has available the identity of the subscriber requiring service. As each subscriber is served by only one group of links, the central office unit need merely select the lowest numbered idle link in the group, and connect it to the line requiring service. The central office common control selects the particular trunk to be employed, and causes the central office unit to establish the connection and to transmit the trunk identity to the field unit. The common control operates only on that central office unit serving the subscriber requiring service. In a manner to be described below, the other seven central office units remain unaffected by control signals from the common control when the common control operates upon any one of the eight central office units.

(2) TRUNK RELEASE SWITCHING INFORMATION

The common control in the central office detects when a trunk must be released. The identity of the trunk is transmitted to the field unit, and as described above in Section II C2, due to the connection of the line and trunk switch hold magnets through the trunk switches to the sleeve of the identified trunk, identifying a trunk, in effect, identifies the line to which it is connected and the link establishing the connection as well. Similar remarks apply to the central office unit, and the identification of a particular trunk by the common control is all that is required to release the trunk, link, and line connections.

(3) LOCAL CONNECTION SWITCHING INFORMATION

As described in Section II C3 above, a local connection is established in the field unit by transmitting to it the identity of the two trunks connected to each other. Idenifying the two trunks in the field unit is sufficient not only to release the trunks but in addition to identify the two links connected to each other through these trunks, A local connection is then established. In a similar manner identifying the two trunks at the central office unit is all that is required to initiate the establishment of a local connection.

(4) LOCAL CONNECTION RELEASE SWITCHING INFORMATION

The remote unit detects the termination of a call by one or both of the two local subscribers. The central office need transmit no information to the field. Instead the field unit notifies the central office unit which of the two local trunks is to be released. Identifying a local trunk automatically results in the identification of the two lines connected to it due to the connection of the line and trunk switch hold magnet windings through the trunk switches to the trunk sleeves.

D. *Regular connection—Detailed Description of Central office unit and common control operations*

The astable multivibrator comprising transistors 65T0 and 65T1 oscillates at approximately 500 cycles per second. When transistor 65T1 conducts, the base of transistor 65T0, connected to the collector of transistor 65T1 is more positive than its emitter and transistor 65T0 remains off. Similarly when transistor 65T0 conducts transistor 65T1 remains off. The switching back and forth of the multivibrator is controlled by capacitors 6531 and 6519. With transistor 65T1 conducting capacitor 6531 charges until the junction of capacitor 6531 and resistors 6530 and 6532 is sufficiently negative in potential to forward bias the emitter-base junction of transistor 65T0. At this time transistor 65T0 conducts and transistor 65T1 turns off. Capacitor 6519 now charges, and when it has charged sufficiently to forward bias the emitter-base junction of transistor 65T1 the astable multivibrator changes state once again.

With transistor 65T0 active, 1500 microseconds are required to charge capacitor 6519 sufficiently to turn on transistor 65T1. It requires 500 microseconds to charge capacitor 6531 sufficiently when transistor 65T1 is conducting to again change the state of the astable multivibrator. The combined time of operation per cycle is thus 2000 microseconds and the multivibrator oscillates 500 times per second The astable multivibrator comprising transistors 65T0 and 65T1 controls the count stored in counter 6100. This counter, comprising stages 61STR, 61GP1 and 61GP2, and 61HOR1 through 61HOR3 identifies a particular line out of 64. The six stages of the binary counter can identify 2⁶ or 64 lines. To identify a particular line in either line switch it is necessary to select one of eight horizontals, one of four groups, and one of two steering levels. The state of stage 61STR identifies the steering level, stages 61GP1 and 61GP2 identify the group, and the last three stages of counter 6100 identify the horizontal. When a particular stage of counter 6100 is in the 0 state a positive potential appears at the 0 output of the stage and a negative potential at the 1 output. Similarly when in the 1 state, a positive potential appears at the 1 output and a negative potential at the 0 output.

Conductor 65AST1 connects the input of the first stage of the counter to the collector of transistor 65T1. Whenever transistor 65T1 turns on, a positive pulse appears at its collector and counter 6100 advances one count. Five hundred microseconds after transistor 65T1 turns on, it turns off, and transistor 65T0 turns on for 1500 microseconds. It is during this 1500 microseconds that lines are scanned. The counter is advanced by the turning on of transistor 65T1 prior to the scan controlled by the turning on of transistor 65T0.

Flip-flop 61A/B is similar to a stage of counter 6100. The count of the counter identifies one of 64 lines, and the state of flip-flop 61A/B identifies a particular one of the two groups of 64 lines each. When in the 0 state output 0 of the flip-flop is positive and output 1 is negative. Similarly when in the 1 state output 1 is positive and output 0 is negative. Positive pulses, when applied to conductor 61PR change the state of flip-flop 61A/B. These pulses are also transmitted to the reset terminals of each of the six stages of counter 6100 and reset all six of these stages to the 0 state.

The six stages of counter 6100 and flip-flop 61A/B control the scanning of a particular one of the 128 lines in each concentrator unit. The eight transistors 55TA0–55TB3 are normally nonconducting and only one of these transistors, under the control of flip-flop 61A/B and counter 6100, conducts at any one time. Each of these transistors identifies one of the four groups of links in a particular one of the pairs of switches A and B. It is also necessary to identify not only a particular one of the two pairs of switches and a particular group of links, but in addition a particular one of eight horizontals and one of the two steering levels in order to identify any given line. The 16 transistors 55TH80–55TH87 and 61TH90–61TH97 are normally nonconducting, and only one conducts at any given time under the control of counter 6100. When transistor 61TH94 conducts, for example, the line being scanned is in horizontal 4 and is connected to one of the five links serving it by the operation of line switch steering level select magnet 9. One of the eight transistors 55TA0–55TB3 and one of the sixteen transistors 55TH80–61TH97 conducting, together identify one of 8 x 16 or 128 lines.

Conductors 55A0–55B3 are normally negative in potential. When the respective transistor conducts however a more positive potential appears on each conductor. These conductors are extended by cable 5556 to central office unit 0. The common control controls the scanning of the same numbered line in each of the eight concentrators simultaneously. For this reason, conductors 55A0–55B3 are also extended to the other central office units as shown by the designation "to C.O.U. 1–7." Similar remarks apply to conductors 55H80–61H97 which are extended by cable 5557 to central office unit 0 and to the other central office units as well.

Figure 55:
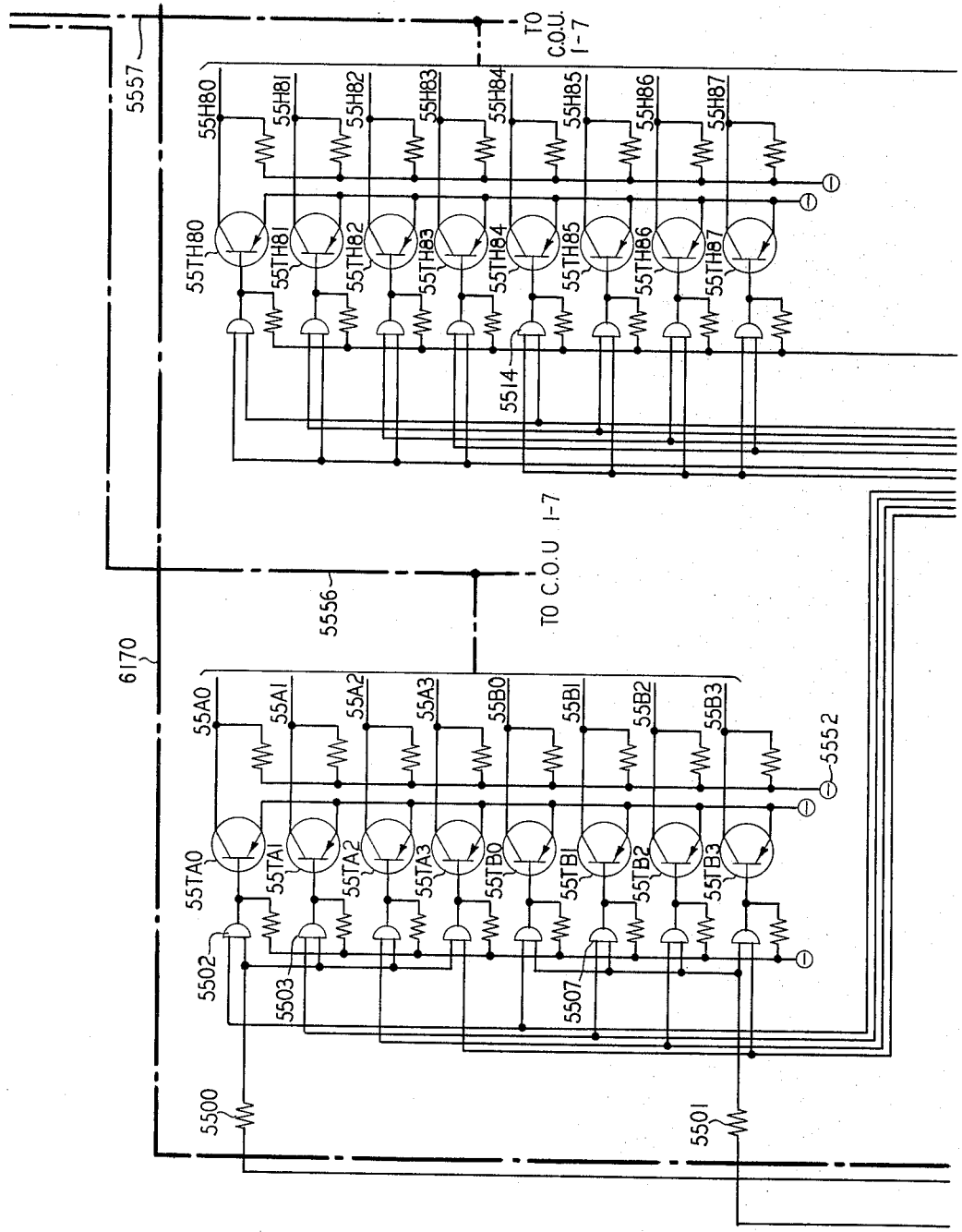
Figure 61:
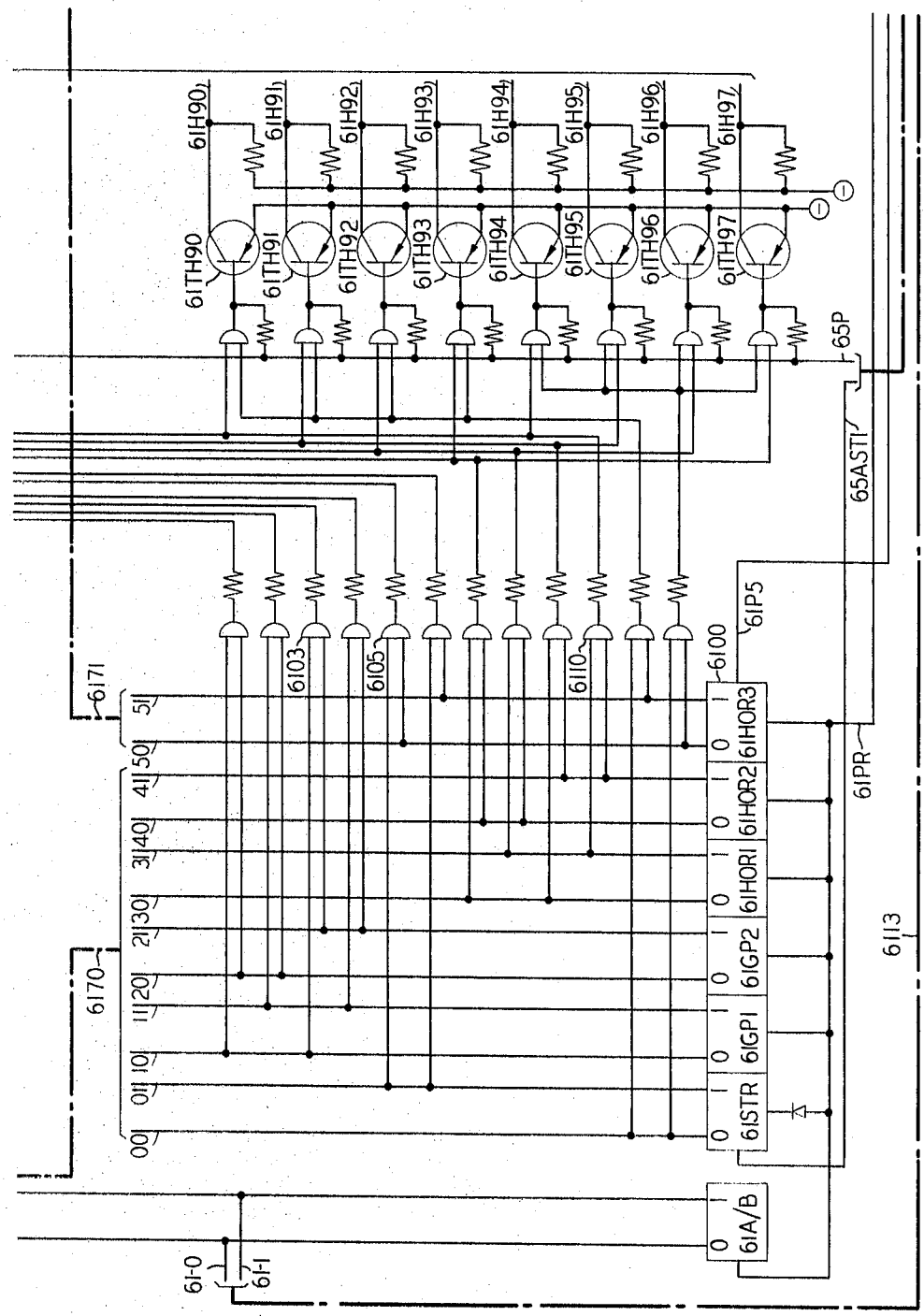

Particular pairs of transistors shown on FIGS. 55 and 61 are energized by means of AND gate circuits. All of the AND gates shown, such as gate 5502, are of the type whose output is positive in potential unless both of the applied inputs are negative in potential. A particular example will illustrate the control of the transistors by the counter stages, flip-flop 61A/B, and the AND gates. Consider that flip-flop 61A/B is in state 1 and the six stages of counter 6100 represent the binary number 010001. Negative potentials thus appear at the 0 outputs of flip-flop 61A/B and stages 61GP1 and 61HOR3. Negative potentials similarly appear at the 1 outputs of stages 61STR and 61GP2–61HOR2. All of the AND gates on FIG. 61 connected directly to the outputs of the stages of counter 6100, only AND gates 6103, 6105, and 6110 are energized. The outputs of these gates are thus negative. The output of gate 6103 is one input of AND gates 5507 and 5503. The other input of AND gate 5503 is connected through resistor 5500 to the 1 output of flip-flop 61A/B which is positive in potential. Thus AND gate 5503 does not operate. However, the other input of AND gate 5507 is connected through resistor 5501 to the 0 output of flip-flop 61A/B which is negative in potential. Transistor 55TB1 conducts and a positive pulse appears on conductor 55B1.

The outputs of AND gates 6105 and 6110 are both connected to respective inputs of AND gate 5514, and this AND gate is the only one of the AND gates associated with transistors 55TH80–61TH97 that is energized. Thus the only one of these transistors that conducts is transistor 55TH84 and a more positive potential appears on conductor 55H84.

The two conductors 55B1 and 55H84 identify a particular one of the 128 lines. The line is in switch B and is connectable to link group 1. The line is also in horizontal 4 and connectable to a link by the operation of steering level select magnet 8. This line corresponds to the line identified by flip-flop 61A/B and counter 6100. Flip-flop 61A/B, being in the 1 state, identifies the B switch. Stage 61STR, being in the 0 state identifies steering level 8. Stages 61GP1 and 61GP2, together forming the binary number 10, identify link group 1. And finally, stages 61HOR1–61HOR3, containing the binary number 001, identfy horizontal 4.

The sixteen transistors 55TH80–61TH97, although controlled by respective AND gates do not operate until a negative pulse is applied to conductor 65P. This conductor is connected by respective resistors to the base of each of these transistors, and the simultaneous application of a negative potential at the output of the respective AND gate and a negative pulse on conductor 65P is required to turn on a transistor. Conductor 65P is pulsed when the astable multivibrator changes state and transistor 65T0 conducts. It is during the 1500 microseconds of conduction of transistor 65T0 that the line identified by flip-flop 61A/B and counter 6100 is scanned. The scanning cycle initiates when transistor 65T0 turns on and causes transistor 65TP to be pulsed. This in turn energizes the selected one of transistors 55TH80–61TH97. When transistor 65T0 turns on a positive pulse appears at it collector. This positive pulse is transmitted through capacitor 6514 and resistor 6505 to the base of transistor 65TP. Transistor 65TP is normally nonconducting and the positive pulse at its base turns it on. The negative pulse now produced at the collector of transistor 65TP is applied to conductor 65P and turns on the particular selected one of transistor 55TH80–61TH97.

It should be noted that the six stages of counter 6100 correspond to the six stages of counter 2400 in the field unit. The first stage in each identifies the steering level, the next two the group, and the last three the horizontal. Thus the same line is scanned at both the field and central office units. Although counter 6100 is advanced when transistor 65T1 turns on, the line at the central office is not scanned until transistor 65T0 turns on and causes conductor 65P to be pulsed. This pulse also controls the transmission of a positive or negative polarity scanning pulse to the field unit. During scanning negative source 4507 is connected through contacts 46IA0–1 to the bases of transistors 45PA and 45BP. Transistor 45PA however does not conduct as long as there are idle trunks serving trunk switch A. Similarly, transistor 45PB does not conduct if there are idle trunks serving trunk switch B. The common control causes the central office unit to transmit scan pulses to the field unit the actual pulses, of either polarity, being developed by transistors 45PR and 45PT. If transistor 45PA is on, the base of transistor 45PT is greater in potential than the emitter and transistor 45PT cannot develop the scanning pulse on the tip of control pair 1 even when the common control attempts to energize it. Similarly, when transistor 45PB is on, the common control cannot energize transistor 45PR. The energization pulses are derived from the collector of transistor 65TP. When transistor 65T0 of the astable multivibrator turns on a negative pulse appears on conductor 65P'. This negative pulse is extended through cable 6262 to the basis of both transistors 45PR and 45PT. The negative pulse attempts to turn on both of these transistors. However, flip-flop 61A/B causes one of these transistors to be inhibited. Conductors 61–0 and 61–1, connected respectively to the 0 and 1 outputs of flip-flop 61A/B are extended through cables 6113 and 6262 to the collectors of respective transistors 45PB and 45PA. When flip-flop 61A/B is in the 0 state the positive potential on conductor 61–0 prevents transistor 45PR from turning on. As a result, the negative pulse on conductor 65P' causes only transistor 45PT to conduct. Similarly when flip-flop 61A/B is in the 1 state, the positive potential on conductor 61–1 applied to the base of transistor 45PT enables only transistor 45PR to conduct when the negative pulse is applied to conductor 65P'. When transistor 45PR conducts a positive pulse is applied at its collector. This pulse is transmitted by transformer 4532 and filter 4533 to conductors 45R1 and 45T1. These conductors are the ring and tip of the first control pair and are extended via cable 4550 to the field unit. The ring being positive with respect to the tip notifies the field that flip-flop 61A/B is in the 1 state and that lines in the B switch are being scanned.

Similarly when flip-flop 61A/B is in the 0 state transistor 45PT controls the transmission of a pulse to the field unit over the tip and ring conductors of control pair 1 with the tip positive in potential with respect to the ring. During scanning contacts 46TR1–1 and 46TR1–2 are closed and the pulses from the secondary of transformer 4532 are transmitted to the field.

The central office unit transmits scan pulses to the field unit only if it is possible to serve a line in the particular switch being scanned. If the common control is controlling the scanning of the lines in the A switches in all eight concentrator units it is apparent that if the 14 trunks serving the A switches in a particular concentrator are all busy service cannot be provided to another line in the switch. For this reason transistor 45PA is made to conduct if there are no trunks available to serve subscribers in line switch A, and transistor 45PB is made to conduct if there are no trunks available to serve subscribers in line switch B. The conduction of either one of these transistors inhibits the respective one of transistors 45PT or 45PR from operating.

Figure 35:
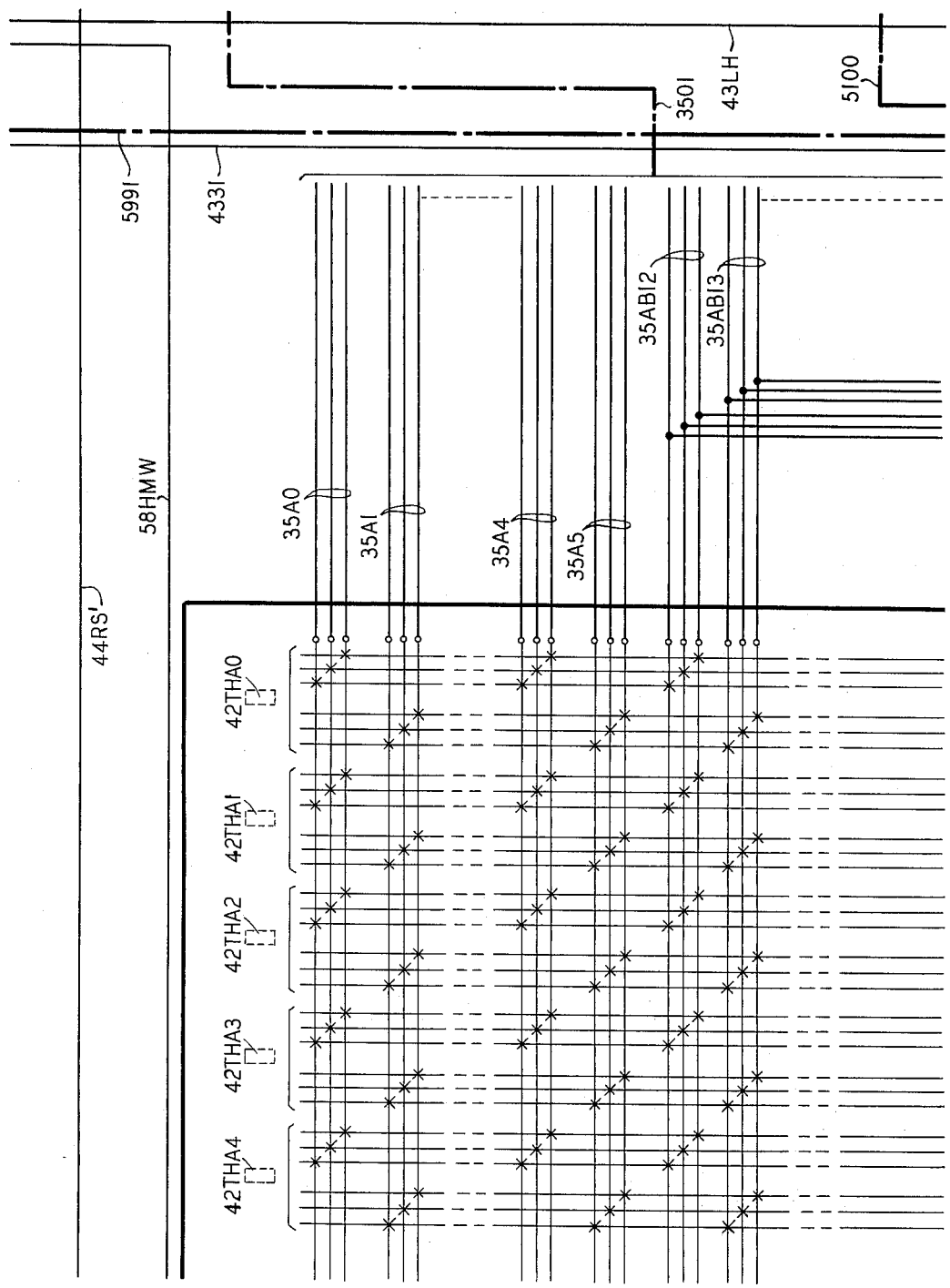
Figure 36:
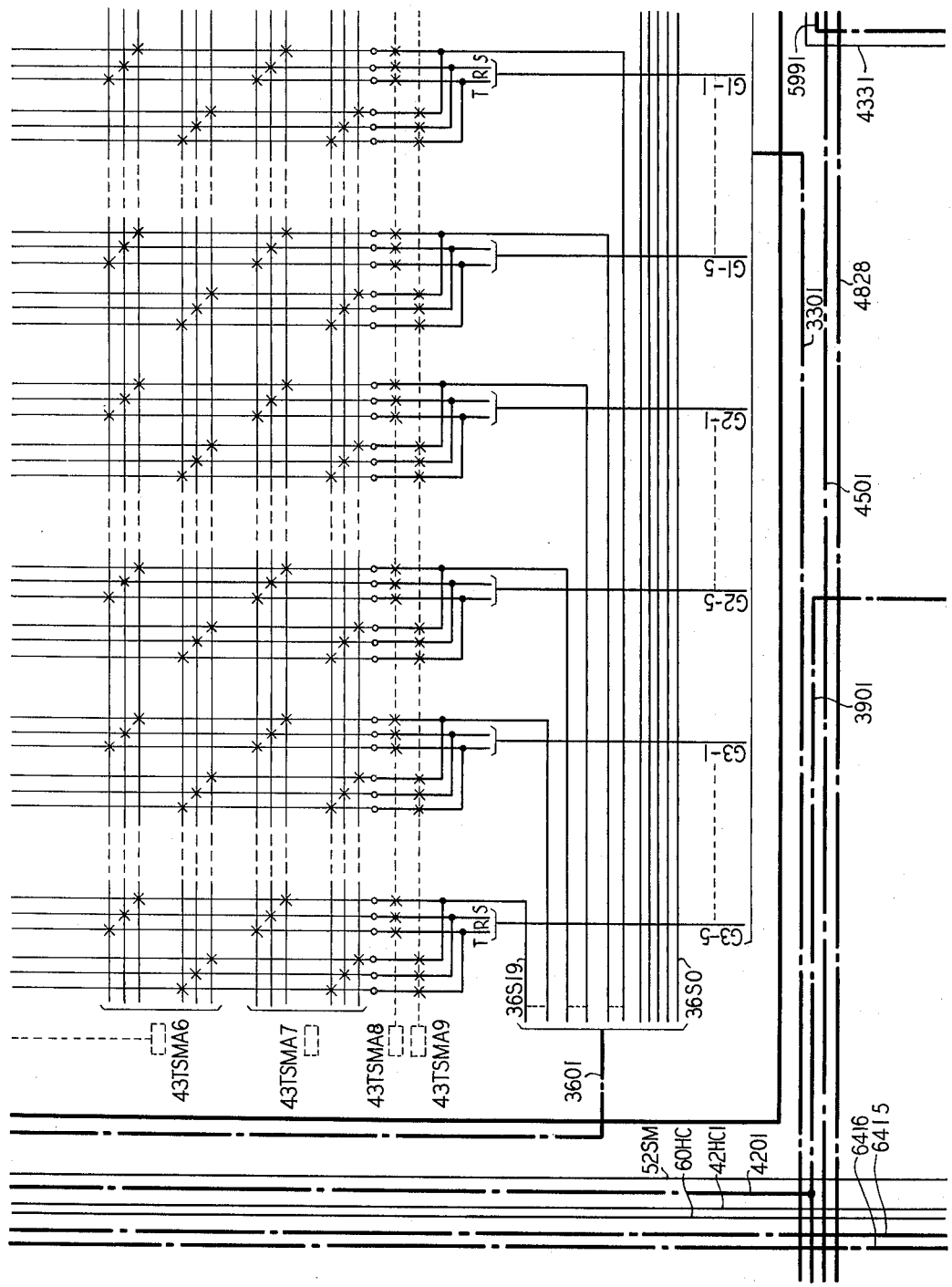
Figure 37:
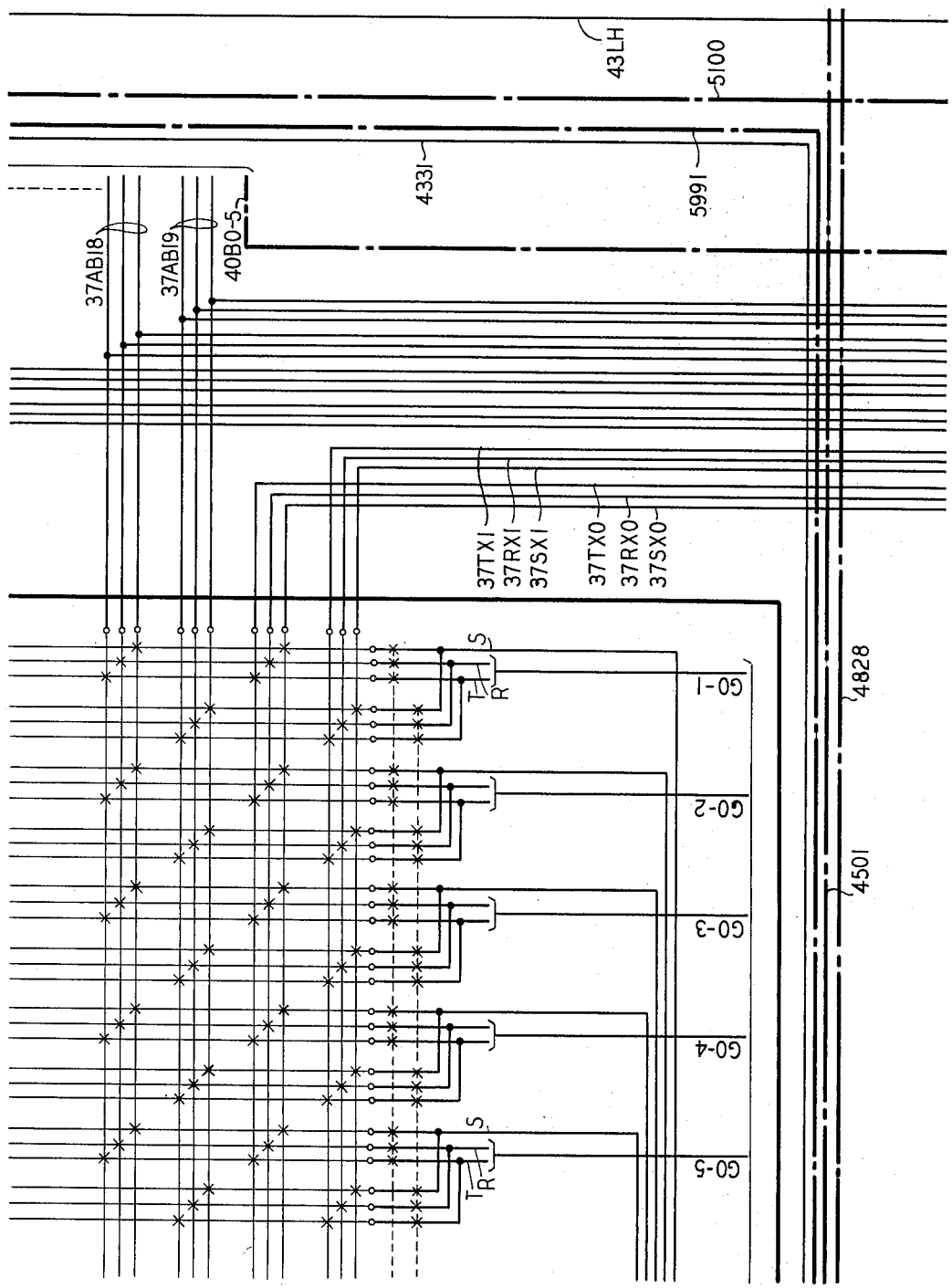
Figure 40:
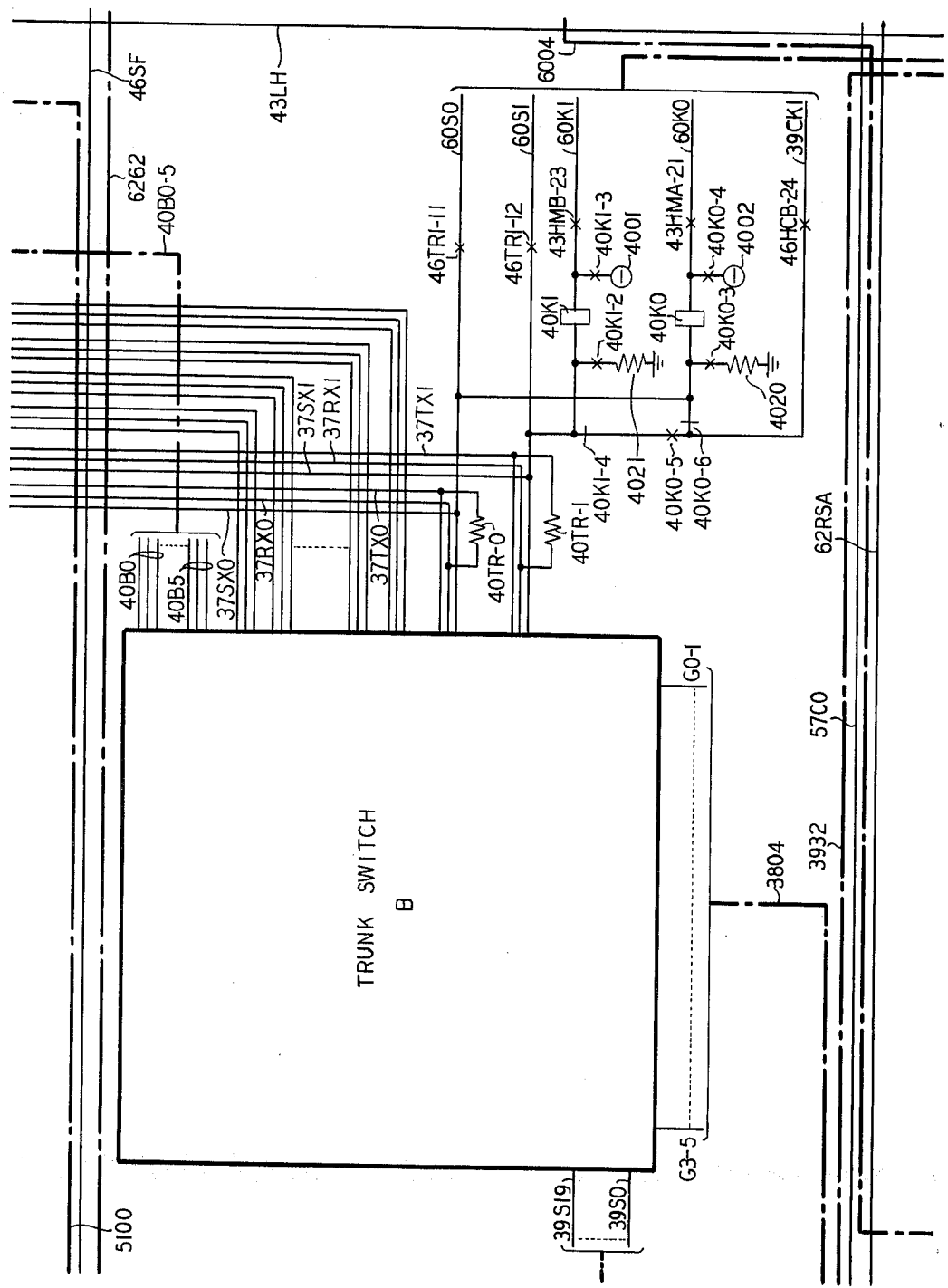

The twenty trunks entering the two trunk switches A and B are shown in FIGS. 35, 37, and 40. These twenty trunks, 35A0–35A5, 35AB12–37AB19, and 40B0–40B5, each contains tip, ring, and sleeve conductors. These conductors are extended via cable 3501 to FIG. 44. The tip and ring of each of the twenty trunks, identified by the designations 44A0–44AB19 are extended to the field unit via cable 4450. The sleeve of each of the trunks is connected through a respective resistor 4402 to ground and in addition to a respective one of conductors 44SA0–44SAB19.

Figure 45:
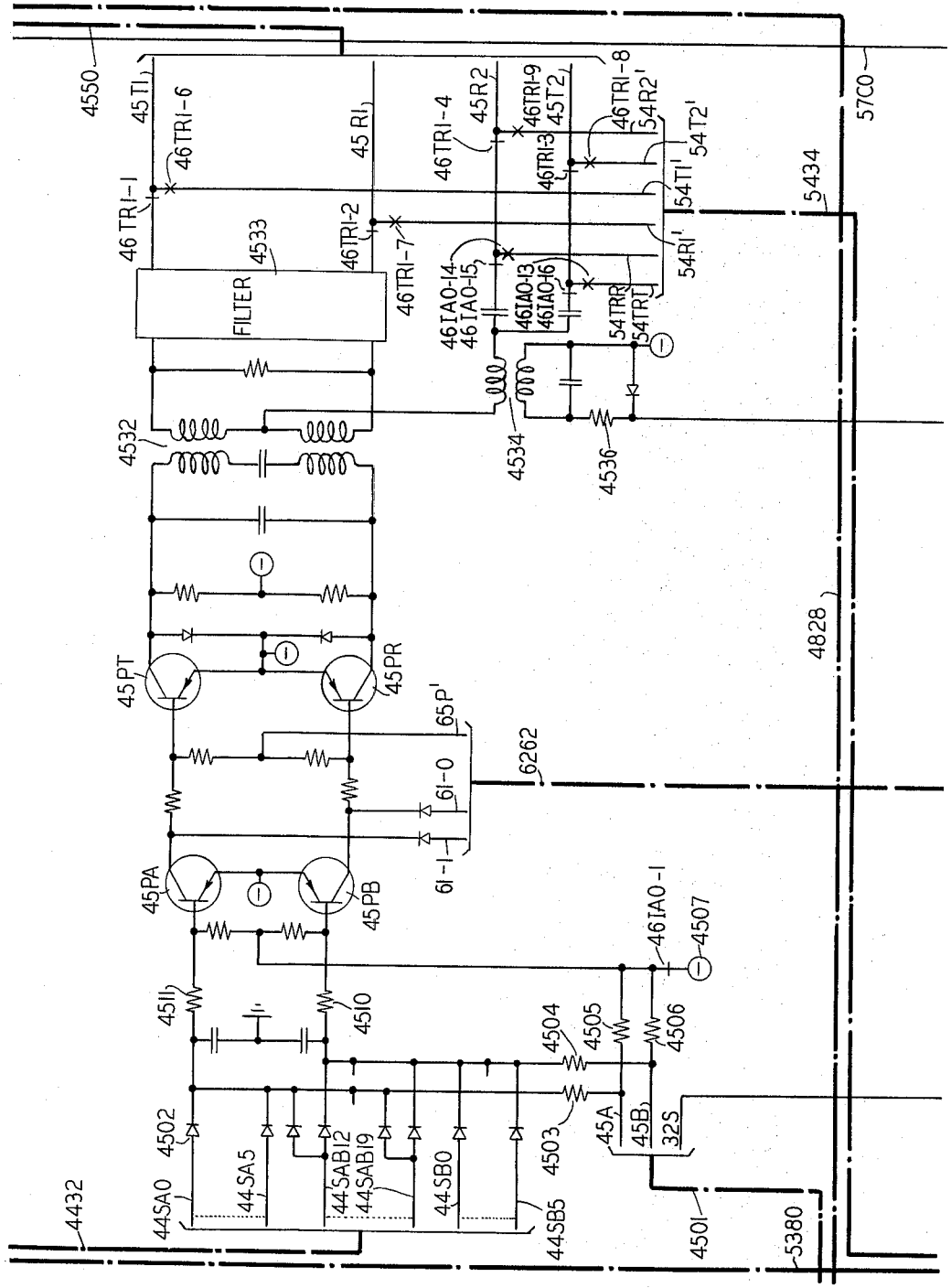

The twenty conductors, 44SA0–44SAB19 are extended via cable 4432 to FIG. 45. The fourteen of these conductors connected to sleeves of trunks serving trunk switch A, conductors 44SA0–44SA5 and 44SAB12–44SAB19, are all connected through respective diodes 4502 and resistor 4511 to the base of transistor 45PA. The fourteen of these conductors connected to sleeves of trunks serving trunk switch B, conductors 44SB0–44SB5 and 44SAB12–44SAB19, are all connected through respective diodes 4502 and resistor 4510 to the base of transistor 45PB.

When a trunk is in use a negative potential is applied to its sleeve as will be described below. If it is not in use, the sleeve is at ground potential, the ground coming through the respective one of resistors 4402. Thus, an idle trunk causes the associated diode or diodes 4502 to be forward biased, while a busy trunk produces a reverse bias. Although source 4507 attempts to forward bias both transistors 45PA and 45PB, each of these transistors is held nonconducting by a ground appearing through any one of the fourteen diodes connected to its base. If at least one trunk serving trunk switch A is idle, ground potential is extended through one or more of diodes 4502 and resistor 4511 to reverse bias the emitter-base junction of transistor 45PA. Similarly, if at least one trunk serving trunk switch B is idle, transistor 45PB is held off. When these two transistors do not conduct, scanning pulses are transmitted by either transistor 45PR or 45PT depending upon the state of flip-flop 61A/B.

On the other hand, if all fourteen trunks serving trunk switch A are busy, transistor 45PA conducts and prevents transistor 45PT from pulsing when conductor 65P' is energized even if flip-flop 61A/B is in the 0 state. Scanning pulses are thus not transmitted to the field unit if it is impossible to provide service. Similar remarks apply to transistors 45PB and 45PR and the fourteen trunks serving trunk switch B.

If all the trunks serving one of the two trunk switches are busy, counter 2400 in the particular field unit is not advanced as no scanning pulses are transmitted. Counter 6100, on the other hand, in the common control is advanced by the pulses appearing on conductor 65AST1, as lines served by the other seven concentrator units can be served and are still scanned for service requests. The two counters are thus out of synchronism. However, this has no effect on the circuit as no regular connections may be set up. The field unit cannot transmit the simplex service request pulse to the central office unit because the field unit is not told to scan any lines as the scan pulses are not originally transmitted from the central office unit. And the central office unit is likewise controlled not to recognize service requests by lines served by a trunk switch, all of whose fourteen trunks are busy. If at least one trunk in trunk switch A is idle, ground potential is extended through resistor 4503 to conductor 45A. Similarly, if at least one trunk in trunk switch B is idle, ground potential is extended through resistor 4504 to conductor 45B. On the other hand, if all trunks in either trunk switch are busy, the negative potential of source 4507 is extended through resistors 4505 or 4506 or both to respective conductors 45A and 45B. A negative potential on conductor 45A will be seen below to prevent the recognition of service requests by line circuits 0–63, served by trunk switch A. Similar remarks apply to conductor 45B, line circuits 64–127, and trunk switch B.

Counter 6100 and counter 2400 in a particular field unit are out of synchronism when all fourteen trunks serving a particular 64 lines are busy. When one of the trunks becomes idle scan pulses are once again transmitted to the field unit and scanning is no longer inhibited at the central office unit. It is now necessary to resynchronize the counters to each other. Were this not so, the two end units would treat a service request as originating from two different lines. It is thus necessary to resynchronize the counters when one of the previously fourteen busy trunks becomes idle. In the illustrative embodiment of the invention trunks must be released by the two end units as trunks do not release automatically when one or both parties hang up. As a consequence, a trunk cannot become idle unless a regular connection release or a local connection sequence has been performed at both end units. And, as described above, after either of these operations, both counters reset to zero. They are thus synchronized to each other when line scanning resumes.

Figure 65:
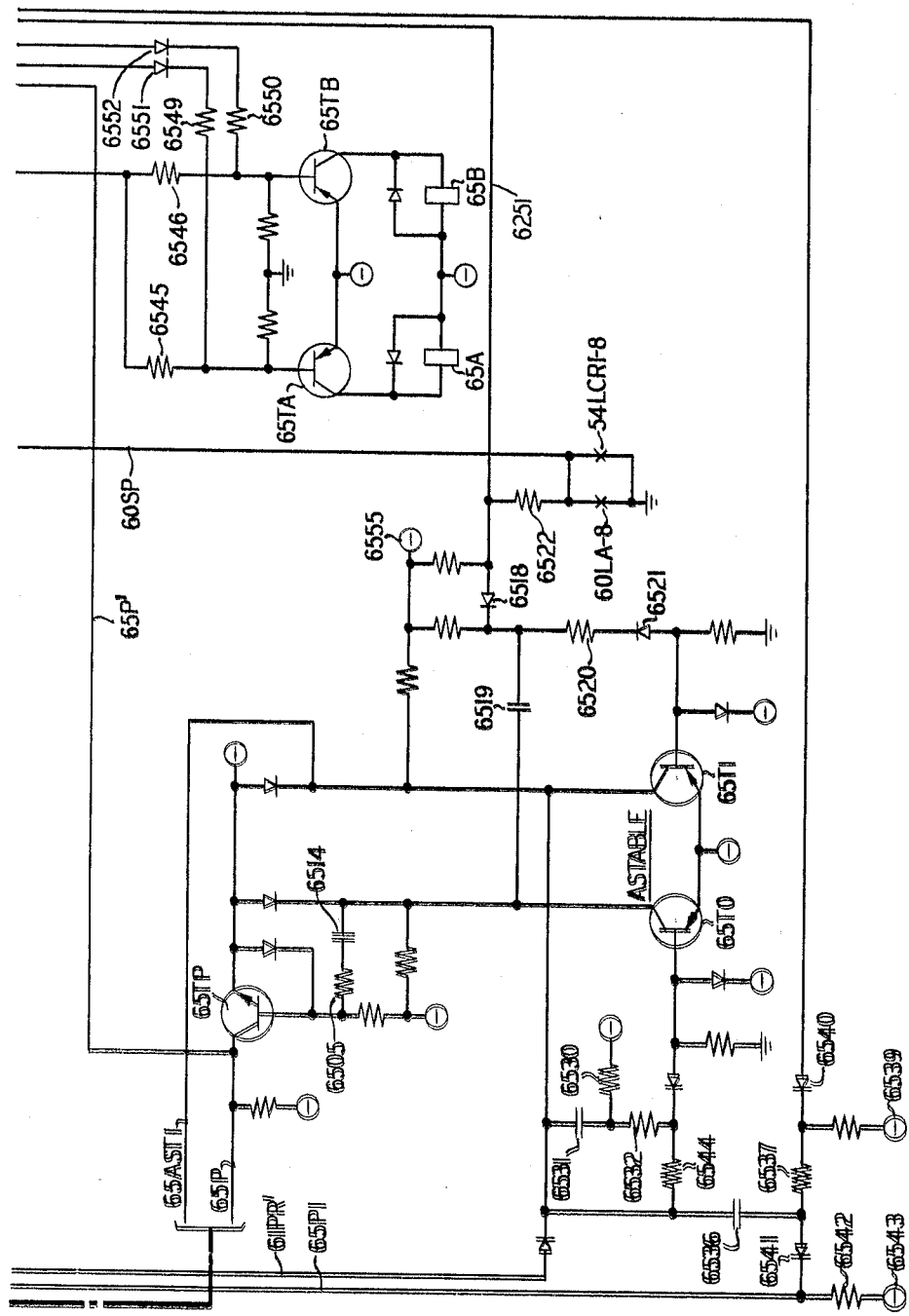

Scanning initiates when the astable multivibrator on FIG. 65 changes state, transistor 65T0 conducts, and conductors 65P and 65P' are pulsed. The pulse on conductor 65P' controls the transmission of a scan pulse to the field unit. The pulse on conductor 65P controls the scanning at the eight central office units. One of the sixteen transistors 55TH80–61TH97 conducts when conductor 65P is pulsed. One of transistors 55TA0–55TB3 is conducting at this time, these transistors being controlled directly by flip-flop 61A/B and counter 6100.

Figure 38:
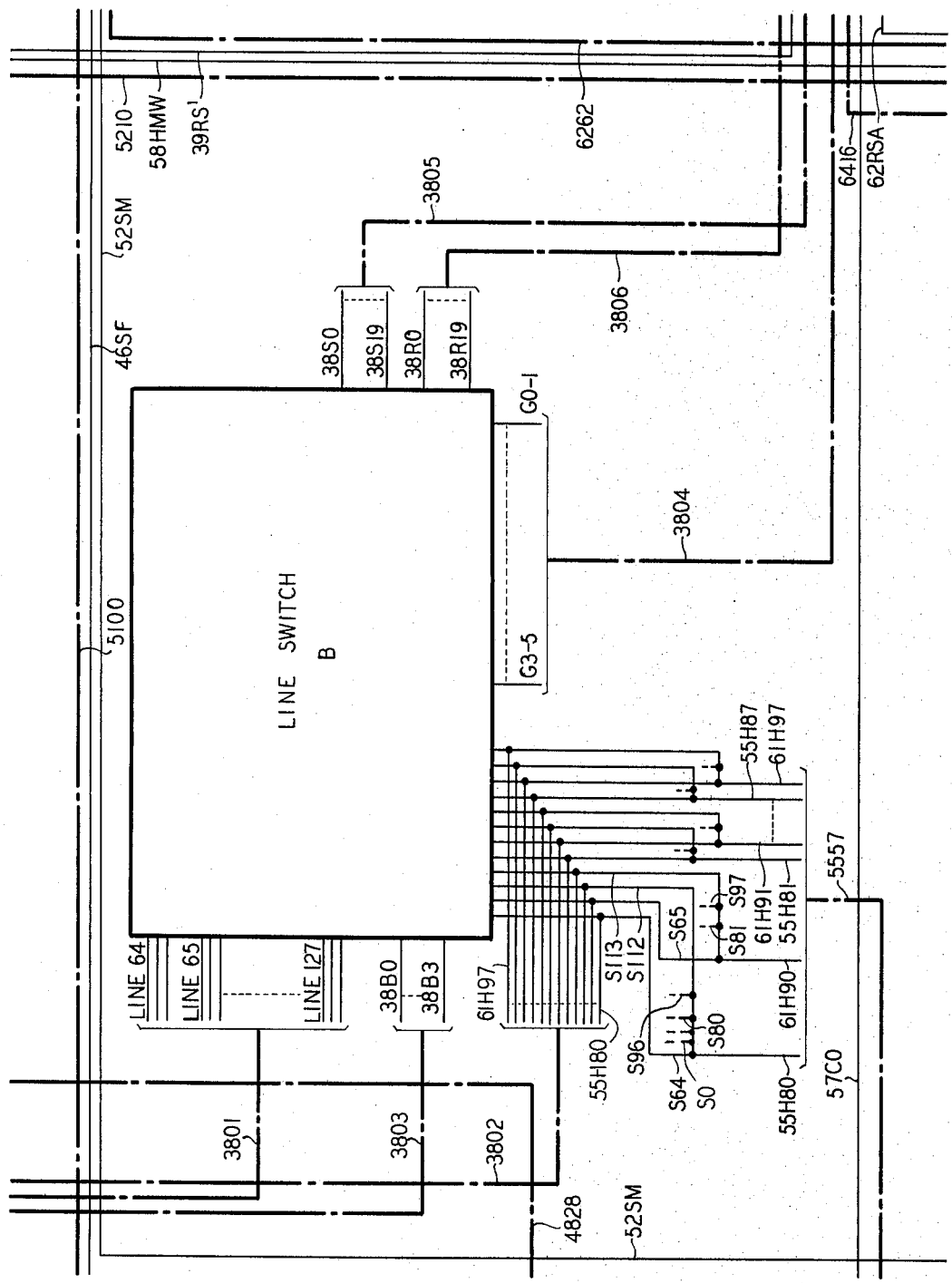

The sixteen conductors 55H80–61H97 are extended via cable 5557 to FIG. 38. Each of these sixteen conductors is connected to sleeves of four lines in line switch B. Each of these sixteen conductors is additionally connected to four of the sixty-four conductors comprising cable 3802, each of these conductors being connected to the sleeve of a line in line switch A. For example, conductor 55H80 is connected to the four lines in line switch A and the four lines in line switch B, all eight of which are in a zero horizontal and controlled by steering level 8. Conductor 55H80 is thus connected to sleeves S0, S16, S32, S48, S64, S80, S96 and S112. As seen in line switch A, the sleeve of each line is connected to a respective resistor 3201 and to a respective diode 3202. Similar remarks apply to line switch B. The positive pulse on any one of the sixteen conductors 55H80–61H97 is transmitted through four of capacitors 3203 and four analogous capacitors in line switch B to four of diodes 3202 and four analogous diodes in line switch B. Thus, the scanning pulse is applied to the anodes of eight of the 128 diodes connected to the sleeves of the lines.

The 128 diodes are multipled to eight conductors. Conductor 32A0 is connected to the sixteen diodes in line switch A which are connected to the sleeves of lines served by line group 0. Similar remarks apply to conductors 32A1–32A3, of which only conductor 32A3 is shown in the drawing. Similarly, the sixty-four diodes in line switch B are coupled to the four conductors 38B0–38B3 which are extended to FIG. 32 via cable 3803.

The energization of one of conductors 55H80–61H97 applies a pulse to eight of the 128 diodes in the line switches, each of these diodes being connected to a line served by a different group of links. Thus, each of the eight conductors 32A0–38B3 is connected to one diode to which the pulse is applied. For a particular line to be scanned, it is necessary to select one of these eight conductors. This final step is obtained by the positive potential appearing on one of conductors 55A0–55B3. Diodes 3206 are normally reverse biased. That one of conductors 55A0–55B3 having a positive potential causes the associated one of diodes 3206 to be less reverse biased. Diodes 3207 are in parallel with their respective resistors in order that one of respective capacitors 3299 be rapidly conditioned by the positive potential appearing on the respective one of conductors 55A0–55B3. When the positive potential is removed, the respective capacitor discharges through the resistor connected in parallel with its respective diode 3207.

If the particular line being scanned does not desire service a negative potential appears on the sleeve. If the line does require service ground potential is applied instead. The central office supplies these potentials and the particular type of central office with which the line concentrator of the invention is utilized does not affect the latter's operation provided the central office applies these two potentials to the sleeve of the line for the two respective conditions. The central office 3001 is shown symbolically only as are the means for applying the potentials to the sleeve leads. Switch 3003 is connected to either ground potential or negative source 3002. Line 0 is shown extended to the central office. Cables 3006 and 3801 extend the other 127 lines to the office where similar ground potentials are applied to the sleeve leads to indicate service requests.

When a particular line circuit does not desire service the sleeve is negative in potential and the associated one of diodes 3202 or the analogous diodes in line switch B is reverse biased. The positive pulse on a particular one of conductors 55H80–61H97 is not transmitted through the diode. If the line does desire service and the sleeve is thus grounded, the positive pulse is transmitted through the diode and through one of diodes 3206 to conductor 32S. A pulse on conductor 32S indicates that the line whose identity is stored in flip-flop 61A/B and counter 6100 desires service, the service request originating at the central office unit.

A particular example will illustrate the scanning circuit. Consider flip-flop 61A/B to be in the 0 state and counter 6100 to contain the binary number 011000. The line being scanned is thus in the A switch, served by steering level 8 and link group 3, and is in horizontal 0. Line 47 is this line. Of conductors 55A0–55B3, all are at the negative potential of source 5552 except conductor 55A3 which is more positive in potential. Accordingly, of the eight diodes 3206 only that one connected to conductor 32A3 is forward biased. When conductor 65P is pulsed a positive pulse appears on conductor 55H80. If at this time the diode 3202 connected to the sleeve of line 47 is forward biased, the positive pulse on conductor 55H80 is transmitted through this diode and through the selected one of diodes 3206 to conductor 32S. If, on the other hand, the line does not desire service and the diode connected to the sleeve of line 47 is reverse biased, the positive pulse of conductor 55H80 is not transmitted to conductor 32S.

In the absence of a service request by either end unit, scanning proceeds in the normal manner. It is only when the positive pulse appears on conductor 32S or a simplex pulse is received from the field unit that the regular connection sequence is initiated.

It has already been described in this section that if all 14 trunks serving the particular 64 lines being scanned are busy, scan pulses are not transmitted to the field unit as it is impossible to provide service to a line requesting it at this time. In this way, lines at the field unit are not scanned if they cannot be provided with service. Line scanning is also inhibited in the central office unit in such a case as explained above. Conductor 45A is positive in potential unless all of the trunks serving line switch A are busy. Similarly, conductor 45B is positive in potential unless all 14 trunks serving line switch B are busy. Conductors 45A and 45B are extended by cable 4501 to FIG. 32. Conductor 45A is connected through four of diodes 3208 to the four conductors 32A0–32A3. Conductor 45B is connected through the other four of these diodes to conductors 38B0–38B3. If at least one trunk of those serving line switch A is idle, conductor 45A is positive in potential and the four diodes 3208 to which it is connected are reverse biased. The scanning circuit is unaffected. However, if all 14 trunks are busy conductor 45A is negative in potential and this potential is extended through the four diodes to conductors 32A0–32A3. The four diodes 3206 connected to these conductors are reverse biased and even if pulses are transmitted through diodes 3202 to conductors 32A0–32A3 the four diodes 3206 connected to these conductors do not pass the pulses to conductor 32S. Similar remarks apply to conductor 45B and the scanning circuit for line switch B. In this manner a service request pulse on conductor 32S is inhibited if it is impossible to provide the line with service.

In order for a line to be provided with service it is not only necessary that one of the 14 trunks serving it be available but, in addition, that one of the five links serving the line be free as well. As described above, scanning in the field unit of those lines served by a link group all of whose links are busy is inhibited. The central office unit likewise inhibits scanning of those lines for which service cannot be provided due to the unavailability of a link in the particular group serving the line. As seen on FIG. 32, if conductor 42GBA0 is negative in potential the respective one of the diodes 3206 is reverse biased in the same manner as it is when a negative potential is applied to conductor 45A. A negative potential on conductor 42GBA0 thus inhibits scanning of a line whose sleeve is connected to conductor 32A0. As conductor 32A0 is connected to the sleeves of all lines served by link group 0 of line switch A it is seen that a negative potential on conductor 42GBA0 inhibits scanning of lines in this group. Similar remarks apply to conductors 42GBA1–39GBB3, there being eight of these conductors in all, one for each of the four link groups in each switch.

A negative potential is applied to any one of these eight conductors when all five links in the associated group are busy. The circuit for deriving this potential is similar to that of the field unit. Conductors 42GBA0–39GBB3 are extended through cables 3901 and 4201 to the hold magnet circuits of both trunk switches. The four conductors 42GBA0–42GBA3 are extended to the hold magnet circuit for trunk switch A and the four conductors 39GBB0–39GBB3 are extended to the hold magnet circuit for trunk switch B. Negative source 4204 is connected through respective resistors 4205 and the normally open contacts 42THA0–1 through 42THA19–1 to these conductors. Trunk switch A hold magnets 42THA0–42THA4 control the contacts in series with conductor 42GBA0. If all five of these trunk switch hold magnets are operated, indicating that the five links in group 0 are in use, the negative potential of source 4204 is extended to conductor 42GBA0 and inhibits the line scanning circuit. Similar remarks apply to the five sets of normally opened contacts in each of the remaining seven conductors 42GBA1–42GBA3 and 39GBB0–39GBB3.

A pulse on conductor 32S indicates a service request. In the event that no service request is indicated, counter 6100 continues to cycle and scan lines in alternate switches. When counter 61HOR3 returns to its 0 state, indicating that the count stored in counter 6100 has just changed from 63 to 0, a positive pulse is produced on conductor 61P5. Transistors 62T5 and 62T6 form a monostable multivibrator. Transistor 62T5 is normally conducting and the positive potential at its collector, coupled to the base of transistor 62T6 through resistor 6236 maintains this transistor nonconducting. The positive pulse on conductor 61P5 is transmitted through capacitor 6237 and diode 6238 to the base of transistor 62T5 which turns off. Transistor 62T6 now conducts and applies a positive pulse through capacitor 6225 to the base of transistor 62T5 which maintains this transistor nonconducting. The monostable multivibrator is maintained in its unstable state until capacitor 6225 charges sufficiently from the collector current of transistor 62T6. At this time the base of transistor 62T5 is once again sufficiently negative in potential, this negative potential being derived from source 6228, to forward bias the emitter-base junction of the transistor, and the monostable multivibrator switches to its stable state. The monostable multivibrator stays in the unstable state for five milliseconds. When it is first switched to the unstable state the collector of transistor 62T6 increases in potential. This positive potential holds off transistors 65TA and 65TB in order that a local connection release request from a field unit be recognized. This positive potential is also extended along conductor 61PR to reset the six stages of counter 6100 and to change the state of flip-flop 61A/B. The six stages of counter 6100 are already reset at this time and the reset pulse on conductor 61PR further insures that the stages are reset to the initially zero count. Flip-flop 61A/B is switched in order that the other group of lines may now be scanned.

It will be recalled that scanning is inhibited for five milliseconds after each group of 64 scans in order that the counter at the field unit reset. The astable multivibrator is inhibited for the duration of the unstable operation of the monostable multivibrator. After the 1500 microseconds of conduction of transistor 65T0, during the 64th scan, the astable multivibrator switches state and transistor 65T1 conducts. This transistor, in turning on, pulses conductor 65AST1 which advances counter 6100 to the initial zero count which thus triggers the monostable multivibrator. Transistor 65T1 is now held on by the monostable multivibrator for five milliseconds rather than its normal 500 microseconds. The positive potential on conductor 61PR is also extended along conductor 61PR' and through resistors 6544 and 6532 to capacitor 6531. Capacitor 6531 is thus not permitted to charge and the astable multivibrator does not change state. After the five milliseconds of unstable state operation of the monostable multivibrator the positive potential is removed from conductor 61PR', transistor 65T0 turns on, and the first line in the next group is scanned.

All eight concentrators scan their respective 128 lines simultaneously under the influence of the common control. The same numbered line in each concentrator is scanned at the same time. The service request originating in any central office unit results in a positive pulse appearing on conductor 32S or the analogous conductor in one of the other seven concentrators. This pulse must ready the particular central office and field units involved to establish the connection. The pulse must also notify the common control to initiate the regular connection sequence. The common control operates on each of the eight central office units. In order that only the subscriber line and line circuit in central office and field units 0 be connected to a trunk, the pulse on conductor 32S enables these units to respond to common control signals, and at the same time disables the other seven central office units from responding to the same common control signals. Similar remarks apply to the pulses on the other seven conductors, in the seven other units, analogous to conductor 32S.

The pulse on conductor 32S is extended through cable 4501 and capacitor 4614 to the base of transistor 46T0. Transistors 46T0 and 46T1 comprise the service action bistable multivibrator. Transistor 46T0 is normally conducting and transistor 46T1 is held off. The positive pulse of conductor 32S, applied to the base of transistor 46T0 turns this transistor off and causes transistor 46T1 to conduct. Current flows through the collector of transistor 46T1 which becomes more positive in potential. Current thus flows through the winding of relay 46IA0, the current flowing from the collector of transistor 46T1, through the relay winding, to negative source 4634. It is this relay that enables central office unit 0 to respond to further commands from the common control.

Source 4634 is the operating potential for not only relay 46IA0 but for the seven analogous relays in the seven other central office units as well. Conductor 4710 connects the source to the other seven relays 47IA1–47IA7. Conductor 4637 is the second conductor common to all eight central office units. When the "IA" relay in any one of the eight central office units energizes it is necessary to disable the other seven central office units. This is accomplished by insuring that the service action bistable multivibrators in the other seven units cannot change state, that is, by insuring that they remain in the reset condition with the transistors analogous to transistor 46T0 conducting. If, for example, central office unit 1 requires service, relay 47IA1 operates, contacts 47IA1–3 close, and conductor 4637 is connected to ground potential. Ground potential is thus applied through contacts 46IA0–4 and diode 4633 to the base of transistor 46T1 which thus remains off. Similarly, in the six other central office units 2–7 the transistors analogous to transistor 46T1 are held off by the ground potential on conductor 4637. Only in central office unit 1, where contacts 47IA1–4 are opened is the ground potential not applied to the service action bistable multivibrator which remains in the 1 state indicating a service request, the multivibrator having been switched by the service request pulse on the conductor analogous to conductor 32S. In this manner, whichever central office unit has its "T1" transistor in the service action bistable multivibrator conducting causes the other seven service action bistable multivibrators to have their "T0" transistors conducting.

It is the circuitry associated with conductor 4637 that holds the other service action bistable multivibrators in the reset state once one of them has been set by a service request pulse. However, this circuitry would not preclude two of the "IA" relays from operating simultaneously with the two associated service action bistable multivibrators both being set as a result. This would result if both of these "IA" relays would open their –4 contacts; the ground on conductor 4637 would not be applied to the bases of two "T1" transistors. In the illustrative embodiment of the invention only one of the eight concentrator units is operated upon by the common control at a time. Thus even if two units desire service only one is given it. This is necessary for, although the same numbered lines in two units may desire service, depending on the previous conditions of these concentrator units, different links and trunks might be selected for the present call. The common control equipment determines this selection and can make only one selection at a given time. As a result, service must be provided to only one unit at a time. It is conductor 4710 and the associated circuitry that permits only one "IA" relay to operate even though two or more service requests might be obtained at the same time. All of the service request pulses set the respective service action bistable multivibrators. All of the associated "IA" relays attempt to operate. However, only the uppermost "IA" relay whose –2 contacts open remains operated. If relay 46IA0 operates it is seen that contacts 46IA0–2 open and as a result the operating potential 4634 is disconnected from the windings of the other seven "IA" relays which are prevented from operating. Contacts 46IA0–3, in closing, cause ground potential to be applied to the "T1" transistors in the other seven service action bistable multivibrators and those of these seven that have set due to the application of service request pulses reset to the normal condition and are held there for the duration of the regular connection sequence. If, on the other hand, contacts 47IA1–2 open and 46IA0–2 do not, they prevent the "IA" relays in units 2–7 from operating. If service request pulses are obtained in both units 0 and 1 relay 46IA0 cuts off the operating potential from the winding of relay 47IA1. This is true even if relay 47IA1 operates first unless, of course, relay 47IA1 is so must faster than 46IA0 that the service action bistable multivibrator in unit 0 is reset even before relay 46IA0 has operated. Similar remarks apply to the other "IA" relays. It is unimportant which of the units desiring service receives it first. During the next scan the other units desiring service will again provide service request pulses on conductor 32S or the analogous conductors in the other units. At this time another unit will be served. It is only necessary to insure that only one service action bistable multivibrator is set at any one time in order that only one unit will be served by the common control during any switching sequence. The circuitry associated with conductors 4637 and 4710 produces this result.

The positive potential at the collector of transistor 46T1 is also applied to conductor 46SF. This potential notifies the common control that a regular connection is to be established. The potential is extended from conductor 46SF along conductor 4820, and through resistors 6331 and 6330 to the base of transistor 63L0. Transistor 63L0 thus conducts and remains on as long as the service action bistable multivibrator is in the set condition, the 1 state.

It is also necessary to hold the astable multivibrator with transistor 65T0 conducting as further scanning must be inhibited until the connection is established. The positive potential on conductor 4820 is extended through diode 6333, conductors 6302 and 6251, and diode 6518 to the junction of capacitor 6519 and resistor 6520. Capacitor 6519 is thus prevented from charging from the collector current of transistor 65T0 to that point where diode 6521 becomes forward biased and transistor 65T1 conducts. As a result transistor 65T0 remains conducting until the service action bistable multivibrator resets at the termination of the regular connection. With the astable multivibrator inhibited from further operation the count stored in counter 6100 remains unchanged, and the identity of the line desiring service is preserved for the duration of the regular connection sequence.

In addition to notifying the common control of a service request, it is also necessary to notify the field unit that a connection is to be established. When transistor 46T0 turns off transistor 46FA conducts. This transistor is normally held off by the positive potential on the collector of transistor 46T0 being extended through diode 4623 and resistor 4605 to the base of transistor 46FA. When transistor 46T0 turns off, however, diode 4623 is reverse biased and the negative potential of source 4603 is extended through resistors 4604 and 4605 to the base of transistor 46FA thus causing it to conduct. A positive pulse is derived at the collector of transistor 46FA, current flowing from the collector through resistor 4536 and the primary winding of transformer 4534. Current is thus induced in the secondary of this transformer, this current flowing through both coils of the secondary of transformer 4532. A simplex pulse is transmitted through filter 4533 along the tip and ring conductors of control pair 1 to the field unit where it notifies the field unit of the service request.

If, on the other hand, the service request originates at the field unit, the positive simplex pulse is transmitted in the opposite direction. Again a positive potential appears across the primary of transformer 4534. This potential is transmitted through resistor 4536, diode 4607, capacitor 4611, and resistor 4612 to the base of transistor 46T0. Transistor 46T0 turns off and the service action bistable multivibrator is set. Again, relay 46IA0 operates and a positive potential is applied to conductor 46SF. The central office unit and common control are notified of the service request and prepare for a regular connection sequence in the same manner as they do when the service request pulse appears on conductor 32S and is applied to the base of transistor 46T0.

The double simplex arrangement, wherein the tip and ring conductors of both control pairs are connected to each other through the secondary windings of transformers 4534 and 4532, is used to mitigate the effect of any 60-cycle A.C. voltage induced in the control conductors, and also to cancel the effect of any differences in ground potential between the field and central office units.

With transistor 63L0 conducting, current flows from ground and through resistor 6325 to the collector of the transistor. The collector is thus negative in potential and this potential is extended through resistor 6247 and respective resistors 6545 and 6546 to the bases of transistors 65TA and 65TB. If flip-flop 61A/B is in the 0 state, indicating that the line desiring service is in line switch A, conductor 61-0 is positive in potential and this potential is applied to the base of transistor 65TB through diode 6552 and resistor 6550. This potential prevents transistor 65TB from turning on and as a result only transistor 65TA conducts. Similarly, if flip-flop 61A/B is in the 1 state only, transistor 65TB conducts, the positive potential on conductor 61-1 being extended through diode 6551 and resistor 6549 to the base of transistor 65TA to hold it nonconducting.

The conduction of either one of these transistors causes the associated relay 65A or 65B, in the collector circuits, to operate. Either one of these relays, in operating, causes contacts 65A-12 or 65B-12 on FIG. 60 to close. Ground potential is extended through either set of these contacts to conductor 60SP which is extended through cable 6004, resistor 6522 and diode 6518 to the junction of capacitor 6519 and resistor 6520. Ground potential at this junction further insures that capacitor 6119 does not charge from the collector current of transistor 65T0 and that the astable multivibrator is held in the 0 state.

Figure 54:
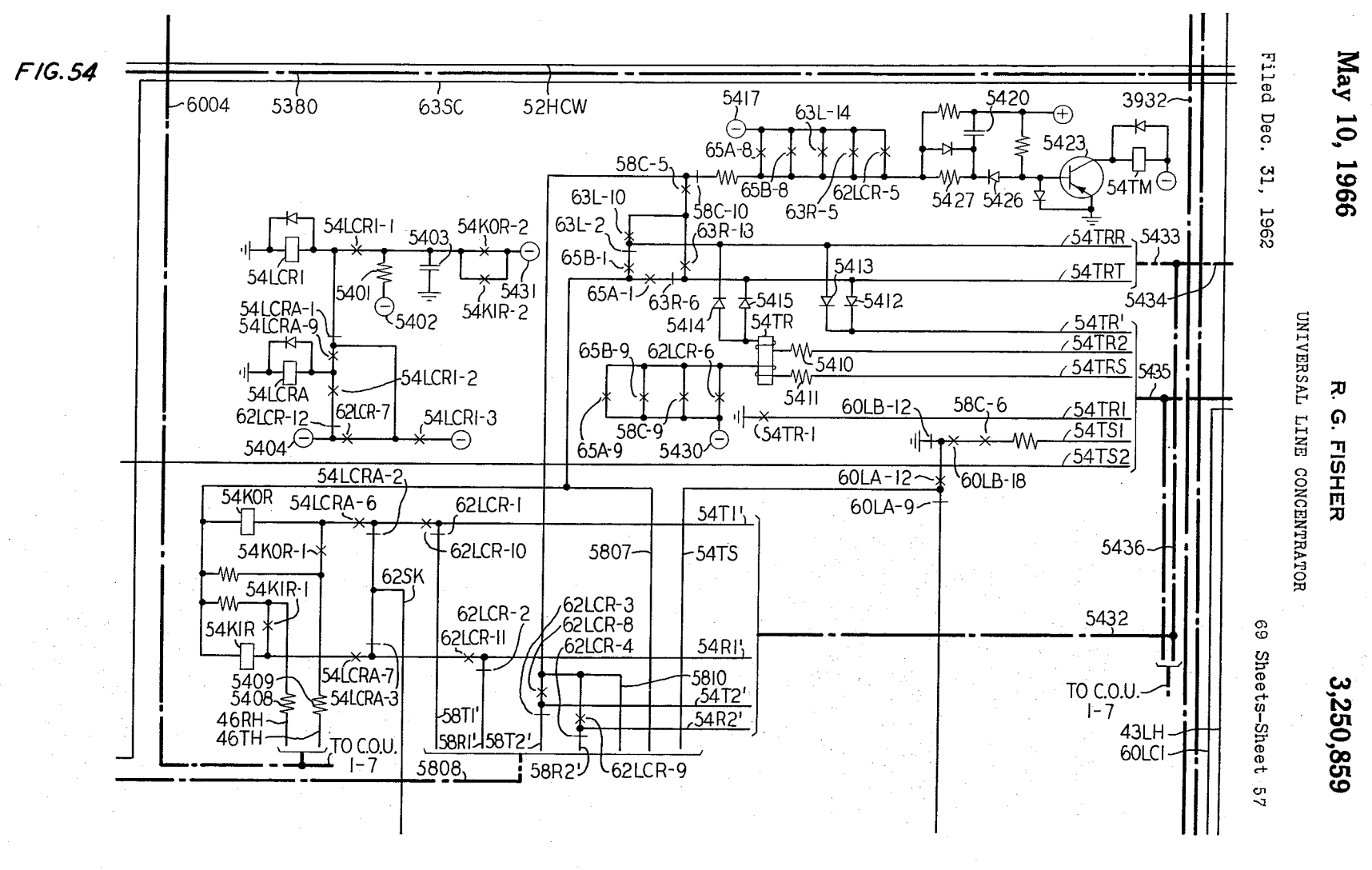

Conductor 5807 is at a negative potential due to its connection through resistor 5800 to source 5801. This potential, extended through cable 5808 to FIG. 54, is applied through either now closed contacts 65A-1 and contacts 63R-6 to conductor 54TRT, or through now closed contact 65B-1 and contacts 63L-2 to conductor 54TRR. If the line requesting service is in the A switch the negative potential is applied through contacts 46IA0-13 and contacts 46TR1-3 to the tip of control pair 2 where it is extended to the field unit. On the other hand, if the line is in the B switch the negative potential of conductor 54TRR is extended through contacts 46IA0-14 and 46TR1-4 and the ring of control pair 2 to the field unit.

If the negative potential is applied to conductor 54TRT diode 5415 conducts, and current flows through this diode, the top winding of relay 54TR, resistor 5410, conductor 54TR2, resistor 4692, contacts 461IA0-5, conductor 54TR', and diode 5413. As described in Section II, D1, the negative potential on the tip of control pair 2 is sufficient to operate relay 25A in the field unit whereas the potential on the ring is insufficient to operate relay 25B in the field unit. In this manner, although a negative potential is applied to both the tip and ring conductors of control pair 2, because only relay 25A in the field unit operates, the field unit is notified that the line being provided service is in the A switch. Similarly, if the line is in the B switch, contacts 65B-1 on FIG. 54 are closed and contacts 65A-1 are open. The negative potential on conductor 5807 is now applied directly to the ring of control pair 2 while it is applied to the tip only through diode 5414, the same winding of relay 54TR, resistors 5410 and 4692, and now diode 5412 rather than 5413. In the field unit only relay 25B operates, the negative potential applied to the winding of relay 25A being insufficient to operate this relay. In either case current flows through the top winding of relay 54TR. Although this current in itself is sufficient to operate the relay, the relay remains unoperated at this time. Contacts 65A-9 or 65B-9 are closed and an equal current flows from ground on FIG. 46, through contacts 46IA0-6, conductor 54TRS, resistor 5411, the lower winding of relay 54TR, and either contacts 65A-9 or 65B-9 to negative source 5430. Because the two windings on relay 54TR are wound in opposite directions, the two magnetomotive forces produced by currents through them at this time oppose each other and the relay remains unoperated.

The common control initiates the operation of selecting the particular link and trunk to be employed in the connection. It will be recalled that the trunk identity is not transmitted to the field unit until after the 25A or 25B relay has operated and has caused the smaller of the two negative currents flowing in the tip and ring conductors of control pair 2 to cease at which time relay 54TR operates. Although the common control does not transmit the trunk identity until after relay 54TR has operated it is nevertheless already selecting the trunk to be employed in the connection.

Figure 53:
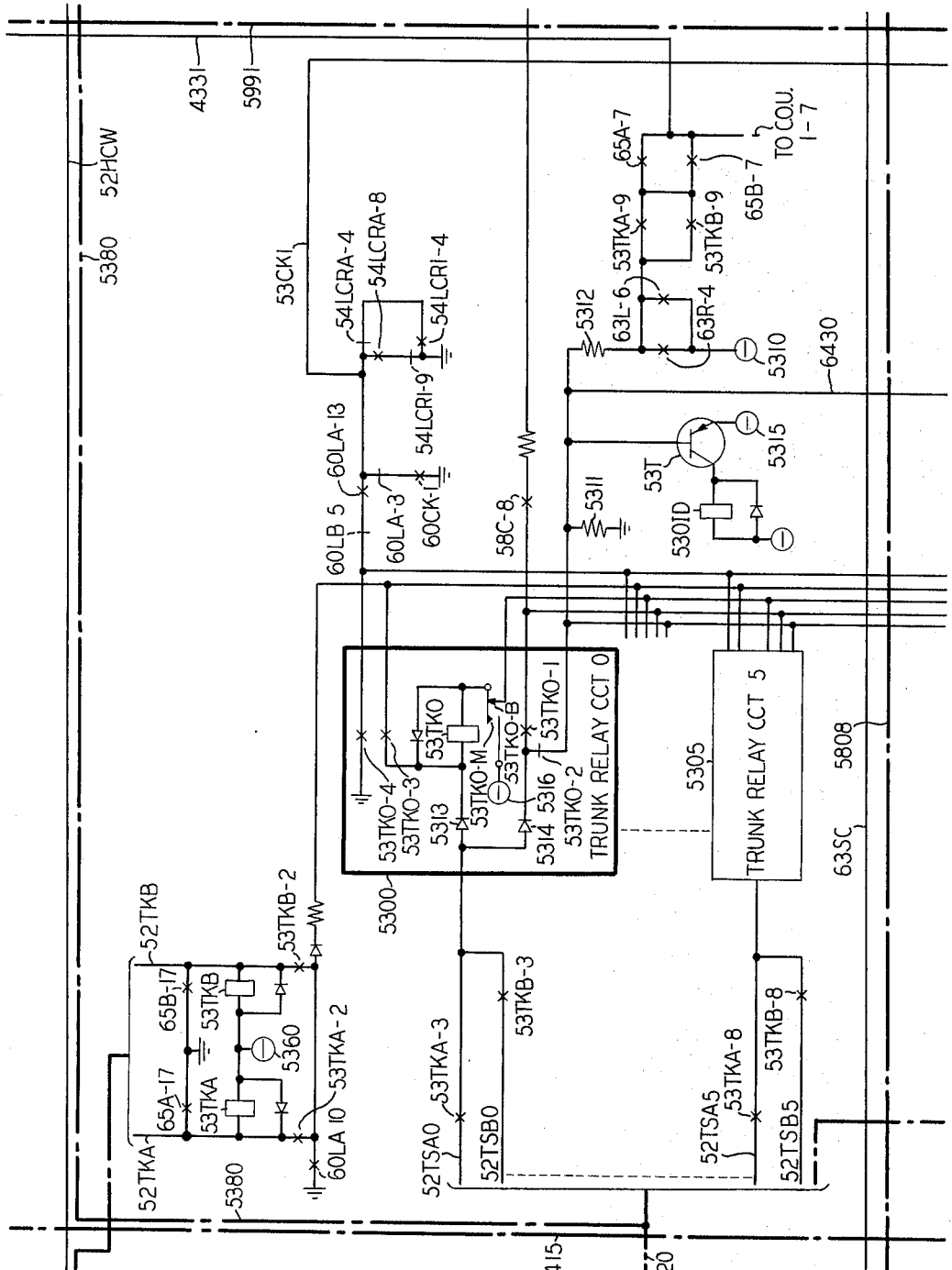
Figure 59:
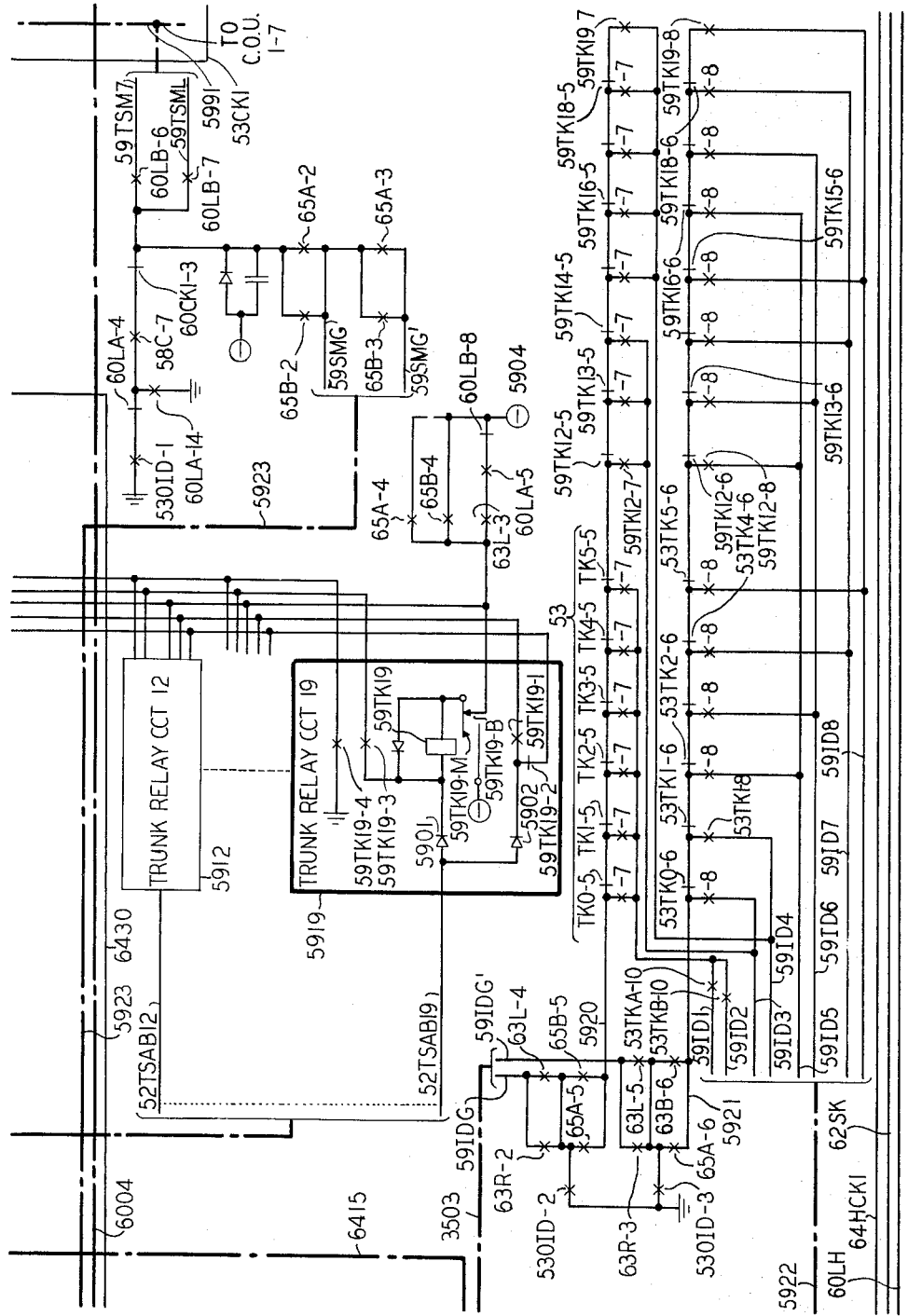

On FIGS. 53 and 59 are 14 trunk relay circuits 5300–5305 and 5912–5919. These 14 trunk relay circuits determine which trunk is to be employed in the connection. Trunk relay circuits 12–19 correspond to the eight common trunks. Trunk relay circuits 0–5 correspond to both the six trunks individual to the A switches and the six trunks individual to the B switches. These six trunk relay circuits are controlled by the trunks individual to the A switch if the line requesting service is in the A switch, and by the six trunks individual to the B switch if the line requesting service is in the B switch. When contacts 65A–4 or 65B–4 on FIG. 59 close, negative source 5904 is connected to each of contacts 53TK0–B through 59TK19–B. At the same time contacts 65A–17 or 65B–17 close, and current flows from source 5360 through the winding of either relay 53TKA or 53TKB to ground. One of these two relays thus operates. The twenty conductors 52TSA0–52TSAB19 are connected via cable 5220 to respective trunk relay circuits in FIG. 53. Conductors 52TSAB12 through 52TSAB19 are connected directly to respective trunk relay circuits 12–19. Conductors 52TSA0–52TSB5 are connected to respective trunk relay circuits 0 through 5 through contacts on relay 53TKA or 53TKB. If the line desiring service is in the A switch relay 53TKA has operated, contacts 53TKA–3 through 53TKA–8 are closed, and connect respective conductors 52TSA0–52TSA5 to respective trunk relay circuits 0 through 5. On the other hand, if the line is in the B switch relay 53TKB has operated, and contacts 53TKB–3 through 53TKB–8 connect respective conductors 52TSB0–52TSB5 to respective relay circuits 0 through 5.

The 20 conductors 52TSA0–52TSAB19 are also connected to the sleeves of the 20 trunks. Contacts 43TK–1 through 43TK–20 connect these conductors through cable 5380 to the trunk sleeves on FIG. 44. A busy trunk, as will be described below, has thereon a negative potential; an idle trunk, on the other hand, is connected through a respective one of resistors 4402 to ground. The sleeve of each trunk is connected through cable 5380 to a respective one of conductors 52TSA0–52TSAB19, and through a diode such as diodes 5313 and 5901 to one end of the winding of the respective one of the fourteen trunk relays 53TK0–53TK19. The other ends of all the trunk relay windings are connected through respective break contacts to negative source 5904. Thus those trunk relays associated with idle trunks and whose sleeves are at ground potential operate. Each operated trunk relay locks independent of contacts 65A–4 or 65B–4 and source 5904. For example, if the sleeve of trunk 35A0 is at ground potential because this trunk is idle, relay 53TK0 operates and contacts 53TK0–M close. Negative source 5316 is now connected to the winding of relay 53TK0 and the relay remains operated. Contacts 53TK0–M close before contacts 53TK0–B open in order that relay 53TK0 remain operated during the change of energizing potentials. Similar remarks apply to the other 13 trunk relays which operate if their respective trunks are idle.

Figure 64:
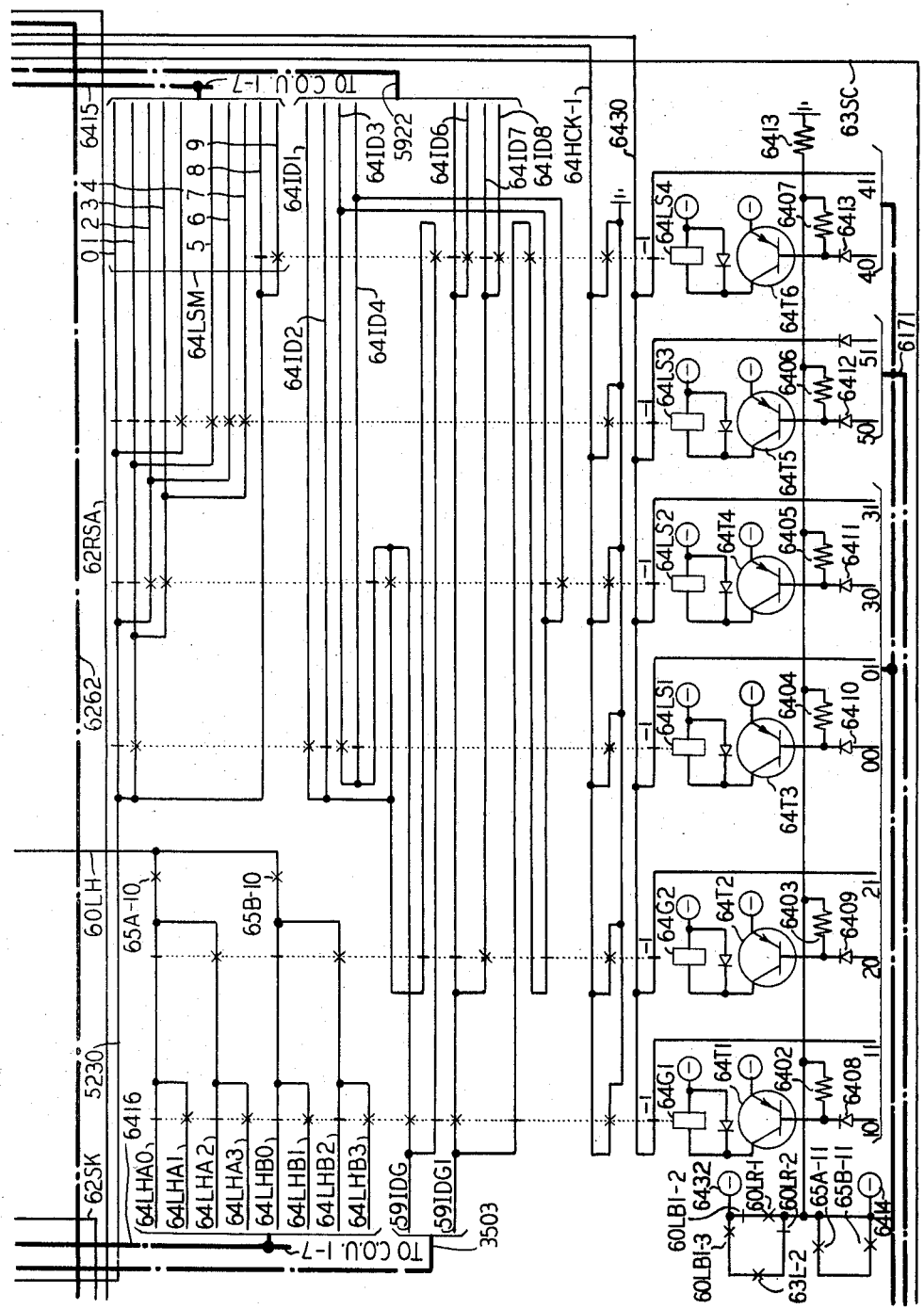

Transistors 64T1 and 64T2 correspond to stages 61GP1 and 61GP2 of counter 6100. Transistors 64T3–64T5 correspond to stages 61HOR1–61HOR3 of counter 6100. Transistor 64T6 corresponds to the remaining stage of the counter, 61STR. Contacts 65A–11 or 65B–11 connect negative source 6414 through resistors 6402–6407 to the bases of respective ones of transistors 64T1–64T6. Negative source 6414 is greater in magnitude than the magnitudes of the potential sources connected to the emitters of these transistors and these transistors would all conduct were no other potentials applied to their base electrodes. However, it is seen that the base electrodes are connected through respective diodes 6408–6413 to the 0 outputs of the six shift register stages. Referring to FIG. 61 each of the shift register stage output conductors is identified by a two digit number. The first digit refers to the stage and the second to the 0 or 1 output. Thus conductor 30 is connected to the 0 output of the fourth stage. The ten output conductors of the first five stages are connected via cable 6170 and the normally closed contacts of relay 60LR shown by bracket on FIG. 56, and the normally closed contacts of relay 60LB1 shown by the bracket on FIG. 57, to FIG. 64 where they are connected to the respective base electrons. The two output conductors 50 and 51 are connected directly through cable 6171 to FIG. 64 where the 0 output conductor is connected through diode 6412 to the base of transistor 64T5. The six 1 output conductors extended to FIG. 64 are connected through respective normally closed contacts controlled by relays 64G1–64LS4 to conductor 6430.

Although negative source 6414 is applied through respective resistors to all six base electrodes of transistors 64T1–64T6, if a positive potential is applied through the respective diode the transistor does not conduct. Thus those of the six transistors corresponding to stages of the shift register in the 0 state, and whose 0 output conductors are positive in potential, do not turn on. Only those transistors whose 0 output conductors are negative in potential turn on. Thus, only those of transistors 64T1–64T6 corresponding to stages of shift register 6100 in the 1 state conduct. The six relays 64G1–64LS4 operate when the respective transistors conduct, collector current flowing through the winding of each of these relays. These relays identify the link group serving the line, the horizontal in which the line is contained, and the steering level controlling its connection to the links.

Those of transistors 64T1–64T6 which conduct are associated with stages of the shift register having positive potentials on their 1 output conductors. Each of these conductors is connected to conductor 6430 which is thus positive in potential. It is only after all of those of relays 64G1–64LS4 which should operate have operated, and respective contacts 64G1–1 through 64LS4–1 have closed that a positive potential no longer appears on conductor 6430.

Conductor 6430 is connected to the base of transistor 53T and as long as this conductor is positive in potential, transistor 53T cannot conduct. After those of relays 64G1–64LS4 that should operate have operated the positive inhibiting potential on conductor 6430 is removed. Transistor 53T is further inhibited from operating, however, until all of the trunk relays on FIGS. 53 and 59 which should operate have operated. The trunk relays which should operate are associated with trunks having ground potentials on their sleeves. These ground potentials are extended through conductors 52TSA0–52TSAB19, respective diodes such as diodes 5314 and 5902, and respective contacts 53TK0–2 through 59TK19–2 to the base of transistor 53T. A ground potential on any one of conductors 52TSA0–52TSAB19 thus inhibits transistor 53T from operating. However, when the respective trunk relay operates and the second set of contacts on this relay open the respective one of conductors 52TSA0–52TSAB19 is no longer connected to the base electrode. Thus when all of those trunk relays that should operate have operated transistor 53T is no longer inhibited by the ground potential of the sleeve leads.

Figure 43:
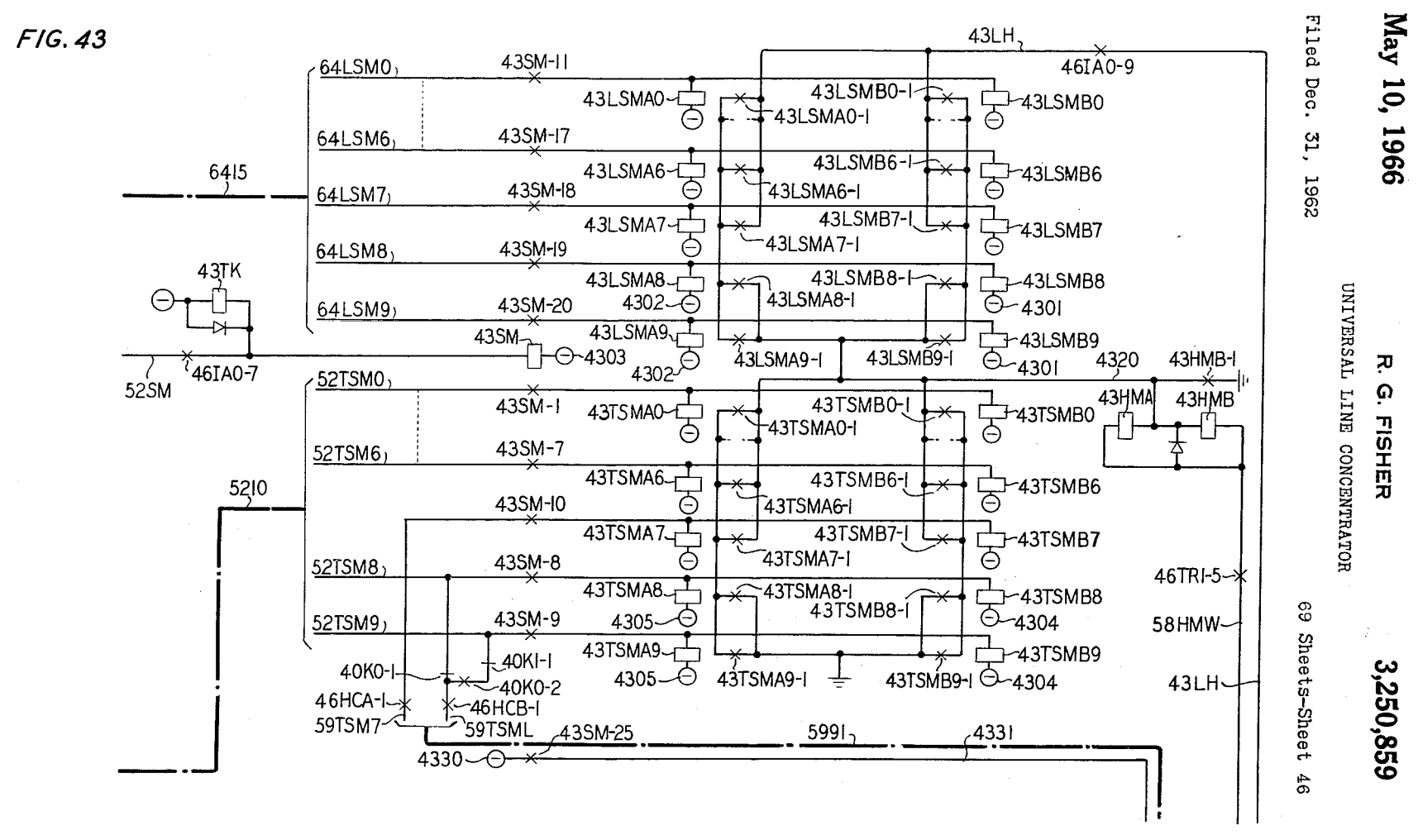
Figure 52:
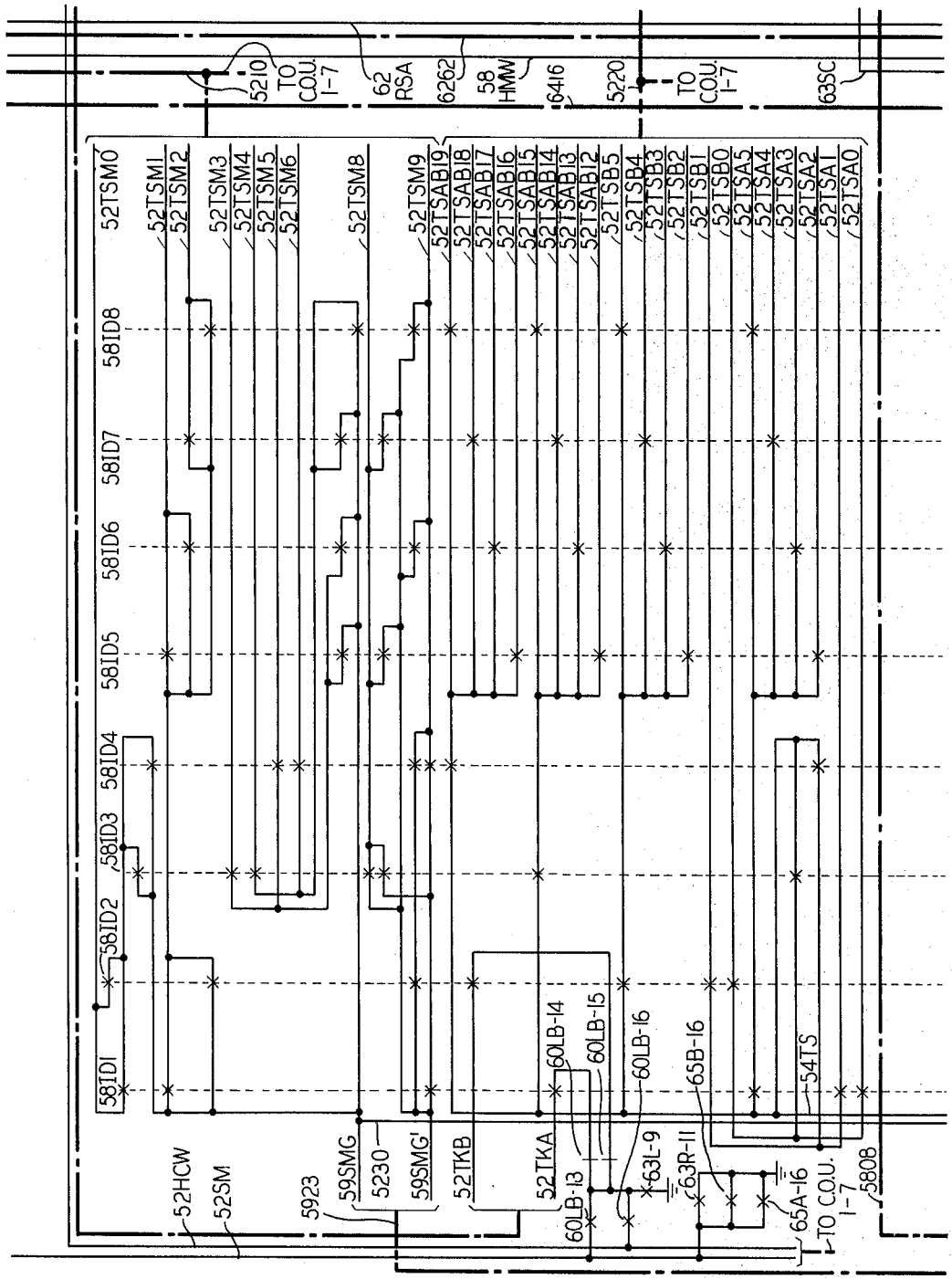

Contacts 65A–16 or 65B–16 on FIG. 52 are closed and extend ground potential to conductor 52SM. Contacts 46IA0–7 on FIG. 43 are closed and relays 43SM and 43TK are thus operated. Contacts 43SM–10 on FIG. 43 are closed and connect negative source 4330 through conductor 4331, either contacts 65A–7 and 53TKA–9, or 65B–7 and 53TKB–9, and resistor 5312 to the base of transistor 53T. Negative source 4330 is greater in magnitude than negative source 5315 and if the inhibiting potentials are removed from transistor 53T, this transistor conducts. Relay 5301D in the collector circuit of transistor 53T operates at this time. Relay 5301D thus does not operate until the inhibiting potentials are removed from the transistor 53T. When this relay does operate it is an indication that the six relays 64G1–64LS4 and the 14 trunk relays 53TK0–56TK19 have operated as required in preparation for identifying the link and trunk to be employed in the connection. With the operation of relay 530ID the actual identification is initiated.

With the operation of relay 530ID, contacts 530ID–2 and 530ID–3 on FIG. 59 close. Ground potential is extended through contacts 530ID–2 and either contacts 65A–5 or 65B–5 to conductor 5920. Ground is also extended through contacts 590ID–3 and either contacts 65A–6 or 65B–6 to conductor 5921. Referring back to the table in Section II D1 showing the two identification relays operated for each trunk employed, it is seen that if the trunk is one of the six individual to the A switch, the first trunk identification relay is operated together with one of trunk identification relays 3–8. If the trunk is individual to the B switch, the second identification relay is operated together with one of trunk identification relays 3–8. If the trunk is common to both switches, two of identification relays 3–8 are operated.

The contact chains on FIG. 59 control the energization of two of conductors 59ID1 through 59ID8. The ground on conductor 5920 is extended through only one set of contacts 53TK0–7 through 53TK5–7, and 59TK12–7 through 59TK19–7. If one of the six trunks individual to the switch containing the line being served is idle, ground is applied to either conductor 59ID1 or 59ID2. If the line is in the A switch, contacts 53TKA–10 are closed and conductor 59ID1 is energized. If the line is in the B switch, contacts 53TKB–10 are closed and conductor 59ID2 is energized. The particular one of the six trunks to be employed is determined by which of conductors 59ID3 through 59ID8 is similarly grounded. If the first individual trunk is idle contacts 53TK0–8 are closed and the ground on conductor 5921 is extended to conductor 59ID3. If this trunk is busy, trunk relay 53TK0 is not operated and contacts 53TK0–6 remain closed. If the second individual trunk is available contacts 53TK1–8 have closed and the ground on conductor 5921 is applied through these contacts to conductor 59ID4. In a similar manner it is seen that the ground on conductor 5921 is extended through one set of contacts 53TK0–8 through 53TK5–8 to one of respective conductors 59ID3 through 59ID8.

In the event that all six of the trunks individual to the switch containing the line being served are busy all of contacts 53TK0–5 through 53TK5–5 and 53TK0–6 through 53TK5–6 remain closed. The ground potential on conductors 5920 and 5921 are extended through these contacts to the respective contacts of trunk relays 59TK12–59TK19. If the first common trunk is idle, the ground on conductor 5920 is extended through contacts 59TK12–7 to conductor 59ID3 and the ground on conductor 5921 is extended through contacts 59TK12–8 to conductor 59ID5. Ground on these two conductors identify the first common trunk. If this trunk is busy and the second common trunk 35AB13 is idle, the ground on conductor 5920 is extended through contacts 59TK12–5 and 59TK13–7 to conductor 59ID3 once again. However, the ground on conductor 5921 is now extended through contacts 59TK12–6 and 59TK13–8 to conductor 58ID6 rather than 59ID5. Ground potentials on conductors 59ID3 and 59ID6 identify the second common trunk. In a similar manner it is seen that the lowest numbered available common trunk is selected with two of conductors 59ID3–59ID8 being grounded in the event that the six trunks individual to the switch are all busy.

Conductors 59ID1–59ID8 are connected by cable 5922 to one end of the windings of respective identification relays 58ID1–58ID8. The other end of each of the eight windings is connected to negative source 5805. The two identification relays whose windings are connected to the two ground conductors 59ID1–59ID8 are operated.

When relay 25AUX in the field unit operates, current ceases to flow through that one of the tip and ring conductors of the second control pair having applied to it the smaller of the two negative potentials. Current thus ceases to flow through this conductor and conductor 54TR2. The current in conductor 54TRS now causes relay 54TR to operate. Contacts 54TR–1 close and current flows through conductor 54TR1, contacts 46IA0–8, and the winding of relay 46TR1 to negative source 4635. Relay 46TR1 thus operates. Contacts 46TR1–5 on FIG. 43 close, and the potential of negative source 5809 is extended through either contacts 65A–15 or 65B–15, conductor 58HMW, and contacts 46TR1–5 to the windings of both relays 43HMA and 43HMB. These relays do not yet operate however until a connection is made to the other end of each winding.

When two of the identification relays 58ID1–58ID8 operate, relay 58C energizes. If both identification relays are two of relays 58ID1–58ID4, either contacts 58ID1–3 or 58ID2–3, and either contacts 58ID3–3 or 58ID4–3 have closed. Ground is extended through these two sets of contacts and current flows from source 5806 through the winding of relay 58C and through the contacts to ground. If, on the other hand, one of the first four identification relays has operated together with one of the last four, current flows from source 5806, through the winding of relay 58C, and through one set of contacts 58ID5–2 through 58ID8–2 and one of 58ID1–2 through 58ID4–2 to ground. In either case relay 58C operates indicating that two of the identification relays in the common control have operated.

Contacts 58ID1–5 through 58ID4–5, and 58ID5–4 through 58ID8–4 control the application of positive and negative potentials to conductors 58T1', 58R1', 58T2' and 58R2'. Referring to the table in Section II D2 it is seen that if the first trunk individual to the A switch is selected, negative potentials are applied to both tip and ring conductors of the first control pair. The first and third identification relays are operated if this trunk is selected and the negative potential on conductor 5807 is extended through contacts 58ID1–5 to conductor 58T1' and contacts 58ID3–5 to conductor 58R1'. Positive potential source 5803 is connected through resistor 5802 to conductor 5810. This conductor is the source of the positive potential to be applied to the control conductors. If, for example, the second of the common trunks is to be employed, the third and sixth identification relays are operated. Referring to the table, a negative potential is applied to the ring of the first control pair, and a positive potential to the tip of the second. Contacts 58ID3–5 are closed and the negative potential of conductor 5807 is applied to conductor 58R1'. With the sixth identification relay also operated contacts 58ID6–4 are closed and the positive potential on conductor 5810 is connected through these contacts to conductor 58T2'. In a similar manner two of conductors 58T1'–58R2' have applied to them positive and negative potentials depending upon which of the twenty trunks is to be employed.

These four conductors are extended through cable 5808 to FIG. 54. Conductor 58R2' is connected through normally closed contacts 62LCR–4 to conductor 54R2'. Conductor 58T2' is connected through normally closed contacts 62LCR–3 to conductor 54T2'. Conductor 58R1' is connected through normally closed contacts 62LCR–2 to conductor 54R1' and conductor 58T1' is connected through normally closed contact 62LCR–1 to conductor 54T1'. The four conductors 54T1'–54R2' are connected by cable 5432 to all eight individual central office units. They are extended to central office unit 0 via cables 5432, 5436 and 5434 to FIG. 45. The four conductors 54T1'–54R2' are connected to respective control conductors 45T1–45R2 through respective contacts 46TR1–6 through 46TR1–9 which close when relay 46TR1 operates. In this manner the trunk identity is transmitted to the field unit after the field unit has controlled the operation of relay 54TR.

In addition to transmitting the trunk identity to the field unit, this information, being the only information required by the field unit to establish the connection, it is also necessary to complete the connection in the central office unit. With relay 58C operated contacts 58C–7 are closed. On FIG. 59 ground is extended through contacts 53OID–1, normally closed contacts 60LA–4, contacts 58C–7, normally closed contacts 60CK1–3, and either contacts 65A–2 or 65B–2 to conductor 59SMG and either contacts 65A–3 or 65B–3 to conductor 59SMG'. The grounds on these two conductors are extended along cable 5923 to FIG. 52. To establish a trunk connection in trunk switch A it is necessary to energize one of trunk switch select magnets 43TSMA0–43TSMA6 and one of trunk switch select magnets 43TSMA8 or 43TSMA9. Similarly to establish a connection in the B trunk switch one of trunk switch select magnets 43TSMB0–43TSMB6 and one of 43TSMB8 or 43TSMB9 must be energized. The ground on conductor 59SMG is extended through various contacts of the identification relays in the contact chains of FIG. 52 to one of conductors 52TSM1–52TSM6. The particular one of these conductors selected depends upon which two of the identification relays have operated. Similarly the ground on conductor 59SMG' is connected through the contacts of the eight identification relays to either conductor 52TSM8 or 52TSM9, the particular steering level selected depending upon the trunk identity. Conductors 52TSM1–52TSM6, 52TSM8 and 52TSM9 are connected via cable 5210 to FIG. 43 where they are connected through respective contacts 43SM–1 through 43SM–9 to the windings of respective trunk switch select magnets 43TSMA0–43TSMA6, 43TSMA8 and 43TSMA9, and 43TSMB0–43TSMB6, 43TSMB8 and 43TSMB9.

Negative sources 4304 or 4305 are connected to the other ends of each of these windings and two of the trunk switch select magnets in switch A and the corresponding two in trunk switch B operate. There is no differentiation at this point between the two trunk switches. Although one of the first six trunk switch select magnets in each switch as well as one of the two steering level select magnets in each switch operates, a connection will be established in only that trunk switch in which a hold magnet is operated.

Before the particular link to be employed is selected the proper line switch select magnets are also operated. Which two of the line switch select magnets in switches A and B are operated is determined by the horizontal whose identity is stored in relays 64LS1–64LS3 and the steering level whose identity is stored in relay 64LS4. The ground potential on conductor 59SMG is extended along conductor 5230 to FIG. 64. Conductor 5230 is connected to one of conductors 64LSM0–64LSM7, and either conductor 64LSM8 or conductor 64LSM9. Contacts on relays 64LS1–64LS3 determine which of conductors 64LSM0–64LSM7 is selected. Contacts on relay 64LS4 determine which of conductors 64LSM8 or 64LSM9 is chosen. The ten conductors 64LSM0–64LSM9 are connected through cable 6415 and contacts 43SM–11 through 43SM–20 to the windings of the line switch select magnets 43LSMA0–43LSMA9 and 43LSMB0–43LSMB9. The other end of each of these windings is connected to a negative potential, and the ground on conductor 5230 causes four of the relays to operate, one of the first eight, and one of the two steering level select magnets in each switch. Again, no differentiation is made between the two line switches. A connection will be made through only that line and trunk switch pair in which hold magnets are operated.

When contacts 46TR1–5 closed a negative potential was applied to one end of the windings of each of relays 43HMA and 43HMB. These relays did not then operate however as no connection was made to the other ends of the windings. However, these relays operate after the trunk switch select magnets have energized. Conductor 4320 is connected to ground through one of contacts 43TSMA0–1 through 43TSMA6–1, and one of contacts 43TSMA8–1 or 43TSMA9–1. The conductor is also connected to ground through one of contacts 43TSMB0–1 through 43TSMB6–1, and one of contacts 43TSMB8–1 or 43TSMB9–1. With the ground on conductor 4320, relays 43HMA and 43HMB operate. Contacts 43HMB–1 close and lock the relays independent of the ground on conductor 4320.

The connection in the central office unit requires in addition to the operation of the line and trunk switch select and steering level magnets, the energization of the same numbered hold magnet in the A or B line and trunk switches. The hold magnets selected are the lowest numbered available in the particular group serving the line desiring service. The line and trunk switch hold magnets are not operated until after the line and trunk switch select magnets have operated. After the required trunk switch select magnets have operated, ground potential is obtained on conductor 4320. After the required line switch select magnets have operated this ground is extended to conductor 43LH through either contacts 43LSMA9–1 or 43LSMA8–1, and one of contacts 43LSMA0–1 through 43LSMA7–1. The ground is similarly extended through one of contacts 43LSMB9–1 or 43LSMB8–1, and one of contacts 43LSMB0–1 through 43LSMB7–1. The ground on conductor 43LH is thus not obtained until after the required line and trunk switch select magnets have operated. The ground potential on conductor 43LH is an indication that the hold magnet operation may proceed.

Figure 42:
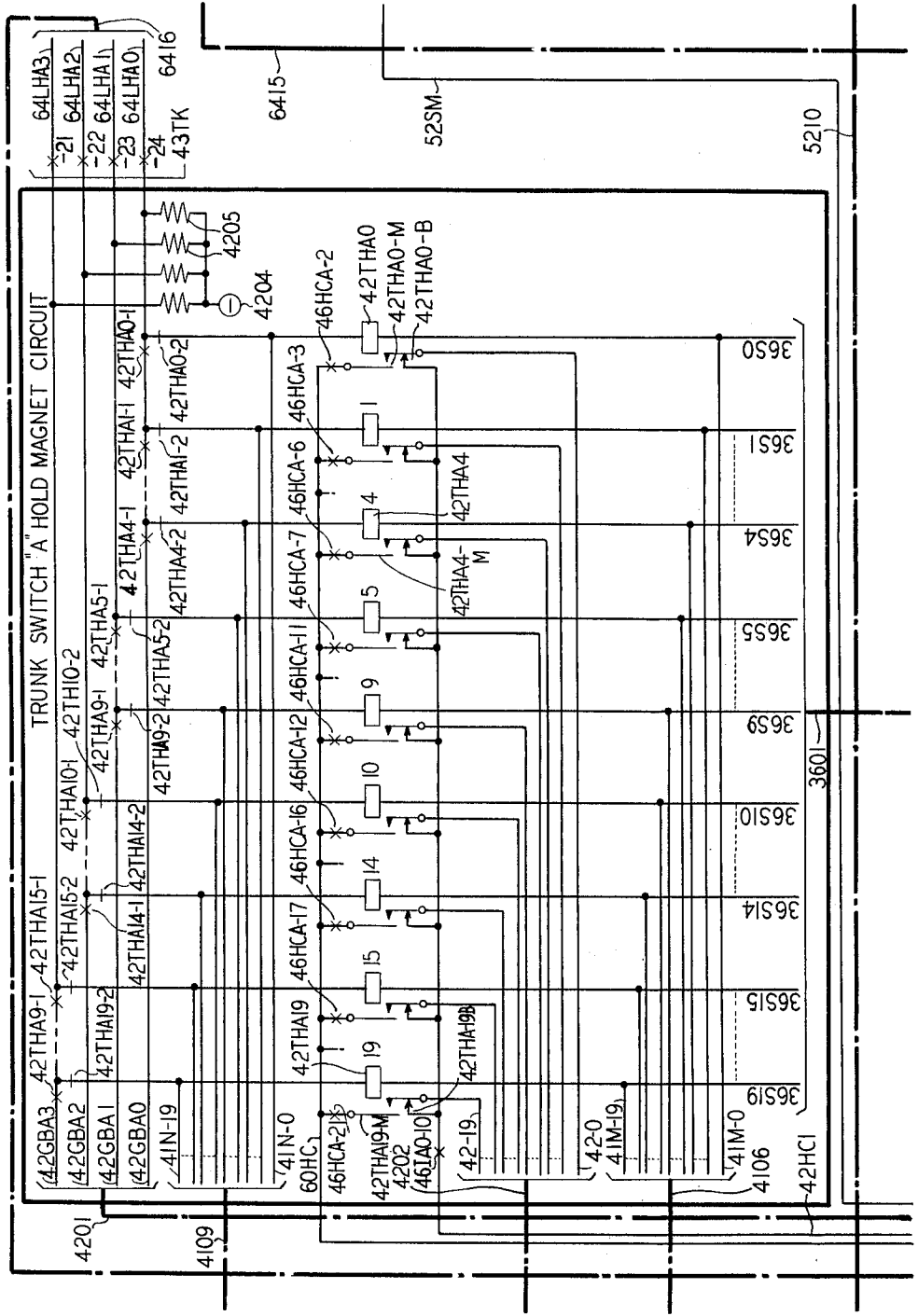
Figure 60:
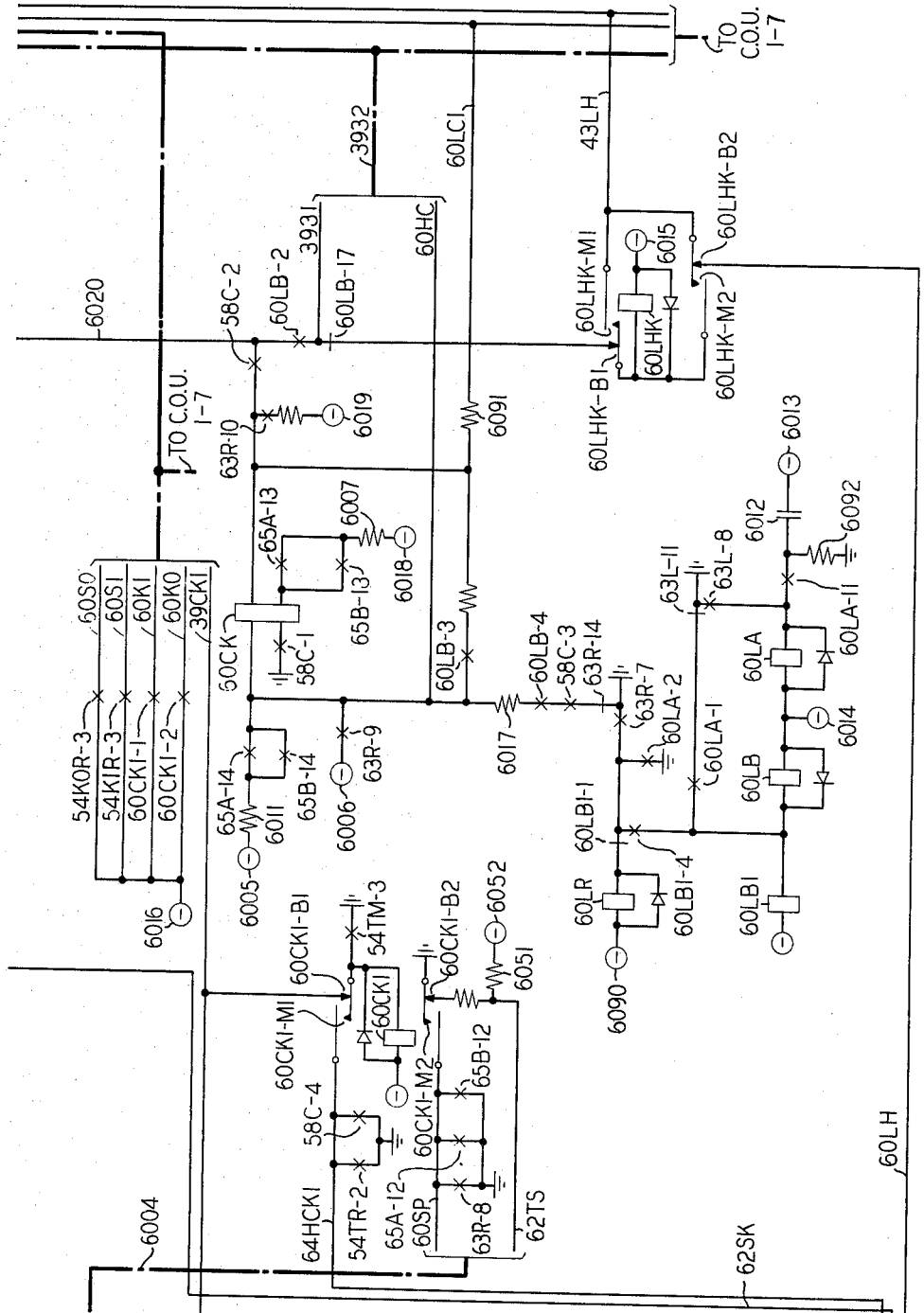

The ground on conductor 43LH is extended through contacts 46IA0–9 to FIG. 60 where it is further extended through contacts 60LHK–B2 and conductor 60LH to FIG. 64. Conductor 60LH is connected to the eight conductors 64LHA0–64LHB3 through contacts controlled by relays 64G1, 64G2, 65A and 65B. Only one of relays 65A or 65B is operated and thus only on set of contacts 65A–10 or 65B–10 are closed. The eight conductors identify the four groups of links in each pair of switches, and particular conductor selected depends upon the group identity stored in relays 64G1 and 64G2. These eight conductors are extended via cables 6416 and 3924 to the hold magnet circuits for trunk switches A and B shown respectively on FIGS. 42 and 39. Contacts 43TK–21 through contacts 43TK–24 on FIG. 42 are closed as are contacts 43SM–21 through 43SM–24 on FIG. 39. The contact chain controlled by the hold magnets in each of the eight conductors 64LHA0–64LHB3 are similar to those in the field unit. If the line desiring service is served by group 0 in the A switches, for example, the ground potential on conductor 64LHA0 is extended through contacts 42THA0–2 to the winding of relay 42THA0. If the first link in group 0 is already in use, contacts 42THA0–2 are open, and instead the ground is extended through contacts 42THA0–1 to the winding of the next available trunk switch hold magnet. The particular trunk switch hold magnet selected in either trunk switch A or trunk switch B does not operate at this time however, as the other end of the winding of the magnet is no connected to an energizing potential.

The winding of each trunk switch hold magnet is connected by a respective one of conductors 41N–0 through 41N–19 and 39N–0 through 39N–19 to the winding of the same numbered line switch hold magnet 41LHA0–41LHA19 and the analogous hold magnets in line switch B. Thus, at this time a ground potential is applied to one end of the winding of one of the line switch hold magnets in a particular one of the two line switches. A negative potential is applied to the other end of each of the line switch hold magnet windings and the selected one operates at this time.

Figure 39:
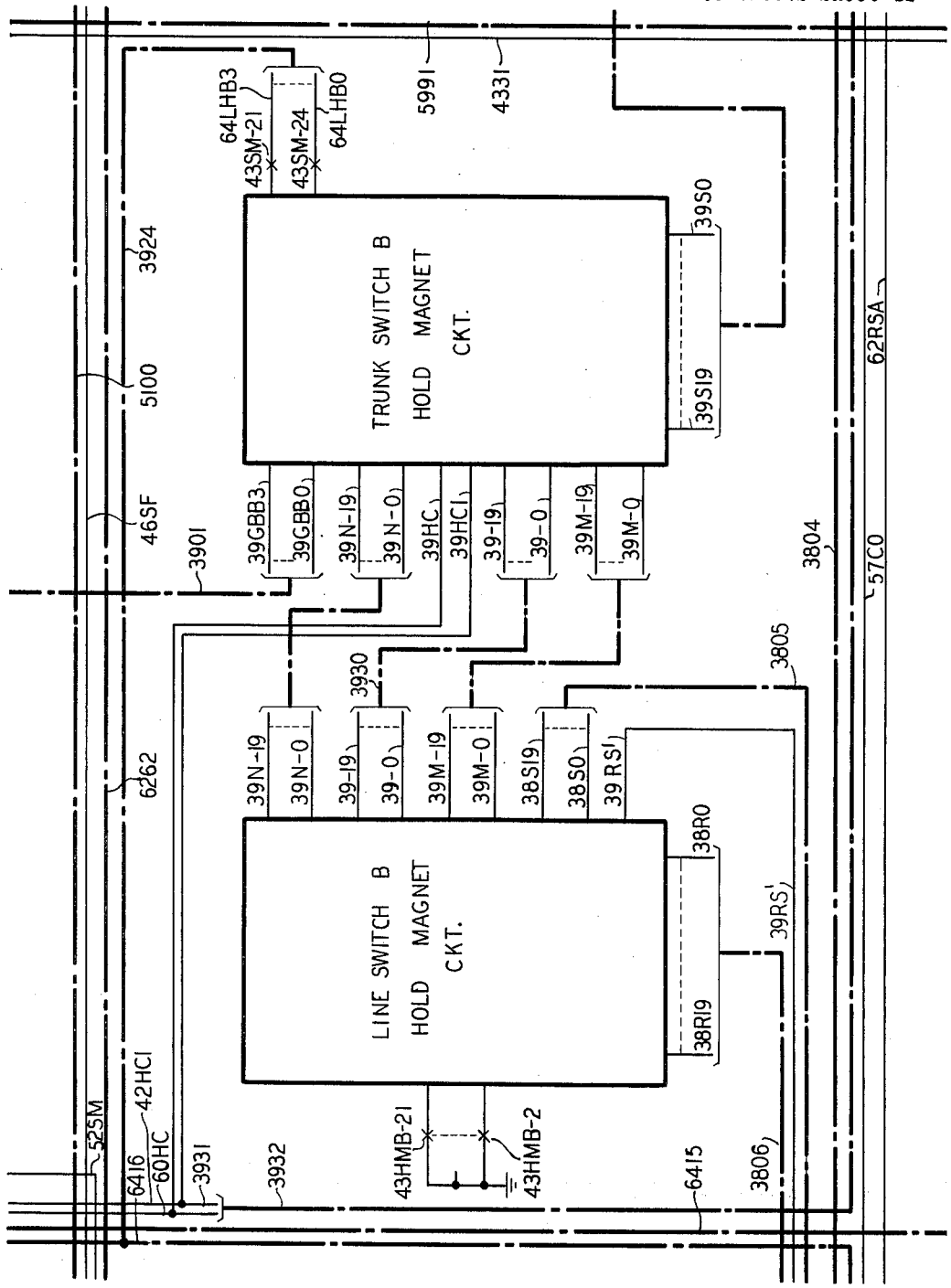

When the selected line switch hold magnet operates one set of contacts 41LHA0–1 through 41LHA19–1 or the analogous contacts in the hold magnet circuit for line switch B close. The ground potential on the selected one of conductors 41N–0 through 41N–19 or 39N–0 through 39N–19 is extended through these contacts and either cable 4202 or cable 3930 to a respective one of conductors 42–0 through 42–19 or 39–0 through 3919. Each of these conductors is connected through a respective one of contacts 42THA0–B through 42THA19–B or the analogous contacts on FIG. 39 to conductor 42HC1 or on 39HC1. Contacts 46IA0–10 on FIG. 42 and analogous contacts on FIG. 39 are closed, and thus the ground potential on either conductor 42HC1 or conductor 39HC1 is extended via conductor 3931 and cable 3932 to FIG. 60. Contacts 60LB–17 are closed and ground is thus extended through these contacts and contacts 60LHK–B1 to one end of the winding of relay 60LHK. The other end of this winding is connected to negative source 6015 and the relay operates at this time.

Figure 41:
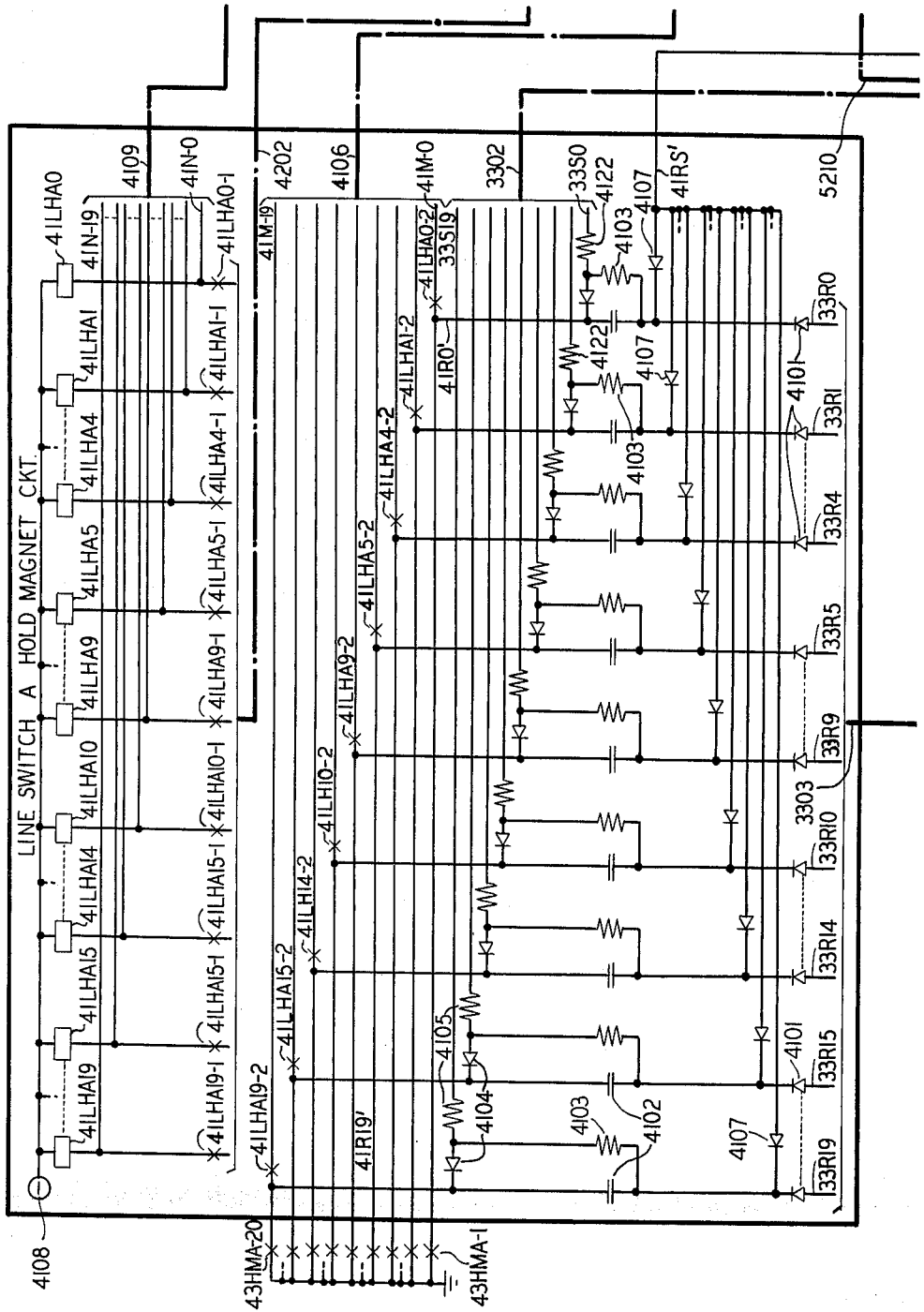

When relay 60LHK operates it locks to ground on conductor 43LH when contacts 60LHK–M1 and 60LHK–M2 close. Contacts 60LHK–B2 open and the ground potential that originally operated the selected line switch hold magnet is removed from conductor 60LH. The line switch hold magnet does not release however. At this time the selected line switch hold magnet is held by another current which also causes the same numbered trunk switch hold magnet to now operate. Contacts 43HMA–1 through 43HMA–20 on FIG. 41 are closed, as are contacts 43HMB–2 through 43HMB–21 on FIG. 39. The negative potential of source 4108 causes current to flow through the winding of the selected one of line switch hold magnets 41LHA0–41LHA19, a respective one of conductors 41N–0 through 41N–19, the winding of the respective trunk switch hold magnet 42THA0–42THA19, the respective one of conductors 41M–0 through 41M–19, one of respective contacts 41LHA0–2 through 41LHA19–2, and one of contacts 43HMA–1 through 43HMA–20 to ground. The trunk switch hold magnet did not operate prior to this time because of the ground on conductors 41N–0 through 41N–19. This ground originated from the ground on cable 6416 which in turn was derived from the ground on conductor 60LH. As ground was also applied to the other end of the winding of the trunk switch hold magnet through one of conductors 41M–0 through 41M–19, no potential difference appeared across the winding of the trunk switch hold magnet. The ground, however, did cause the line switch hold magnet to operate as negative potential source 4108 is connected to the other end of this winding. With the ground now removed from conductor 60LH ground potential is no longer applied to conductors 41N–0 through 41N–19. Negative source 4108 now causes current to flow through the winding of the line switch hold magnet and through the winding of the trunk switch hold magnet as well. The particular trunk switch hold magnet operated after the energization of relay 60LHK depends upon which of contacts 41LHA0–2 through 41LHA19–2 are closed at this time. This in turn depends upon which line switch hold magnet priorly operated and closed its respective contacts. If the line desiring service is served by line and trunk switches B, the line and trunk switch B hold magnet circuits on FIG. 39 operate in a similar manner rather than those on FIGS. 41 and 42.

It should be noted that although the ground is removed from the selected one of conductors 41N–0 through 41N–19 or 39N–0 through 39N–19 when relay 60LHK operates, the operated line switch hold magnet does not release. Current immediately flows from source 4108 through the line and trunk switch hold magnet windings thus maintaining the line switch hold magnet in an operated condition.

The line and trunk switches in the field units are of the magnetic latching type. Once a hold magnet is operated it remains operated until its winding is pulsed in the opposite drection. The swtches in the central office units, however, are not of the magnetic latching type, and a continuous energizing current is required in order to maintain the magnets operated once they are initially placed in this condition. It is also necessary once a pair of line and switch hold magnets have operated to cause a negative potential to be placed on the sleeve of the trunk employed as it will be recalled that the negative potential on the sleeve of trunks 35A0–35A5, 35AB12–37AB19, and 40B0–40B5 control the scanning and trunk selection operations. Once the crosspoints in the trunk switch close it is seen that the sleeve of the selected trunk, determined by the particular trunk switch select magnets operated, is connected to the sleeve of the link chosen. The sleeve of the trunk is thus connected through one of conductors 36S0–36S19 and cable 3601 or the analogous conductors on FIGS. 39 and 40 directly to one end of the winding of the operated trunk switch hold magnet. As long as relays 43HMA and 43HMB are operated, the trunk sleeve is connected to ground. However, as will be seen below, these relays release prior to the resumption of scanning. At this time the winding of the operated trunk switch hold magnet is no longer connected through one of conductors 41M–0 through 41M–19 or 39M–0 through 39M–19 to ground. The winding, however, is still connected to one of conductors 36S0–36S19 or 39S0–39S19. The winding is thus connected through the trunk switch link sleeve, the trunk switch, the trunk sleeve, and one of resistors 4402 to ground. Current flows from negative source 4108 or the analogous potential source in the hold magnet circuit for line switch B, the windings of the operated line and trunk switch hold magnets, crosspoints connecting the link and trunk sleeves and one of resistors 4402 to ground. This current maintains the two hold magnets operated. In addition, the negative potential developed across the particular one of resistors 4402 provides the necessary indication that the trunk is in use. And the negative potential on the sleeve of the line just connected through the line crossbar switch reverse biases the associated one of diodes 3202 to prevent further indications of service requests by this off-hook line.

The connection is completed when the line and trunk switch hold magnets operate. Scanning is resumed after both the central office unit and the field unit notify the common control that the connection has been established. When relay 58C initially operated contacts 58C–1 on FIG. 60 closed. Current flows from ground through these contacts, the lower winding of relay 60CK, either contacts 65A–13 or 65B–13, and resistor 6007 to negative source 6018. The current flowing through the relay winding is insufficient to operate the relay. The relay only operates when current also flows through its other winding. When relay 58C operated contacts 58C–2 on FIG. 60 also closed. Negative source 6005 was connected through resistor 6011, either contacts 65A–14 or 65B–14, the top winding of relay 60CK, contacts 58C–2, conductor 6020, contacts 60LA–9, and conductor 54TS to FIG. 52. This conductor is connected through contact chains controlled by the eight identification relays to conductors 52TSA0–52TSAB19. Each of these twenty conductors is associated with one of the twenty trunks and the particular one of these twenty conductors to which conductor 54TS is connected depends upon the trunk identity stored in relays 58ID1–58ID8. The twenty conductors 52TSA0–52TSAB19 are connected via cables 5220 and 5380 to FIG. 44 where they are extended through contacts 43TK–1 through 43TK–20 to the trunk sleeves. Once the connection is established and prior to the release of relays 43HMA and 43HMB, the trunk whose identity is stored in identification relays 58ID1–58ID8 is connected through the trunk crossbar switch and one of conductors 41M–0 through 41M–19 or 39M–0 through 39M–19, and contacts of relays 43HMA or 43HMB to ground. Thus immediately after the connection is established, ground potential is extended to conductor 54TS through the crossbar switch and at this time current flows through the top winding of relay 60CK. The relay now operates to indicate that the connection has indeed been established. The contact chain on FIG. 52 controlling the connection of conductor 54TS to one of conductors 52TSA0–52TSAB19 is provided to insure that not only has a connection been established but the correct trunk has been employed. The particular one of conductors 52TSA0–52TSAB19 which is connected to conductor 54TS depends upon the trunk identity stored in relays 58ID1–58ID8. Conductors 54TS is thus connected to the sleeve of a particular one of the twenty trunks. Only if this trunk is now in use is the ground potential extended to conductor 54TS.

It should be noted that relay 60CK operates in the regular connection sequence only when currents flow in both of its windings, either current being individually insufficient to operate the relay. In the other sequences, to be described below, it will be seen that relay 60CK operates when current flows through only its upper winding. In the regular connection sequence, the potential source for causing current flow in the upper winding is source 6005. Resistor 6011 causes a reduced current to flow that is insufficient in itself to operate the relay. Current in the lower winding is thus also required. In the other sequences however, source 6005 is not the energizing potential for the upper winding, and resistor 6011 is not included in the current path. A different source is employed and the current in the upper winding is sufficient in itself to operate the relay.

When relay 60CK operates contacts 60CK–1 on FIG. 53 close. Ground potential is extended through these contacts, contacts 60LA–3, conductor 53CK1, and contacts 60CK1–B1 to one end of the winding of relay 60CK1. This relay now operates, contacts 60CK–1–M1 close, and the relay locks through these contacts, and contacts 54TR–2 and 58C–4 to ground. Contacts 60CK1–3 on FIG. 59 open and ground potential is no longer applied to conductors 59SMG and 59SMG'. This ground on these conductors initially operated and held the line and trunk switch select magnets which release at this time.

It will be recalled that when the field unit completes its connection, a negative potential is applied to the unused conductor of control pair 2 or the tip conductor if both tip and ring are not used for transmitting trunk identity information. The negative potential on the unused conductor of control pair 2 is extended through cables 5434, 5436 and 5432 to either conductor 54T2' or 54R2'. The potential is then extended through cable 5808 to FIG. 58. Conductor 58SK is connected to the unused one of conductors 58T2' and 58R2' by contacts 58ID1–4 through 58ID4–4 and 58ID5–3 through 58ID8–3. For example, if the second of the common trunks is employed in the connection identification relays 58ID3 and 58ID6 are operated. This causes a negative potential to be applied to the ring of the first control pair and a positive potential to the tip of the second. Thus the negative potential supplied by the field is applied to the ring of the second control pair. This negative potential on conductor 58R2' is extended through contacts 58ID6–3 to conductor 58SK. The negative potential on conductor 58SK is extended along conductor 62SK to FIG. 62. If the central office unit has completed its connection, relay 60CK1 has operated and contacts 60CK1–6 are closed. The negative potential on conductor 62SK is thus applied through these contacts, diode 6210 and resistor 6209 to the anode of diode 6212. Normally this anode is connected to ground through resistor 6208, the diode being forward biased by negative potential source 6201. Thus normally the cathode of diode 6217 is at ground potential and this diode is reversed biased. Transistor 62T1 of the reset bistable multivibrator is normally nonconducting. However, when the negative potential is applied to conductor 62SK, diode 6212 is reverse biased. Ground potential is no longer applied to the cathode of diode 6217 which now conducts due to negative source 6201. The negative potential is extended to the base of transistor 62T1 which conducts. The reset bistable multivibrator thus switches state, with transistor 62T1 now conducting and transistor 62T0 turning off.

When transistor 62T1 turns on, its collector increases in potential. This increased potential is applied through contacts 60LA–6 and 54LCR1–6 to conductor 62RSA which is connected to diode 4632. The positive potential passed by this diode is applied to the base of transistor 46T1 which thus turns off. The service action bistable multivibrator switches to its normal condition with transistor 46T0 conducting. Transistor 63L0 turns off, and in turn causes the conducting one of transistors 65TA and 65TB to turn off and the operated one of relays 65A and 65B to release. With the service action bistable multivibrator restored to normal, relay 46AI0 releases. This relay in releasing in turn causes relays 46TR1, 43TK, 43SM, 54TR and 60LHK to release. The identification relays restore to normal when contacts 43TK–1 through 43TK–20 on FIG. 44 open thereby causing trunk relays 0 through 19 on FIGS. 53 and 59 to release. When the identification relays release, relay 58C releases. Relays 54TR and 58C in releasing remove the locking ground comprising contacts 54TR–2 and 58C–4 for relay 60CK1 which now releases.

When relay 60CK1 releases, contacts 60CK1–B2 close and a positive pulse is created on conductor 62TS. This positive pulse is extended along cable 6004 to FIG. 62, and through capacitor 6242, diode 6229, and resistor 6230 to the base of transistor 62T5 which now turns off. The monostable multivibrator now remains in its unstable state for 125 milliseconds rather than five milliseconds as it does after groups of 64 line scans. Capacitor 6225 controls the five millisecond operation as it charges from the collector current of transistor 62T6. But when the multivibrator is triggered by the positive pulse on conductor 62TS, it is capacitor 6242 that controls the duration of the unstable period. This capacitor charges from the positive pulse and maintains transistor 62T5 off until it discharges. The capacitor discharges through resistor 6051 into negative source 6052. It requires 125 milliseconds until the capacitor discharges sufficiently to enable transistor 62T5 to conduct once again.

Figure 62:
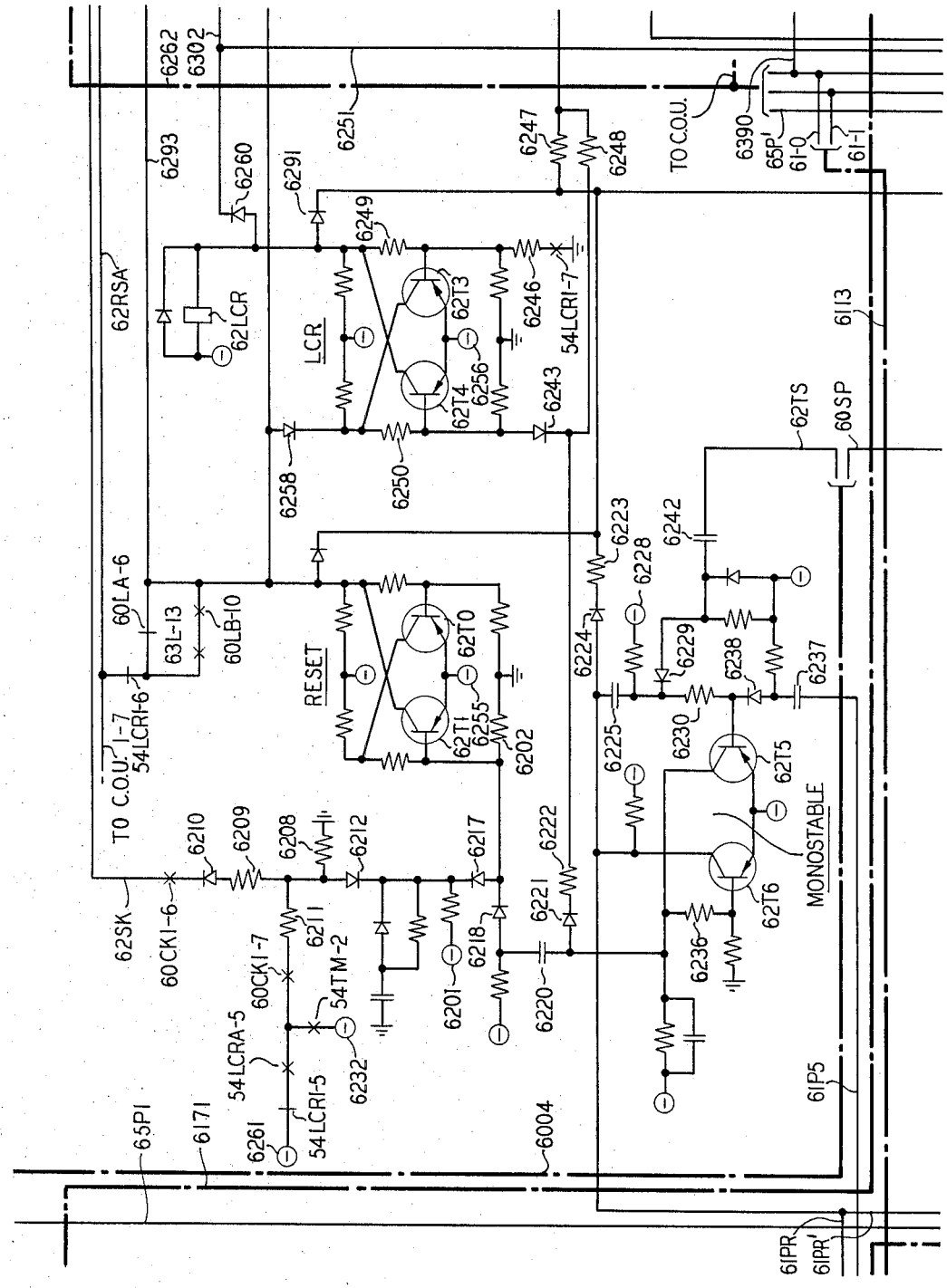
Figure 63:
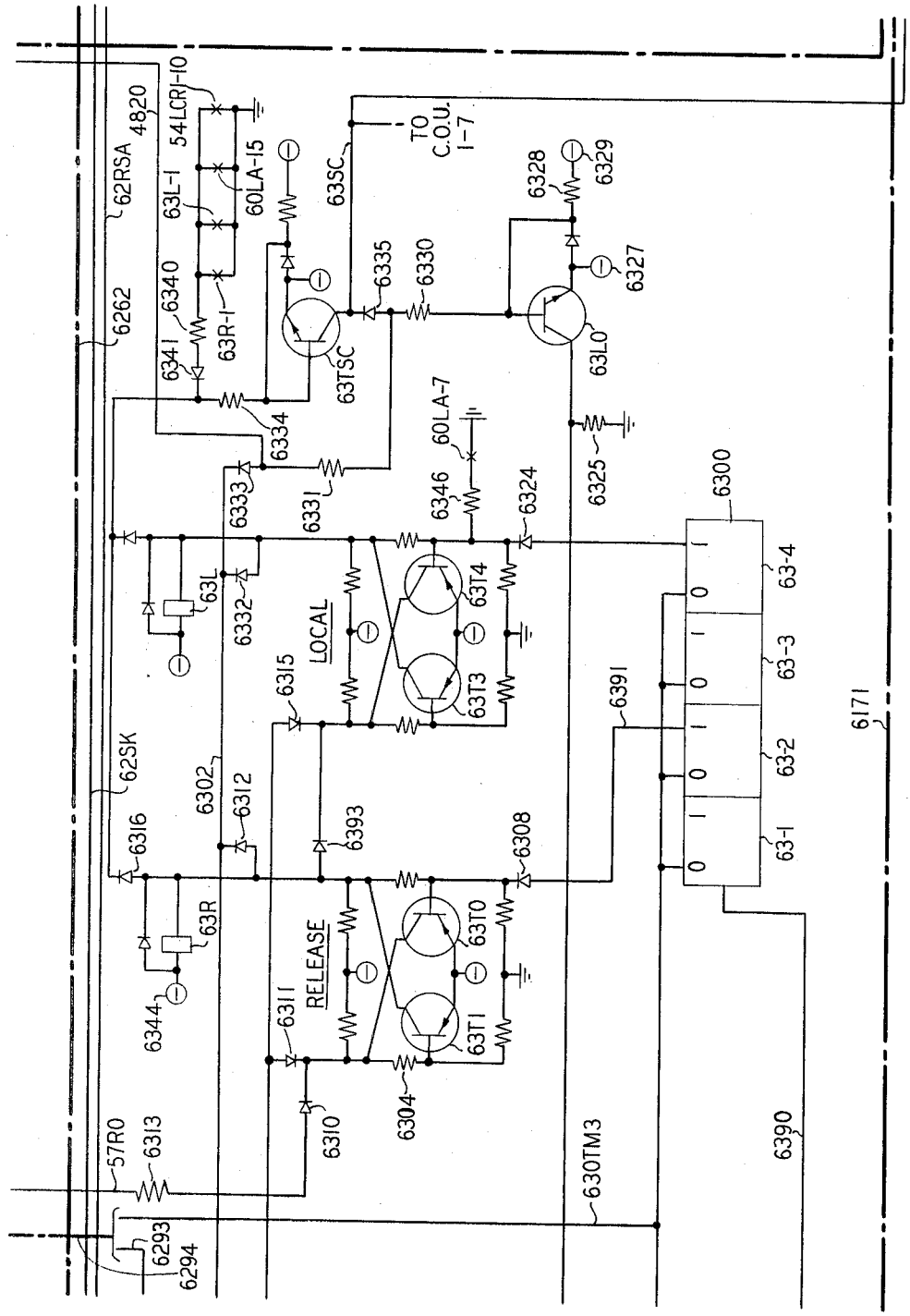

When the monostable multivibrator is first placed in the unstable state the pulse on conductor 61PR resets the six stages of counter 6100 and causes flip-flop 61A/B to change state. While the monostable multivibrator is in its unstable state, the astable multivibrator on FIG. 65 is still held in its 0 state by the positive potential on conductor 61PR'. After 125 milliseconds the monostable multivibrator restores to its stable state, the astable multivibrator resumes pulsing and line scanning resumes. When the monostable multivibrator enters its stable state after 125 milliseconds the reset flip-flop of FIG. 62 is also restored to its normal condition with transistor 62T0 conducting. The positive pulse produced at the collector of transistor 62T5 when it turns on is transmitted through capacitor 6220 and diode 6218 to the base of transistor 62T1 which turns off. The field unit is ready for the new scan as transistor 26R has gone passive after 2.5 milliseconds and has reset counter 2400 to its initial 0 count.

In the event the connection is not completed within one second, the common control and individual units automatically reset. When contacts 65A–8 or 65B–8 close at the the begining of the regular connection sequence, capacitor 5420 begins to charge from negative source 5417. After one second has elapsed, the capacitor has charged sufficiently to forward bias diode 5426 and thus to turn on transistor 5423. Collector current of this transistor operates relay 54TM. Contacts 54TM-3 on FIG. 60 close, and relay 60CK1 energizes. Contacts 60CK1-7 on FIG. 62 close. Contacts 54TM-2 are also closed, and the negative potential of source 6232 is applied to diode 6212. The reset flip-flop is triggered, and the entire circuit resets. When contacts 58C-10 on FIG. 54 close, the positive potential on conductor 5810 causes capacitor 5420 to rapidly discharge. Relay 54TM releases, contacts 54TM-1 open, and relay 60CK1 releases as well. The positive pulse on conductor 62TS triggers the monostable multivibrator which after 125 milliseconds causes scanning to resume.

E. Trunk release—Detailed description of central office unit and common control operations Trunk scanning proceeds simultaneously with line scanning in the eight central office units. The five counter stages 56TKR1-56TKR5, comprising counter 5600, identify one of 20 trunks. As counter 5600 counts to 32 and there are only 20 trunks in each unit to be scanned, 12 of the 32 counts contained within counter 5600 are unused for scanning purposes. The three stages 56CON1-56CON3, comprising counter 5601, determine in which of the eight units the particular trunk, whose identity is stored in counter 5600, is scanned.

Counter 5600 complets a 32 count cycle prior to the change of the count stored in counter 5601. Thus each unit whose identity is contained in counter 5601 has all of its trunks scanned for trunk releases prior to trunk scanning in the next unit. Just as counter 5601 advances after each cycle of operation of counter 5600, counter 5700 advances its count after each cycle of operation of counter 5601. The five counter stages 57TKT1-57TKT5 are utilized in the local connection scanning sequence, to be described below. It will suffice at this point to note that although counters 5600 and 5601 control trunk scanning for release of a regular connection, they do so only when stages 57TKT1 and 57TKT2 of counter 5700 both contain binary 0's. In the event that either of these stages contains a binary 1, counters 5600 and 5601 are utilized for local connection scanning in conjunction with counter 5700.

AND gate 5715 provides a positive output potential unless both inputs are negative in which case the output is negative as well. With both stages 57TKT1 and 57TKT2 containing binary 0's the 1 outputs are negative in potential and only at this time is a negative potential applied to conductor 57R0. The negative potential on conductor 57R0, rather than a positive one, controls counters 5600 and 5601 to scan trunks for releases of regular connections rather than to be utilized in the local connection scanning sequence.

Conductor 65P1 is connected to the input of the first stage of counter 5600. Each time the astable multivibrator switches to the 1 state, with transistor 65T1 turning on, the collector of this transistor becomes positive in potential. This potential, applied to conductor 65AST1, causes counter 6100 to advance to control the scanning of the next line. At the same time counter 5600 is advanced to control the scanning of the next trunk. The negative potential of source 6543 is normally applied through resistor 6542 to conductor 65P1. However, when transistor 65T1 conducts, the positive pulse produced at its collector is transmitted through capacitor 6536, diode 6541, and conductor 65P1 to the input of counter 5600. The counter thus advances with each operation of the astable multivibrator.

Figure 48:
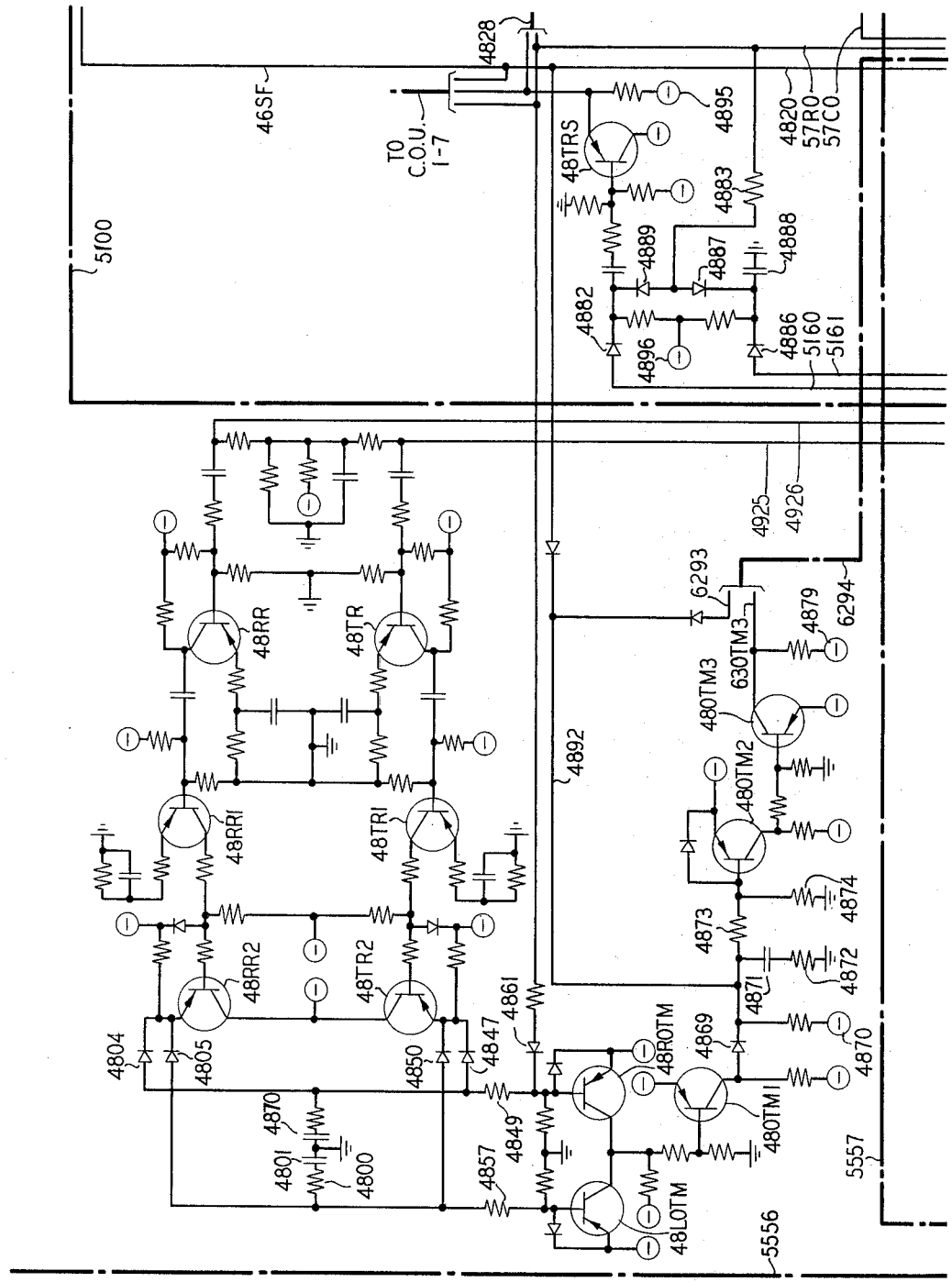

Conductor 57R0 is coupled to each of the eight central office units as shown in FIG. 48. It is connected to central office unit 0 via cable 4828 extended to FIG. 44. When conductor 57R0 is positive in potential diode 4422 conducts and transistor 44CR is inhibited. However, during trunk scanning conductor 57R0 is negative in potential and diode 4422 does not conduct. At this time transistor 44CR is not inhibited as negative source 4423 is greater in magnitude than negative source 4424 thereby forward biasing the emitter-base junction of transistor 44CR. Thus the negative potential on conductor 57R0 would ordinarily allow the forward biasing of transistor 44CR and the seven other analogous transistors in the seven other central office units. Only one of these eight transistors conducts at any one time however, in order that the only trunk scanned will be that contained in the individual unit whose identity is stored in counter 5601. The outputs of this counter are connected to eight AND gates 5716. The eight outputs 57C0-57C7 are successively energized with a negative potential as counter 5601 advances. Each of these eight conductors is connected to a respective central office unit. Conductor 57C0 is connected to FIG. 44. When a trunk in one of the other seven units is being scanned conductor 57C0 is positive in potential and both diodes 4420 and 4421 conduct.

This positive potential reverse biases transistor 44C. In addition the positive potential, extended through diode 4421 and resistor 4430 to the base of transistor 44CR, inhibits this transistor even though at this time a negative potential is applied to conductor 57R0. Transistor 44CR conducts only when conductor 57C0 is negative in potential as well as conductor 57R0. When transistor 44CR does so conduct a positive potential is transmitted through diode 4426 and resistor 4415 to the base of transistor 44C. Thus this transistor is held passive.

In summary, during trunk scanning seven of the individual units have their transistors analogous to transistors 44CR and 44C both nonconducting due to the positive potentials on the respective seven of conductors 57C0-57C7. The individual unit containing the trunk to be scanned has only its transistor analogous to transistor 44CR conducting, the associated transistor analogous to transistor 44C being held off by the former transistor.

When the trunk being scanned is not contained within central office unt 0 the collector of transistor 44CR is at approximately the negative potential of source 4427. All of diodes 4404 connected to the trunk sleeves are thus reverse biased. These diodes control the trunk scanning in central office unit 0 and thus with transistor 44CR passive trunk scanning is inhibited in this unit. When the trunk being scanned however is contained in central office unit 0, the collector of transistor 44CR is more positive in potential and all of diodes 4404 connected to the trunk sleeves are forward biased thereby permitting trunk scanning in this unit.

Trunk scanning is accomplished by applying an 18 kc. tone to the links in the unit being scanned. A trunk priorly in use but now necessitating a release permits this tone to pass to the anode of the respective one of diodes 4404 connected to its sleeve. Those of diodes 4404 connected to the trunk sleeves are enabled in only one of the eight units under control of counter 5601. Thus the tone is transmitted through those of diodes 4404 in this particular unit connected to trunks requiring release. It is possible for the tone to be transmitted through more than one of diodes 4404 in the particular unit whose trunks are being scanned in the event that more than one trunk requires release. Counter 5600 identifies a particular one of these 20 trunks and this counter controls the detection of the tone through only that one of diodes 4404 connected to the particular trunk identified. The five stages of counter 5600 each are designated by the letters TKR indicating that these stages control the receiving of the tone from a particular trunk.

Figure 49:
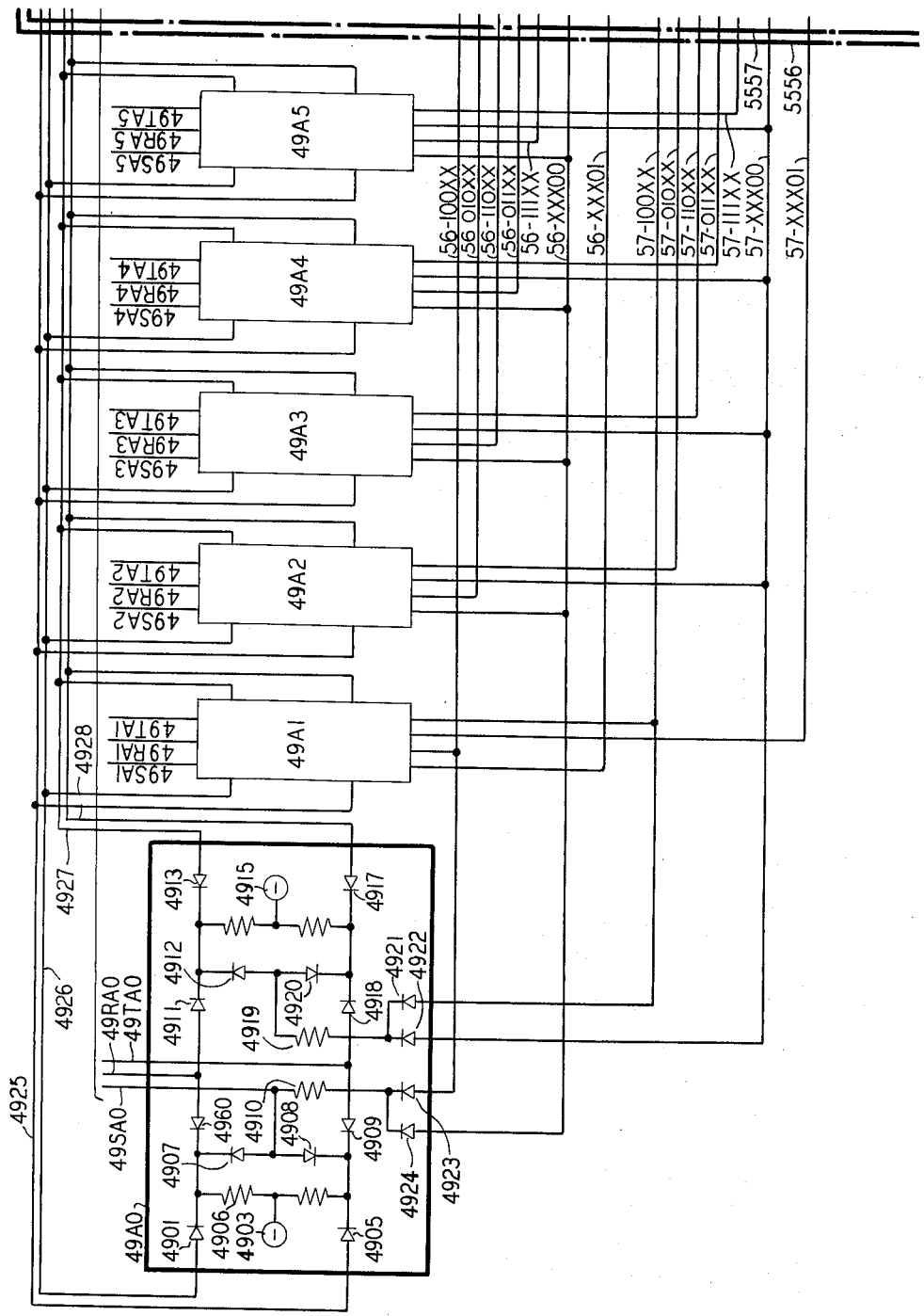
Figure 50:
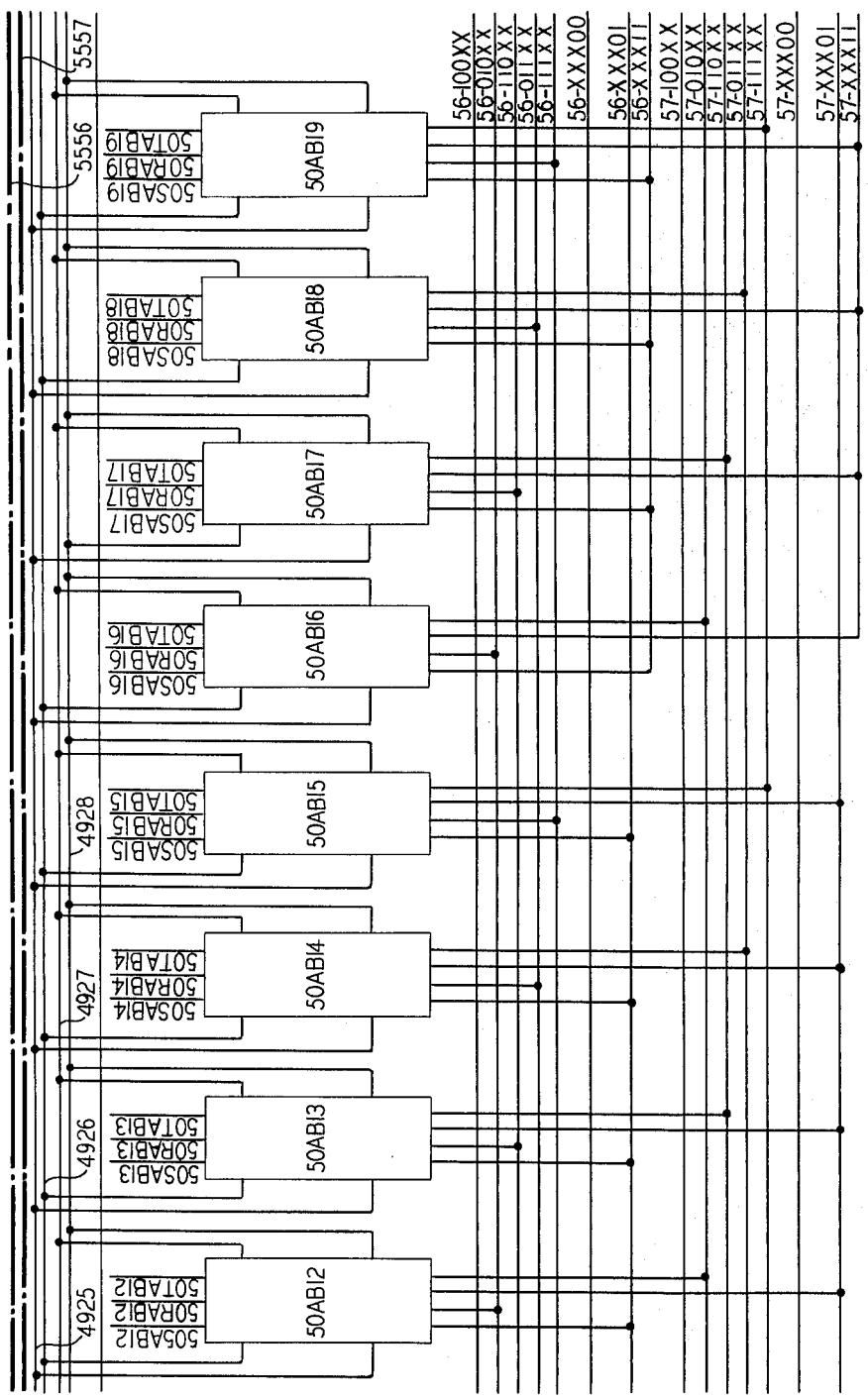
Figure 51:
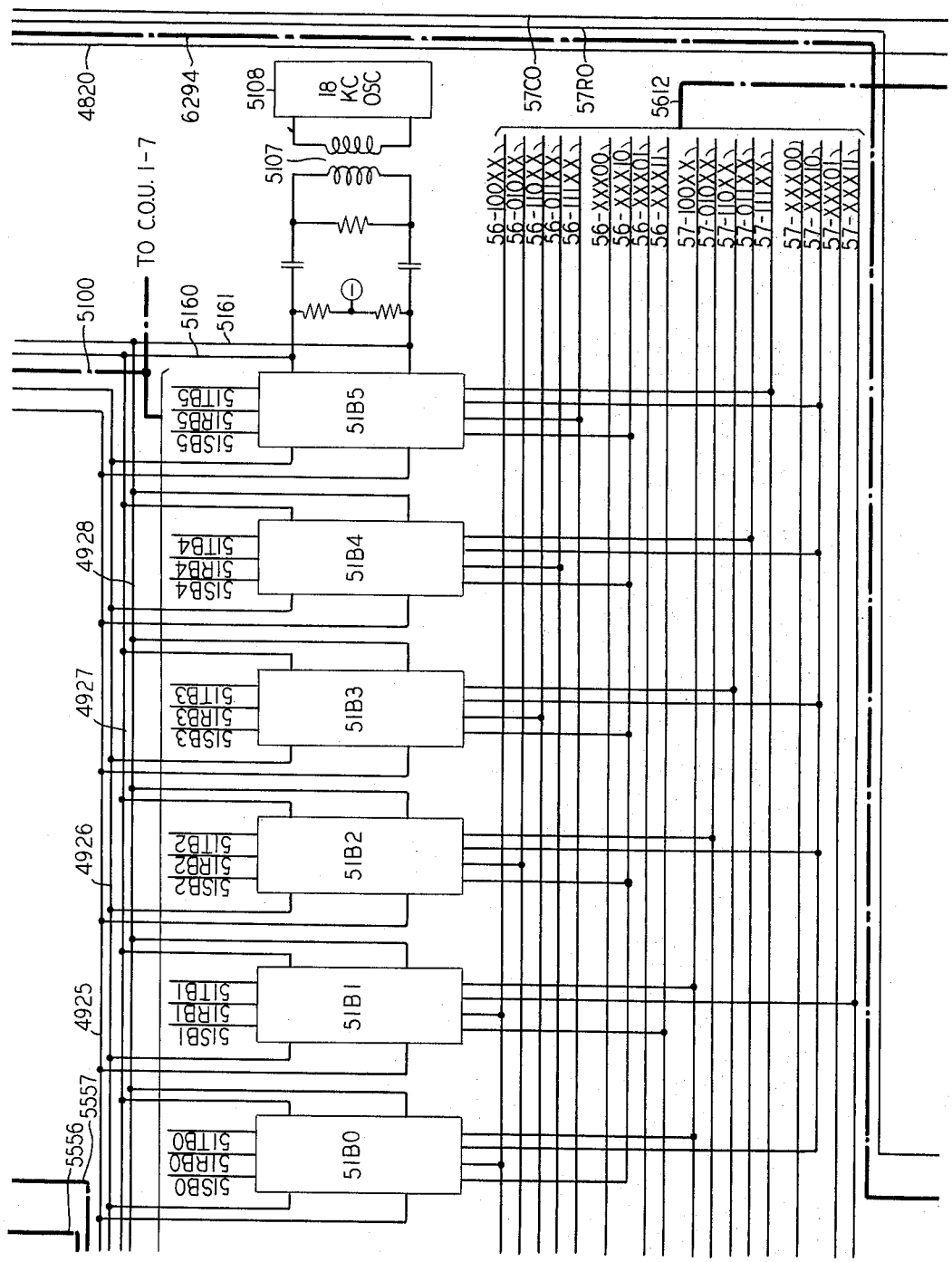

The particular one of the 20 trunks which is scanned for the tone is determined by gates 49A0-51B5 shown on FIGS. 49, 50 and 51. Only gate 49A0 is shown in detail in the drawing. Each of these gates is provided with three conductors analogous to conductors 49SA0, 49RA0 and 49TA0. These three conductors of each gate are connected via cable 5100 to FIG. 44 where it is seen they are connected through diodes 4404 and capacitors 4403 to the tip, ring and sleeve conductors of respective trunks. The three conductors of each gate are similarly coupled to the tip, ring and sleeve conductors of a particular trunk in each of the other seven central office units. The tip and ring connections are not utilized in trunk scanning. However, the sleeve connections control the receiving of the tone from only the sleeve of the trunk whose identity is contained within counter 5600. Although more than one of the sleeve conductors in central office unit 0 may transmit the 18 kc. tone if more than one trunk requires release, only one of the gates 49A0–51B5 permits this tone to pass through it on one of conductors 49SA0–51SB5. In this manner only one trunk is scanned for release at a particular time. The tone, if it appears on conductor 49SA0, and if gate 49A0 is enabled, is transmitted through diodes 4907 and 4908, and 4901 and 4905 to conductors 4925 and 4926. Similarly if one of the other 19 trunks is being scanned and requires release only the gate associated with that trunk is enabled and permits the tone to pass through it to both of conductors 4925 and 4926. As each of the conductors 49SA0–51SB5 is coupled to eight central office units it is apparent that the tone appears on conductors 4925 and 4926 if the particular one of the 160 trunks being scanned requires release.

Before describing the manner in which the tone is applied to the trunk sleeves in the first place, it will be of aid to describe the operation of gates 49A0–51B5 under the control of counter 5600. Referring to gate 49A0 it is seen that the gate comprises two systemically symmetrical halves. The rightmost half is utilized only in the scanning sequence for local connections and will be described below. The leftmost half however is utilized in both scanning for trunk releases and local connections. Negative source 4903 would normally cause both of diodes 4901 and 4905 to be forward biased in the absence of other positive potentials at the cathodes of these diodes. If a positive potential is applied to the anode of either of diodes 4923 or 4924 it is seen that this potential is transmitted through resistor 4910 and diodes 4907 and 4908 to the cathodes of diodes 4901 and 4905. Thus a positive potential applied to either of diodes 4923 or 4924 reverse biases diodes 4901 and 4905. The tone on conductor 49SA0 is transmitted to conductors 4925 and 4926 only if the anodes of both of diodes 4923 and 4924 are negative in potential. Similar remarks apply to each of the other 19 gates 49A1–51B5. Each of these gates has two diodes analogous to diodes 4923 and 4924. Each of these diodes is connected to one of conductors 56–100XX through 56–XXX11. These nine conductors are ordinarily positive in potential and thus all of gates 49A0–51B5 are inhibited. Under control of counter 5600 various ones of AND gates 5602 are energized thereby applying negative potentials to the output conductors 56–100XX through 56–XXX11. Under control of counter 5600 these output conductors are energized in such a manner that the two diodes analogous to diodes 4923 and 4924 in only one of the 20 gates are reverse biased at a particular time thereby enabling the gate.

Only 20 of the possible 32 counts stored in counter 5600 are utilized for trunk scanning. The following table illustrates the trunk scanned for each count stored in counter 5600. It must be borne in mind that the only trunk which is scanned for the eight trunks identified by counter 5600 is that trunk contained in the central office unit whose identity is contained in counter 5601. It must also be remembered that the following table is valid, that is trunk scanning is accomplished under the control of counters 5600 and 5601, only when stages 57TKT1 and 57TKT2 are both in the 0 state.

| Counters 56TKR1–56TKR5 | Trunk Scanned |
|---|---|
| 0 0 0 0 0 | Unused |
| 1 0 0 0 0 | 35A0 |
| 0 1 0 0 0 | 35A2 |
| 1 1 0 0 0 | 35A3 |
| 0 0 1 0 0 | Unused |
| 1 0 1 0 0 | Unused |
| 0 1 1 0 0 | 35A4 |
| 1 1 1 0 0 | 35A5 |
| 0 0 0 1 0 | Unused |
| 1 0 0 1 0 | 40B0 |
| 0 1 0 1 0 | 40B2 |
| 1 1 0 1 0 | 40B3 |
| 0 0 1 1 0 | Unused |
| 1 0 1 1 0 | Unused |
| 0 1 1 1 0 | 40B4 |
| 1 1 1 1 0 | 40B5 |
| 0 0 0 0 1 | Unused |
| 1 0 0 0 1 | 35A1 |
| 0 1 0 0 1 | 37AB12 |
| 1 1 0 0 1 | 37AB13 |
| 0 0 1 0 0 | Unused |
| 1 0 1 0 1 | Unused |
| 0 1 1 0 1 | 37AB14 |
| 1 1 1 0 1 | 37AB15 |
| 0 0 0 1 1 | Unused |
| 1 0 0 1 1 | 40B1 |
| 0 1 0 1 1 | 37AB16 |
| 1 1 0 1 1 | 37AB17 |
| 0 0 1 1 1 | Unused |
| 1 0 1 1 1 | Unused |
| 0 1 1 1 1 | 37AB18 |
| 1 1 1 1 1 | 37AB19 |

The nine conductors 56–100XX through 56–XXX11 are energized by two or three input AND gates. The last five numerals and X's of each designation indicate to which of the five stages the AND gates are connected and which counts stored in these stages energize the conductor. For example, conductor 56–010XX is negative in potential only when the first three stages contatin a binary 010. Conductor 56–XXX10 is negative in potential only when the last two stages contain the binary number 10. These nine conductors are connected via cable 5612 to FIGS. 49–51 where they are connected to the two leftmost diodes in the 20 gates 49A0–51B5.

Figure 56:
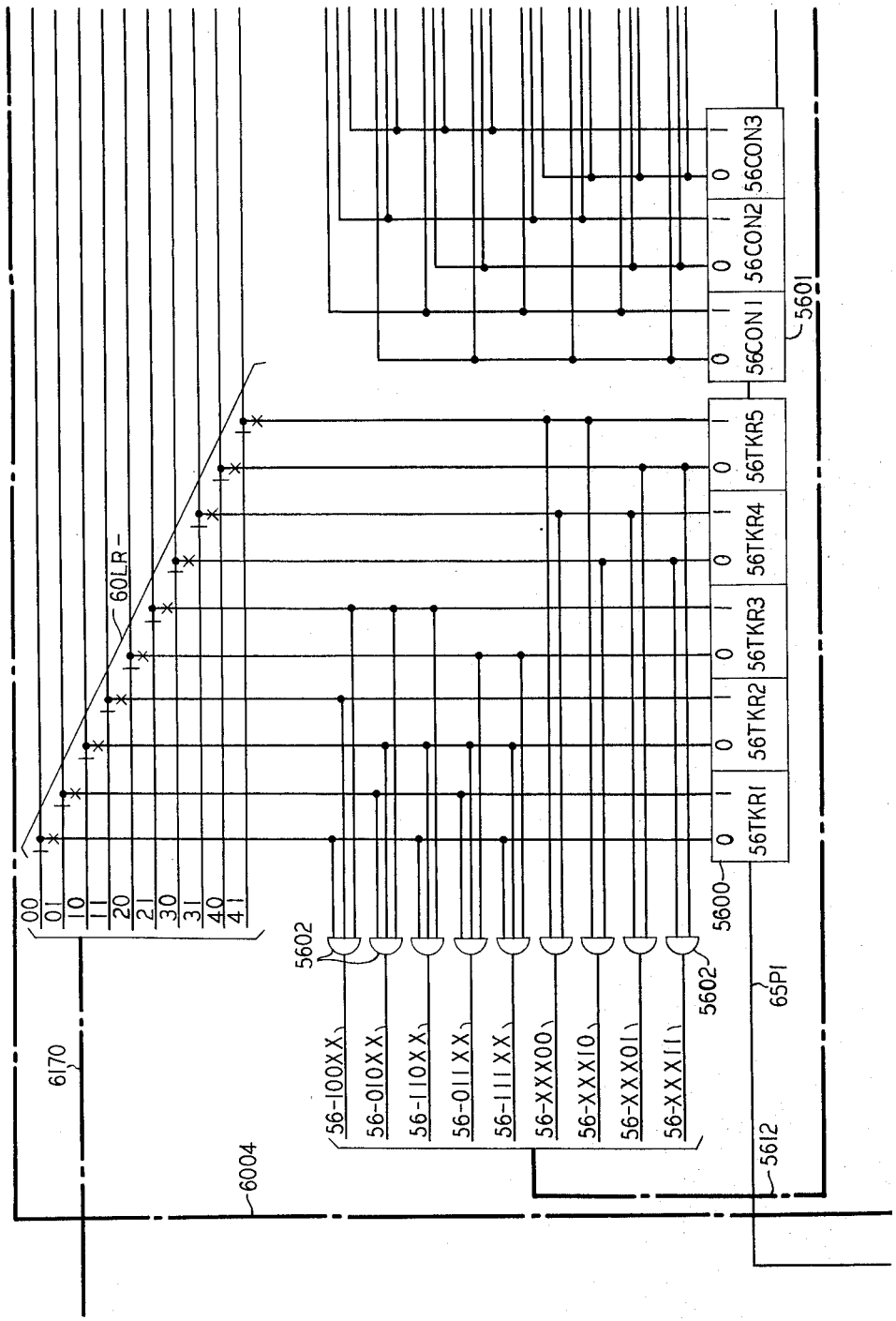

An example will illustrate the enabling of the gates under the control of counter 5600. Referring to the table above when the binary number 00000 is stored in the counter none of the 20 gates should be enabled. Referring to FIG. 56, with this number stored in the counter only conductor 56–XXX00 is negative in potential. As each of the gates 49A0–51B5 has its two diodes analogous to diodes 4923 and 4924 connected to two different ones of conductors 56–100XX through 56–XXX11, it is apparent that at least one of these diodes in each gate is forward biased. As a consequence, none of the gates is enabled. With the binary number 10000 stored in the counter conductors 56–100XX and 56–XXX00 are both negative in potential. The two diodes 4623 and 4624 in gate 49A0 are connected to these two conductors. As both diodes are reverse biased the gate is enabled and trunk 35A0 is scanned in the particular concentrator whose identity is stored in counter 5601. If a tone appears on conductor 49SA0 it is transmitted to both of conductors 4925 and 4926, the tone on these two conductors being in phase with each other.

The tone originates in oscillator 5108. It is transmitted along conductors 5160 and 5161 to diodes 4882 and 4886. Transistor 48TRS is normally conducting in a quiescent condition. During any sequence other than trunk scanning conductor 57R0 is positive in potential. This potential is coupled through resistor 4883 to the anodes of diodes 4889 and 4887. With these diodes forward biased, diodes 4882 and 4886 are reverse biased and the tone does not pass through these diodes. However, during trunk scanning conductor 57R0 is negative in potential and diodes 4887 and 4889 are reverse biased. At this time, negative source 4896 forward biases both of diodes 4882 and 4886. The 18 kc. tone on conductor 5160 is now transmitted through diode 4882 and causes transistor 48TRS to follow the 18 kc. oscillations. The tone is thus transmitted over conductor 48RS to each of the eight central office units.

It is transmitted via cable 4828 to FIG. 4. With transistor 44CR conducting diode 4411 is forward biased and the tone is transmitted through this diode and capacitor 4409 to conductor 44RS'. The tone is thus transmitted to conductor 44RS' only if the trunk being scanned is contained in central office unit 0. If the trunk being scanned is in one of the other seven units the collector of transistor 44CR is more negative in potential, diode 4411 is reverse biased, and the tone is not transmitted to conductor 44RS'. Thus transistor 44CR not only insures that a signal is not transmitted through diodes 4404 connected to the trunk sleeves if the trunk being scanned is not contained in central office unit 0, but as further protection prevents the tone from being applied to the trunks in this unit in the first place.

If the subscriber at the field unit has hung up his receiver the tip of the line becomes more positive in potential as no current flows through his subset. The central office detects this condition in the ordinary manner as the subscriber's tip and ring conductors are connected directly to the tip and ring conductors of the line circuit in the central office. The central office thus treats the signal as a termination request and causes a negative potential to be applied to the sleeve of the line equipment. Referring to line switch A it is seen that although the central office applies a negative potential to the sleeve, the cross points in the line switch have not yet opened as the particular line switch hold magnet utilized in the connection is still operated. As a result, the negative potential applied to the sleeve is extended through the line switch crosspoints and the sleeve of the line switch link employed in the connection to one of conductors 33S0–33S19. Each of the sleeve leads 33S0–33S19 is connected via cable 3302, a resistor 4122 and a resistor 4103 to a respective one of diodes 4107. The only ones of these diodes that will be forward biased at this time are those connected to the sleeves of links connected to the sleeves of line circuits that were previously grounded but are now negative in potential. The tone on conductor 41RS' is transmitted through each of these forward biased diodes 4107 to respective conductors 41M–0 through 41M–19. Those of diodes 4107 connected through resistors 4103 and 4122 to respective conductors 33S0–33S19 which are grounded indicating the links are in use, are reverse biased and the tone is not transmitted to the respective ones of conductors 41M–0 through 41M–19. Any link that is presently being used has applied to its sleeve a positive potential by the central office line circuit which is extended through the crosspoints of the line switch. Thus the tone is not applied to those of conductors 41M–0 through 41M–19 associated with links presently in use. However, those links priorly in use but now requiring release and those links which were not priorly in use have applied to their sleeves respectively a negative potential or no potential at all. The latter condition arises as the respective crosspoints are open. In either event the diodes 4107 associated with these links are not reverse biased and the tone on conductor 41RS' is transmitted to the associated conductors 41M–0 through 41M–19.

One other possibility should be noted. If a regular connection has been set up through the concentrator as a result of a telephone being off-hook, central office 3001 may not yet have handled the call. In this case negative potential 3002 will still be on the particular line sleeve involved. This negative potential however will not cause a regular release. The off-hook condition will result in enough of the sleeve potential being drained off through the particular diode 4101 involved so that the associated diode 4107 can not be forward biased. The diode 4101 conducts because the ring is less negative than it is when the receiver is on-hook.

Although the tone is thus on conductors 41M–0 through 41M–19 associated with links priorly in use but now requiring release, and links not previously used at all, the tone is transmitted to only those of respective conductors 36S0–36S19 associated with links priorly in use. These links have their line switch hold magnets still operated. The operated line switch hold magnets have their contacts 41LHA0–2 through 41LHA19–2 closed, and the tone on conductors 41M–0 through 41M–19 is transmitted through these closed contacts to respective conductors 36S0–36S19. However, those links not priorly in use have their respective contacts 41LHA0–2 through 41LHA19–2 open, and the tone is not transmitted to respective conductors 36S0–36S19. Thus the tone on conductor 41RS' appears on only those of conductors 36S0–36S19 associated with links priorly in use and which are still connected through the line switch to central office line circuits but now require release.

The tone on conductor 44RS' is extended to conductor 41RS' in the hold magnet circuit for line switch A and also to conductor 39RS' in the hold magnet circuit for line switch B. The tone thus also appears on those of conductors 39S0–39S19 connected to links which must now be released.

Figure 44:
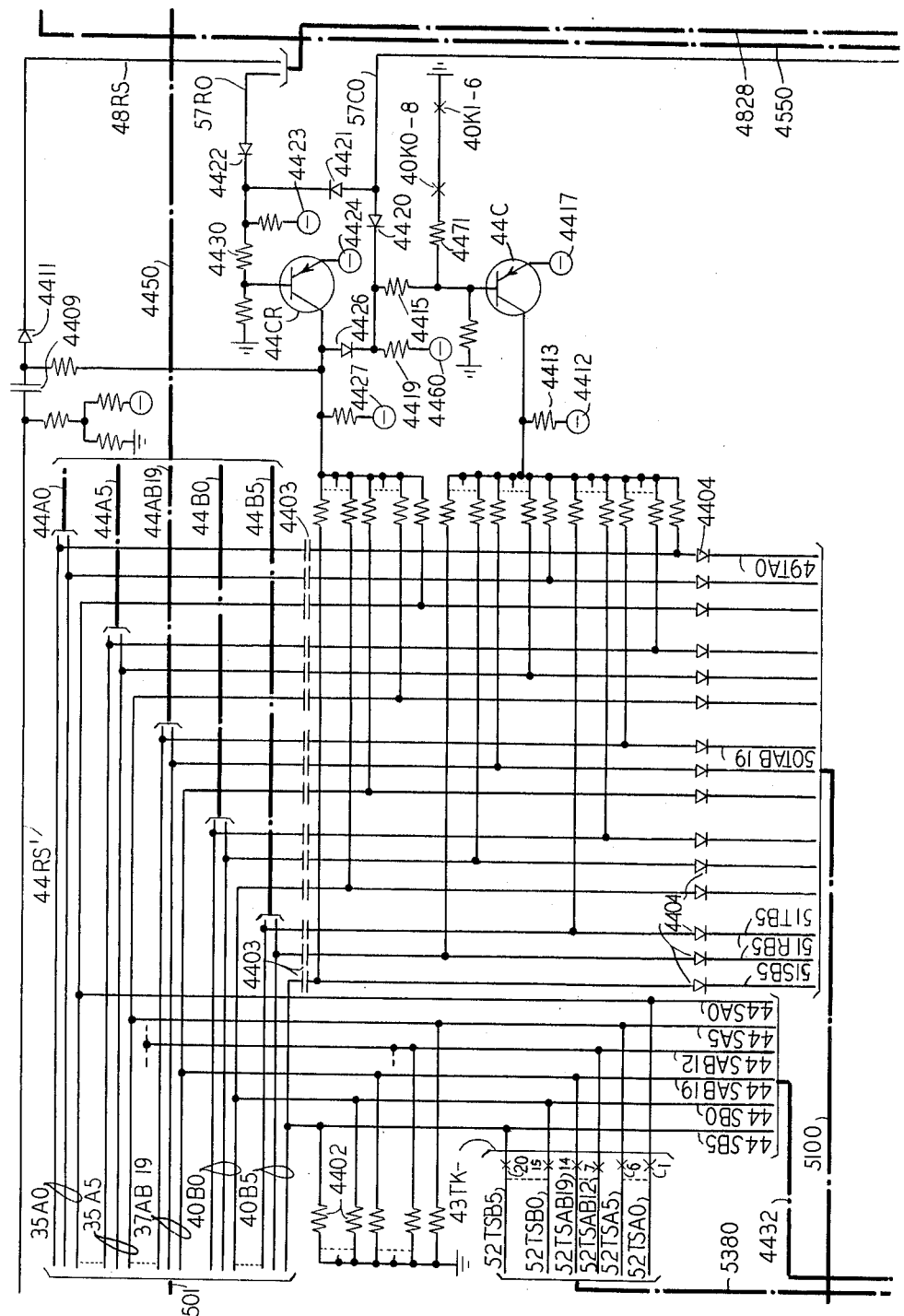

The link sleeves of trunk switch A, 36S0–36S19, are connected through the crosspoints of this trunk switch and cable 3501 to FIG. 44. The tone is transmitted through capacitors 4403 and thus appears at the anodes of the respective ones of diodes 4404. Similar remarks apply to the tone transmitted through the sleeve connections in trunk switch B to respective ones of the analogous diodes. Although the tone thus appears on the sleeves of all of the trunk links which must be released, the tone is transmitted to conductors 4925 and 4926 through only that one of gates 49A0–51B5 associated with the trunk whose identity is stored in counter 5600 and which is contained in the unit whose identity is stored in counter 5601. Any link which must now be released is still connected to a trunk which similarly must be released. The tone on all of the links to be released therefore appears on the sleeves of all trunks which must be released. The tone appears on conductors 4925 and 4926 only if it is applied to the sleeve of the particular one of the 160 trunks being scanned at the moment.

The in-phase signals on conductors 4925 and 4926 are applied respectively to the bases of transistors 48TR and 48RR. These transistors amplify the signals and apply them to the bases of respective transistors 48TR1 and 48RR1. These transistors similarly amplify the signals and apply them to the bases of transistors 48TR2 and 48RR2. These two latter transistors similarly amplify the signals, and in addition comprise a low impedance source. Transistor 48ROTM is normally reverse biased by the positive potential on conductor 57R0 which is connected through diode 4861 to the base of this transistor. However, during trunk scanning this conductor is negative in potential and transistor 48ROTM is not inhibited. As the emitters of transistors 48TR2 and 48RR2 become negative in potential as a result of the oscillating signal, this potential is applied through diodes 4847 and 4804, and resistor 4849 to the base of transistor 48ROTM. The negative potential causes transistor 48ROTM to conduct. This transistor would normally follow the 18 kc. oscillations, and turn off for half of each cycle. However, when transistors 48RR2 and 48TR2 conduct for one-half of each cycle, capacitor 4870 charges. The discharge of this capacitor during the other half of each cycle maintains transistor 48ROTM conducting. Transistor 48OTM1 is normally on but turns off when transistor 48ROTM conducts. Thus transistor 48OTM1 is continuously off. Transistor 48OTM2 is normally off. In the quiescent state transistor 48OTM1 is conducting and current flows through diode 4869, and resistors 4873 and 4874 to ground. The positive potential across resistor 4874 reverse biases the emitter-base junction of transistor 48OTM2 which thus remains off. However, when transistor 48OTM1 turns off, negative source 4870 causes the emitter-base junction of transistor 48OTM2 to be forward biased and thus the transistor conducts. Transistor 48OTM2 conducts however only after the tone has been received for 750 microseconds. Capacitor 4871 must first charge from source 4870 after transistor 48OTM1 is turned off. This 750 microsecond delay is provided to insure that a continuous tone is being received rather than some spurious signal. After 750 microseconds transistor 48OTM2 remains continuously on provided the 18 kc. tone is not interrupted which it will not be if the trunk being scanned indeed requires release and the initial signal on conductor 4925 and 4926 did not arise from a spurious source whose duration was greater than 750 microseconds.

Transistor 48OTM3 is normally on and a potential more positive than that of source 4879 is applied to conductor 63OTM3. This positive potential is connected to the 0 outputs of each of the four stages 63-1 through 63-4 of counter 6300. Thus in the quiescent condition the binary number 0000 is maintained in this counter. However, whenever transistor 48OTM2 conducts transistor 48OTM3 turns off, and the positive inhibiting potential on conductor 63OTM3 is removed.

The negative potential now on conductor 63OTM3 is also applied to the anode of diode 6540. The more positive potential on this conductor was previously transmitted through this diode and resistor 6537 to forward bias diode 6541. With diode 6540 reverse biased however, negative source 6539 causes diode 6541 to be reverse biased. As a result, the pulses from the astable multivibrator are no longer transmitted through this diode to conductor 65P1 to advance counter 5600. Although the astable multivibrator continues to switch state, counter 5600 does not advance and the priorly energized gate of gates 49A0–51B5 remains energized. The 18 kc. tone thus continues to be transmitted through the sleeve of the trunk being scanned, and transistor 48OTM3 remains off continuously thereby continuously reverse biasing diode 6541 and enabling counter 6300.

The astable multivibrator continues to create pulses to cause the scanning of lines. Whenever flip-flop 61A/B changes from its 1 state to its 0 state a pulse is obtained on conductor 61-0. This conductor is connected via cable 6113 to conductor 6390 which is in turn connected to the input of counter 6300. Thus each time flip-flop 61A/B changes to its 0 state the count in counter 6300 advances. When counter stage 63-2 changes from 0 to 1 state a positive potential is applied to conductor 6391. This potential is transmitted through diode 6308 to the base of transistor 63T0 of the release flip-flop comprising transistors 63T0 and 63T1. The positive potential on conductor 57R0 before trunk scanning begins is transmitted through resistor 6313, diode 6310, and resistor 6304 to the base of transistor 63T1 to cause this transistor to remain off and transistor 63T0 to remain on. During trunk scanning diode 6310 is reverse biased and transistor 63T1 is no longer held off by the potential on conductor 57R0. This transistor remains off however as the flip-flop was originally set in this state by the positive potential on conductor 57R0. The positive potential now applied by counter stages 63-2 to the base of transistor 63T0 turns this transistor off and transistor 63T1 on. Current flows from the collector of transistor 63T1 through the winding of relay 63R to negative source 6344. Relay 63R operates indicating that the trunk whose identity is stored in counter 5600 and which is contained in the central office unit whose identity is stored in counter 5601 must be released.

It is thus seen that relay 63R does not operate immediately upon the detection of the 18 kc. tone on the scanned trunk. Instead, it is only after the tone is received for a time interval during which flip-flop 61A/B changes to the 0 state twice that relay 63R operates. In the event that the tone is interrupted transistor 48OTM3 turns on and the more positive potential is once again applied to conductor 63OTM3. This immediately resets counter 6300 thereby insuring that relay 63R does not operate. Diode 6541 is now forward biased once again and the next pulse from the astable multivibrator enables another one of gates 49A0–51B5. The trunk release sequence is thus not initiated unless the 18 kc. tone is received for a sufficient time interval. This insures that spurious signals do not trigger the circuitry for releasing a trunk. A continuous tone for a pre-determined minimum time interval is required to initiate the sequence to release a trunk.

It should be noted that counter stages 63-3 and 63-4 are not utilized in the scanning sequence for trunk releases. These two additional stages are utilized in the scanning sequence for local connections. Similarly, transistor 48LOTM has no effect on the circuit at this time. Although diodes 4805 and 4850 conduct in the same manner as diodes 4804 and 4847, capacitor 4801 is smaller in magnitude than capacitor 4870 and cannot maintain transistor 48LOTM conducting during alternate half cycles. Transistor 48LOTM follows the 18 kc. tone and is thus incapable of maintaining transistor 48OTM1 continuously non-conducting. Transistor 48LOTM is utilized in the scanning sequence for local connections to be described below.

When transistor 63T1 turns on it is necessary to inhibit further operation of the astable multivibrator. As it is now definitely established that a trunk is to be released, further line scanning must be inhibited. The positive potential at the collector of transistor 63T1 is transmitted through diode 6312 to conductor 6302. This positive potential is further transmitted through conductor 6251 to the anode of diode 6518. As in the line scanning sequence a positive potential on this conductor maintains the astable multivibrator in the 0 state with transistor 65T0 conducting for the duration of the switching sequence.

The positive potential at the collector of transistor 63T1 is transmitted through diode 6316 and resistor 6334 to the base of transistor 63TSC which turns on. A negative potential is now applied to conductor 63SC which is extended to FIG. 46. This negative potential is extended to each of the eight central office units. It is necessary to switch the service action bistable circuit in the particular unit requiring the trunk release. This particular unit has a negative potential on its respective one of conductors 57C0–57C7, the other seven units having positive potentials on their respective conductors. On FIG. 46 it is seen that if a positive potential appears on conductor 57C0, diode 4631 is forward biased and diode 4629 is reverse biased. The negative potential on conductor 63SC is thus not transmitted through this diode to the base of transistor 46T1. On the other hand, if conductor 57C0 is negative in potential, diode 4631 is reverse biased, and as a consequence the negative potential on conductor 63SC is transmitted through diode 4629 to turn transistor 46T1 on. Thus, in the unit requiring the trunk release the service action bistable multivibrator is switched on. Again, one of the eight relays 46IA0–46IA7 operates and further insures that the other seven service action bistable multivibrators remain off.

The more positive potential on conductor 46SF due to the conduction of transistor 46T1 is transmitted to FIG. 48 to ocnductor 4892. This potential turns off transistor 480TM2. Conductor 630TM3 becomes negative in potential once again. Although counter 6300 resets, transistor 63T1 continues to conduct as the release flip-flop has already been triggered from the pulse on conductor 6391. And although the negative potential on conductor 630TM3 that was previously inhibiting pulses from the astable multivibrator from advancing counter 5600 is now removed, the counter does not advance as the astable multivibrator is held by the positive potential on conductor 6251.

Diode 6393 is forward biased when transistor 63T1 conducts and holds transistor 63T3 off. This insures that the local flip-flop, which initiates a local connection sequence, is not erroneously triggered.

As in the regular and local connection sequences, when transistor 46T1 turns on transistor 46FA goes active and causes a simplex pulse to be sent to the field unit over the first control path. Although this simplex pulse is transmitted at the beginning of a regular release and a local connection sequence it has no effect on the field unit. The simplex pulse sent to the field only holds counter 2400. It is the potentials on the conductors of the second control pair that initiates a switching sequence at the field.

Transistor 63L0, as described above, is normally turned on by the potential put on conductor 46SF by the now operated transistor 46T1. The negative potential at the collector of transistor 63TSC is transmitted through diode 6335 and resistor 6330 to the base of transistor 63L0 to keep this transistor off. As a result, transistor 63L0 does not turn on the transistor 65TA or 65TB. One of relays 65A and 65B operates only when the sequence to be performed is a regular connection in one of the two pair of switches. For a trunk release, relay 63R operates, and relays 65A and 65B must remain unenergized.

As in a regular connection sequence, ground potential is applied to conductor 60SP, now as a result of contacts 63R–8 on FIG. 60 closing. This ground potential again further insures that the astable circuit is held for the duration of the switching sequence. A ground potential is also applied to conductor 52SM when contacts 63R–11 close. This ground potential is transmitted through contacts 46IA0–7 on FIG. 43 to operate relays 43TK and 43SM if the trunk to be released is in unit 0. Again the equivalent two relays do not operate in the other seven units as the contacts analogous to contacts 46IA0–7 in these other units are not closed.

Relay 63R also causes contacts 63R–5 on FIG. 54 to close and start the timing circuit. If the regular release is not completed within the predetermined one second time limit, relay 54TM operates and the circuit resumes scanning.

Figure 57:
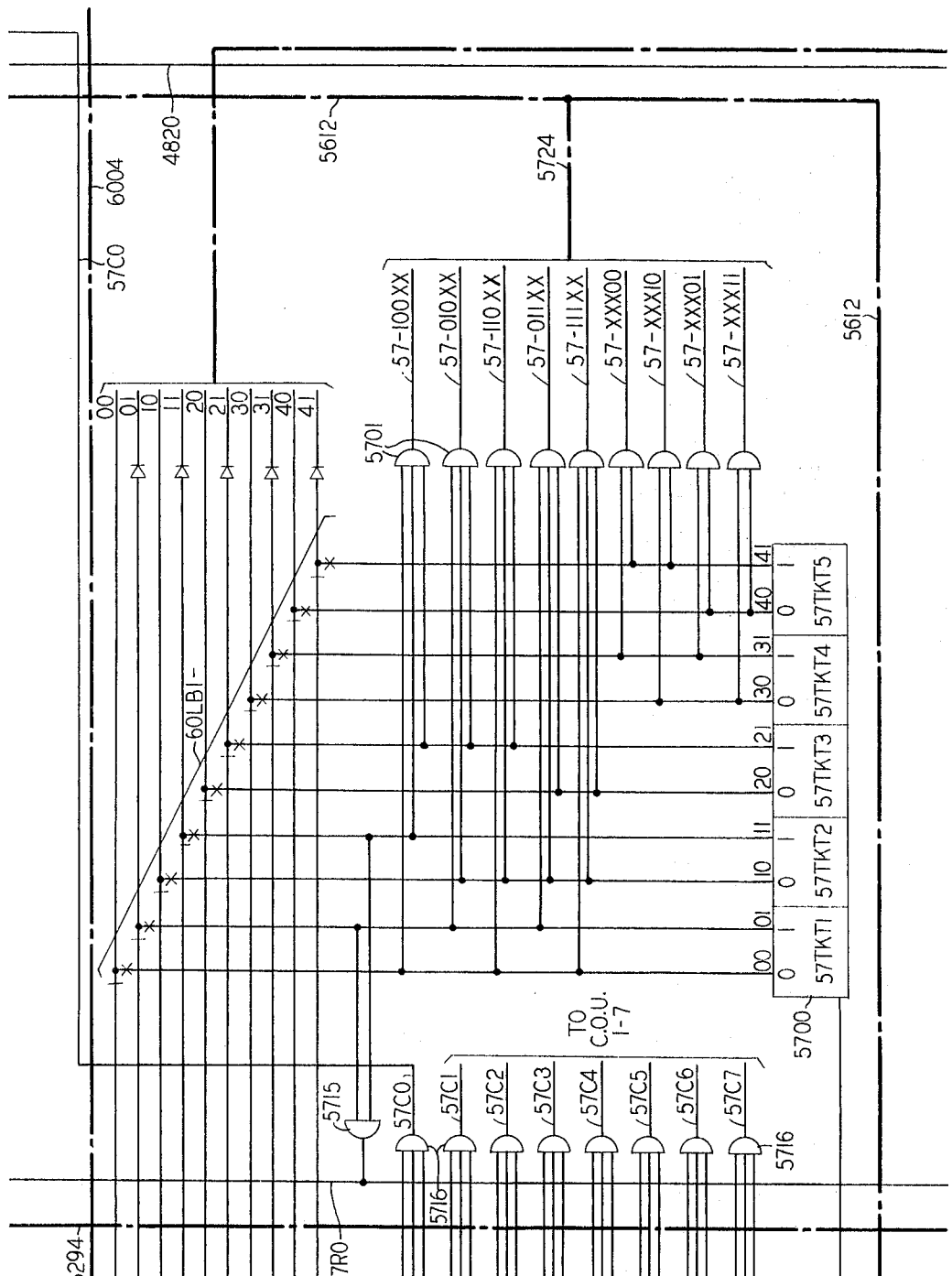
Figure 58:
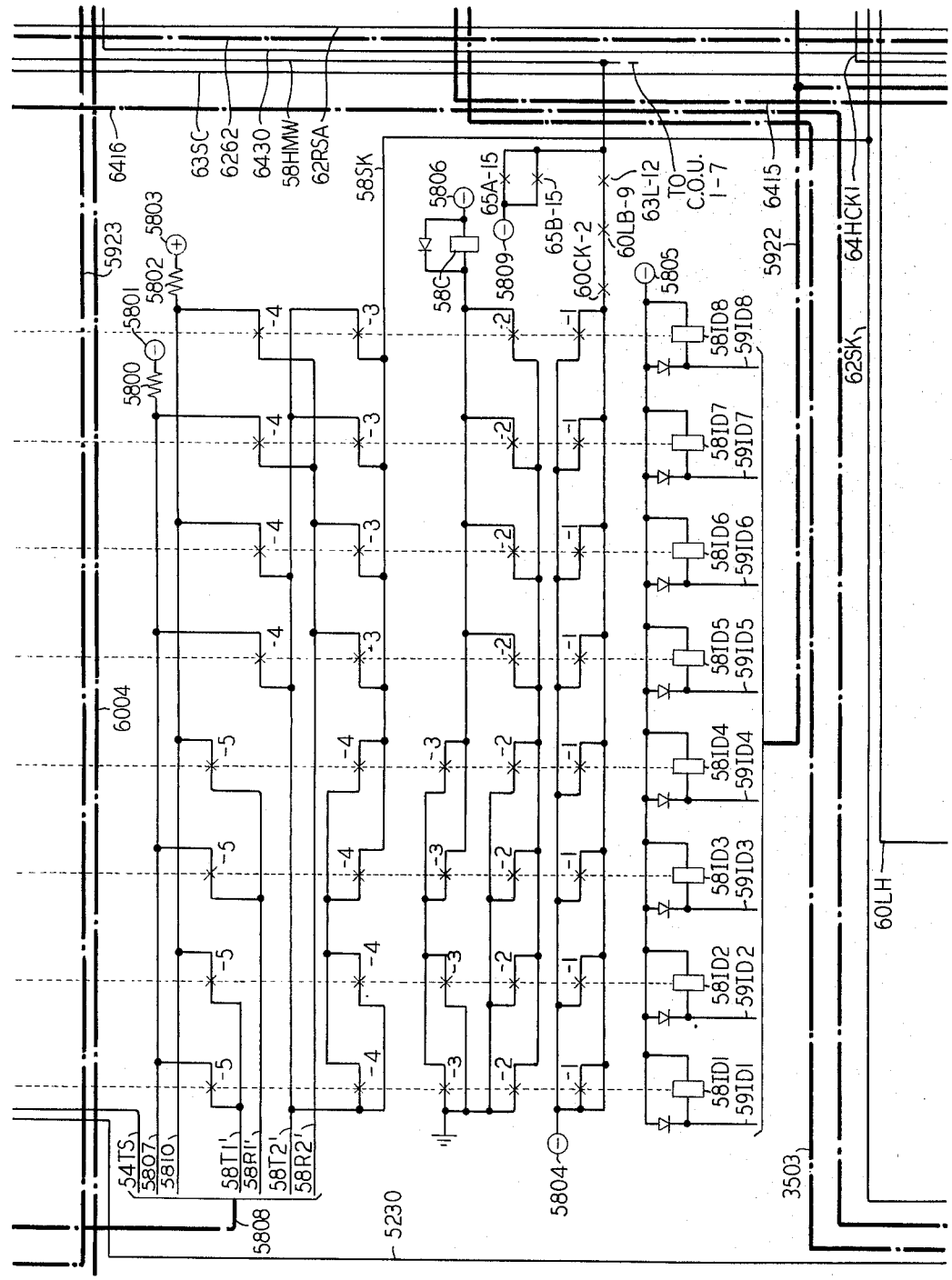

The field unit is not yet notified of the service action. The field is notified only after the identification relays in the common control have operated. With the operation of relay 63R, contacts 63R–7 on FIG. 60 close. As contacts 60LB1–1 are closed at this time relay 60LR operates. Referring to FIG. 56 it is seen that the normally closed contacts identified by the bracket designated 60LR– connect five stages of counter 6100 to respective transistors 64T1–64T4 and 64T6. With relay 60LR operated however, each of the two conductors connected to one of the stages of counter 6100 is now connected to an output of one of the five stages of counter 5600. As relay 60LB1 is still unoperated and the normally closed contacts identified by the bracket designated 60LB1– on FIG. 57 are still closed it is seen that the five transistors 64T1–64T4 and 64T6, and the five relays 64G1–64LS2 and 64LS4, are now controlled by counter 5600 rather than counter 6100. Counter 5600 contains a trunk identity and the transistors and relays on FIG. 64 are now controlled by this counter whose count identifies the trunk to be released.

Although all six relays on FIG. 64 are required to identify a particular line only five are required to identify a particular trunk. Sixty-four lines require six binary bits to identify them. Twenty trunks however require only five binary bits. Transistor 64T5 and relay 64LS3 are not connected to a stage of counter 5600. Transistor 64T5 and relay 64LS3 are still connected to stage 61HOR3 of counter 6100. Although relay 64LS3 may operate depending upon the state of this stage, no contacts on this relay are contained in the translating tree for energizing two of identifying conductors 64ID1–64ID8. As a consequence, the operation of this relay, if it occurs, has no effect on the selection of the two identification relays in the trunk release sequence.

Contacts 60LR–1 on FIG. 64 close when relay 60LR operates. As contacts 60LB1–2 are closed, negative source 6432 is connected through resistors 6402–6407 to the base of each of transistors 64T1–64T6. This is similar to the connection of source 6414 to these transistors when contacts 65A–11 or 64B–11 close. The transistors now operate under control of their respective counter stages in a manner similar to their operation during a regular connection sequence. Only when all of the relays 64G1–64LS4, which should operate, have operated is the positive potential on conductor 6430 removed and transistor 53T no longer inhibited. Contacts 63R–4 on FIG. 53 close when relay 63R operates and connect negative source 5310 through resistor 5312 to the base of transistor 53T. As in the regular connection sequence a negative potential applied through resistor 5312 to the base of transistor 53T is insufficient to operate this transistor as long as a positive potential appears on conductor 6430. It is only after all of the required relays 64G1–64LS4 have operated that the positive potential is removed from conductor 6430 and transistor 53T conducts. At this time relay 530ID operates.

With this relay operated contacts 530ID–2 and 530ID–3 on FIG. 59 close. Contacts 63R–2 and 63R–3 are closed at this time and ground potential is applied to conductors 59IDG and 59IDG′. These two conductors are extended to FIG. 64 where they are connected through a translating tree to the eight conductors 64ID1–64ID8. Two of these eight conductors are connected respectively to conductors 59IDG and 59IDG′ depending upon the energization states of the five relays 64G1–64LS2 and 64LS4. The eight conductors 64ID1–64ID8 are connected respectively to conductors 59ID1–59ID8 and at this time two of identification relays 58ID1–58ID8 operate. The two operated identification relays identify the particular trunk to be released, the trunk identity originally appearing in counter 5600. With two of the identification relays operated, relay 58C operates as in the regular connection sequence.

It is only after relay 58C operates and contacts 58C–5 on FIG. 54 close that the field is notified of the service action. In a regular connection sequence it will be recalled that a negative potential is applied to either the tip or ring of the second control pair to operate either relay 25A or 25B in the field unit depending upon which switch contains the line requesting service. A lesser negative potential is applied to the other of these two conductors and when relay 25AUX in the field unit operates and opens the conducting path in this other conductor, relay 54TR in the common control operates indicating that the field has recognized the common control command. In the trunk release sequence the common control causes a positive potential to be applied to the tip of control pair 2 to alert the field. The circuitry for accomplishing this result is similar to that just summarized for the regular connection sequence. A greater positive potential is applied to the tip of the second control pair than is applied to the ring. As a result, only relay 25R in the field unit operates, relay 25L remaining unoperated. When relay 25AUX in the field operates and opens the conducting path in the ring of the second control pair relay 54TR in the common control operates.

Conductor 5810 is positive in potential being connected through resistor 5802 to positive source 5803. This potential is extended on FIG. 54 through now closed contacts 58C–5 and 63R–13, diode 5412, conductor 54TR', contacts 46IA0–5, resistor 4692, conductor 54TR2, resistor 5410, the top winding of relay 54TR, diode 5414, conductor 54TRR, contacts 46IA0–14, and contacts 46TR1–4 to the ring of control pair 2. Although current now flows through the top winding of relay 54TR this relay does not operate. Contacts 58C–9 are closed at this time and current flows from negative source 5430 through these contacts, the lower winding of relay 54TR, resistor 5411, conductor 54TRS and contacts 46IA0–6 to ground. The two currents through the respective windings of relay 54TR apply opposing magneto-motive forces to this relay which remains unoperated.

The positive potential applied to the tip of control pair 2 is greater in magnitude than the positive potential applied to the ring of this pair. The positive potential on conductor 5810 is connected directly through contacts 58C–5 and 63R–13 to conductor 54TRT which is connected through contacts 46IA0–13 and 46TR1–3 to the tip of control pair 2. The positive potential applied to the ring is smaller in magnitude because current flowing in the ring conductor is reduced due to the resistance of resistors 4692, 5410 and the top winding of relay 54TR. Consequently, the greater current in the tip of control pair 2 causes relay 24R in the field unit to operate while the lesser current in the ring is insufficient to operate relay 25L. Relay 25R in the field when operated causes relay 25R1 to operate which in turn operates relay 25AUX. Contacts 25AUX–8 open and current ceases to flow in the ring of control pair 2. Current in the top winding of relay 54TR thus no longer flows and as only the bottom winding is energized the relay now operates. As in a regular connection sequence the operation of relay 54TR causes relay 46TR1 in the central office unit to operate when contacts 54TR–1 on FIG. 54 close. Contacts 46TR1–6 through 46TR1–9 close and contacts 46TR1–1 through 46TR1–4 open thereby connecting the four control conductors to conductors 54T1'–54R2'. These four conductors are connected via cables 5434, 5436, and 5432, and 5808 to FIG. 58 where they are connected to respective conductors 58T1'–58R2'. As in a regular connection, positive and negative potentials are applied to two of these four conductors in accordance with the operation of two of relays 58ID1–58ID8. In this manner the field unit is notified over two of the four control conductors of the identity of the trunk to be released. The field unit then causes the release of this trunk as described above.

The operation of relay 58C thus causes the field to be notified of the service action and in addition of the particular trunk identity. Relay 58C also controls the release of the trunk at the central office unit. Contacts 58C–2 on FIG. 60 are now closed and negative source 6006 is now connected through contacts 63R–9, the top winding of relay 60CK, and contacts 58C–2 to conductor 6020. Conductor 6020 is connected through contacts 60LA–9 to conductor 54TS which is connected through the translating tree of FIG. 52 to one of conductors 52TSA0–52TSAB19. The particular one of these 20 conductors which is selected depends upon the trunk identity stored in relays 58ID1–58ID8. The negative potential on the selected one of these 20 conductors is extended through cables 5220 and 5380 to FIG. 44. This negative potential is extended through respective contacts 43TK–1 through 43TK–20 to the sleeve of the particular trunk to be released. It will be recalled that the holding current path for the two hold magnets extends from negative source 4108 or the equivalent source on FIG. 39, through the windings of both hold magnets, and the sleeve crosspoints in the trunk switch to the sleeve conductors on FIG. 44, and through a respective one of resistors 4402 to ground. With a negative potential now being applied to the sleeve conductor on FIG. 44 current no longer flows through the two hold magnet windings as no potential difference appears across them. As a consequence, the line and trunk switch hold magnets release. Once released these hold magnets remain unenergized as the switch crosspoints have opened.

One source of negative potential for releasing the two hold magnets is potential source 6006. Contacts 63R–10 are closed and the potential of negative source 6019 also aids the release operation. This source is less in magnitude than source 6006 and a potential difference appears across the winding of relay 60CK which thus operates. Source 6019 reduces the value of this potential difference. The top winding of relay 60CK has a small resistance and could be damaged by excessive current through it. By reducing the potential difference across the winding, source 6019 insures that the winding is undamaged.

Current flowing at this time from source 6006 through the top winding of relay 60CK causes this relay to operate. Contacts 60CK–1 on FIG. 53 close. Ground potential is extended through these contacts, contacts 60LA–3, and conductor 53CK1 to contacts 60CK1–B1. Relay 60CK1 operates and locks through contacts 60CK1–M1, and contacts 58C–4 and 54TR–2 to ground. With relay 60CK1 operated contacts 60CK1–6 on FIG. 62 are closed. As with a regular connection when the field unit has completed its operation a negative potential is applied to the unused conductor of control pair 2. This potential is extended through contacts on relays 58ID1–58ID8 to conductor 58SK. This negative potential is further transmitted through conductor 62SK and contacts 60CK1–6 to the reset bistable multivibrator which as in a regular connection sequence switches to the 1 state. An increased potential now appears at the collector of transistor 62T1 which is connected through diode 6311 and resistor 6304 to the base of transistor 63T1 in the release bistable multivibrator. This multivibrator switches state and relay 63R releases. In addition, the reset multivibrator restores the entire circuit as in a regular connection sequence. During the release of the various relays in the resetting operation, voltages are induced throughout the circuit. To insure that an erroneous trunk release indication is not obtained, the more positive potential on the collector of transistor 62T1 is transmitted through conductor 6293 to hold transistor 480TM2 off.

When relay 60CK1 releases, again a positive pulse is applied to conductor 62TS which is transmitted through capacitor 6242, diode 6229 and resistor 6230 to the base of transistor 62T5. The monostable multivibrator is switched to its unstable state. This causes counter 6100 to reset to zero. After 125 milliseconds scanning resumes. It should be noted that as counter 6100 is reset line scanning resumes with the first line in the next group. Trunk scanning however continues with the next trunk in the scanning sequence. No reset circuitry is provided to reset counter 5600, and therefore when conductor 65P1 is pulsed upon the next operation of the astable multivibrator the count of this counter advances and the next trunk in sequence is scanned.

F. *Local connection—detailed description of central office unit and common control operations*

When a subscriber served by one of the field units wishes to call another subscriber served by the same unit he places the call in the ordinary manner, and the concentrator functions to establish a connection to the central office in the manner described above. The central office, after receiving the called number, applies a ground potential to the sleeve of the called number's line circuit. This results in a call being offered to the concentrator and again the connection is established in the normal manner. This type of connection is the type that is to be switched to a "local connection." The local connection is a connection made between these two subscribers at the field unit and at the respective central office unit thereby permitting the release of the two regular trunks for use by the other subscribers served by the concentrator.

In the trunk scanning sequence, as described above, the 18 kc. tone is applied to the sleeves of all trunks requiring release. When a particular trunk is scanned and the tone on the sleeve is detected, the common control initiates the trunk release sequence. In the local connection scanning sequence the same tone is applied to the tip and ring of a particular one of the twenty trunks in any one of the central office units. The tip and ring conductors of the other 19 trunks in the same unit are scanned for this tone. If two trunks are connected to each other by the central office switching equipment, the tone applied to the tip and ring of one will appear on the tip and ring of the other. When this tone is detected a local connection switching sequence is begun. In the event that the tone is not detected on the 19 trunks when it is being applied to the one selected trunk in this central office unit, tone is applied to another one of the 20 trunks and a new set of 19 trunks is scanned for the tone. This process continues with the tone being applied to each of the 20 trunks in turn. For each application of the tone to one of the trunks the other 19 are scanned for its appearance. This same scanning procedure takes place for each of the eight units, but like trunk scanning, is not performed simultaneously in all eight units.

Scanning for trunk releases is not performed simultaneously with the scanning for local connections. These two types of scanning sequences are interspersed with each other. Line scanning however proceeds simultaneously with whichever one of these scanning sequences is being performed. Before proceeding to analyze the local connection scanning sequence it will be of aid to describe the manner in which the various counters control the interspersed trunk release and local connecting scanning sequences.

As described above, the five stages of counter 5600 control trunk scanning only when stages 57TKT1 and 57TKT2 are both in the 0 state. Counter 5601 determines the particular one of the eight units in which the scanning is performed. When stages 57TKT1 and 57TKT2 are not both in the 0 state however, AND gate 5715 is unenergized and a positive potential is applied to conductor 57R0. This positive potential inhibits those circuits described above as being enabled by a negative potential on conductor 57R0. Thus trunk release scanning is not performed. For example, the positive potential on conductor 57R0 reverse biases diode 4882 and the 18 kc. tone is not even applied through transistor 48TRS to the trunk sleeves. When counter stages 57TKT1 and 57TKT2 are in any one of the three states other than 00, namely 01, 10, and 11, local connection scanning results. Counter 5601 again determines in which unit the scanning proceeds. The five stages of counter 5700 determine the particular one of the 20 trunks to which the tone is applied. The five stages of counter 5600, as in trunk scanning for regular releases, determine which of the trunks is scanned for the detection of the tone. Each of the stages in counter 5700 has in its designation the letters TKT. This is to indicate that counter 5700 controls the trunk on which the tone is transmitted. Each of the stages in counter 5600 has in its designation the letters TKR as counter 5600 determines which trunk is scanned at a particular time for the receipt of the tone. In trunk scanning for regular releases only counters 5600 and 5601 are required, as the tone is applied to the sleeves of all trunks requiring release, and it is only necessary to determine which trunk is scanned at a particular time, and in which concentrator unit the scanning is to be performed. In the local connection scanning sequence however, as all combinations of two trunks in each unit must be scanned it is also necessary for the common control to apply the tone to a particular one of the 20 trunks and to detect its possible appearance on a particular one of the other 19 trunks in any unit. For this reason counter 5700 is employed in the local connection scanning sequence to determine on which one of the 20 trunks the tone is applied. Again, counter 5601 determines the particular unit in which the scanning is performed.

In the preceding section it was described how the common control scans the sleeves of the trunks under the control of counters 5600 and 5601. In the local connection scanning sequence these same stages control the scanning of the tip and ring of each trunk for the receipt of the tone. The tone receiving sequence is identical to that described in the preceding section. Counter 5700 determines the particular trunk on which the tone is applied. Although counter 5700 identifies one of 20 trunks, this trunk can be in any one of the eight units. Counter 5601 again determines the particular unit in which the scanning takes place. The table below indicates on which trunk the tone is transmitted for each of the 32 counts stored in counter 5700. Again, all of the 32 counts in each cycle are not needed as each unit contains only 20 trunks. As counter 5700 cycles through its 32 counts the first two stages both contain binary 0's eight times. When both of these stages contain binary 0's trunk scanning for regular releases is performed. Assume that the last pulse has just switched all counter stages to the 0 condition. This pulse, together with the next 31, cycle counter 5600, and the 20 trunks in the first unit, identified by the 000 count in counter 5601, are scanned for regular releases. The next pulse resets counter 5600 and advances counter 5601. Unit 1 is now identified by counter 5601 and the last pulse along with the next 31 control the scanning of the 20 trunks in this unit for regular releases. The next six groups of 32 pulses each cause the other six units to be scanned for regular trunk releases. In all, 8 x 32 or 256 pulses cause all 160 trunks to be scanned for regular releases when the first two stages of counter 5600 are in their 0 states. After 256 pulses counter 5601 has completed its cycle and the next pulse resets it to 000. Stage 57TKT1 is now pulsed and a 1 appears in this stage. Under these circumstances local connection scanning takes place. The 10000 count in counter 5700 identifies a particular trunk on which the tone is transmitted. The next 32 pulses cycle counter 5600 to sequentially scan the other 19 trunks in the unit identified by the count in counter 5601 for the appearance of the tone. After these 32 pulses counter 5601 advances and identifies another unit. The tone is now applied to the same numbered trunk in this new unit, and the next 32 pulses cycle counter 5600 and cause the other 19 trunks in this unit to be scanned for the receipt of the tone. The next six six groups of 32 pulses cause the other 19 trunks in each of the remaining six units to be scanned for the tone appearance. After 256 pulses have been applied, counters 5600 and 5601 reset and counter 5700 is advanced. As 01 is now stored in the first two stages of counter 5700 the local connection sequence continues with the tone now being applied to a new trunk. The next 256 pulses cycle counters 5600 and 5601 to control the scanning of the other 19 trunks in each of the eight units. Counter 5700 is advanced once again and 11 appears in the first two stages. A new trunk is now identified by counter 5700 and the tone is applied to this trunk in the particular concentrator being scanned. The next 256 pulses control the scanning of the other 19 trunks in each of the eight units sequentially. Thus, after the first 256 x 4 or 1024 pulses, all trunks have been scanned once for regular release, and the tone has been applied to three trunks in each concentrator while the other 19 in each concentrator have been scanned for its appearance. After these 1024 pulses, the first two stages of counter 5700 are once again in the 00 condition, and the next 256 pulses control the scanning for regular releases. This process continues until counter 5700 completes its cycle. The total number of pulses required to complete the cycling of this counter is 256 x 32 or 8192. These pulses cause the first two stages of counter 5700 to be in the 00 condition eight times and thus, each trunk is scanned for regular release eight times while each pair of trunks is scanned once for a possible local connection.

Counter 5700 contains 32 different counts in each cycle. Eight of these control trunk scanning for regular releases. Only 20 are needed to retermine on which trunk the tone is applied in the local connection scanning sequence. Thus, four counts in counter 5700 are unused. It must be borne in mind that each of these four counts being unused implies that the 256 pulses cycling counters 5600 and 5601 during the time this count is stored in counter 5700 do not control any scanning whatsoever. Trunk scanning for regular releases is not performed because the first two stages of counter 5700 are not both in the 0 state and conductor 57R0 is not enabled. Although counter 5600 controls the scanning of the trunks for the detection of the tone, no tone is in fact detected for counter 5700 does not cause the tone to be applied to any trunk in any of the eight units. The following table illustrates the manner in which counter 5700 controls both trunk scanning for regular releases, and the particular trunk to which the tone is applied during the local connection scanning sequence.

| Counters 57TKT1–57TKT5 | Trunk Having applied To It The 18 kc. Tone |
|---|---|
| 0 0 0 0 0 | Scan for regular release |
| 1 0 0 0 0 | 35A0 |
| 0 1 0 0 0 | 35A2 |
| 1 1 0 0 0 | 35A3 |
| 0 0 1 0 0 | Scan for regular release |
| 1 0 1 0 0 | Unused |
| 0 1 1 0 0 | 35A4 |
| 1 1 1 0 0 | 35A5 |
| 0 0 0 1 0 | Scan for regular release |
| 1 0 0 1 0 | 40B0 |
| 0 1 0 1 0 | 40B2 |
| 1 1 0 1 0 | 40B3 |
| 0 0 1 1 0 | Scan for regular release |
| 1 0 1 1 0 | Unused |
| 0 1 1 1 0 | 40B4 |
| 1 1 1 1 0 | 40B5 |
| 0 0 0 0 1 | Scan for regular release |
| 1 0 0 0 1 | 35A1 |
| 0 1 0 0 1 | 37AB12 |
| 1 1 0 0 1 | 37AB13 |
| 0 0 1 0 1 | Scan for regular release |
| 1 0 1 0 1 | Unused |
| 0 1 1 0 1 | 37AB14 |
| 1 1 1 0 1 | 37AB15 |
| 0 0 0 1 1 | Scan for regular release |
| 1 0 0 1 1 | 40B1 |
| 0 1 0 1 1 | 37AB16 |
| 1 1 0 1 1 | 37AB17 |
| 0 0 1 1 1 | Scan for regular release |
| 1 0 1 1 1 | Unused |
| 0 1 1 1 1 | 37AB18 |
| 1 1 1 1 1 | 37AB19 |

It must be remembered that for each of the above counts stored in counter 5700, 256 pulses cycle counters 5600 and 5601. Each time the count stored in counter 5700 indicates "Scan for regular release" the 20 trunks in each of the eight units are sequentially scanned for regular releases. The sequence for this trunk scanning is as shown in the previous section. Each time the count in counter 5700 identifies a particular trunk as in the table above, the other 19 trunks in each of the eight units are scanned for the receipt of the tone. The sequence of the trunk scanning for the receipt of the tone, determined by counter 5600, is the same as described in the previous section as counter 5600 controls trunk scanning for the receipt of the 18 kc. tone during both scanning for regular connection releases and local connections. The only difference, as described below, is that the particular trunk on which the tone is being applied in the local connection scanning sequence (determined by counter 5700) is not scanned for tone receipt. Only 19 of the 20 trunks are scanned for the tone. This is to insure that a local connection sequence is not initiated to connect a subscriber to himself.

AND gates 5701 are similar to AND gates 5602 and output conductors 57–100XX through 57–XXX11 are energized in a manner similar to the energization of conductors 56–100XX through 56–XXX11. Each of gates 49A0–51B5 comprises two symmetrical halves as far as the network configuration is concerned. The nine conductors 56–100XX through 56–XXX11 control the left half of each of the gates to enable the 18 kc. tone appearing on the trunk sleeve to be transmitted to conductors 4925 and 4926 during the scanning sequence for regular releases. During scanning for regular trunk releases the tone does not appear on the tip and ring conductors of each trunk. However, during scanning for local connections the tone is received over the tip and ring conductors rather than the sleeve. Referring to the gate 49A0, it is seen that if the left side of the gate is enabled the tone appearing on conductor 49RA0 is transmitted through diodes 4960 and 4901 to conductor 4926. Similarly, the tone on conductor 49TA0 is transmitted through diodes 4909 and 4905 to conductor 4925. Thus conductors 56–100XX through 56–XXX11 enable a particular one of gates 49A0–51B5 to receive the tone on the respective trunk tip and ring conductors during local connection scanning in the same manner that they enable the gate to receive the tone on the trunk sleeve during regular release scanning.

The nine conductors 57–100XX through 57–XXX11 are extended via cables 5724 and 5612 to FIGS. 49–51 where they control the sequential enabling of the right sides of gates 49A0–51B5. The 18 kc. tone from oscillator 5108 is applied to conducotrs 4927 and 4928 which are connected to each of gates 49A0–51B5. Referring to gate 49A0, if a positive potential appears on either of conductors 57–100XX or 57–XXX00 one of diodes 4921 or 4922 is forward biased and the positive potential is extended through resistor 4919 and diodes 4912 and 4920. This positive potential reverse biases all of diodes 4911, 4913, 4917 and 4918 and the tone on conductors 4927 and 4928 is not transmitted through these diodes. However, when both of these conductors are negative in potential due to the energization of their respective AND gates 5701, both of diodes 4921 and 4922 are reverse biased. At this time negative source 4915 forward biases all four of diodes 4911, 4913, 4917 and 4918. The tone of conductors 4927 and 4928 is now extended through these diodes to respective conductors 49RA0 and 49TA0.

During the local connection scanning sequence the right side of one of gates 49A0–51B5 is enabled, and the left side of another one of these gates is similarly enabled. The enabled right side is under control of counter 5700 and the enabled left side is under control of counter 5600. The tone is transmitted to one pair of conductors 49RA0 and 49TA0 through 51RB5 and 51TB5 depending on which gate has its right side enabled. These two conductors are connected to the trunk to which the tone is being applied. As counter 5600 cycles, the left sides of the other gates are sequentially enabled and the tone if it appears on the tip and ring conductors of the scanned trunk is extended through the left side of the associated gate to conductors 4925 and 4926 to indicate that the two trunks are connected to each other through the central office switching equipment. Thus during the local connection scanning sequence gates 49A0–51B5 serve to control the transmission of the tone to a trunk and the receipt of the tone from another trunk. The same two conductors associated with each gate are used for both transmitting and receiving the tone, at different times.

Each of gates 49A0–51B5 serves a double function in the local connection scanning sequence. In must be insured that the left side and the right side of the same gate are not both enabled at the same time. For each count stored in counter 5700, the counter 5600 cycles eight times, and thus in each complete local connection scanning sequence cycle each of gates 49A0–51B5 would normally have both its left and right sides enabled together eight times. The tone on conductors 4927 and 4928 is transmitted to the two conductors connected to the tip and ring of the trunk associated with the gate whose right side is enabled, and were the left side of the gate enabled at the same time the tone would be transmitted directly from the right side of the gate through the left side to conductors 4925 and 4926, and a local connection switching sequence would be initiated. This must be avoided as the two trunk identities stored in counters 5600 and 5700 are the same. For this reason each of gates 49A0–51B5 is provided with means for inhibiting the operation of the left side of the gate whenever the right side is enabled. Negative source 4915 is greater in magnitude than negative source 4903. When the right side of the gate is enabled the negative potential from source 4915 is extended through diodes 4911 and 4918 to reverse bias diodes 4960 and 4909. As diodes 4960 and 4909 do not conduct, the tone on conductors 49RA0 and 49TA0 is not transmitted through the left side of the gate and thus does not appear on conductors 4925 and 4926. Only if the right side is not enabled can the left side be enabled under the control of counter 5600. In this manner an erroneous command to initiate a local connection sequence is precluded from appearing on conductors 4925 and 4926.

It should be noted that the potentials on conductors 4927 and 4928 are out of phase with each other as these conductors are connected to opposite sides of the secondary of transformer 5107. Thus the tone transmitted to the tip and ring of the trunk whose identity is stored in counter 5700 has opposite phases in the two conductors. If this trunk is connected to another trunk associated with that one of gates 49A0–51B5 whose lift side is enabled, the waveforms in conductors 4925 and 4926 are similarly out of phase with each other. In the regular release scanning sequence, as the tone is received only via the sleeve of the trunk, the two waveforms in conductors 4925 and 4926 are in phase with each other. Although this fact distinguishes the two indications on conductors 4925 and 4926 from each other, that is, the two waveforms are in phase with each other if the trunk whose identity is stored in counter 5600 requires a regular release, and they are out of phase with each other when the two trunks whose identities are stored in counters 5600 and 5700 are connected to each other, this distinguishing feature is not used to identify which of the two switching sequences is to ensue. Rather, the potential on conductor 57R0 determines whether the 18 kc. tone on conductors 4925 and 4926 represents a regular release or a local connection indication. A negative potential on conductor 57R0 causes the tone on conductors 4925 and 4926 to initiate a regular trunk release sequence. If stages 57TKT1 and 57TKT2 are not both in the 0 state the positive potential on conductor 57R0 causes the local connection sequence to be initiated upon the appearance of the tone on conductors 4925 and 4926.

Before proceeding to the local connection switching sequence it must be understood how the tone transmitted from one of gates 49A0–51B5 is applied to the trunk whose identity is stored in counter 5700 in only that central office unit whose identity is stored in counter 5601, and in addition, how the tone is received from the trunk whose identity is stored in counter 5600 in only that central office unit whose identity is stored in counter 5601. The three output conductors 49SA0, 49RA0, and 49TA0 in gate 49A0 as well as the analogous output conductors in the other 19 gates are connected via cable 5100 to FIG. 44 in central office unit 0 as well as to the other seven central office units. Depending on which central office is having its trunks scanned for either regular releases or local connections, seven of AND gates 5716 apply positive potentials to their output conductors, and one applies a negative potential to its output conductor. Conductor 57C0 is extended to FIG. 44 and conductors 57C1–57C7 are extended to respective ones of the other seven central office units. A positive potential on conductor 57C0 reverse biases the emitter-base junction of both transistors 44C and 44CR as described in the preceding section. With transistor 44CR off, negative source 4427 reverse biases all of diodes 4404 connected to the sleeve conductors of the twenty trunks in central office unit 0. This prevents these diodes from conducting a signal to that one of gate 49A0–51B5 whose left side is enabled. With transistor 44C nonconducting negative source 4412 reverse biases those of diodes 4404 connected to the tip and ring conductors in each of the 20 trunks in central office unit 0. As a result no tone can be transmitted to the tip and ring conductors through these diodes from any one of gates 49A0–51B5 whose right side is enabled. Similarly, no signal can be transmitted from the tip and ring conductors in one of these trunks to any one of gates 49A0–51B5 whose left side is enabled. A double protection is afforded. Not only is the tone not transmitted to the trunk whose identity is stored in counter 5700 in a unit not being scanned, but in addition, spurious signals are prevented from being transmitted from the trunk whose identity is stored in counter 5600.

If conductor 57C0 is negative in potential however, diodes 4420 and 4421 are reverse biased and transistors 44C and 44CR are not inhibited from the potential of conductor 57C0. If the scanning sequence being performed is for regular releases, as described above, conductor 57R0 is negative in potential and transistor 44CR conducts and transistor 44C does not. Transistor 44CR conducting forward biases those of diodes 4404 connected to the sleeves of the trunks to permit the 18 kc. tone on the sleeves of trunks requiring release to be transmitted to gates 49A0–51B5. As transistor 44C does not conduct those of diodes 4404 connected to the tip and ring conductors of the trunks are reverse biased and the tone is not transmitted to or from the tip and ring of each trunk.

If the scanning in progress is for local connections rather than regular releases those of diodes 4404 connected to the tip and ring conductors must conduct and those of diodes 4404 connected to the sleeves must not. If the local connection scanning is taking place, conductor 57R0 is positive in potential and diode 4422 conducts. Transistor 44CR is held off and consequently negative source 4427 reverse biases those of diodes 4404 connected to the sleeve conductors. With transistor 44CR nonconducting and diode 4420 reverse biased, the negative potential of source 4460 is extended through resistors 4419 and 4415 to the base of transistor 44C. The magnitude of negative source 4460 is greater than that of negative source 4417 and transistor 44C conducts. The conduction of this transistor forward biases those of diodes 4404 connected to the tip and ring conductors of the trunks.

In summary, if the scanning is not of the trunks in central office unit 0, conductor 57C0 is positive in potential and inhibits both transistors 44C and 44CR. All of diodes 4404 are reverse biased. If the scanning is for regular releases or local connections of trunks in central office unit 0, conductor 57C0 is negative in potential and has no effect on transistors 44C and 44CR. If the scanning is for regular trunk releases, conductor 57R0 is negative in potential, and transistor 44CR conducts and transistor 44C is inhibited. If the scanning is for local connections, conductor 57R0 is positive in potential, and transistor 44C is now inhibited while transistor 44CR conducts. In the former situation, only sleeves of the trunks conduct signals to gates 49A0–51B5. In the latter situation the tip and ring conductors conduct signals to and from gates 49A0–51B5.

If both local trunks are already in use, as will be described below, both of relays 40K0 and 40K1 are operated. As both local trunks are in use no further local connections can be established, and it is necessary to inhibit the local connection scanning. In such a case, contacts 40K0–8 and 40K1–6 on FIG. 44 are closed and connect ground potential through resistor 4471 to the base of transistor 44C. This transistor remains off and local connection scanning is inhibited.

If a local connection is to be established, out of phase 18 kc. tones appear on conductors 4925 and 4926. Transistors 48RR, 48RR1, 48RR2, 48TR, 48TR1 and 48TR2 operate as they do when in phase signals are applied on conductors 4925 and 4926. However, transistors 48RR2 and 48TR2 are now out of phase with each other. Either of these transistors conducting causes transistor 48LOTM to conduct. Capacitor 4801 is provided to insure that transistor 48LOTM conducts continuously in the event that there is a short interval between the turning off of transistor 48RR2 or 48TR2 and the turning on of the other. During the conduction of either of these two transistors capacitor 4801 charges. If the conducting one of these transistors turns off before the other one turns on, the capacitor discharges through resistors 4800 and 4857 to maintain transistor 48LOTM conducting. It should be noted that transistor 48ROTM does not conduct at this time as the positive potential on conductor 57R0 now inhibits this transistor. Transistor 48LOTM conducting causes transistor 480TM1 to turn off. This transistor and transistors 480TM2 and 480TM3 operate as they do when a regular trunk release signal is received. Transistor 480TM3 turns off and a negative potential is applied to conductor 630TM3. This potential, as in a regular trunk release sequence, enables counter 6300 to now advance whenever flip-flop 61A/B changes to the 0 state. This negative potential similarly prevents the pulsing of conductor 65P1 by the astable multivibrator. Although this multivibrator continues to function and control line scanning, counters 5600, 5601 and 5700 do not advance, and the two enabled ones of gates 49A0–51B5 remain enabled. Provided the tone is not interrupted counter 6300 continues to advance whenever flip-flop A/B changes to its 0 state. Counter 6300 is utilized in the local connection scanning sequence for the same reason it is in the regular trunk release scanning sequence. The tone must appear on the tip and ring conductors for a sufficient time interval to insure that the received signal is not spurious.

Line scanning continues and each time flip-flop 61A/B changes to the 0 state counter 6300 advances. Unlike the trunk release scanning sequence when stage 63–2 changes to the 1 state the release flip-flop does not function to operate relay 63R. As a positive potential now appears on conductor 57R0 diode 6310 is forward biased, and transistor 63T1 is held off. Consequently, the positive pulse on conductor 6391 cannot switch the state of the release flip-flop and relay 63R remains unenergized. However, when stage 63–4 changes to the 1 state a positive potential is applied through diode 6324 to the base of transistor 63T4. Transistors 63T3 and 63T4 comprise the local bistable multivibrator. Transistor 63T3 is normally off. The positive potential on the base of transistor 63T4 now turns this transitsor off and transistor 63T3 on. Current flows from the collector of transistor 63T3 to operate relay 63L.

When transistor 63T3 turns on a more positive potential appears at its collector. This potential is extended through diode 6332 to conductors 6302 and 6251 and holds the astable multivibrator in its 1 state. The same potential on conductor 6302 is extended through resistor 6334 to the base of transistor 63TSC which turns on. The negative potential now appearing on conductor 63SC, as in a regular release sequence, causes transistor 46T1 in the service action bistable multivibrator to turn on if a negative potential now appears on conductor 57C0 indicating that the local connection to be established is for two trunks serving central office unit 0. The service action bistable multivibrators in the other seven units are not operated as conductors 57C1–57C7 are positive at this time. Transistor 63TSC conducting causes transistor 63L0 to remain off, and as in a regular release sequence transistors 65TA and 65TB are prevented from operating.

When transistor 46T1 turns on relay 46IA0 operates. When relay 63L energizes due to the triggering of the local flip-flop, contacts 63L–8 on FIG. 60 close and relay 60LA operates, current flowing from ground through these contacts and the winding of relay 60LA to negative source 6014. Contacts 60LA–2 close, and current flows from ground through these contacts, contacts 60LB1–1 and the winding of relay 60LR to negative source 6090. Relay 60LR operates. Contacts 60LR– on FIG. 56 close and transistors 64T1–64T4 and 64T6 are now connected through the normally closed contacts 60LB1– on FIG. 57 and the now closed contacts 60LR– on FIG. 56 to the five stages of counter 5600. Contacts 60LR–1 on FIG. 64 also close and negative source 6432 is connected through these contacts, contacts 60LB1–2, and respective resistors 6402–6407 to the bases of transistors 64T1–64T6. Relays 64G1–64LS2 and 64LS4 operate, as in the regular release sequence, in accordance with the binary states of the five respective stages of counter 5600.

Contacts 63L–6 on FIG. 53 are now closed and negative source 5310 is connected through these contacts and resistor 5312 to the base of transistor 53T. When all of relays 64G1–64LS4 which should operate have operated, the positive potential on conductor 6430 is removed and at this time transistor 53T and relay 53OID operate. Contacts 53OID–2 and 53OID–3 on FIG. 59 close, and as contacts 63L–4 and 63L–5 are closed at this time ground potential is applied to conductors 59IDG and 59IDG'. The ground potential on these conductors is extended through the lowest relay contact translator on FIG. 64 to two of conductors 64ID1–64ID8. Two of the identification relays operate and identify the trunk on which the tone is being received as these relays operate in accordance with the count stored in counter 5600.

The field unit must be notified that the local connection switching sequence is to take place. The field unit is notified when the positive potentials are applied to the tip and ring of the second control pair with the magnitude of the potential applied to the ring being greater than that applied to the tip. When two of the eight identification relays 58ID1–58ID8 are energized, relay 58C energizes, contacts 58C–5 on FIG. 54 close, and the positive potential on conductor 5810 is now extended through these contacts and now closed contacts 63L–10 to conductor 54TRR. The potential is extended directly from this conductor through contacts 46IA0–14 and 46TR1–4 to the ring of the second control pair. The positive potential on conductor 54 TRR is also extended through diode 5413, conductor 54TR', contacts 46IA0–5, resistor 4692, conductor 54TR2, resistor 5410, the top winding of relay 54TR, diode 5415, conductor 54TRT, contacts 46IA0–B, and contacts 46TR1–3 to the tip of the second control pair. The positive potential is extended to the field unit and current flows through the top winding of relay 54TR. This relay does not operate however as contacts 58C–9 are now closed and current also flows in the lower winding of relay 54TR.

In the field unit the current flowing in the ring of the second control pair is sufficient to operate relay 25L while the current in the tip is insufficient to operate relay 25R. When relay 25AUX operates and contacts 25AUX-7 open current ceases to flow through the tip conductor. At this time relay 54TR operates to indicate that the field unit has been notified that a local connection sequence is to ensue. When relay 54TR operates, as in the other sequences, relay 46TR1 energizes. As in the previous two switching sequences two of the four control conductors have applied to them positive or negative potentials to notify the field of the first trunk identity.

When the field unit has stored the first trunk identity two of identification relays 23ID-1' through 23ID-8' are operated and a negative potential is extended to the central office unit on the unused conductor, or if neither is in use the tip, of the second control pair. As in the two previous sequences this negative potential is extended to conductors 58SK and 62SK.

With the operation of two of relays 58ID1-58ID8 one of conductors 52TSA0-52TSAB19 is connected to conductor 54TS. On FIG. 54 contacts 60LB-12 are closed, and as relay 60LA has operated contacts 60LA-12 are similarly closed. Ground potential is extended through these contacts to conductor 54TS and through the relay contact translator on FIG. 52 to one of conductors 52TSA0 through 52TSAB19. If the trunk to be used is individual to the A switch, relay 58ID1 is operated. Conductor 52TKA connects the winding of relay 53TKA through contacts on relay 58ID1 and contacts 60LB-14 and 63L-9 to ground. Relay 53TKA operates and causes contacts 53TKA-3 through 53TKA-8 on FIG. 53 to close. If the trunk is individual to the B switch, relay 58ID2 is operated and ground potential is extended to relay 53TKB over contacts 63L-9, 60LB-15, contacts on relay 58ID2, and conductor 52TKB. Relay 53TKB operates and contacts 53TKB-3 through 53TKB-8 on FIG. 53 close. If the trunk to be used is one of the eight common trunks, neither of relays 53TKA and 53TKB will be operated because neither of relays 58ID1 nor 58ID2 have operated. The ground potential on one of conductors 52TSA0-52TSAB19 is extended through contacts on relay 53TKA or 53TKB, or directly, to one of the trunk relay circuits 5300-5305, or 5912-5919. As contacts 63L-3, 60LA-5 and 60LB-8 on FIG. 59 are closed negative source 5904 is connected through contacts 53TK0-B through 59TK19-B to one end of the windings of all 14 of trunk relays 0-19. The one of these relays connected to the grounded one of conductors 52TSA0-52TSAB19 operates. It locks over a path including contacts 60LA-10, one of contacts 53TK0-3 through 53TK19-3, and one of contacts 53TK0-M through 53TK19-M. When one of these 14 relays operates and one set of contacts 53TK0-4 through 59TK19-4 closes, ground potential is extended through contacts 60LB-5 and 60LA-13, conductor 53CK1, and contacts 60CK1-B1 to the winding of relay 60CK1 which now operates. The common control thus stores the first trunk identity in one of the trunk relays, and the operation of relay 60CK1 indicates that this storage has been effected.

With relay 60CK1 operated and contacts 60CK1-6 on FIG. 62 closed the negative potential exended from the field unit to the central office unit and appearing on conductor 62SK causes the reset bistable multivibrator to switch state. Transistor 62T1 conducts and the potential at its collector increases. This increased potential is extended through diode 6315 to turn off transistor 63T3. However, transistor 63T4 does not go on at this time as contacts 60LA-7 are closed and connect the base of this transistor through resistor 6346 to ground. Both transistors in the local bistable multivibrator are thus held off. When transistor 63T3 turns off relay 63L releases. Although relay 60LA operated through contacts 63L-8, relay 60LA does not release at this time. When relay 60LA operated contacts 60LA-11 closed and by this time capacitor 6012 has charged sufficiently from source 6013 to maintain relay 60LA operated as it discharges through the relay winding. Relay 60LA is held operated by the discharge of capacitor 6012 but would normally release afterwards as resistor 6090 is large in magnitude and allows insufficient current flow through it to hold relay 60LA operated. However, relay 60LA is held over another path to be described below before capacitor 6012 completes its discharge. Thus relay 60LA remains operated during the entire local connection sequence. With contacts 60LA-1 still closed and contacts 63L-11 now closed relays 60LB and 60LB1 operate. These relays lock over contacts 60LB1-4 and 60LA-2 even after contacts 63L-11 open thereafter. Relay 60LR releases as contacts 60LB1-1 are now open.

When relay 63L releases contacts 63L-4 and 63L-5 on FIG. 59, open, and the ground potential on conductors 59IDG and 59IDG' which originally operated two of the eight identification relays 58ID1-58ID8 is removed. Consequently, the two previously operated identification relays release. The first trunk identity is still stored however in the operated one of the 14 trunk relays and the operated one of relays 53TKA or 53TKB, if priorly operated, the operated one of these latter two relays being locked over contacts 60LA-10 and either 53TKA-2 or 53TKB-2. Contacts 63L-6 on FIG. 53 are now open, and the ground potential extended through resistor 5311 causes transistor 53T to turn off. Relay 53OID releases. When the two identification relays release relay 58C de-energizes and as contacts 58C-4 are now open relay 60CK1 releases. This relay was priorly locked over contacts 58C-4, 54TR-2 and 60CK1-M1. Relay 54TR releases when contacts 58C-9 open, and thus the locking path for relay 60CK1 is broken. Relay 60CK1 does not reoperate from a ground on conductor 53CK1 as it did before as contacts 60LB-5 are now open.

When relay 60CK1 releases contacts 60CK1-B2 close and a positive pulse is applied to conductor 62TS. This pulse triggers the monostable multivibrator which remains in its unstable state for 125 milliseconds. During this interval although transistor 63TSC is not held on by the conduction of transistor 63T3 it is held on by the ground potential applied through contacts 60LA-15, resistor 6340, diode 6341, and resistor 6334 connected to the base of transistor 63TSC.

The positive potential at the collector of transistor 62T1 is not transmitted along conductor 62RSA to reset the service action flip-flop on FIG. 46, as it is when transistor 62T1 conducts at the end of the regular connection and trunk release sequences. Contacts 60LA-6 and 63L-13 are open and conductor 62RSA is unenergized. It is necessary to maintain transistor 46T1 conducting as the local connection sequence is not yet completed.

After 125 milliseconds the monostable multivibrator on FIG. 62 returns to its stable state, and the reset bistable multivibrator on FIG. 52 returns to its normal condition with transistor 62T0 conducting. Transistor 62T1 turns off and no longer inhibits transistor 63T3. This latter transistor now conducts once again and energizes relay 63L. Transistor 63T4 is still held off as contacts 60LA-7 are still closed. Relay 60LA has remained operated during the 125 millisecond period by the discharge of capacitor 6012. When relay 63L operates once again, contacts 63L-8 close and relay 60LA remains operated from the ground extended through these contacts independent of the discharge of capacitor 6012.

When contacts 63L-9 on FIG. 52 close, now that contacts 60LB-13 are closed, ground potential is applied to conductor 52SM, and relays 43TK and 43SM operate.

With relay 60LB1 now operated the normally open contacts on FIG. 57 close, and the normally closed contacts controlled by this relay open. Transistors 64T1-64T4 and 64T6 are now connected to the five stages of counter 5700 rather than the five stages of counter 5600. These stages now control the operation of these five transistors to identify the second trunk involved in the local connection and whose identity is stored in counter 5700. Contacts 60LB1-3 are closed as are contacts 63L-2 and 60LR-2, and the negative potential of source 6432 causes transistors 64T1-64T4 to operate their respective relays 64G1-64LS2 and 64LS4 in accordance with the count stored in counter 5700.

Contacts 63L-6 on FIG. 53 close when relay 63L reoperates, and when the ground potential on conductor 6430 is removed after the required ones of relays 64G1-64LS4 have operated, transistor 53T turns on once again and relay 53OID reoperates. Once again contacts 53OID-2 and 53OID-3 on FIG. 59 close and as contacts 63L-4 and 63L-5 are now closed ground potential is applied once again to conductors 59IDG and 59IDG'. This ground potential is extended through the relay contact translator on FIG. 64 to two of conductors 64ID1-64ID8. As a result two of identification relays 58ID1-58ID8 operate to identify the second trunk involved in the local connection.

Relays 58C operates once again. As contacts 58C-5 and 63L-10 are now closed positive potentials are extended to the field unit over the tip and ring conductors of the second control pair as they were before to reoperate relay 25L in the field unit. Relay 54TR does not operate as current flow once again through both of its windings. When relay 25AUX in the field operates and causes the current in the ring of the second control pair to cease relay 54TR operates and in turn causes relay 46TR1 to operate. The trunk identity information is now transmitted to the field unit in the normal manner, the field is notified of the second trunk involved in the local connection, and proceeds to establish the local connection.

On FIG. 52 ground potential is now extended through contacts 63L-9 and 60LB-16 to conductor 52HCW. The ground potential, extended along this conductor to FIG. 46, is further extended through now closed contacts 46TR1-10 to the windings of relays 46HCA and 46HCB which now operate.

In order to establish a local connection in the central office unit, trunk switch select magnets 43TSMA7 and 43TSMB7 must operate. In addition, either steering level select magnets 43TSMA8 and 43TSMB8, or 43TSMA9 and 43TSMB9 must operate. The re-energization of relay 58C causes the trunk switch select magnets to operate. On FIG. 59 contacts 60LA-14, 58C-7, 60CK1-3, 60LB-6 and 60LB-7 are all closed, and ground potential appears on conductors 59TSM7 and 59TSML. These conductors are extended via cable 5991 to FIG. 43. The ground potential on conductor 59TSM7 is extended through contacts 46HCA-1 and 43SM-10 to operate trunk switch select magnets 43TSMA7 and 43TSMB7. Contacts 43SM-10 are closed as relay 43SM and 43TK operated when their windings, connected to conductor 52SM, were connected to ground potential through contacts 60LB-13 and 63L-9 on FIG. 52. The ground potential on conductor 59TSML operates the same numbered steering level select magnet in each trunk switch. Relay 40K0 will be shown below to be operated whenever the first local trunk, controlled by steering levels 8, is in use. Similar remarks apply to relay 40K1 and the second local trunk. If the first local trunk is not in use the present local trunk connection is made on it. However, if this trunk is in use the second trunk is selected. If the first local trunk is not in use the ground potential on conductor 59TSML is extended through contacts 46HCB-1, 40K0-1 and 43SM-8 to operate steering level select magnets 43TSMA8 and 43TSMB8. If, on the other hand, the first local trunk is already in use contacts 40K0-1 are open while contacts 40K0-2 are closed. If the second local trunk is not also in use the ground potential is extended through contacts 46HCB-1, 40K0-2, 40K1-1 and 43SM-9 to operate steering level select magnets 43TSMA9 and 43TSMB9. When four of the six magnets 43TSMA7-43TSMB9 have operated it will be seen that ground potential is extended through four of contacts 43TSMA7-1 through 43TSMB9-1 to conductor 4320. Relays 43HMA and 43HMB do not operate yet however, as conductor 58HMW is energized at this time.

It will be recalled that to establish a local connection it is necessary to first release the two trunk switch hold magnets, identified respectively by an operated one of the 14 trunk relays on FIGS. 53 and 59, and the two operated identification relays 58ID1-58ID8. After the two trunk switch hold magnets have released and the necessary trunk switch select magnets have operated the two trunk switch hold magnets must reoperate to establish the connection.

At the beginning of the local connection sequence there may be numerous hold magnets operated in the two line and trunk switches. Every call in progress has a line and trunk switch hold magnet energized. Each pair of hold magnets involved in a regular connection are held by current flowing from source 4108 through the winding of the line switch magnet, one of conductors 51N-0 through 41N-19, the winding of the same numbered trunk switch hold magnet, one of conductors 36S0-36S19, link and trunk sleeves in trunk switch A, and one of resistors 4402 to ground. Similar remarks apply if the trunk is served by line and trunk switches B. The hold magnets maintaining all regular connections other than those maintaining the two connections to now be operated upon, and the hold magnets maintaining a previously established local connection must not be erroneously released during the local connection switching sequence.

Illustrative component value will aid in the understanding of the local connection switching sequence. Negative source 4108 has a magnitude of 50 volts. The impedance of the winding of each line switch hold magnet is 200 ohms as is the impedance of each of the trunk switch hold magnet windings. Each of resistors 4402 is 250 ohms. Thus, during a regular connection the junction of the line and trunk switch hold magnet windings is at approximately −34.6 volts, and the junction of the trunk switch hold magnet winding and one of resistors 4402 is at −19.2 volts. To release the two particular trunk switch hold magnets involved in the local connection, −34.6 volts is applied to the two connected resistors 4402. The potential difference across the two trunk switch hold magnets is thus zero and they release. The two associated line switch hold magnets, however, must not release. They would normally do so because once the trunk switch hold magnets release and the associated crosspoints open, the hold current paths for the line switch hold magnets are broken. Thus at the same time −34.6 volts is applied to two of resistors 4402 it is necessary that the two line switch hold magnets be held by means other than the current path including the crosspoints controlled by the trunk switch hold magnets to be released. They must be held even though they have not yet been identified by sleeve potentials.

Although not yet thus identified, the two line switch hold magnets whose trunk switch hold magnets will be released shortly, are held by multiplying them to all others of the operated line switch hold magnets and maintaining the junction at −34.6 volts. All operated line and trunk switch hold magnets are connected to conductor 60HC. For example, if line and trunk switch hold magnets 41LHA4 and 42THA4 are operated, the junction of both windings is connected through contacts 41LHA4-1, 46HCA-6, and 42THA4-M to conductor 60HC. Conductor 60HC is thus connected at one end to the junction of the windings of all operated line and trunk switch hold magnets, and through resistor 6017 and contacts 60LB-4, 58C-3, and 63R-14 to ground on FIG. 60. This is done simultaneously with the application of the shunting potential to the trunk switch hold magnets. Thus, it is seen that even when two of the trunk switch hold magnets release, their associated line switch hold magnets are still connected to conductor 60HC and a 15.4 potential difference across their windings maintains them energized.

Although this technique of multipling the junctions of all operated line and trunk switch hold magnets to each other enables the two line switch hold magents, whose associated trunk switch hold magnets are soon to be released, to remain operated, the voltage equilibrium of the circuit is not disturbed. Every operated line and trunk switch hold magnet pair has its own hold current path, and looking at the junction of the two windings it is seen that the impedance to the left is merely that of the line switch hold magnet winding, 200 ohms, and the impedance to the right is that of a trunk switch hold magnet winding and one of the resistors 4402, a total of 450 ohms. The junctions of all windings may be connected to each other without disturbing the —34.6 voltage because each of the individual circuits maintains this same voltage at its windings junction. When two of the trunk switch hold magnets release, at the common junction point, conductor 60HC, there are still two 200 ohm paths to the left of the junction, and the equivalent of two 450 ohm paths to the right is now provided. This is accomplished by adding a 225 ohm resistance in parallel with the operated trunk switch hold magnet windings simultaneously with shunting the trunk switch hold magnets. This 225 ohms is the equivalent of the two 450 ohm branches in parallel that are removed during and after the release of the two trunk switch hold magnets. By connecting a 225 ohm resistor between conductor 60HC and ground while the two trunk switch hold magnets release, conductor 60HC is still maintained at —34.6 volts and all of the line switch hold magnets remain operated. This method of multipling all of the winding junctions to conductor 60HC to maintain operated the two line switch hold magnets whose associated trunk switch hold magnets are to be released, and adding a 225 ohm compensating resistor between conductor 60HC and ground, insures that all line switch hold magnets remain operated.

In the event that no other regular connections are established other than the two involved in the local connection, the two line switch hold magnet windings are both connected through the 225 ohm resistor to ground, and remain operated.

Conductor 60HC, and analogous conductor 39HC are connected on FIG. 60 through resistor 6017 and contacts 60LB–4, 58C–3 and 63R–14 to ground. Resistor 6017 has a magnitude of 225 ohms and thus when contacts 58C–3 close the compensating 225 ohm resistor is connected to conductors 60HC and 39HC. The operation of relay 58C, at the same time that it controls the release of the two trunk switch hold magnets involved in the local connection, causes the compensating resistance to be inserted in the circuit.

When relay 58C operates and contacts 58C–8 on FIG. 53, and 58C–6 on FIG. 54 close, the two trunk switch hold magnets involved in the local connection release. Negative source 4670 is connected through contacts 46HCB–22 and 46HCA–23 to conductor 54TS1, and through contacts 46HCB–23 and 46HCA–24 to conductor 54TS2. Conductor 54TS2 is connected through contacts 58C–8 and one set of contacts 53TK0–1 through 59TK19–1 either directly to one of conductors 52TSAB12–52TSAB19, or through the contacts of relays 53TKA or 53TKB to one of conductors 52TSA0–52TSB5. This one conductor, identified by the operated trunk relay, is connected through one of contacts 43TK–1 through 43TK–20 to the sleeve of the trunk connected to the trunk switch hold magnet that is to be released, the connection including crosspoints controlled by the trunk switch hold magnet to be released. Conductor 54TS1 is connected through 58C–6, 60LB–18, and 60LA–12 to conductor 54TS. This conductor is in turn connected through the translating network of FIG. 52, controlled by identification relays 58ID1–58ID8, to another one of the 20 conductors 52TSA0–52TSAB19. Thus the other trunk switch hold magnet to be released also has a negative potential applied to its associated one of conductors 36S0–36S19 or 39S0–39S19.

The resultant negative potential applied to each of the two selected conductors 52TSA0–52TSA19 is —34.6 volts and thus the two trunk switch hold magnets whose windings are connected to these conductors through the trunk switch crosspoints release. During this release operation the two associated line switch hold magnets remain operated as they are multipled to conductor 60HC as described above.

However, when the make contacts adjacent the trunk switch hold magnets release it is seen that the windings of the two associated line switch hold magnets are no longer connected to conductor 60HC. These two line switch hold magnet windings are now connected through the associated trunk switch hold magnet break contacts to conductors 42HC1 or 39HC1. The line switch hold magnets remain operated, however, as conductors 42HC1 and 39HC1 are connected to conductor 60HC. Conductors 42HC1 and 39HC1 are connected to conductor 3931 which is in turn connected on FIG. 60 through contacts 60LB–2 and 58C–2, and the top winding of relay 60CK to conductor 60HC. Thus although the windings of the two line switch hold magnets are no longer connected to conductor 60HC through the make contacts of the associated trunk switch hold magnets, they are now connected to the same conductor through the break contacts of these magnets and the winding of relay 60CK, and thus remain operated.

The winding of relay 60CK is included in the path in order that relay 60CK operate after both trunk switch hold magnets have released. Current flows through this winding, the current being derived in part from the current through one of the line switch hold magnets, and in part from the winding current of another of the line switch hold magnets. Relay 60CK operates only after both component currents flow through its top winding, or in other words, after both trunk switch hold magnets have released, and have controlled the associated make contacts to open and the break contacts to close. The resistance of the top winding of relay 60CK is negligible and as the 225 ohm resistor 6017 is still connected to conductors 60HC and 39HC the voltage equilibrium of the circuit is not disturbed. The energization of relay 60CK indicates that the two trunk switch hold magnets may now be reoperated. The trunk switch hold magnets may be reoperated, however, only after the required trunk switch select magnets on FIG. 43 have operated. Relays 43HMA and 43HMB control the reoperation of the trunk switch hold magnets, and these relays energize only after relay 60CK has operated indicating that the two trunk switch hold magnets have released, and after the trunk switch select magnets have also been energized.

After the trunk switch select magnets on FIG. 43 operated, ground potential was applied to the windings of both relays 43HMA and 43HMB. These relays did not operate however as conductor 58HMW was unenergized. After relay 60CK operates, however, this conductor is connected to a negative potential and the two relays operate. The relay windings are connected through closed contacts 46TR1–5, conductor 58HMW, contacts 63L–12, 60LB–9, now closed contacts 60CK–2, and through two of contacts 58ID1–1 through 58ID8–1 to negative source 5804. Relays 43HMA and 43HMB operate and initiate the reoperation of the two priorly released trunk switch hold magnets when contacts 43HMA–1 through 43HMA–20 on FIG. 41 and contacts 43HMB–2 through 43HMB–21 on FIG. 39 close.

These contacts connect a ground potential through those of contacts 41LHA0–2 through 41LHA19–2, and the analogous contacts on FIG. 39 associated with the operated line switch hold magnets, to respective conductors 41M–0 through 41M–19 and 39M–0 through 49M–19. These conductors are in turn connected to the windings of the associated trunk switch hold magnets, and the ground potential is extended through these windings and conductors 41N–0 through 41N–19, and 39N–0 through 39N–19 to the windings of the operated line switch hold magnets. The two trunk switch hold magnets priorly released now reoperate. The two priorly released trunk switch hold magnets reoperate as the negative potentials on their windings derived from the two energized ones of conductors 52TSA0 through 52TSAB19 are no longer applied, the trunk switch crosspoints connected to these conductors and controlled by these magnets having opened. These negative potentials are no longer applied when the crosspoints close as the crosspoints now closed are in horizontals 7 of the trunk switches rather than one of horizontals 0–6 to which conductors 52TSA0–52TSAB19 are connected.

Each pair of operated line and trunk switch hold magnets, including the reoperated trunk switch hold magnets, are held by current flowing from source 4108 through the line switch hold magnet windings, conductors 41N–0 through 41N–19, the trunk switch hold magnet windings, conductors 41M–0 through 41M–9, contacts 41LHA0–2 through 41LHA0–19, and contacts 43HMA–1 through 43HMA–20. There are similar current paths on FIG. 39 for line and trunk switches B, contacts on relay 43HMB being used rather than contacts on relay 43HMA. All of resistors 4402 are thus shunted, even those being used for holding regular connections. The junction of each pair of line and trunk switch hold magnets is thus at —25 volts rather than —34.6. Conductor 60HC is, however, still connected to all of these junctions, and the 225 ohm resistor 6017 might now disturb the voltage equilibrium of the circuit. To insure that such a condition does not arise, a negative 25 volt potential is applied to conductor 60HC to counteract any deleterious effects on the circuit that may now arise from resistor 6017 which although necessary before is no longer needed. Negative source 4670 has a magnitude of 50 volts and when relay 43HMB operates this source is connected through contacts 46HCA–22 and 43HMB–22, conductor 60LC1, resistor 6091, and the top winding of relay 60CK to the junction of resistor 6017 and conductor 60HC. Resistor 6091 has a magnitude of 225 ohms, and with resistor 6017 forms a voltage dividing relationship that places a negative 25-volt potential on conductor 60HC. In this manner resistor 6017 is effectively removed from the circuit as conductor 60HC is maintained at the negative 25-volt potential that it would normally be at from the operating currents for the line and trunk switch hold magnets.

All of the regular connections are held by currents flowing through line and trunk switch hold magnet windings and directly through contacts 43HMA–1 through 43HMA–20, and 43HMB–2 through 43HMB–21 to ground. After the local connection switching sequence is completed, relays 43HMA and 43HMB release and these contacts open. The line and trunk switch hold magnets establishing the regular connections are then held once again by currents flowing through the hold magnet windings and resistors 4402 to ground.

The two reoperated trunk switch hold magnets and the associated line switch hold magnets are now held operated over two of contacts 43HMA–1 through 43HMA–20, or 43HMB–2 through 43HMB–21. These contacts open at the end of the local connection switching sequence, and it is necessary to provide another holding current path. This current path cannot include resistors 4402 as these resistors are not connected to the two local trunks. Also, it is necessary to register the fact that the local trunk just connected to the two line equipments is in use. When the trunk switch cross points close, the windings of the two trunk switch hold magnets involved in the local connection are connected through respective conductors 36S0–36S19 and 39S0–39S19, and the crosspoints in horizontals 7 to one of conductors 37SX0 or 37SX1. This conductor, at the ground potential of two of conductors 41M–0 through 41M–19 or 39M–0 through 39M–19, is connected to the winding of either relay 40K0 or 40K1. If the first local trunk was available, relay 40K0 was previously unoperated and conductor 37SX0 is now connected through contacts 40K0–6 and 46HCB–24 to conductor 39CK1. If the first local trunk was previously in use and the local trunk now chosen is the second local trunk, contacts 40K0–5 are closed as are contacts 40K1–4, and conductor 37SX1 is connected to conductor 39CK1. The ground potential on conductor 39CK1 is extended through contacts 60CK1–B1 to the winding of relay 60CK1 which now operates. Relay 60CK1 locks over contacts 60CK1–M1, and 58C–4 and 54TR–2.

It is necessary to operate relay 40K0 if the first local trunk was just put in use and relay 40K1 if the second local trunk was just put in use. Contacts 60CK1–1 and 60CK1–2 close when relay 60CK1 operates, and negative source 6016 is now connected through these contacts to respective conductors 60K1 and 60K0. As contacts 43HMA–21 and 43HMB–23 are now closed it is seen that the negative potential of source 6016 is connected through the winding of either relay 40K0 or 40K1 to the grounded sleeve of the associated local trunk just chosen. Either relay 40K0 or 40K1 now operates. If relay 40K0 operates, contacts 40K0–3 and 40K0–4 close, and relay 40K0 is held for the remainder of the local connection by current from source 4002 flowing through contacts 40K0–4, the winding of relay 40K0, contacts 40K0–3, and resistor 4020 to ground. In addition, the sleeve of the first local trunk is now connected through contacts 40K0–3 and resistor 4020 to ground, which provides the holding current path for the two hold magnets establishing the local connection. Similarly, if the second local trunk was just put in use, relay 40K1 operates from the negative potential applied to conductor 60K1. Contacts 40K1–2 and 40K1–3 close and provide a holding current path for relay 40K1. In addition, contacts 40K1–2 and resistor 4021, connected to conductor 37SX1, provide a holding current path for the two hold magnets establishing the local connection.

With relay 60CK1 operated, contacts 60CK1–3 on FIG. 59 open and the operated select magnets release. Contacts 60CK1–6 on FIG. 62 are closed and when the field unit transmits a negative signal over one of the conductors in the second control pair in the normal manner indicating that it has completed the local connection, the reset multivibrator on FIG. 62 switches state. A positive potential is applied at the collector of transistor 62T1 which is transmitted through diode 6315 to turn off transistor 63T3 of the local multivibrator on FIG. 63. Relay 63L releases. Relay 60LA remains operated due to the discharge of capacitor 6012 but when this discharge is completed relay 60LA releases. Contacts 60LA–7 on FIG. 63 now opens and transistor 63T4 conducts. The local bistable multivibrator is in its normal unoperated condition and relay 63L becomes unenergized. This relay and relay 60LA which are now both unenergized control the resetting of the central office unit and common control. Conductor 62RSA is energized at this time, although it was not when the reset flip-flop was first triggered during the local connection sequence, as contacts 60LA–6 are now closed. The service action flip-flop is thus reset with transistor 46T0 conducting. When contacts 58C–4 and 54TR–2 on FIG. 60 open, relay 60CK1 releases. The positive pulse applied to conductor 62TS causes the monostable multivibrator on FIG. 62 to enter its unstable state as in the other switching sequences. After 125 milliseconds the common control causes line scanning to resume.

G. *Local connection release—detailed description of central office unit and common control operations*

The local connection release sequence is initiated in the field unit as it is this unit which recognizes the on-hook condition of either or both of the subscribers priorly involved in the local connection. During the 5 milliseconds between successive groups of line scanning pulses, the field unit transmits a simplex pulse over the first control pair if a local connection must be released.

This pulse triggers the service action bistable multivibrator in the same manner as in a regular connection sequence. With transistor 46T1 conducting a positive potential is applied to conductor 46SF. Transistor 63L0 conducts as in the regular connection sequence. When transistor 63L0 conducts a negative potential appears at its collector. This negative potential is extended through resistor 6248 and diode 6243 to turn on transistor 62T4 of the LCR bistable multivibrator. The conduction of transistor 63L0 turns on transistor 62T4 only when the monostable multivibrator is in the unstable state as it is between groups of line scans. During the scanning process with the multivibrator in its stable state, the collector of transistor 62T5 is positive in potential and this potential is transmitted through diode 6221 and resistor 6222 to the cathode of diode 6243. Diode 6243 is reverse biased and the negative potential at the collector of transistor 63L0 is not transmitted to the base of transistor 62T4 to turn it on. The LCR flip-flop can thus be triggered only between successive groups of line scans.

The negative potential at the collector of transistor 63L0 does not turn on transistors 65TA and 65TB at this time. The monostable multivibrator is in its unstable state and inhibits transistors 65TA and 65TB from conducting. The collector of transistor 62T6 is now more positive in potential rather than the collector of transistor 62T5. This positive potential is transmitted through diode 6224, resistor 6223 and resistors 6545 and 6546 to reverse bias the emitter-base junctions of transistors 65TA and 65TB.

When the service action bistable multivibrator on FIG. 46 changes state relay 46IA0 energizes. Also, with transistor 62T4 conducting, relay 62LCR energizes. And the positive potential at the collector of transistor 62T4 is extended through diode 6260, conductor 6302, conductor 6251, and diode 6518 to the junction of capacitor 6519 and resistor 6520 to stop the astable multivibrator.

With relay 62LCR energized, contacts 62LCR-7 are closed. Current flows from negative source 5404 through these contacts, contacts 54LCRA-1, and the winding of relay 54LCR1 to ground. This relay thus operates. Contacts 54LCR1-10 on FIG. 63 in closing, operate transistor 63TSC. Transistor 63TSC in operating, turns transistor 63L0 off.

With relay 62LCR energized contacts 62LCR-6 on FIG. 54 are also closed. Current flows through the lower winding of relay 54TR which thus energizes. Contacts 54TR-1 close and relay 46TR1 energizes.

On FIG. 53 contacts 54LCR1-4 are now closed as are normally closed contacts 54LCRA-4. Ground potential is extended to conductor 53CK1 and relay 60CK1 energizes. As contacts 54TR-2 are now closed relay 60CK1 locks through these contacts and contacts 60CK1-M1 to ground. Contacts 62LCR-5 on FIG. 54 are also closed to start the timing operation to reset the circuit if the local connection release is not completed in the predetermined time interval. On FIG. 65 contacts 54LCR1-8 close and ground potential is extended through resistor 6522 and diode 6518 to the junction of capacitor 6519 and resistor 6520. As in the other sequences the astable multivibrator is thus also held to prevent further scanning until the local connection is released at both central office and field units.

The field unit must be notified that the common control has recognized the simplex signal. Conductor 5810 is positive in potential and when contacts 62LCR-8 and 62LCR-9 close this positive potential appears on conductors 54T2' and 54R2'. As contacts 46TR1-8 and 46TR1-9 are now closed the positive potential is transmitted over both conductors of the second control pair. As described above both relays 25R and 25L in the field unit operate.

The field responds with a negative potential on either the tip and/or ring of the first control pair depending upon which local trunk must be released. It will be recalled that the central office unit does not identify which local trunk or both must be released at this time. The negative potential on either or both of the tip and ring conductors of the first control pair at this time only causes the further operation of the common control. The negative potential is extended through contacts 46TR1-6 and/or 46TR1-7 to FIG. 54. If the negative potential appears on conductor 54T1' it is extended through contacts 62LCR-10 and 54LCRA-2 to conductor 62SK. Similarly, if a negative potential is on conductor 54R1' it is extended through contacts 62LCR-11 and 54LCRA-3 to conductor 62SK. As contacts 60CK1-6 on FIG. 62 are closed, the negative potential on conductor 62SK causes the reset multivibrator to switch state as in the other sequences. Transistor 62T1 conducts and the positive potential at its collector is transmitted through diode 6258 and resistor 6250 to the base of transistor 62T4 which now turns off. Transistor 62T3 does not turn on, however, because contacts 54LCR1-7 are now closed and the ground potential extended through these contacts and resistor 6246 to the base of transistor 62T3 maintains this transistor nonconducting. With transistor 62T4 off, relay 62LCR releases. On FIG. 54 contacts 62LCR-12 now close and as contacts 54LCR1-2 are now closed, relay 54LCRA operates from negative source 5404. This relay locks over contacts 54LCRA-9 and 54LCR1-3.

Relay 54LCR1 was priorly held operated over contacts 54LCRA-1 which are now open. However, the relay remains operated. When contacts 54LCR1-1 first closed, capacitor 5403 charged. Although current from source 5402 through resistor 5401 is insufficient to maintain the relay operated, when contacts 54LCRA-1 open, capacitor 5403 begins to discharge through the relay winding and keeps the relay operated. Contacts 54KOR-2 and/or 54KIR-2 close before the discharge has completed and source 5431 then holds the relay operated.

With relay 62LCR released contacts 62LCR-6 are open and relay 54TR releases. Contacts 54TR-2 on FIG. 60 open and relay 60CK1 releases. This relay does not reoperate as the ground potential on conductor 53CK1 is now removed, contacts 54LCRA-4 being now open as well as contacts 54LCR1-9. Relay 54TR released causes relay 46TR1 to release as well. When relay 60CK1 releases and contacts 60CK1-B2 close the pulse applied on conductor 62TS causes transistor 62T5 to turn off, and the monostable multivibrator is placed in its unstable state. The monostable multivibrator has by now timed out, 5 milliseconds having expired. During the period of unstable operation between group scans, it enabled the LCR flip-flop to be triggered by the conduction of transistor 63L0, and prevented transistors 63TA and 63TB from conducting. Even though it times out after 5 milliseconds, the LCR flip-flop remains set at it has already been triggered. And the more positive potential at the collector of transistor 62T4 is now transmitted through diode 6291 to hold transistors 63TA and 63TB off. The monostable multivibrator is now triggered once again and the 125 millisecond unstable operation ensues.

Although the resets flip-flop now has transistor 62T1 conducting, as in the local connection, conductor 62RSA must not be energized for resetting the service action flip-flop as the local connection release sequence is not yet completed. Contacts 54LCR1–6 are now open and thus conductor 62RSA is not connected to the collector of transistor 62T1.

Although transistor 62T4 is now off, transistor 63TSC remains conducting. Contacts 54LCR1–10 are closed and cause the emitter-base junction of this transistor to be forward biased. Transistor 63L0 thus remains off.

When relay 62LCR releases contacts 62LCR–8 and 62LCR–9 on FIG. 54 open, the positive potentials priorly on the tip and ring conductors of the second control pair are removed, and relays 25L and 25R in the field unit release.

When the monostable multivibrator on FIG. 62 restores to its stable state, transistor 62T5 conducts again. A positive pulse is extended through capacitor 6220 and diode 6218 to the base of transistor 62T1 which now turns off. The reset flip-flop is thus in its normal condition. The positive potential at the collector of transistor 62T1 which was holding transistor 62T4 off is now removed. As transistor 62T3 is held off by closed contacts 54LCR1–7, transistor 62T4 immediately turns on. Relay 62LCR operates once again as do relays 54TR and 46TR1. With relay 62LCR reoperated the positive potential is applied once again to the tip and ring of the second control pair. Relays 25L and 25R reoperate in the field unit.

With contacts 62LCR–10 and 62LCR–11 on FIG. 54 closed as a result of the reoperation of relay 62LCR, and with contacts 54LCRA–6 and 54LCRA–7 closed as a result of the energization of relay 54LCRA, the negative potential on conductor 5807 is extended through the windings of relays 54KOR and 54KIR and these four sets of contacts to conductors 54T1' and 54R1'. These two potentials are then extended through contacts 46TR1–6 and 46TR1–7 to the tip and ring conductors of the first control pair. It will be recalled that although the negative potential is applied to both of these conductors current flows through the tip only if the first local trunk is to be released and current flows through the ring only if the second local trunk must be released. The field unit determines which or both of the local trunks must be released and permits current to flow through the corresponding tip or ring conductor of the first control pair. Consequently, relay 54KOR operates, if the first local trunk must be released, when current flows through the tip of the first control pair. Relay 54KIR operates, if the second local trunk must be released, when current flows through the ring of the first control pair. If both local trunks must be released both of relays 54KOR and 54KIR energize.

If the first local connection is to be released and current flows through the tip of the first control pair, relay 54KOR energizes and contacts 54KOR–3 on FIG. 60 close. Negative source 6016 is connected through contacts 46TR1–11 to the winding of relay 40K0. Relay 40K0 is operated whenever the first local trunk is in use, holding current coming from source 4002. With the potential of negative source 6016 now connected to one end of the winding of relay 40K0, this relay releases as the potential difference across its winding is zero. The negative potential on conductor 60S0 is also extended through the sleeves of the trunk switches to the lower ends of the windings of the two trunk switch hold magnets maintaining the connection. These hold magnets are held during the call by current flowing from negative source 4108 or the equivalent source on FIG. 39 through the windings of the line and trunk switch hold magnets in series, the sleeve of the local trunk, and through either contacts 40K0–3 and resistor 4020 or contacts 40K1–3 and resistor 4021, to ground. When the negative potential of source 6016 is applied to the sleeve conductors the potential difference across each pair of line and trunk switch hold magnets is zero and they now release.

Relay 54KOR is held by two currents. One of these is the current in the tip of the first control pair which ceases to flow when the field has completed the release of the local connection. The other holding current is also derived from the potential on conductor 5807 and flows through the winding of relay 54KOR and through contacts 54KOR–1, resistor 5409, conductor 46TH, contacts 46TR1–13 and contacts 40K0–7 to ground. When the field releases its local connection current in the tip of control pair 1 ceases. When the central office unit releases its local connection relay 40K0 releases and contacts 40K0–7 open thereby preventing the second current flow through the winding of relay 54KOR. The release of relay 54KOR thus indicates that both units have released their respective first local trunks.

Similarly, if the second local trunk is to be released the potential of negative source 6016 is extended through contacts 54KIR–3, conductor 60S1 and contacts 46TR1–12 to the sleeve of the second local trunk which causes both the line and trunk switch hold magnets establishing the local connection to release. The negative potential on conductor 60S1 is also connected to the winding of relay 40K1 which now releases. The two holding currents for relay 54KIR are similar to those for relay 54KOR. When the field unit has released its local connection, current in the ring of the first control pair ceases. When the central office unit has released its second local trunk the second energizing current for relay 54KIR which flows through conductor 5807, the winding of relay 54KIR, contacts 54KIR–1, resistor 5408, conductor 46RH and contacts 46TR1–14 and 40K1–5 to ground ceases. At this time relay 54KIR releases indicating that both units have released their second local trunks if this release was required.

Relay 54LCR1 has been held during this time by current flowing through the relay winding, contacts 54LCR1–1 and either contacts 54KOR–2 or 54KIR–2 to negative source 5431. The discharge of capacitor 5403 holds relay 54LCR1 after contacts 54LCRA–1 open until either or both of relays 54KOR or 54KIR energizes at which time the relay is held by source 5431. When either or both of the operated relays 54KOR or 54KIR release the holding path for relay 54LCR1 is broken and this relay releases. It should be noted that in the event that both local trunks must be released both of relays 54KOR and 54KIR must release before relay 54LCR1 de-energizes. When this relay does release, contacts 54LCR1–9 on FIG. 53 close. As relay 54LCRA is still operated contacts 54LCRA–8 are closed and ground potential is now applied once again to conductor 53CK1. Relay 60CK1 operates and locks through contacts 54TR–2. On FIG. 62 contacts 54LCR1–5 are now closed as relay 54LCR1 has released. Contacts 54LCRA–5 are still closed as relay 54LCRA is still operated. As contacts 60CK1–7 have just closed, a negative potential is extended from source 6261 through these contacts and resistor 6211 to the anode of diode 6212. This causes the reset multivibrator to operate in the same manner as when a negative potential is applied on conductor 62SK. When transistor 62T1 turns on, the LCR bistable multivibrator is restored to its normal conduction. Transistor 62T3 is no longer held off as contacts 54LCR1–7 are now open. Consequently, the positive potential applied at the collector of transistor 62T1 is transmitted through diode 6258 and resistor 6250 to the base of transistor 62T4, and causes this transistor to turn off and transistor 62T3 to turn on. Relay 62LCR releases and as contacts 62LCR–8 and 62LCR–9 on FIG. 54 open the positive potential on the tip and ring of the second control pair is removed. The field unit releases and is restored to its normal condition. Contacts 54LCR1–6 are now closed and the more positive potential on conductor 62RSA connected to the collector of conducting transistor 62T1 causes the service action flip-flop on FIG. 46 to reset. With relay 62LCR released, contacts 62LCR–6 on FIG. 54 open and relay 54TR releases. Contacts 54TR–2 on FIG. 60 open and relay 60CK1 releases. When contacts 60CK1–B2 close a pulse is applied to conductor 62TS which causes the monostable multivibrator to be placed in its unstable state after 125 milliseconds scanning resumes.

IV. EPILOGUE

The invention is a line concentrator system wherein a common control serves a plurality of central office and field units. The system is universal in that it may generally be used with any of the well-known present-day telephone systems. The common control scans all units simultaneously for service requests. At the same time the common control causes the scanning of trunks for trunk release requests, and pairs of trunks for possible interconnections, the two types of trunk scanning being on an interleaved basis and occurring in only one of the central office units at any one time.

The common control causes the establishment of regular connections in both central office and field units of a particular pair in response to a service request. In response to a request for trunk release the common control releases the line, link, and trunk connections.

When the common control determines that two trunks serving the same units are connected to each other through the central office switching equipment the two trunks connecting respective subscriber lines and line circuits are both released. In the field unit the two subscriber lines are connected directly to each other by one of two local trunks. In the central office unit the two line circuits are connected directly to each other by respective ones of two local trunks. The field unit local trunk circuit provides talking battery to the subscriber lines and supervises the remainder of the call. The central office local trunk connections are established to return busy tone to all telephone users calling either of the subscriber lines on the field unit local connection.

When the field unit local trunk supervisory circuit detects the termination of a local call, a signal is transmitted to the respective central office unit during the time interval between groups of line scans. The simplex pulse arriving at the central office unit between groups of line scans rather than during the line scanning sequence, notifies the common control that the field unit request is for the release of a local connection rather than a service request. The common control proceeds to cause the release of the local connections in both central office and field units.

Because of the local trunk feature fewer inter-unit trunks are required than those in prior art systems having the same call capacity. Two or four subscribers served by the field unit may be so served without the use of inter-unit trunks. Thus, although only 20 trunks are extended between each pair of field and central office units, a maximum of 24 subscribers may be served at any one time. If more than two pairs of local subscribers are talking to each other only two local connections may be established. However, immediately after one of the local connections is released, local connection scanning resumes, and another pair of subscribers are connected to each other by the previously released local trunk.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrating system comprising a plurality of pairs of field and central office units, each of said field units being connected to a plurality of subscriber lines, and each of said central office units being connected to a plurality of respective line circuits; a respective plurality of voice communication trunks extended between each pair of said field and central office units; respective control conductors extended between each pair of said field and central office units; and common control means connected to each of said central office units, said common control means including
    (1) means for scanning all of said line circuits for service requests, means for transmitting signals over said control conductors to said field units to control the scanning of all of said subscriber lines for service requests, means for connecting said line circuits to said trunks responsive to service requests and for transmitting switching information over said control conductors to cause said field units to connect said subscriber lines to said trunks;
    (2) means for scanning said trunks to determine release requests of said trunks, means for disestablishing the connections between the line circuits connected to said trunks responsive to said trunk release requests, and for transmitting switch information over said control conductors to cause said field units to disestablish the connections between the respective subscriber lines and said trunks; and
    (3) means for detecting the interconnection of any two trunks in the same plurality through two connected line circuits in the same plurality, means for disconnecting said two line circuits connected to said two trunks from said two trunks and for connecting said line circuits directly to each other, means for transmitting switching information over said control conductors to cause the respective field unit to disconnect the two subscriber lines connected to said two trunks from said two trunks and to connect said two subscriber lines directly to each other; and means in all of said field units for detecting the termination of a call between two subscriber lines connected directly to each other in said field units and for transmitting signals to said central office units and said common control means over the said control conductors; said common control means further including
    (4) means responsive to said signals for controlling the disconnection of the two respective line circuits connected directly to each other, and means for transmitting switching information over the said control conductors to cause said field units to disconnect said two subscriber lines from each other.

2. A telephone line concentrating system in accordance with claim 1 wherein each of said field and central office units contains a plurality of local trunks selectively connectable respectively to two of said subscriber lines and two of said line circuits for establishing said direct connections.

3. A telephone line concentrating system in accordance with claim 1 further including means connected to all of said central office units for enabling said common control means to establish and disestablish connections in only one pair of said field and central office units at any particular time.

4. A telephone line concentrating system in accordance with claim 1 wherein said trunk release scanning means includes means for applying nonaudible signals to line circuits connected to said trunks; means for inhibiting said signals from being transmitted to trunks connected to line circuits not requiring release; and means for detecting said signals on the remainder of said trunks connected to line circuits requiring release.

5. A line concentrating system in accordance with claim 1 wherein said means for detecting the connection of any two trunks in the same plurality to each other includes means for applying a nonaudible signal successively to every trunk in each one of said pluralities; means for scanning the other trunks in the same plurality for said signal; and means responsive to the detection of said signal for indicating the interconnection of the trunk on which said signal is applied and the trunk on which said signal is detected.

6. A telephone line concentrating system in accordance with claim 1 wherein said common control means includes means for controlling the scanning of subscriber lines and line circuits for service requests in each of said field and central office units simultaneously, means for controlling said trunk release scanning and said scanning to detect the interconnection of any two trunks to occur on an interleaved basis, means for controlling said interleaved scannings to be performed on only one of said pluralities of trunks at any particular time, and means for controlling said subscriber line and line circuit scanning to be performed simultaneously with said interleaved scannings.

7. A telephone line concentrating system in accordance with claim 6 wherein said common control means further includes means for controlling the scanning of said subscriber lines and line circuits in successive groups; means for inhibiting said subscriber line and line circuit scanning for a predetermined time interval after each group scan; and means in all of said field units for controlling the transmission of said signals to said central office units and common control means only during said predetermined time interval; said common control means including means for enabling said common control means to detect said signals only during said predetermined time interval.

8. A telephone line concentrator comprising a plurality of field units and a plurality of respective central office units; a plurality of subscriber lines connected to each of said field units; an equal plurality of respective line circuits connected to each of said central office units; a respective plurality of trunks connected between each pair of said central office and field units; and common control means connected to each of said central office units for scanning said line circuits and for controlling the scanning of said subscriber lines for service requests, for controlling the connection of any subscriber line to the respective line circuit over one of said trunks responsive to a service request, for scanning said trunks for release requests, and for controlling the disconnections of a subscriber line and line circuit connected to a trunk requesting release characterized by a respective plurality of local trunks in each of said field units selectively connectable to pairs of said subscriber lines; means in said common control means for scanning pairs of trunks in the same plurality to detect the interconnection of two trunks; and means in said common control means responsive to said trunk pair scanning means for controlling the release of the two interconnected trunks, and for controlling the connection directly to each other of the two subscriber lines previously connected to said two trunks over one of said local trunks.

9. A telephone line concentrator in accordance with claim 8 further characterized by means for inhibiting said trunk pair scanning for any pair of central office and field units when all of the respective local trunks are in use.

10. A telephone line concentrator in accordance with claim 8 wherein the subscriber lines connected to each field unit are divided into a plurality of groups, the respective line circuits are divided into an equal plurality of groups, and the respective trunks are divided into a plurality of groups further characterized by a plurality of groups of linkage means in each of said central office and field units for connecting particular groups of subscriber lines or line circuits only to particular groups of trunks.

11. A telephone line concentrator in accordance with claim 10 further characterized by means for inhibiting said scanning for service requests of a subcriber line or line circuit if all of the linkage means connectable to said subscriber line or line circuit are in use.

12. A telephone line concentrator in accordance with claim 10 further characterized by means for inhibiting said scanning for service requests of a subscriber line or line circuit if all of the trunks to which said subscriber line or line circuit is connectable are in use.

13. A telephone line concentrator in accordance with claim 8 further characterized by a pluraliy of local trunks in each of said central office units connectable to pairs of said line circuits; and means in said common control means for interconnecting any two line circuits in the same central office unit over one of said central office unit local trunks in response to the establishment of a direct connection between the two respective subscriber lines in the respective field unit.

14. A telephone line concentrator in accordance with claim 8 further characterized by means connectable to said field unit local trunks for connecting energizing potentials to said subscriber lines, and means for supervising direct connections between said subscriber lines.

15. A telephone line concentrator in accordance with claim 8 further characterized by means in said common control means for applying supervisory signals to the line circuits whose respective subscriber lines are connected directly to other subscriber lines in the same field unit.

16. A telephone line concentrator in accordance with claim 8 further characterized by signaling means extended between each of said field units and said common control means and each of said central office units and said common control means for enabling said common control means to verify that connections and disconnections have been established in response to signals from said common control means.

17. A line concentrator for connecting a plurality of subscriber lines at a remote location to a plurality of respective line circuits in a telephone central office by a plurality of trunks fewer in number than said subscriber lines comprising means in said central office and at said remote location for scanning said subcriber lines and said line circuits for service requests; means in said central office responsive to said scanning means for establishing a connection of a line circuit to one of said trunks and for transmitting first information to said remote location representing the identity of said trunk; means at said remote location responsive to the transmission of said first information for connecting said identified trunk to the respective subscriber line associated with said line circuit; means in said central office for scanning said trunks to determine a release request of any one of said trunks; means in said central office responsive to said trunk scanning means for releasing said trunk requesting release and for transmitting second information to said remote location representing the identity of said trunk; means at said remote location responsive to the transmission of said second information for releasing said identified trunk; means in said central office for sequentially scanning pairs of said trunks to detect if any pair of said trunks are connected to each other through said central office; means responsive to said detecting means for transmitting third information to said remote location representing the identity of the two trunks connected to each other; means at said remote location responsive to the transmission of said third information for releasing said two trunks and for connecting the two subscriber lines priorly connected to said two trunks directly to each other at said remote location; means in said central office responsive to said detecting means for releasing said two trunks and for connecting the two line circuits priorly connected to said two trunks directly to each other at said central office; means at said remote location for detecting when two subscriber lines connected directly to each other at said remote location request release and for transmitting a signal to said central office; and means at said remote location and in said central office for releasing direct connections responsive to the transmission of said signal.

18. A line concentrator in accordance with claim 17 wherein said subscriber lines and respective line circuits are separated into a plurality of respective groups, and said plurality of trunks are separated into an equal plurality of groups with each of said trunk groups serving a pair of subscriber line and line circuit groups, said line concentrator further including means at said remote location for controlling said connecting and releasing operations upon only one group of said subscriber lines at any particular time, and means in said central office for controlling the operation upon only the respective one of said groups of line circuits at the same time.

19. A telephone line concentrator comprising a plurality of subscriber lines connected to a field unit, an equal plurality of respective central office line circuits connected to a central office unit, and a lesser plurality of trunks extended between said central office and field units selectively connectable to respective subscriber lines and line circuits characterized by means for detecting the interconnection of any two of said trunks through the telephone central office; means for signalling said central office and field units of the identity of said two interconnected trunks; and means in said central office and field units for releasing said two trunks and for respectively connecting directly to each other the two line circuits and the two subscriber lines previously connected to said two trunks.

20. A telephone line concentrator in accordance with claim 19 wherein said detecting means comprises means for successively applying a nonaudible signal to each one of said trunks; means for sequentially scanning all others of said trunks for said signal; and means responsive to the detection of said signal on one of said other trunks for indicating that said one trunk is interconnected to said one of said other trunks through said central office.

21. A telephone line concentrator in accordance with claim 19 further characterized by means in said field unit for detecting an on-hook condition of a subscriber line connected directly to another of said subscriber lines in said field unit and for transmitting a signal to said central office unit; and means in said central office unit responsive to said signal for controlling the release of said on-hook subscriber line from said other subscriber line and the release in said central office unit of the two respective line circuits.

22. A switching circuit comprising a first plurality of terminals; a second plurality of terminals; a plurality of connecting means each selectively connectable between one of the terminals in said first plurality and one of the terminals in said second plurality; switching means for selectively connecting any one of the terminals in said second plurality to another one of the terminals in said second plurality; means for detecting the interconnection of any two of said connecting means through said switching means; means responsive to said detecting means for disconnecting the two interconnected connecting means from the terminals in said first and second plurality; and means for connecting directly to each other those two terminals in said first plurality priorly respectively connected to said two connecting means and those two terminals in said second plurality priorly respectively connected to said two connecting means.

23. A switching circuit comprising a first plurality of terminals; a second plurality of terminals; a plurality of connecting means each selectively connectable between one of the terminals in said first plurality and one of the terminals in said second plurality; switching means for selectively connecting any one of the terminals in said second plurality to another one of the terminals in said second plurality; means for detecting the connection of one of the terminals in each of said first and second pluralities to another of the terminals in each of said first and second pluralities through said switching means; means responsive to said detecting means for disconnecting the two connecting means connecting respectively said ones and said others of said terminals in said first and second pluralities from said terminals; and means for connecting directly to each other those two terminals in said first plurality priorly connected to said two connecting means and those two terminals in said second plurality priorly connected to said two connecting means.

24. A switching circuit in accordance with claim 23 further including means for detecting a request for releasing the direct connection of said two terminals in said first plurality and the direct connection of said two terminals in said second plurality priorly connected respectively to said two terminals in said first plurality by said two disconnected connecting means; and means responsive to said release request detecting means for releasing said two direct connections.

25. A switching circuit comprising a first plurality of terminals; a second equal plurality of terminals; a plurality of connecting means each selectively connectable between one of the terminals in said first plurality and one of the terminals in said second plurality; switching means for selectively connecting any one of the terminals in said second plurality to another one of the terminals in said second plurality; means for detecting the connection of one of the terminals in each of said first and second pluralities to another of the terminals in each of said first and second pluralities through said switching means; means responsive to said detecting means for disconnecting the two connecting means connecting respectively said ones of said terminals in said first and second pluralities and said others of said terminals in said first and second pluralities from said terminals; and means for connecting directly to each other those two terminals in said first plurality priorly connected to said two connecting means.

26. A telephone line concentrator comprising a plurality of field units and a plurality of respective central office units, a plurality of subscriber lines connected to each of said field units, an equal plurality of respective line circuits connected to each of said central office units, a respective plurality of trunks connected between each pair of said central office and field units, common control means connected to each of said central office units for controlling the connection of said subscriber lines to said line circuits over said trunks characterized by means in said common control means for detecting the connection of any trunk to another of said trunks in the same plurality; and means in said common control means responsive to said detecting means for controlling the release of said two trunks connected to each other, the connection directly to each other of the two subscriber lines previously connected to said two trunks, and the connection directly to each other of the two line circuits previously connected to said two trunks.

27. A telephone line concentrator in accordance with claim 26 further including means in each of said field units responsive to the on-hook condition of a subscriber line connected directly to another subscriber line in the same field unit for signaling said common control means of said on-hook condition; and means controlled by said common control means for disestablishing the direct connection in said field unit connecting said on-hook subscriber line to said other subscriber line in the same field unit, and for disestablishing the direct connection in the respective central office unit connecting the respective line circuits.

28. A switching circuit comprising a first plurality of groups of terminals and a second plurality of groups of terminals; a plurality of respective groups of connecting means, each of said connecting means being selectively connectable to the terminals in said first plurality of groups and the terminals in said second plurality of groups and to others of said connecting means; means for detecting the connection of any one of said connecting means to another of said connecting means in the same group; and means responsive to said detecting means for disconnecting said two connected connecting means, for directly connecting to each other those two terminals in said first plurality of groups previously connected to said two connecting means, and for directly connecting to each other those two terminals in said second plurality of groups previously connected to said two connecting means.

29. A telephone line concentrator comprising a plurality of subscriber lines connected to a field unit, an equal plurality of respective central office line circuits connected to a central office unit, and a lesser plurality of trunks extended between said central office and field units selectively connectable to respective subscriber lines and line circuits, a plurality of means for connecting any two of said subscriber lines directly to each other through said field unit, means for detecting the interconnection of any two of said trunks through the telephone central office, means responsive to said detecting means for releasing said two interconnected trunks and for connecting the two subscriber lines connected to said two trunks directly to each other over one of said direct connecting means, means for inhibiting said detecting means if all of said direct connecting means are in use, means for releasing any one of said direct connecting means from said subscriber lines, and means for reoperating said detecting means responsive to the release of one of said direct connecting means.

References Cited by the Examiner

UNITED STATES PATENTS 3,198,887  8/1965  Brooks et al. _____ 179—18

ROBERT H. ROSE, *Primary Examiner.*

WILLIAM C. COOPER, *Examiner.*